US006473541B1

(12) United States Patent
Ho

(10) Patent No.: US 6,473,541 B1
(45) Date of Patent: *Oct. 29, 2002

(54) PHOTON TRANSISTORS

(76) Inventor: Seng-Tiong Ho, 120 Picardy La., Wheeling, IL (US) 60090

( * ) Notice: Subject to any disclaimer, the term of this patent is extended or adjusted under 35 U.S.C. 154(b) by 148 days.

This patent is subject to a terminal disclaimer.

(21) Appl. No.: 09/661,975

(22) Filed: Sep. 14, 2000

Related U.S. Application Data
(60) Provisional application No. 60/154,142, filed on Sep. 15, 1999, and provisional application No. 60/167,526, filed on Nov. 24, 1999.

(51) Int. Cl.[7] ................................................. G02B 6/26
(52) U.S. Cl. ................................................. 385/15; 385/50
(58) Field of Search ............................. 385/50, 15, 14, 385/16; 359/278, 264

(56) References Cited

U.S. PATENT DOCUMENTS

| | | | |
|---|---|---|---|
| 5,005,933 A | 4/1991 | Shimuzu ................ 350/96.14 |
| 5,051,789 A | 9/1991 | Rosen et al. ................ 357/19 |
| 5,091,983 A | 2/1992 | Lukosz ........................ 385/13 |
| 5,097,357 A | 3/1992 | Ranganathan et al. ...... 359/243 |
| 5,109,156 A | 4/1992 | Evans et al. ................ 250/213 |
| 5,136,353 A | 8/1992 | Pankove et al. ............... 357/38 |
| 5,148,505 A | 9/1992 | Yanagawa et al. ............ 385/16 |
| 5,218,198 A | 6/1993 | Bristow et al. .......... 250/227.24 |
| 5,268,785 A | 12/1993 | Crenshaw et al. ........... 359/244 |
| 5,287,302 A | 2/1994 | Brandelik et al. ........... 365/161 |
| 5,315,422 A | 5/1994 | Utaka et al. ................ 359/107 |
| 5,329,137 A | 7/1994 | Taylor et al. ................ 257/21 |
| 5,375,180 A | 12/1994 | Murphy ........................ 385/21 |
| 5,414,282 A | 5/1995 | Ogura ........................ 257/187 |
| 5,434,434 A | 7/1995 | Kasahara et al. ............. 357/84 |
| 5,452,383 A | 9/1995 | Takiguchi ..................... 385/16 |
| 5,543,631 A | 8/1996 | Weinberger .................. 257/40 |
| 5,569,626 A | 10/1996 | Kurtz et al. ................. 437/228 |

(List continued on next page.)

OTHER PUBLICATIONS

Ho, Seng–Tiong, et al., "Single–beam squeezed–state generation in semiconductor waveguides with $x^{(3)}$ nonlinearity at below half–band gap," J. Opt. Soc. Am., vol. 12, No. 9, Sep. 1995, pp. 1537–1549.

Ho, Seng–Tiong, et al., "Scheme for realizing a photon number amplifier," Optics Letters, vol., 19, No. 1, Jan. 1, 1994, pp. 61–63.

Lee, Sangjae, et al., "Optical switching scheme based on the transmission of coupled gap solitons in nonlinear periodic dielectric media," Optics Letters, vol. 18, No. 12, Jun. 15, 1993, pp. 962–964.

Chu, Daniel Y., et al., "Spontaneous emission from excitons in cylindrical dielectric waveguides and the spontaneous–emission factor of microcavity ring lasers," J. Opt. Soc. Am., vol. 10, No. Feb. 2, 1993, pp. 381–390.

*Primary Examiner*—Ricky Mack
*Assistant Examiner*—Omar Hindi
(74) *Attorney, Agent, or Firm*—Brinks Hofer Gilson & Lione

(57) ABSTRACT

A light transfer device is provided that includes a first light pathway having a first input and a first output and a second light pathway having a second output. The second light pathway is coupled to the first light pathway, and light from the first input is transferable between the first and second light pathways. An active medium is positioned along one of the first and second light pathways, and the active medium is capable of receiving optical energy that modifies the active medium so that the active medium controls the transfer of light between the first and second pathways.

67 Claims, 93 Drawing Sheets

U.S. PATENT DOCUMENTS

| | | | | |
|---|---|---|---|---|
| 5,572,045 A | | 11/1996 | Takahashi et al. | 257/59 |
| 5,581,108 A | | 12/1996 | Kim et al. | 257/457 |
| 5,598,492 A | | 1/1997 | Hammer | 385/27 |
| 5,650,611 A | | 7/1997 | Nishikawa et al. | 250/225 |
| 5,659,640 A | | 8/1997 | Joyner | 385/14 |
| 5,682,042 A | * | 10/1997 | Amer et al. | 257/31 |
| 5,689,357 A | | 11/1997 | Campi | 359/245 |
| 5,699,462 A | | 12/1997 | Fouquet et al. | 385/18 |
| 5,699,465 A | | 12/1997 | Nakaya | 385/41 |
| 5,703,975 A | | 12/1997 | Miller et al. | 385/16 |
| 5,709,980 A | | 1/1998 | Schilling | 430/321 |
| 5,710,845 A | | 1/1998 | Tajima | 385/16 |
| 5,771,320 A | | 6/1998 | Stone | 38/16 |
| 5,790,583 A | | 8/1998 | Ho | 372/92 |
| 5,804,815 A | | 9/1998 | Loubriel et al. | 250/214.1 |
| 5,804,842 A | | 9/1998 | Thio | 257/184 |
| 5,808,349 A | | 9/1998 | Papadopoulos | 257/421 |
| 5,825,799 A | | 10/1998 | Ho et al. | 372/92 |
| 5,837,995 A | | 11/1998 | Chow et al. | 250/214 |
| 5,878,070 A | | 3/1999 | Ho et al. | 372/92 |
| 5,878,181 A | | 3/1999 | Van Der Tol | 385/122 |
| 5,886,809 A | * | 3/1999 | Puzey | 359/278 |
| 5,887,092 A | | 3/1999 | van der Tol | 38/27 |
| 5,937,118 A | | 8/1999 | Komori | 285/27 |
| 5,963,683 A | | 10/1999 | Goorjian | 385/16 |
| 5,974,216 A | | 10/1999 | Nakaya | 385/140 |
| 5,991,475 A | | 11/1999 | Nelson | 385/16 |
| 6,014,237 A | | 1/2000 | Abeles et al. | 359/124 |
| 6,049,642 A | | 4/2000 | Nakamura et al. | 385/16 |
| 6,061,380 A | | 5/2000 | Jiang et al. | 372/96 |
| 6,064,788 A | | 5/2000 | Khan et al. | 385/45 |
| 6,075,251 A | | 6/2000 | Chow et al. | 220/551 |
| 6,078,704 A | | 6/2000 | Bischel et al. | 385/4 |
| 6,078,717 A | | 6/2000 | Nashimoto et al. | 385/130 |
| 6,081,634 A | | 6/2000 | Attard | 385/16 |
| 6,084,992 A | | 7/2000 | Weber et al. | 385/24 |
| 6,111,998 A | | 8/2000 | Ido et al. | 389/29 |
| 6,115,170 A | | 9/2000 | Puzey | 359/278 |
| 6,115,517 A | | 9/2000 | Shiragaki et al. | 385/24 |
| 6,298,180 B1 | * | 10/2001 | Ho | 385/15 |

* cited by examiner

CASE E

TRANSPARENCY AT $\lambda$
$V=0$
$\lambda > \lambda_{gap}/_{V=0}$

CASE F

LOSS AT $\lambda$
$V \neq 0$
$\lambda < \lambda_{gap}/_{V \neq 0}$

CASE G

LOSS AT $\lambda$ ( $I_\lambda < I_{SAT}$)
$0 < V < V/ C = C_t(\lambda)$
$C < C_t(\lambda)$
$\lambda < \lambda_{gap}$

CASE H

TRANSPARENCY AT $\lambda$
$0 < V = V/ C = C_t(\lambda)$
$C = C_t(\lambda)$
$\lambda > \lambda_{gap}$

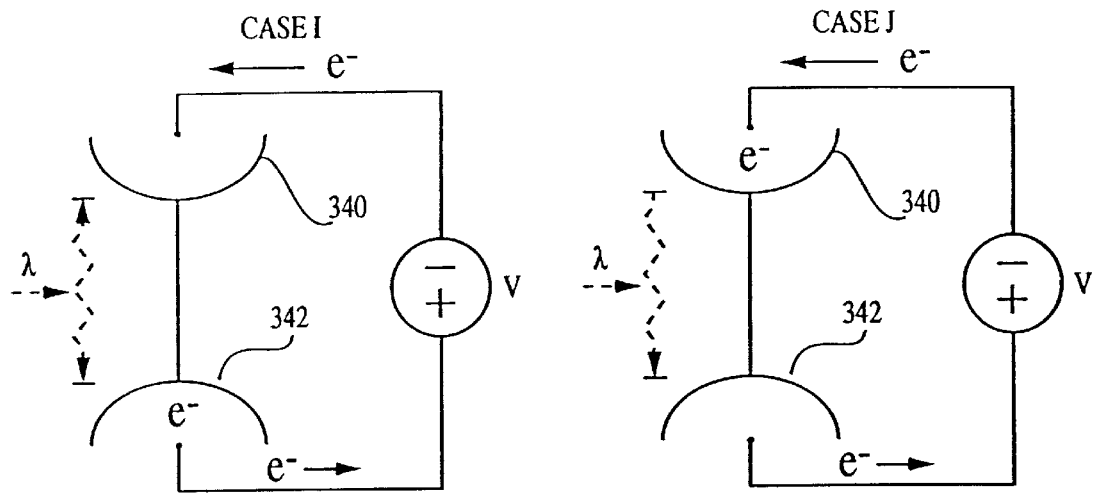
FIG. 4I
FIG. 4J
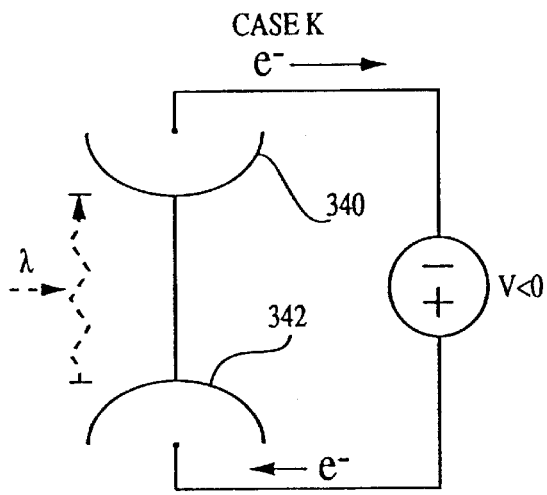
FIG. 4K

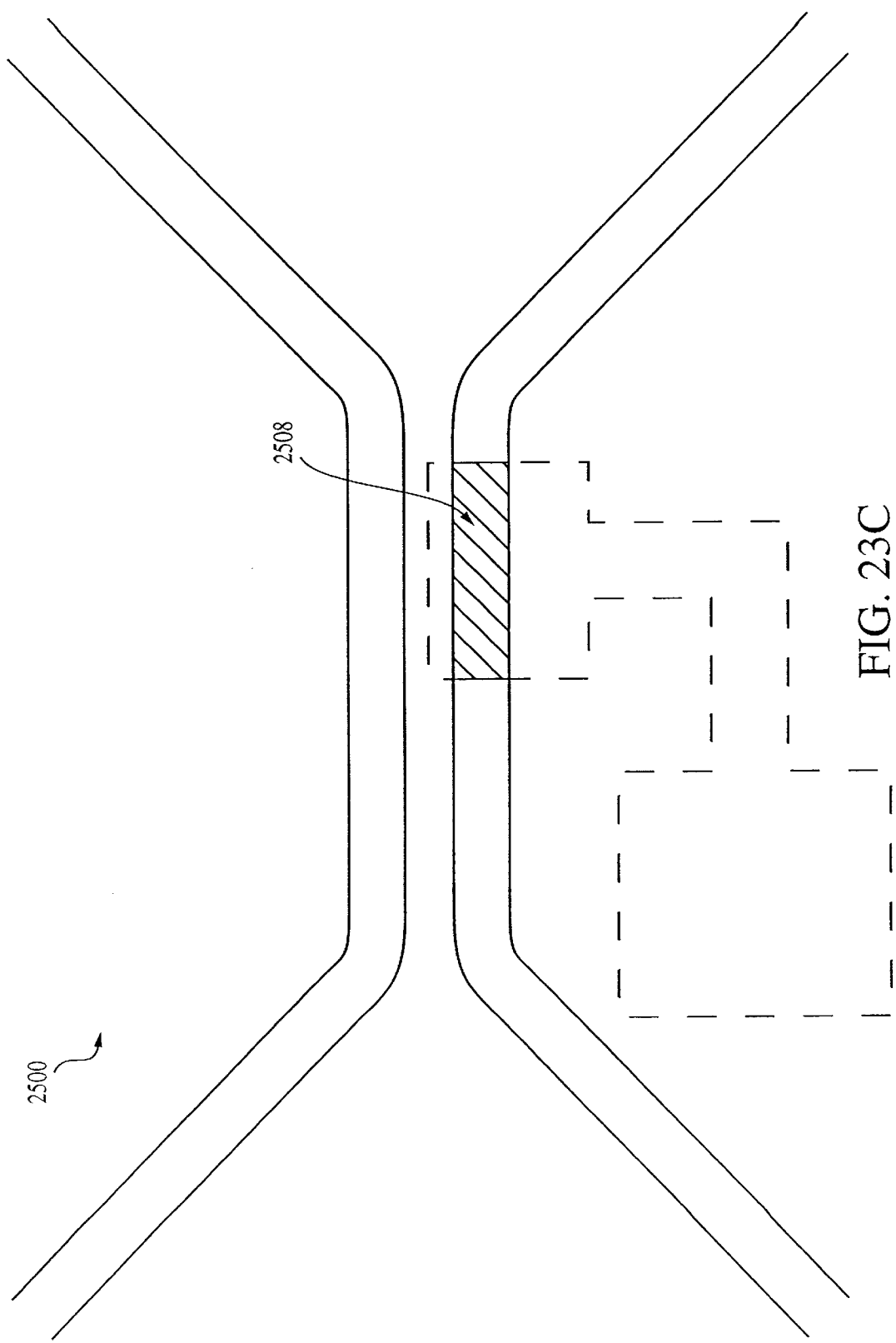

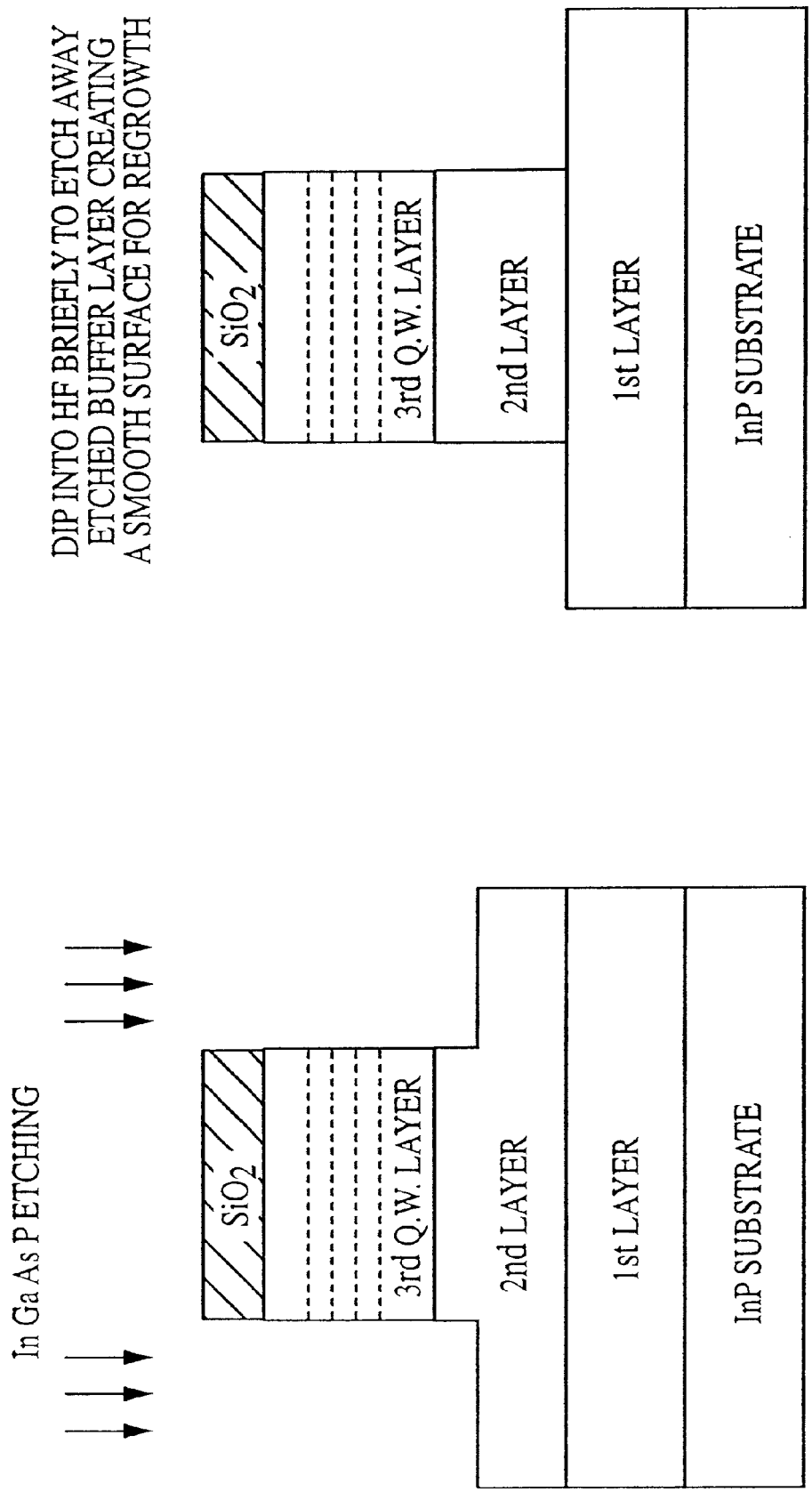

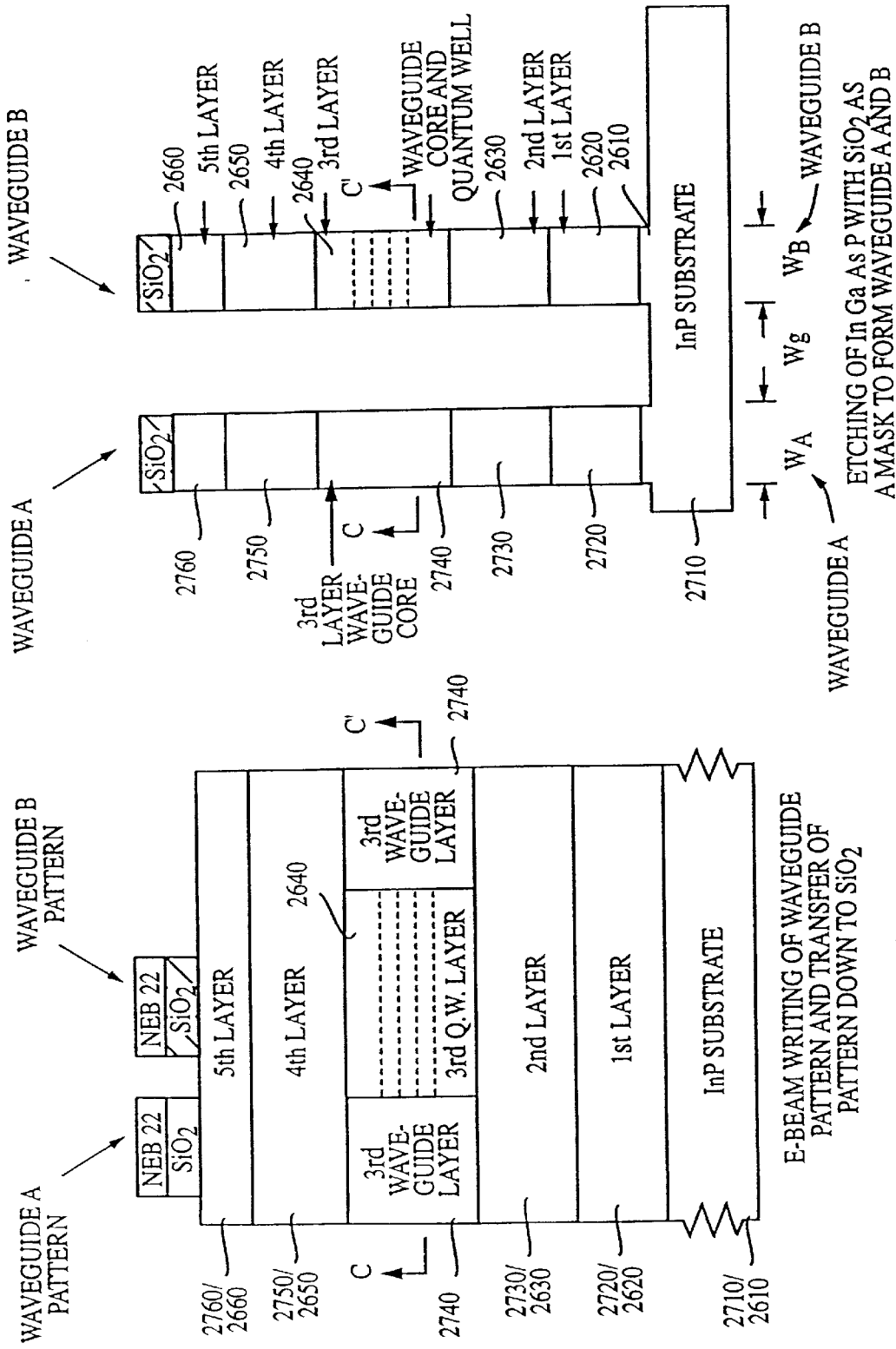

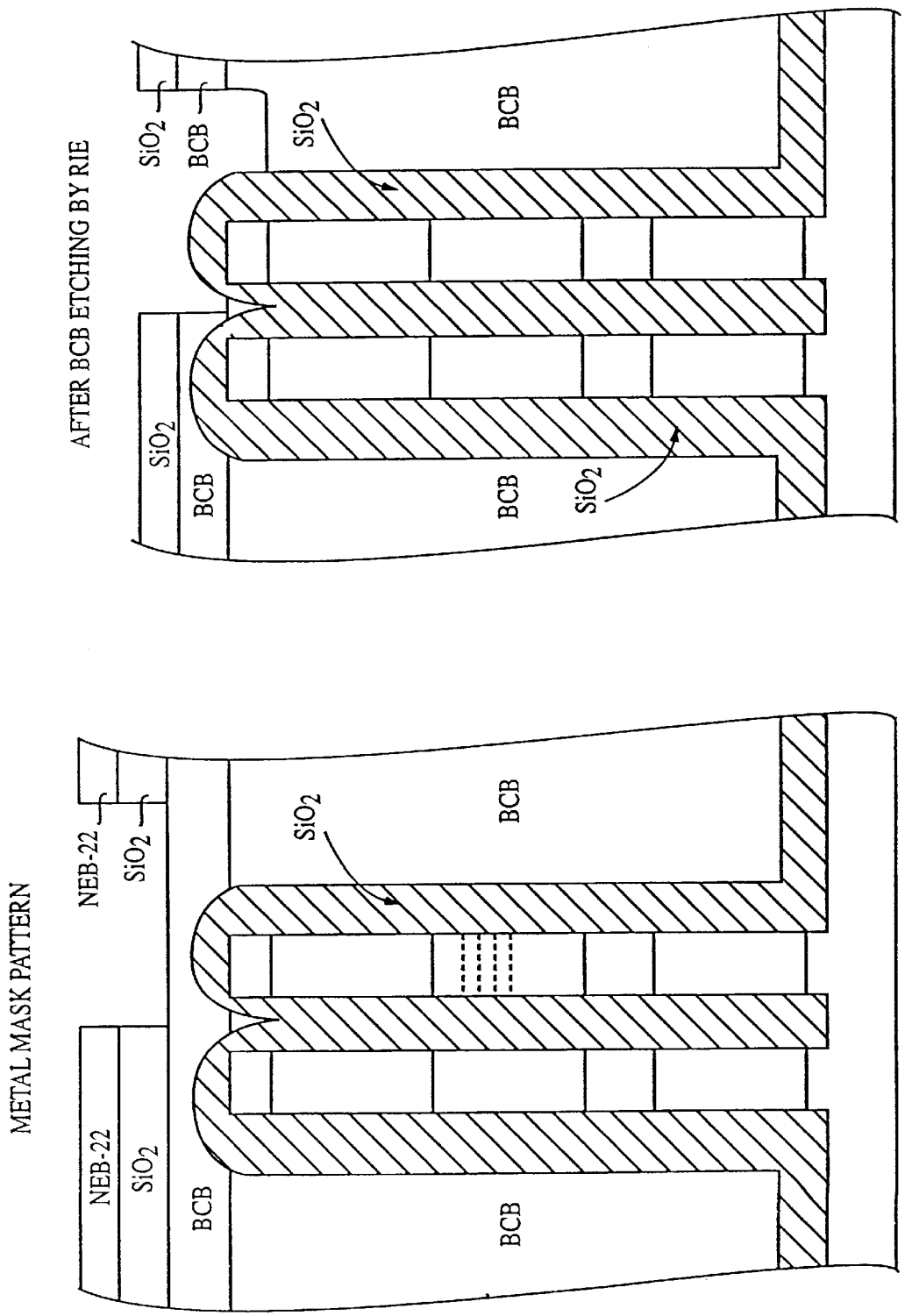
FIG. 26N — AFTER BCB ETCHING BY RIE
FIG. 26M — METAL MASK PATTERN

PHOTON TRANSISTORS

The present application claims priority to U.S. patent application Ser. No. 6,298,180, filed Sep. 15, 1999, entitled Photon Transistors, and also claims priority to U.S. Provisional Appl. Ser. No. 60/154,142, filed Sep. 15, 1999, entitled Photon Transistors, and also claims priority to U.S. Provisional Appl. Ser. No., 60/167,526, filed Nov. 24, 1999, entitled Electro-Photonic Transistors. The contents of these three applications are hereby incorporated in their entirety by reference.

BACKGROUND

The present invention relates to optical devices. In particular, the present invention is related to switching devices, signal-processing devices, and logic implemented using photonic optical devices. More particularly, the present invention is related to a new class of optical devices, operated on the principle of transfer photon resistance, that are capable of performing multiple functions on signals carried by lightwaves or photons, including all-optical and electro-optical switching. The broad functionalities of these devices are similar to that of electronic transistors, except that electronic transistors operate on signals carried by RF current or electrons while the devices of the current invention operate on signals carried by lightwave or photons.

The current generation of computers utilizes a plurality of electronic transistor components. These transistors modulate the resistance to the motion of electrons (and thus current) in order to accomplish a wide variety of switching, amplification, and signal processing functions. Transistor electronic action controls or affects the motion of a stream of electrons through "transfer (electron) resistance" via the action of another stream of electrons.

Electronic transistors are typically fabricated using semiconductors such as Silicon (Si), and to a far less extent Gallium Arsenide (GaAs). Computing functions are performed by such electronic transistors integrated or grouped together as logic circuits on a very large scale with high device density. Due to various reasons discussed below, however, electronic transistor computing in present implementations is ultimately limited to the maximum data clock speeds of a few GHz. Semiconductor electronic switches generally are thought to have theoretical upper limits on their performance. Achievable minimum switching times are thought to be in the tens of picoseconds (10–20 ps), while minimum achievable switching power consumption and operational energy are thought to be around 1 microwatt (1 $\mu$W) and tens of femto-joule (10–20 fJ) levels, respectively. Such levels imply that high frequencies of operation may be possible for electronic computing.

Dense, high-frequency electronic circuit operations utilizing such electronic transistors present several persistent problems and complexities that, whether surmountable or not, are issues of concern to circuit designers. Even though electronic transistors that can operate at faster than tens of GHz do exist, the problems of electromagnetic interference (or "crosstalk"), radiation, and parasitic capacitance in dense circuits limit the clock speed of electronic computers to a range of a few GHz as the signal wavelength through the circuit becomes comparable to the circuit size. Furthermore, high-frequency electronic circuits can suffer seriously from the problems of electromagnetic interference and radiation.

It is thought that an optical circuit for which the signals are carried by light instead of electrical current may be used to eliminate the problems involving electromagnetic interference. In order for an optical circuit to perform useful computational or signal processing functions, however, there must be a way to switch optical signals using other optical signals or electrical signals. The former case is referred to as "all-optical switching" and the latter case as "electro-optical switching".

Presently, fiber-optic communication systems typically use electro-optical switching. These optical communications systems have significant advantages over electrical communications systems utilizing electronic or radio-frequency (~$10^9$ Hertz) circuitries, partly because of the high frequency of light (~$10^{14}$ to $10^{15}$ Hertz), which allows much broader bandwidths to be used to transmit signals. However, current electro-optical switches are large in size (usually at centimeter sizes or larger) and expensive. This makes it difficult to bring the high bandwidth fiber communication systems directly to the customer's location, an undertaking which will require low-cost components capable of complex electro-optical signal processing. Thus, low-cost electro-optical devices and circuits capable of high-density of integration would be desirable. Besides optical communications, such low-cost integrated electro-optical devices and circuits can also aid in data transmission between electronic circuits or subcircuits or within an electronic integrated circuit. A greater percentage of optical signals used in such devices would help to reduce electromagnetic radiation or interference and decrease transmission speed within each device. This could lead to improved performance for high-speed electronic computers as well.

A future goal in optical communications systems is to replace part of the system with all-optical devices or circuits, which would enable faster operation. Such all-optical devices or circuits would also lead to the realization of ultrafast all-optical computers. Thus, devices that are capable of electro-optical operations or a mixture of electro-optical and all-optical operations would be very desirable.

Because optical pulses can be very short (in the femto-second range), it is often suggested that all-optical switching can be very fast. There have been attempts to construct switches that partially use light beams to switch light beams in an attempt to increase speed. In such attempts, switching an optical beam with another optical beam typically involves electronics to translate an optical signal at some point to an electrical signal which is then returned back to an optical signal at a subsequent time. Optical communications systems based on such switches are not "all-optical communications" because of this interface with electronic componentry. All-optical communications that allow the switching of light with light without the involvement of electronics as an intermediate step would reduce or eliminate the complexities inherent in the inclusion of electronic elements.

Below, examples of current art relating to all-optical switches as well as electro-optical switches are described.

There have been various attempts to switch light with light without the use of electronics. A typical method of switching one light beam via another light beam utilizes a Mach-Zehnder interferometer with a nonlinear optical medium. This implementation may be referred to as a nonlinear optical Mach-Zehnder interferometer. An exemplary Mach-Zehnder Interferometer 100 is illustrated in FIG. 1. The nonlinear optical Mach-Zehnder Interferometer 100 of FIG. 1 includes a pair of mirrors M1 102, M2 104 and a pair of 50 percent beam splitters BS1 106, BS2 108. A Signal Beam Input 110 input into the Interferometer 100 is split into a pair of beams 112, 114 via the 50 percent beam splitter BS1 106. The beams 112 and 114 are recombined at the beam splitter BS2 108 to form a pair of resultant beams. If the beams 112 and 114 face equal optical path lengths as the beams 112 and 114 traverse the upper and lower arms, respectively, of the Interferometer 100, then the beams 112 and 114 will constructively interfere to become Signal Beam Output A 116 and destructively interfere to become Signal Beam Output B 118. Hence, in this event, no signal beam will be output as beam 118 (as the destructive interference cancels the power at Signal Beam Output B), while the full combined signal beam will be output as beam 116.

A Nonlinear Refractive Index Medium 120 of length Lm, known to those skilled in the art as an optical Kerr medium, is positioned in the upper arm of the Mach-Zehnder Interferometer 100, as shown in FIG. 1. A Control Beam Input 122 with a polarization orthogonal to that of the beam 112 is introduced via a polarization beam splitter PBS1 124. The Control Beam Input 122 propagates through and exits the medium 120 and is output from the Interferometer 100 via a polarization beam splitter PBS2 126. The medium 120 has nonlinear optical properties, in that exposing the medium 120 to a strong light beam (in this case the Control Beam Input 122), can alter the refractive index of the medium 120. When the Control Beam Input 122 is on, the refractive index of the medium 120 will change according to the optical intensity, which is proportional to photons per unit time per unit area, of the beam 122. The refractive index of medium 120 can increase or decrease, which in turn causes the beam 112 in the upper arm of the Interferometer 100 to experience a change in the optical path length and to undergo an additional phase shift. This phase shift causes the destructive interference of the beams 112 and 114 at the beam splitter BS2 108 to become constructive in forming Signal Beam Output B 118. Similarly, the phase shift causes the constructive interference of the beams 112 and 114 at BS2 108 to become destructive in forming the Signal Beam Output A 116. This phenomenon leads to a net switching of signal output from the beam 116 (A) to the beam 118 (B). When the Control Beam Input 122 is viewed as a second input signal to the Interferometer 100, this dual input, dual-output all-optical switch can be viewed as performing optical logic operation equivalent to an "AND" gate used in the electronics realm.

The nonlinear optical Mach-Zehnder devices such as the interferometer 100 can achieve all-optical switching, but due to the lack of materials with a sufficiently high nonlinear refractive index, switches of this variety typically suffer from a number of problems and drawbacks. First, the device size (indicated by Lm in FIG. 1) is large. For a medium with a reasonably high nonlinear refractive index, a device length of 1 centimeter (1 cm) or longer is required. The large size of the device clearly prohibits their use in large-scale optical logic circuit integration. Second, the switching power required is very high, in that a control power of hundreds of Watts or more is required to operate the device at high speed. Third, while the nonlinear effect can be substantially higher when operated at close to the atomic resonance of the medium, thereby reducing the switching power, the speed of the switching operation will be slow due to real carrier excitation in the medium limiting the switching speed to below the hundreds of megahertz for a semiconductor medium. Fourth, the Mach-Zehnder device is very sensitive to device design parameter variations and vibration because of the dependence of the device on the optical path-length balance between the two arms of the interferometer.

Other variations of all-optical switching devices exist, such as one device (not shown) that uses a cavity to enhance the intensity in a medium or to achieve optical bi-stability. This device also suffers from one or more of the problems and/or drawbacks listed above with regard to the Mach-Zehnder device. These problems make the current all-optical switching devices impractical for applications to form large-scale or dense optical logic circuits. In fact it is often quite challenging to cascade even a few of the current all-optical switching devices to work together.

The nonlinear Mach-Zehnder interferometer described above and illustrated in FIG. 1 can also be implemented in a way to achieve electro-optical switching. Such an electro-optical Mach-Zehnder interferometer has the same configuration as the nonlinear-optical Mach-Zehnder interferometer except that the Kerr Medium of the Nonlinear Refractive Index Medium 120 is replaced by an electro-optical medium known to those skilled in the art as Pockel medium. The refractive index of the electro-optical medium can be altered via an applied electric field. The change in the refractive index leads to a change in the optical path length in one arm of the Mach-Zehnder interferometer, which again leads the Signal Beam Input 110 to exit the Signal Beam Output B 118 when the field is applied and to exit Signal Beam Output A 116 when the field is turned off, thereby achieving electro-optical switching. The electro-optical Mach-Zehnder switch may operate within a speed range of MegaHertz to tens of GigaHertz if the nonlinear optical effect is based on an intrinsically fast physical phenomenon such as the distortion of electron clouds around the atoms. Such distortion leads to a change in the microscopic electric dipole strength and in turn the macroscopic refractive index of the medium. One such medium commonly used is Lithium Niobate crystal. However, due to the smallness of such a fast electro-optic effect, a large electric field strength is needed to bring about complete switching. In typical devices, this translates into an applied voltage in the tens of volts, a high voltage value for high-frequency electronics.

In addition, these devices are typically large in size, with dimensions of several centimeters. A long interaction length is needed to attain the 180 degree (or $\pi$ radian) phase shift required for complete switching of the optical beam, due to the smallness of the electro-optic effect.

In order for computers to perform faster, and to circumvent many of the complexities that accompany electronic transistor computing at increased speeds, new compact technology must be developed. It would be advantageous to provide all-optical logic circuitry or a device family capable of improved speed, implementation at high or very high density of integration (due to smaller device sizes), operation at lower switching energy and power consumption levels, and improved immunity to device variations.

SUMMARY OF THE INVENTION

In accordance with the present invention, many of the disadvantages associated with prior electrical transistor-based devices and optical beam switching devices are addressed.

In particular, the devices described herein are very small in size with typical device dimensions of a few micrometers to hundreds of nanometers and are capable of achieving optical switching and electro-optical switching at high speed and low switching energy. Using these "photonic" devices, which typically operate by manipulating photon flux, it is possible to build low-cost electro-optical optical communication systems, all-optical communication systems or all-optical logic gates that can operate at speeds of 10 GHz to 10000 GHz or faster. Such devices will enable the realization of computers operating with a clock rates from 10 to more than 100 times faster than that of current high-speed electronic computers. Furthermore, the compact size of the devices will allow very-high-density device integration (a few million devices per square centimeters), leading to low cost per device function and subsequently the enablement of complex operation.

In addition to their superior speed of operation, these devices are also advantageous in that the signal transfer in the photonic circuit is via an optical beam well-confined within optical waveguides. This configuration results in very little signal interference from surrounding componentry. Furthermore, optical beams do not radiate radio frequencies to cause such interference.

Like electronic transistors, these devices will have a wide range of other general applications apart from applications to computers, such as applications relating to optical communications, optical signal processing, optical sensing or quantum optical communications. For example, in optical communications, in addition to their low cost and applications to electro-optical switching, these devices will have important applications to the realization of ultrafast (Tera-bit) all-optical communications for which a stream of optical pulses is being switched at very high (Tera-Hertz) speeds directly via another stream of optical pulses without the complication and speed compromise involved in using electronics to transfer the optical signal to an electrical signal and back again.

Unlike all the current electro-optical and all-optical switches, such as that of the Mach Zhender type described above, where the switching of light signals is activated by changing the refractive index of the active medium, the devices of the present invention enable the switching of light signals via changing the photon resistance brought about by modifying primarily the absorptive, transparency, or gain property of the active medium. It will become obvious from the exemplary devices described below that the switching of light signal based on such "transfer photon resistance" has many advantages over the current devices based on changing the refractive index of the medium. In particular, the devices of the current invention can be much smaller in size (10–10,000 times smaller), in operating power (10–1000,000 times smaller), and yet still relatively fast in switching time (hundreds of picosecond or faster). Such use of transfer photon resistance makes the devices of the current invention a close photonic analogue of electronic transistors. Hence, we call the devices of the current invention "phosistor", which is short for "photon transistors".

In one aspect of the present invention, a light transfer device is provided including a first light pathway having a first input and a first output and a second light pathway having a second output. The second light pathway is coupled to the first light pathway so that light from the first input is transferable between the first and second light pathways. An active medium is positioned along at least one of the first and second light pathways, and is capable of receiving optical energy that modifies the active medium so that the active medium controls the transfer of light between the first and second pathways.

In another aspect of the present invention, a light transfer device is provided including a first light pathway having a first input and a first output and a second light pathway having a second output. The second light pathway is coupled to the first light pathway so that light from the first input is transferable between the first and second light pathways. An active medium is positioned along at least one of the first and second light pathways, and is capable of receiving electrical energy that modifies the active medium so that the active medium controls the transfer of light between the first and second pathways.

In another aspect of the invention, a light transfer device is provided that includes a first light pathway having a first input and a first output and a second light pathway having a second output. The second light pathway is coupled to the first light pathway, and light from the first input is transferable between the first and second light pathways. A third light pathway is interposed between the first and second light pathways. An active medium is positioned along at least one of the first, second and third light pathways, wherein the active medium is capable of receiving light that modifies the active medium so that the active medium controls the transfer of light between the first, second and third pathways.

In yet another aspect of the invention, a light transfer component is provided having a first light pathway having a first input and a first output. A second light pathway is provided having a second output, and the second light pathway is coupled to the first light pathway. Light from the first input is transferable from the first input of the first light pathway to the second output of the second light pathway. An active medium is positioned along the first light pathway. The active medium is capable of receiving electrical energy that modifies the active medium so that a substantial portion of the light from the first input no longer remains on the first light pathway.

The invention may be further embodied in a logic device utilizing photonic energy. In this aspect, a plurality of directional couplers are provided, wherein the directional couplers each are capable of modifying the propagation direction of a photon beam through an active medium. The active medium has light transfer control properties that are modifiable via electrical energy. The directional couplers are linked by inputs and outputs capable of transmitting the photon beam through one or more switchable propagation paths.

In yet another aspect of the invention, a light transfer device is provided having a first light pathway including a first input and a first output, a second light pathway having a second output, and a third light pathway spaced from the first light pathway and the second light pathway. The second light pathway is spaced from the first light pathway, and the third light pathway is movable between at least a first position relatively near both of the first and second light pathways and a second position relatively far from the first and second light pathways. The first position allows the first light pathway to be optically coupled with the third light pathway, and simultaneously allows the third light pathway to be optically coupled with the second light pathway.

The present invention may also be embodied in a method of manufacturing a light transfer device. The method includes the steps of etching at least two waveguide structures onto a substrate material. The waveguides each include input and output ends, and at least one of the waveguides defines a gap area between its input and output ends. An active medium is then integrated onto the substrate into the gap area using epitaxial layer growth techniques to define an active medium section of the one of the waveguides. The active medium section preferably includes a plurality of quantum wells.

In another aspect of the present invention, a method of manufacturing a waveguide structure having at least two waveguides is provided. The method includes the steps of providing a silicon dioxide substrate, bonding a layer of GaAs to the substrate, patterning a photoresist for the waveguide structures, etching the GaAs not covered by the photoresist, and etching the silicon dioxide structure so as to form an undercut.

In addition to their use as optical switches, the disclosed invention can relate to the performance of a variety of functions, including logical operations, optical flip-flops, optical wavelength translation, electro-optical switches, optical detection, optical filtering, optical attenuation or gain, optical phase shifting, optical memory, and quantum optical operations, which take advantage of the physical effect of transfer photon resistance.

Beside their use as optical switches, the disclosed devices according to the present invention can perform a variety of multiple all-optical and electro-optical functions, including wavelength selective switching or filtering, variable optical attenuation/amplification or phase shifting, optical wavelength translation, optical diode, optical detection, optical memory, quantum-optical operations, optical flip-flops, and all-optical or electro-optical logic operations, all based on the physical effect of transfer photon resistance, which therefore creates a new class of devices. Potential applications of these devices include the realization of very-high-density photonic integrated circuits or nanoscale photonic (nanophotonic) devices and circuits, optical communications, optical sensing, optical interconnects, optical signal processing, all-optical computing, and all-optical communications.

The foregoing and other features and advantages of the presently preferred embodiments of the invention will be more readily apparent from the following detailed description, which proceeds with references to the accompanying drawings.

BRIEF DESCRIPTION OF THE DRAWINGS

Exemplary embodiments of the present invention are described with reference to the following drawings, wherein:

FIGS. 4E–K illustrate the states of a system used to describe an exemplary semiconductor active medium operating under essentially one wavelength;

FIG. 6C-1 is a simulation diagram illustrating the spatial distribution of the electric field strength of the first exemplary phosistor device illustrated in FIG. 6A under one exemplary state of operation out of a plurality of possible states of operation;

FIG. 6C-2 is a simulation diagram illustrating the spatial distribution of the electric field strength of the first exemplary phosistor device illustrated in FIG. 6A under another exemplary state of operation out of a plurality of possible states of operation;

FIG. 6C-3 is a simulation diagram illustrating the spatial distribution of the electric field strength of the first exemplary phosistor device illustrated in FIG. 6A under still another exemplary state of operation out of a plurality of possible states of operation;

FIG. 6C-4 is a graphical portrayal of the performance of the device of FIG. 6A;

FIG. 6E-1 is a simulation diagram illustrating the spatial distribution of the electric field strength of the phosistor device illustrated in FIG. 6D under one exemplary state of operation out of a plurality of possible states of operation;

FIG. 6E-2 is a simulation diagram illustrating the spatial distribution of the electric field strength of the phosistor device illustrated in FIG. 6D under another exemplary state of operation out of a plurality of possible states of operation;

FIG. 6F-1 illustrates an embodiment of the first exemplary phosistor device utilizing a first embodiment of an exemplary resonator configuration;

FIG. 6F-2 illustrates an embodiment of the first exemplary phosistor device utilizing a second embodiment of an exemplary resonator configuration;

FIG. 6F-3 illustrates an embodiment of the first exemplary phosistor device utilizing a third embodiment of an exemplary resonator configuration;

FIG. 6F-4 illustrates an embodiment of the first exemplary phosistor device utilizing a fourth embodiment of an exemplary resonator configuration;

FIGS. 6F-5 through 6F-8 are further alternative embodiments of a resonator configuration;

FIG. 6G-1 illustrates an embodiment of the first exemplary phosistor device utilizing a first exemplary photonic bandgap configuration;

FIG. 6G-2 illustrates an embodiment of the first exemplary phosistor device utilizing a second exemplary photonic bandgap configuration;

FIG. 6G-3 illustrates an embodiment of the first exemplary phosistor device utilizing a third exemplary photonic bandgap configuration;

FIG. 7 illustrates an embodiment of a second exemplary phosistor device utilizing directionally coupled waveguides;

FIG. 7A-1 is a simulation diagram illustrating the spatial distribution of the electric field strength of the phosistor device illustrated in FIG. 7 under one exemplary state of operation out of a plurality of possible states of operation;

FIG. 7A-2 is a simulation diagram illustrating the spatial distribution of the electric field strength of the phosistor device illustrated in FIG. 7 under another exemplary state of operation out of a plurality of possible states of operation;

FIG. 7A-3 is a graphical portrayal of the performance of the device of FIG. 7;

FIG. 7AA illustrates an embodiment of the second exemplary phosistor device utilizing three directionally coupled waveguides;

FIG. 7C-1 is a simulation diagram illustrating the spatial distribution of the electric field strength of the phosistor device illustrated in FIG. 7B under one exemplary state of operation out of a plurality of possible states of operation;

FIG. 7C-2 is a simulation diagram illustrating the spatial distribution of the electric field strength of the phosistor device illustrated in FIG. 7B under another exemplary state of operation out of a plurality of possible states of operation;

FIG. 7D-1 illustrates an embodiment of the second exemplary phosistor device utilizing a first embodiment of a first exemplary resonator configuration;

FIG. 7D-2 illustrates an embodiment of the second exemplary phosistor device utilizing a second embodiment of a first exemplary resonator configuration;

FIG. 7D-3 illustrates an embodiment of the second exemplary phosistor device utilizing a third embodiment of a first exemplary resonator configuration;

FIG. 7D-4 illustrates an embodiment of the second exemplary phosistor device utilizing a fourth embodiment of a first exemplary resonator configuration;

FIG. 7E-1 illustrates an embodiment of the second exemplary phosistor device utilizing a first embodiment of a second exemplary resonator configuration;

FIG. 7E-2 illustrates an embodiment of the second exemplary phosistor device utilizing a second embodiment of a second exemplary resonator configuration;

FIG. 7E-3 illustrates an embodiment of the second exemplary phosistor device utilizing a third embodiment of a second exemplary resonator configuration;

FIG. 7F-1 illustrates an embodiment of the second exemplary phosistor device utilizing a first exemplary photonic bandgap configuration;

FIG. 7F-2 illustrates an embodiment of the second exemplary phosistor device utilizing a second exemplary photonic bandgap configuration;

FIG. 7F-3 illustrates an embodiment of the second exemplary phosistor device utilizing a third exemplary photonic bandgap configuration;

FIGS. 9A-1 and 9A-2 are computer simulations of the spatial distribution of the electrical field strength of the device of FIG. 9;

FIG. 9A-3 is a graphical portrayal of the performance of the device of FIG. 9;

FIGS. 23A–C are alternate embodiments of phosistor devices;

DETAILED DESCRIPTION OF THE PRESENTLY PREFERRED EXEMPLARY EMBODIMENTS

CONTENTS OF DETAILED DESCRIPTION

I. TERMINOLOGY

II. THE UNDERLYING PHYSICS OF AN EXEMPLARY ACTIVE MEDIUM

Figure 1:
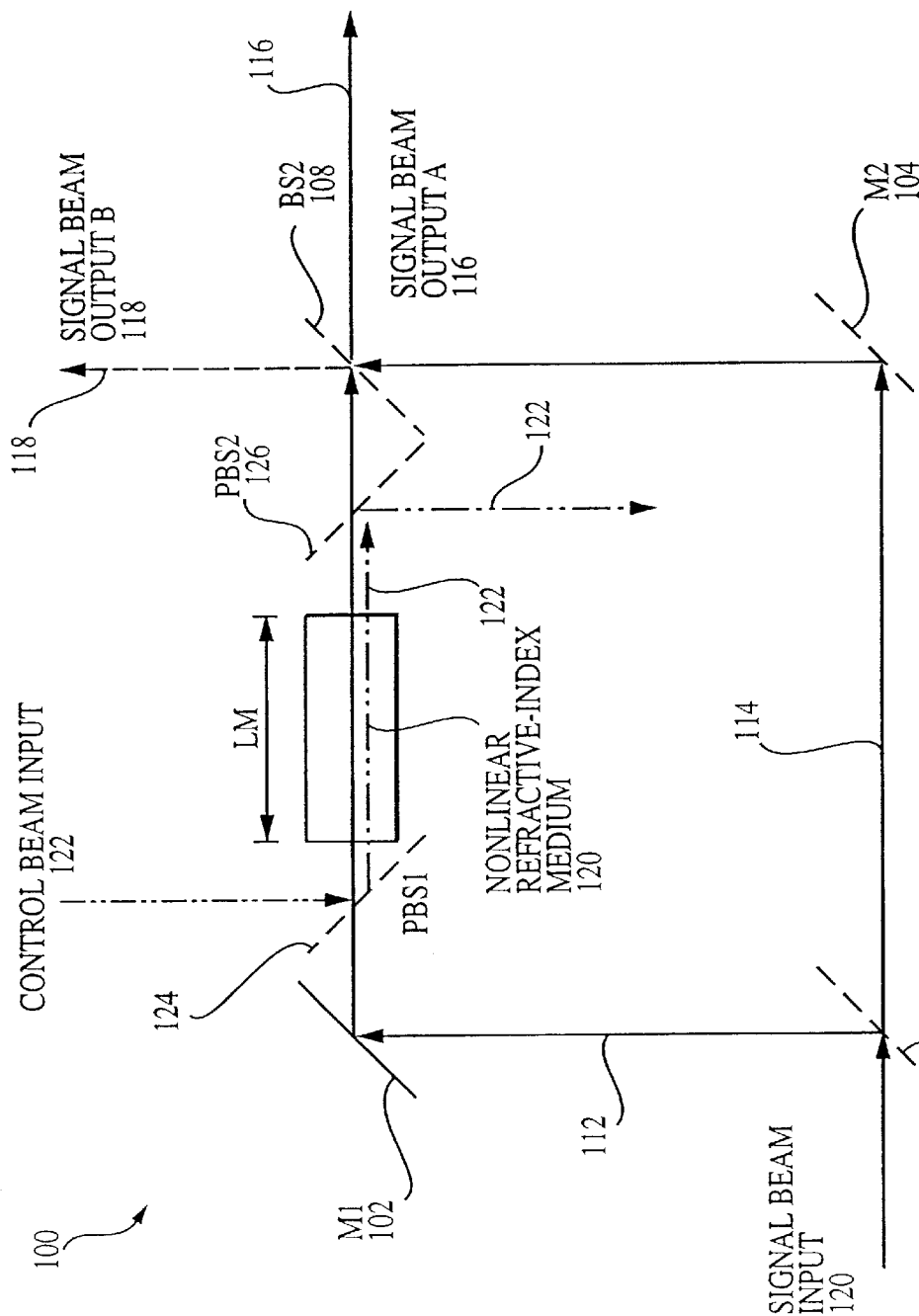
FIG. 1 is an illustration of an exemplary prior art Mach-Zehnder Interferometer all-optical switching device.

III. EXEMPLARY EMBODIMENTS OF THE WAVEGUIDE AND THE ACTIVE MEDIUM
IV. ALL-OPTICAL DEVICES
V. EXEMPLARY DEVICES AND EMBODIMENTS
  A. EXEMPLARY DEVICE 1
    i). MMI Configuration Device
    ii). Resonator Configuration Device
    iii). PBG Implementation of the Coupler/MMI/Resonator Configuration Device
  B. EXEMPLARY DEVICE 2
    i). Exemplary Device 2 as a Wavelength Multiplexer/De-Multiplexer or Wavelength Selective Switch
    ii). Multiple Waveguide Version of Device 2
    iii). MMI Configuration Device
    iv). Resonator Configuration I Device
    v). Resonator Configuration II Device
    vi). PBG Implementation of the Coupler/MMI/Resonator Configuration Device
  C. EXEMPLARY DEVICE 3
    i). MMI/Resonator Configuration Device
    ii). PBG Implementation of the Coupler/MMI/Resonator Configuration Device
  D. EXEMPLARY DEVICE 4
    i). Exemplary Device 4 as a Wavelength Multiplexer/De-Multiplexer or Wavelength Selective Switch
    ii). Multiple Waveguide Version of Device 4
    iii). MMI/Resonator Configuration Device
    iv). PBG Implementation of the Coupler/MMI/Resonator Configuration Device
  E. EXEMPLARY DEVICE 5: A FLIP-FLOP BASED ON EXEMPLARY DEVICE 2
    i). The Enable State
    ii). The Set State
    iii). The Reset State (Enable=1; Set=0; Reset=0→1→0)
    iv). MMI/Resonator Configuration Device
    v). PBG Implementation of the Coupler/MMI/Resonator Configuration Device
  F. EXEMPLARY DEVICE 6: A FLIP-FLOP BASED ON EXEMPLARY DEVICE 3
    i). The Enable State
    ii). The Set State
    iii). The Reset State (Enable=1; Set=0; Reset=0→1→0)
    iv). MMI/Resonator Configuration Device
    v). PBG Implementation of the Coupler/MMI/Resonator Configuration Device
  G. EXEMPLARY DEVICE 7: AN OPTICAL AMPLIFIER
    i). The First Stage (Device 1)
    ii). The Second Stage (Device 2)
VI. ELECTRO-OPTIC DEVICES
VII. ADDITIONAL EXEMPLARY DEVICES AND EMBODIMENTS
  A. EXEMPLARY DEVICE 8 (ELECTRO-OPTIC)
    i). A First Exemplary State (State K in FIG. 4K)
    ii). A Second Exemplary State (State H in FIG. 4H)
    iii). A Third Exemplary State (State J in FIG. 4J)
    iv). Exemplary Device 8 as a Switching Element
    v). MMI/Resonator Configuration Device
    vi). PBG Implementation of the Coupler/MMI/Resonator Configuration Device
  B. EXEMPLARY DEVICE 9 (ELECTRO-OPTIC)
    i). A First Exemplary State (State K in FIG. 4K)
    ii). A Second Exemplary State (State H in FIG. 4H)
    ii). A Third Exemplary State (State J in FIG. 4J)
    iii). A Third Exemplary State (State J in FIG. 4J)
    iv). Exemplary Device 9 as a Switching Element
    v). Exemplary Device 9 as a Phase Shifter
    vi). Exemplary Device 9 as a Wavelength Multiplexer/De-Multiplexer or Wavelength Selective Switch
    vii). MMI/Resonator Configuration Device
    viii). PBG Implementation of the Coupler/MMI/Resonator Configuration Device
  C. EXEMPLARY DEVICE 10 (A THREE GATE ELECTRO-OPTIC DEVICE)
    i). A First Exemplary State (State K in FIG. 4K)
    ii). A Second Exemplary State (State H in FIG. 4H)
    iii). A Third Exemplary State (State J in FIG. 4J)
    iv). Exemplary Device 10 as a Switching Element
    v). Exemplary Device 10 as a Phase Shifter
    vi). Exemplary Device 10 as a Wavelength Multiplexer/De-Multiplexer or Wavelength Selective Switch
    vii). MMI/Resonator Configuration Device
    viii). PBG Implementation of the Coupler/MMI/Resonator Configuration Device
  D. EXEMPLARY DEVICE 11 (A WAVELENGTH MULTIPLEXING/FILTERING DEVICE)
  E. EXEMPLARY DEVICE 12 (A THREE GATE MECHANICAL-OPTICAL DEVICE)
    i). Exemplary Device 12 as a Switching Element
    ii). Exemplary Device 12 as a Phase Shifter
    iii). Exemplary Device 12 as a Wavelength Multiplexer/De-Multiplexer or Wavelength Selective Switch
    iv). Resonator Configuration Device
  F. EXEMPLARY DEVICE 13 (A RELAYING GATE MECHANICAL-OPTICAL DEVICE)
    i). Exemplary Device 13 as a Switching Element
    ii). Exemplary Device 13 as a Wavelength Multiplexer/De-Multiplexer or Wavelength Selective Switch
    iii). Resonator Configuration Device
VIII. PHOSISTOR EXEMPLARY FABRICATION METHOD

I. TERMINOLOGY

Described herein is a new class of photonic devices, referred to as "photon transistors" (or "transfer photon-resistors"). The word "resistor" is used here to describe the resistance to the motion of photons, not electrons. The photon transistor devices and the exemplary embodiments described herein present a new class of optical devices that are capable of performing multiple functions, including all-optical and electro-optical switching, wavelength selective switching or filtering, variable optical attenuation/amplification or phase shifting, optical wavelength translation, optical diode, optical detection, optical memory, quantum-optical operations, optical flip-flops, and all-optical or electro-optical logic operations. These devices are small in size, allowing very-high-density photonic integrated circuits to be built incorporating these devices to perform complex operations, including faster optical processing or all-optical computing.

The name "photon transistor" is derived from the fact that the devices and exemplary embodiments described herein preferably use a combination of means to resist or enhance the flow of photon flux in a certain direction. The modified flow of flux is preferably accomplished by altering the interference flux pattern of light and by preferably altering the light transfer control properties of the active medium via the action of another photon flux, an applied voltage or an injection current on an active medium. Preferably, the interference flux pattern of light identifies, and the light transfer control property of the active medium determines, the propagation direction of the flow of photon flux in the photon transistor(s) (hereinafter "phosistor(s)") at a given time. This action is the photonic analogue of the action of an electronic transistor wherein the motion of a stream of electrons is affected or controlled through "transfer resistance" via the action of another stream of electrons, or an applied voltage or injection current.

II. THE UNDERLYING PHYSICS OF AN EXEMPLARY ACTIVE MEDIUM

The photon transistor or phosistor devices and presently preferred exemplary embodiments detailed herein are based on the interaction of photons with active materials or media having multiple upper-energy levels. An example of one such active material is Gallium Arsenide Phosphide, which is used in the manufacture of conventional semiconductors. Most of the phosistors and related devices herein preferably utilize two or more wavelengths of light for all-optical operations and one or more wavelengths of light for electro-optical operation under the control of an applied voltage or injection current. For the case of two wavelengths, the light beam interacting with the lower upper-energy level of the active material will have a longer wavelength than that of the beam interacting with the higher upper-energy level. In general, the longest wavelength is denoted as $\lambda_1$, and all subsequently shorter wavelengths as $\lambda_2$, $\lambda_3$, ... etc. In this notation $\lambda_1 > \lambda_2 > \lambda_3 > $ ... etc. The upper-energy levels with which these wavelengths interact will be denoted by $E_1$, $E_2$, $E_3$ ... etc, respectively, with $E_1 < E_2 < E_3$ ... etc. If the ground-energy level for which an electron in energy level $E_n$ can make a radiative transition to is denoted as $E_{gn}$, then $\lambda_n$ will be related to $E_n$ via $E_n - E_{gn} = h\nu_n$, where the frequency is $\nu_n = c/\lambda_n$, c is the speed of light in free space, and h is Planck's constant, $6.6262 \times 10^{-34}$ J–s. During the transition, a photon with a quantized energy of $h\nu_n$ is either emitted or absorbed by the medium. The energy difference $E_n - E_{gn} = h\nu_n$ is referred to as the transitional energy and $\nu_n$ ($\lambda_n$) is referred to as the transitional frequency (wavelength).

Preferably, the active medium has a general ground-energy level (it can consist of a series of related ground-energy states or levels) and a number of upper-energy levels. That is, the active material or medium having multiple upper-energy levels may be defined as having multiple ground energy levels, or states. The ground-energy states are generally connected in that after an electron from an upper-energy level $E_n$ makes a radiative transition to a ground-energy level $E_{gn}$, it may move, or relax, to other ground energy levels and can subsequently be excited to another upper-energy level. Thus, as far as the general operation of the active medium is concerned, the ground levels may be seen as a state reservoir holding a finite number of ground-energy electrons.

Preferably electrons excited to the upper-energy levels generally should relax back to the lower upper-energy level (often referred to as intraband relaxation) at a faster rate compared to the decay rate between an upper-energy level and the general ground-energy level (often referred to as interband decay). That is, electrons excited to the higher upper-energy level will relax rapidly to the next upper-energy level, ultimately filling the lowest upper-energy level rapidly and then continuing to fill the next higher upper-energy levels. This property is called "upper-state intraband relaxation." The rate of upper-state relaxation is fast compared to the radiative interband decay between an upper-energy level $E_n$ and a ground-energy level $E_{gn}$.

With respect to the general requirements of the active medium, three useful and exemplary active media are: (1) an essentially two-level system with a general ground-energy level and an upper-energy level; (2) an essentially three-level system with a general ground-energy level and two upper-energy levels; and (3) an essentially four-level system with a general ground-energy level and three upper-energy levels. It should be understood that these three systems are described for exemplary purposes and do not consist of or exhaust all possibilities for multi-level systems contemplated by and within the scope of the active medium utilized in the phosistor devices and embodiments described herein.

An exemplary embodiment of the active medium will be a semiconductor having a bandgap energy $E_{Gap}$ for which the lowest upper-energy level $E_1$ discussed above will be the lowest state above the bandgap or lowest upper-bandgap state. Any electrons excited to above the bandgap energy state will relax to the energy $E_1$ very rapidly (preferably in hundreds of femtoseconds or less) and will fill the states of higher upper-energy states after the lower upper-energy states have been filled. In the case of semiconductors, the higher upper-energy level $E_2$ discussed above can be a particular upper-bandgap state above the energy $E_1$. The speed of upper-state relaxation from $E_2$ to $E_1$ will depend on the energy separation between $E_1$ and $E_2$. A larger energy difference will generally slow the relaxation rate. The relaxation time is typically around hundreds of femtoseconds or less. This relaxation time is fast compared to the time it takes an electron to decay from $E_1$ to the ground state $E_g$, which is usually around a few nanoseconds to hundredths of a picosecond.

It should be understood that while a semiconductor material is a convenient active material or medium that can be used for phosistors, other media may be utilized. For example, other than semiconductor media, there are many other atomic, molecular, ionic, or low-dimensional electronic media, such as quantum wells, quantum wires, or quantum dots, for example, that can satisfy the general requirements of the medium described and that are known to those skilled in the art.

Figure 2A:
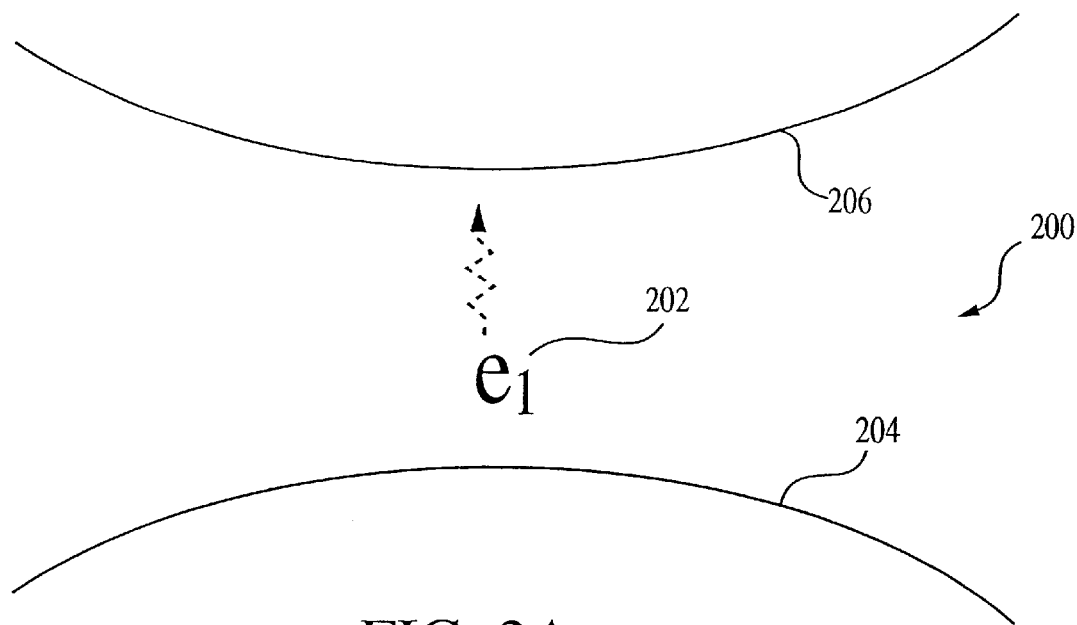
FIGS. 2A–C illustrate a system having essentially two energy levels used to describe an exemplary semiconductor active medium.
Figure 2B:
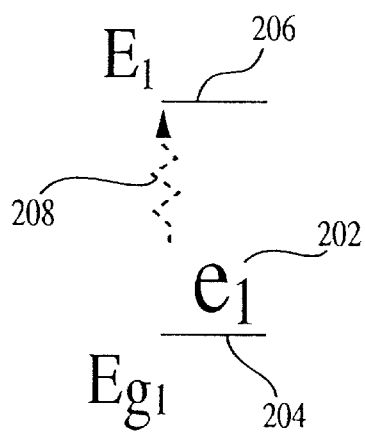
Figure 2C:
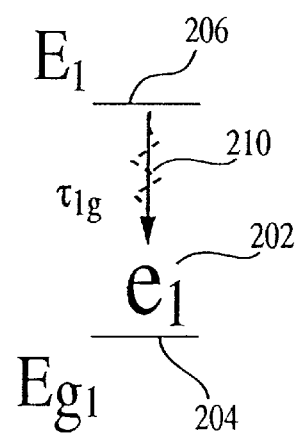
Figure 3A:
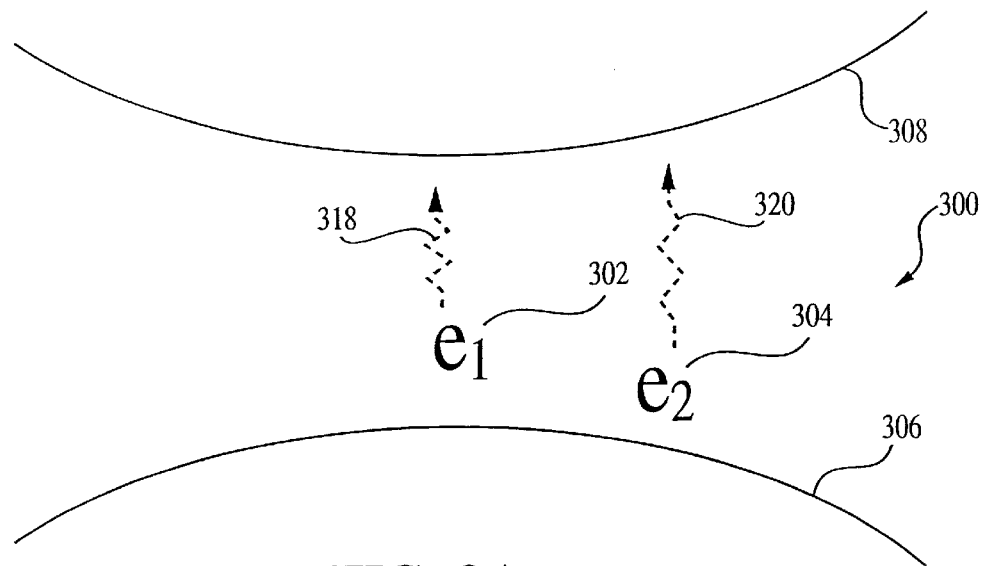
FIGS. 3A–C illustrate a system having essentially three energy levels used to describe an exemplary semiconductor active medium.
Figure 3B:
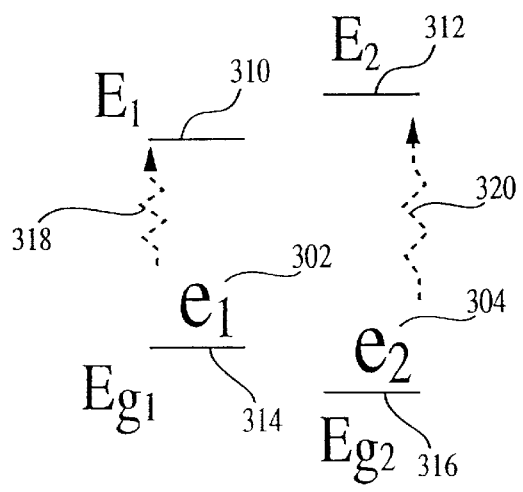
Figure 3C:
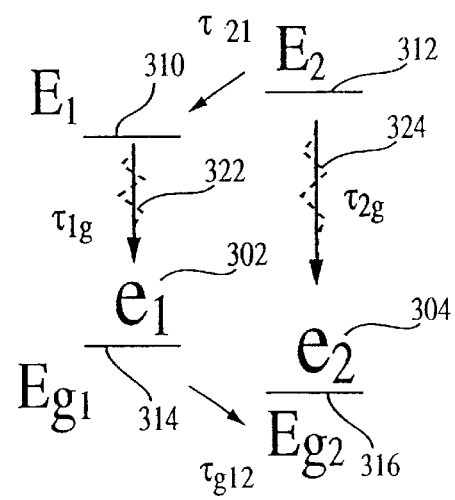

For purposes of illustration and not limitation, the semiconductor material described above will be used as the exemplary active material or medium for the discussion of multi-level systems. A first, essentially two-level system having a general ground-energy level and an upper-energy level is illustrated in FIGS. 2A–C. A second, essentially three-level system with a general ground-energy level and two upper-energy levels is shown in FIGS. 3A–C. A third, essentially four-level system with a general ground-energy level and three upper energy levels, while not illustrated, is easily extrapolated from the three level system by those skilled in the art and follows from FIGS. 3A–C and 2A–C. Again, it should be understood that these three systems are described for exemplary purposes and do not consist of or exhaust all possibilities for multi-level systems contemplated by and within the scope of the active medium utilized in the phosistor devices and embodiments described herein.

FIGS. 2A–C illustrate the case of essentially two energy levels or an essentially two-level system 200 for a semiconductor active medium. FIG. 2A illustrates a single electron $e_1$ 202 that is excited from a general ground-energy level 204 to an upper-energy level 206. FIG. 2B is a diagram illustrating the excitation of the electron $e_1$ 202 from the general ground-energy level $E_{g1}$ 204 to the upper-energy level $E_1$ 206. In FIGS. 2A and 2B, a zigzag dashed-line arrow 208 is used to represent the excitation from low to high energy via the absorption of light. FIG. 2C is a diagram illustrating the free spontaneous decay of the electron $e_1$ 202 from the upper-energy level $E_1$ 206 to the general ground-energy level $E_{g1}$ 204. In FIG. 2C, a solid line arrow 210 is used to represent the electron decay from high to low energy while the rate of this transition between $E_1$ 206 and $E_{g1}$ 204 is denoted by $\tau_{1g}$.

As described above, the general ground-energy level includes one or more electrons that can be excited to the various upper-energy levels. In general, the transition time between any two upper-energy levels, level m ($E_m$) and level n ($E_n$), is denoted by $\tau_{mn}$ where m, n are 1,2,3 . . . etc. and the free spontaneous decay transition rate between the upper-energy level $E_m$ and the general ground-energy level $E_g$ is denoted by $\tau_{mg}$, which will be slow compared to $\tau_{mn}$.

FIGS. 3A–C illustrate the case of essentially three energy levels or a essentially three level system 300 for a semiconductor active medium. FIG. 3A illustrates a pair of electrons $e_1$ 302 and $e_2$ 304. The electrons 302 and 304 can be excited from a general ground-energy level 306 to a general upper-energy level 308. As illustrated in FIGS. 3B and 3C, the essentially three-level system can be represented by four sublevels: a pair of upper-energy levels $E_1$ 310, $E_2$ 312 with $E_1<E_2$ and a pair of ground-energy levels $E_{g1}$ 314, $E_{g2}$ 316 with $E_{g1}>E_{g2}$. The medium can thus be modeled as a collection of atoms with four energy levels. Each atom is assumed to have two electrons $e_1$ 302 and $e_2$ 304, initially occupying the ground-energy levels $E_{g1}$ 314 and $E_{g2}$ 316 with $E_{g1}>E_{g2}$. In particular, FIG. 3B is a diagram illustrating the excitation of the two electrons $e_1$ 302 and $e_2$ 304 from the ground-energy levels $E_{g1}$ 314 and $E_{g2}$ 316, respectively, to the upper-energy levels $E_1$ 310 and $E_2$ 312. In FIGS. 3A and 3B, zig-zag dashed-line arrows 318 and 320 are used to represent the excitation from low to high energy of the electrons $e_1$ 302 and $e_2$ 304, respectively.

FIG. 3C is a diagram illustrating the relaxation and transition or decay of the electrons $e_1$ 302 and $e_2$ 304 in the essentially three energy level system. When an electron ($e_2$ 304 for example) is removed from the ground-energy level (e.g. by exciting it to $E_2$ 312 as in FIG. 3B), the electron ($e_1$ 302 for example) in $E_{g1}$ 314 will relax to fill the state at $E_{g2}$ 316, since the Pauli exclusion principle, as is known to those skilled in the art, allows only one electron to fill one state. Note that this can be described in the electron-hole picture of the semiconductor as a hole moving in the reverse direction from the state $E_{g2}$ to $E_{g1}$. The relaxation time between the upper-energy levels $E_2$ 312 and $E_1$ 310 is denoted by $\tau_{21}$, while the relaxation time between the ground-energy levels $E_{g1}$ 314 and $Eg_2$ 316 is denoted by rg 2. In FIG. 3C, solid line arrows 322, 324 are used to represent the free electron decay from high to low energy. The transition time between the upper-energy level $E_1$ 310 and $E_{g1}$ 314 will be denoted by $\tau_{1g}$ and between the upper-energy level $E_2$ 312 and $E_{g2}$ 316 will be denoted by $\tau_{2g}$. As described above, typically $\tau_{21}$ and $\tau_{g12}$ are relatively fast with a femtosecond time scale, while $\tau_{1g}$ and $\tau_{2g}$ are relatively slow having times roughly on the scale of nanoseconds to hundreds of picoseconds.

Likewise, an essentially four-level system (not illustrated) can be represented by three upper-energy levels $E_1$, $E_2$, $E_3$ with $E_1<E_2<E_3$ and three ground-energy levels $E_{g1}$, $E_{g2}$, $E_{g3}$ with $E_{g1}>Eg_2>E_{g3}$, three electrons $e_1$, $e_2$, and $e_3$, two relaxation times $\tau_{21}$ and $\tau_{32}$ between the upper-energy levels, two relaxation times $\tau_{g12}$ and $\tau_{g23}$ between the ground-energy levels, and three free spontaneous decay transition times $\tau_{1g}$, $\tau_{2g}$, $\tau_{3g}$ between the upper-energy levels and the ground energy levels. While this case is not illustrated, it is easily extrapolated from the three level system by those skilled in the art and follows from FIGS. 3A–C and 2A–C.

FIGS. 4A–D illustrate several states of the essentially three-level semiconductor medium 300 described above and illustrated in FIGS. 3A–C.

Figure 4A:
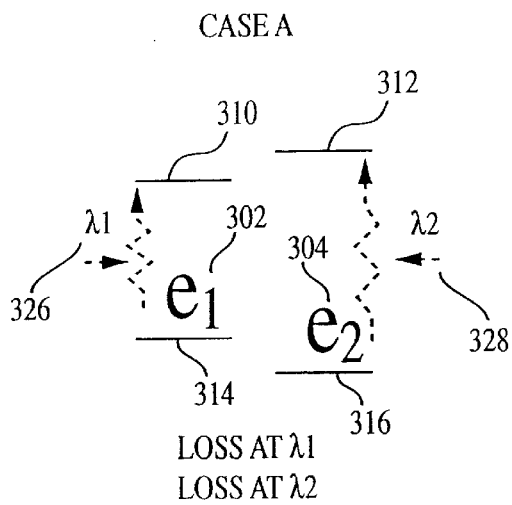
FIGS. 4A–D illustrate the states of a system used to describe an exemplary semiconductor active medium having essentially three energy levels and operating under two wavelengths.

The active or interacting medium is typically an excitable medium. Every operating wavelength $\lambda_1, \lambda_2, \lambda_3, \ldots$ etc. of the excitable medium in general, as opposed to just the particular case of a semiconductor active medium, can be in one of three basic states, namely (1) absorption, (2) gain, and (3) transparency, depending on the conditions of excitation. Returning to the specific case of the exemplary semiconductor active medium 300, the medium 300 has two operating wavelengths $\lambda_1$ and $\lambda_2$, as illustrated in FIGS. 4A–D. For simplicity of illustration, and using the same nomenclature as in FIGS. 3A–C, the system 300 is made up of two electrons, $e_1$ 302 and $e_2$ 304. It should be understood that the two electrons, $e_1$ 302 and $e_2$ 304 are used for illustration purposes to explain and to model complex processes at a high-level. An analogous high-level model of complex processes familiar to those skilled in the art is the energy band model of electron-hole dynamics. The essentially three-level semiconductor system 300 has the pair of upper-energy levels $E_1$ 310, $E_2$ 312 with $E_1<E_2$ and the pair of ground-energy levels $E_{g1}$ 314, $E_{g2}$ 316 typically with $E_{g1}>E_{g2}$. The case with $E_{g1}\leq E_{g2}$ may also be allowed in the case where thermal energy could help to re-distribute the ground-state electrons among the ground energy levels, thereby providing a general reservoir for ground-state electrons. FIG. 4A illustrates the STATE OF LOSS AT $\lambda_1$ AND $\lambda_2$, the state corresponding to loss or absorption for a photon or light beam 326 at $\lambda_1$, and loss or absorption for the light beam 328 at wavelength $\lambda_2$. "Photons" are particles of light and are used interchangeably with "light" in the present description. In FIGS. 4A–D, an upwardly pointing (from low to high energy) zigzag dashed-line arrow represents loss or absorption of photons and electron excitation, a downwardly pointing (from high to low energy) zigzag dashed-line arrow represents gain of photons and electron decay, and a simultaneously upwardly and downwardly pointing zigzag dashed-line arrow represents transparency, wherein an electron has a nearly equal probability of being at the general ground-energy level 306 (see FIG. 3A) ($E_{g1}$ 314 and $E_{g2}$ 316) or at the associated upper-energy level 308 (see FIG. 3A) ($E_1$ 310 or $E_2$ 312) and photons experience neither a net gain nor a net loss. A solid arrow represents the movement of electrons. In terms of the electrons $e_1$ 302 and $e_2$ 304, a dashed or dotted "e" represents the split location state of an electron, while transparent "e" and solid "e" represent the initial and final locations, respectively, of an electron.

As illustrated in FIG. 4A, when there are no input beams, the electrons $e_1$ 302 and $e_2$ 304 will be in the ground-energy levels $E_{g1}$ 314 and $E_{g2}$ 316, respectively. In this state, the medium 300 will be rendered into the absorption state, or in other words will become an absorbing medium for a light beam 326 having a wavelength of light at $\lambda_1$ or a light beam 328 having a wavelength of light at $\lambda_2$. When the medium 300 absorbs the photons at $\lambda_1$ 326 or $\lambda_2$ 328, the electrons $e_1$ 302 and $e_2$ 304 will be excited to upper energy level $E_1$ 310 or $E_2$ 312, respectively (represented by the zigzag dashed-line arrows). The rate of the electronic transition or photon absorption is called the "photon absorption rate" (or electron excitation rate). As is known to those skilled in the art, this transition rate is determined by the rate at which photons are captured by the medium and is not limited by the slow free spontaneous decay rate. The medium 300 is said to be in the absorbing state at $\lambda_1$ 326 and $\lambda_2$ 328. This state is illustrated in FIG. 4A.

Figure 4B:
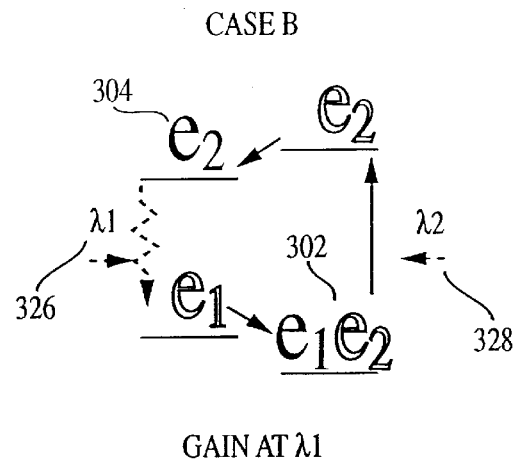

FIG. 4B illustrates the STATE OF GAIN AT $\lambda_1$ AND LOSS AT $\lambda_2$, the state corresponding to gain for the photon or light beam 326 at $\lambda_1$ and loss for the light beam 328 at wavelength $\lambda_2$. This state can be brought about photonically by an excitation of the medium 300 with a light beam 328 at $\lambda_2$ which will bring the electron $e_2$ 304 from the ground-energy levels (in particular $E_{g2}$ 316) to the upper-energy level $E_2$ 312.

The electron $e_2$ 304 will quickly relax back to the lower upper-energy level $E_1$ 310 (within a hundreds of femtosecond time scale for the semiconductor medium 300). That is, the electron $e_2$ 304 is brought to level $E_1$ 310 from level $E_{g2}$ 316 due to a light beam 328 at $\lambda_2$. An electron population inversion then occurs between level $E_1$ 310 and the ground-energy level $E_{g1}$ 314 (i.e. the number of electrons in level $E_1$ 310 is more than that in $E_{g1}$ 314 (shown in FIG. 3A)). In this state, a light beam 326 at $\lambda_1$ will "stimulate" the decay of the electron $e_2$ 304 from $E_1$ 310 to $E_{g1}$ 314, enabling the medium 300 to emit a photon at a wavelength of $\lambda_1$ (not illustrated in FIG. 4B), thereby achieving energy gain for the light beam 326 at wavelength $\lambda_1$. This result is referred to as stimulated emission. The rate of the electronic stimulated decay or photon stimulated emission is called the photon stimulated emission rate (or electron stimulated decay rate). As is known to those skilled in the art, this transition rate is determined by the rate at which photons interact with the medium and is not limited by the slow free spontaneous emission rate. In this state illustrated in FIG. 4B, the medium 300 is said to be in the gain state at $\lambda_1$ 326. This method of inducing the state of 4B is used often in the situation of control-beam induced gain for which a signal beam at $\lambda_1$ is made to achieve gain through a medium by inducing the medium to be in the state of gain with the intensity of a second control beam at $\lambda_2$ whose power is being absorbed by the medium.

Figure 4C:
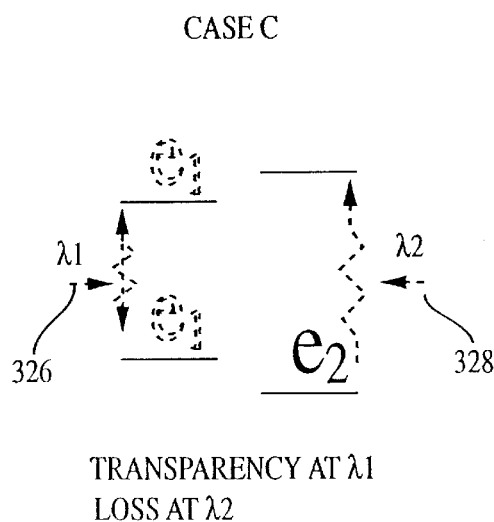

FIG. 4C illustrates the STATE OF TRANSPARENCY AT $\lambda_1$ AND LOSS AT $\lambda_2$, the state corresponding to transparency for the light beam 326 at $\lambda_1$, and loss for the light beam 328 at wavelength $\lambda_2$. There are three main methods by which this can be brought about: (1) by a strong light beam at $\lambda_1$, (2) by a light beam at $\lambda_2$ and a strong light beam at $\lambda_1$, and (3) by a light beam at $\lambda_2$. In the case of method (1), it might appear at first that a strong light beam at $\lambda_1$ will bring about gain at $\lambda_1$. That is electron population inversion can be achieved by exciting the electron $e_1$ 302 from $E_{g1}$ 314 to $E_1$ 310 directly by a light beam 326 at $\lambda_1$. This is not the case, however, for the reason that when an electron population builds up at $E_1$ 310, the same light beam 326 at $\lambda_1$ will also cause the stimulated decay of the electron 302 from $E_1$ 310 back to $E_{g1}$ 314. If the intensity $I_1$ of the light beam 326 at $\lambda_1$ is very strong, this intensity will cause close to half-electron population inversion between $E_{g1}$ 314 to $E_1$ 310. In this instance, the photon stimulated emission rate is approximately equal to the photon absorption rate). In this state, the medium 300 will not absorb many photons from the light beam 326 at $\lambda_1$ or give much gain (cause photons to be emitted) in response to the light beam 326 at $\lambda_1$. Instead the medium 300 will act as a nearly transparent medium at $\lambda_1$ 326. In this state, the medium 300 is said to be in the transparency state at $\lambda_1$ 326. As $E_2$ is not excited, there will be absorption at $\lambda_2$. This state is illustrated in FIG. 4C with the nearly half-populated electron $e_1$ 302 represented with dashed or dotted lines. This transparency state is represented with the simultaneously upward and downward pointing zigzag dashed-line arrow. The word transparency is used here not necessarily to refer to the state of zero loss but the state for which the absorption of the medium is substantially reduced and the medium is not excited to the state of substantial gain. The critical intensity that is required for the light beam 326 at wavelength $\lambda_1$ to bring about this transparency condition is called the "saturation intensity" and will be denoted as $I_{1Sat}$. More specifically, in this case the medium absorption coefficient $\alpha$ at $\lambda_1$ is a function of the intensity $I_1$ and is typically given by:

$$\alpha = \frac{\alpha_0}{1 + \frac{I_1}{I_{1Sat}}},$$

where $\alpha_0$ is the absorption coefficient when the intensity $I_1$ is zero. That is, when $I_1=I_{1Sat}$, the absorption of the medium 300 will reduce to about half and the absorption of medium 300 will rapidly reduce when $I_1>I_{1Sat}$. The situation corresponding to the case of method (1) is referred to as 4C-I.

In case of method (2) for producing a transparency state, a light beam at $\lambda_2$ is present in addition to the strong light beam at $\lambda_1$ and the $\lambda_2$ light begins to excite electrons from the ground energy level $E_{g2}$ 316 to $E_2$ 312, which subsequently decay to energy level $E_1$ 310 and populate energy level $E_1$ 310, causing close to half-electron population inversion between $E_{g1}$ 314 and $E_1$ 310. If these electrons remain at $E_1$ 310, then they will prevent any further electrons from decaying from energy level $E_2$ 312 to $E_1$ 310 due to the Pauli exclusion principle. The electron population will thus begin to build up at energy level $E_2$ 312 as well, eventually causing the state at $\lambda_2$ to be driven to a transparency state. However, the presence of the strong $\lambda_1$ light de-excites the electron populations at $E_1$ 310 rapidly to ground energy level $E_{g1}$ 314. The net result is that the strong light at $\lambda_1$ prevents the build up of the electron population at energy level $E_2$ 312 and maintains the state at $\lambda_2$ as one of loss. This situation can be referred to as 4C-II. In the case where the light beam at $\lambda_2$ is not very strong so that the population at $\lambda_1$ decays away before it can build up substantially, it is also possible to drive the state to transparency at $\lambda_1$ but loss at $\lambda_2$ without the presence of the light beam at $\lambda_1$. This situation corresponds to the case of method (3) and can be referred to as 4C-III.

There are various ways the state of 4C induced by the three different methods is utilized in device applications. The method of 4C-I can be used in the situation of self-induced transparency for which a signal light beam at $\lambda_1$ is made to propagate through an otherwise absorbing medium by inducing the medium to be transparent with its own intensity. The method of 4C-III can be used in the situation of control-light-beam induced transparency for which a signal light beam at $\lambda_1$ is made to propagate through an otherwise absorbing medium by inducing the medium to be transparent with the intensity of a second (control) light beam at $\lambda_2$. The method of 4C-III can be used in the situation of control-light-beam induced loss for which a signal light beam at $\lambda_2$ is made not to propagate through an otherwise transparent or gain medium by inducing the medium to be absorbing with the intensity of a second (control light beam) at $\lambda_1$. In the case of such usage of 4C-II, the main effect used is the loss at $\lambda_2$, not the transparency at $\lambda_1$.

Figure 4D:
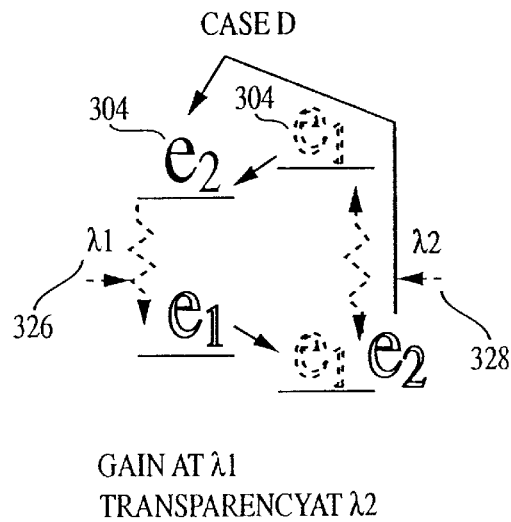
Figure 4E:
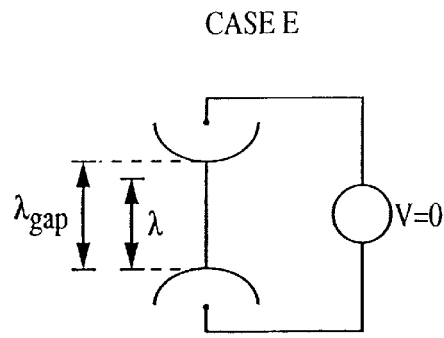
Figure 4F:
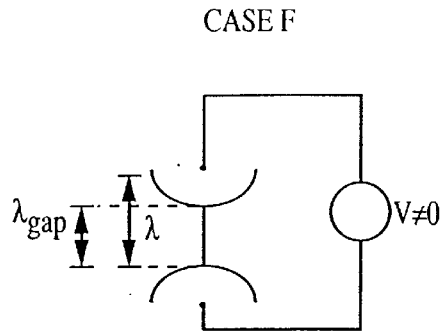

FIG. 4D illustrates the STATE OF GAIN AT $\lambda_1$ AND TRANSPARENCY AT $\lambda_2$, the state corresponding to gain for the light beam 326 at $\lambda_1$, and transparency for the light beam 328 at wavelength $\lambda_2$. This state can be brought about by a strong light beam at $\lambda_2$. Similarly to FIG. 4C, if the intensity $I_2$ of the light beam 328 at $\lambda_2$ is strong enough, the light beam 328 at $\lambda_2$ not only will bring electron $e_2$ 304 to $E_1$ 310, causing gain at the light beam 326 at $\lambda_1$, it will also further drive $E_2$ 312 and $E_{g2}$ 316 to transparency at $\lambda_2$ by exciting the electron $e_2$ 304 from $E_{g2}$ 316 to $E_2$ 312 and partially filling up the electron population at $E_2$ 312 to about half of capacity. This situation occurs when the electron population at $E_1$ 310 is completely filled since the Pauli exclusion principle prevents the electrons at $E_2$ 312 from decaying or relaxing to $E_1$ 310. This situation is illustrated in FIG. 4D. This method of inducing the state of 4D can be used in the situation of self-induced transparency for which a signal light beam at $\lambda_2$ is made to propagate through an otherwise absorbing medium by inducing the medium to be transparent with its own intensity.

It should be understood that although light beams 326 and 328 of wavelength $\lambda_1$ and $\lambda_2$ are shown in each of FIGS. 4A–D, the light beams 326 and 328 may be continuously or discontinuously applied to the medium or may be applied prior to one another or vice versa.

FIGS. 4E–K elaborate on the states illustrated in FIGS. 4A–D for the case of the active medium of an applied electric field or an injection current. As is known to those skilled in the art, excitation corresponding to FIGS. 4A–D, can also be brought about via the use of a P-N (PN) or P-I-N (PIN, where I indicates an intrinsic semiconductor layer, positioned or sandwiched between a P-doped layer and an N-doped layer, which may contain quantum wells as part of the structure) junction or interfaces of materials capable of providing electron excitation via an injection current (e.g. a semiconductor-metal interface), and an injection current driven by an externally applied forward bias voltage across the PN or PIN junction. In this case, electrons from the ground energy levels (commonly known as the valence band for a semiconductor) will flow through the external circuit to the upper energy levels (commonly known as the conduction band for a semiconductor). In the cases of FIGS. 4E–K, the role of one of the excitation light beams at $\lambda_1$ or $\lambda_2$ is played by such injection current or as will be seen below, in the cases of FIGS. 4E and 4F, by an externally applied field which changes the absorption wavelength of the semiconductor medium. FIGS. 4G–4K illustrate the case of a PIN junction for which the upper energy level 340 is the conduction band for an n-doped semiconductor, while the ground energy level 342 is the valence band for a p-doped semiconductor. FIGS. 4G–4K are understood to be applicable not only to the use of a PN and PIN junction but also to the use of interfaces of materials capable of providing electron excitation via an injection current. The energy increase of the excited electron is provided by the external voltage source.

In the case of electrical excitation, a forward bias applied voltage V, known to those skilled in the art as a forward bias across the PN or PIN junction, is defined as positive voltage (V>0). As described above, the forward bias creates an injection current into the PN (or PIN) junction resulting in electron excitation from the ground to the upper energy level.

The injection current will begin to fill a particular upper energy level $E_\lambda$ with excited electrons, where $\lambda$ is a wavelength above the bandgap wavelength $\lambda_{gap}$ of the semiconductor. In the absence of light, these excited electrons will eventually decay back to the ground energy level via spontaneous decay. With high enough injection current, when the rate of electron excitation overcomes the rate of spontaneous decay at $E_\lambda$, the medium reaches the state of transparency at $\lambda$ for which there is half population inversion between energy levels $E_\lambda$ and $E_{g\lambda}$. This critical current required to reach the transparency state is called the "transparency current" at $\lambda(C_t(\lambda))$ and the associated voltage required may be denoted as $V=V|_{C=C_1(\lambda)}$.

Figure 4G:
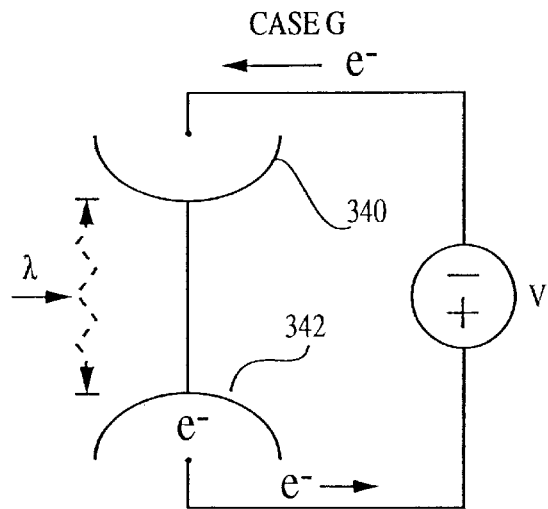

In the case where the voltage is forward bias (V>0) but the injection current is below its transparency value at wavelength $\lambda(C<C_t(\lambda))$, the excitation of electrons is not enough to make the medium transparent and the medium is in a loss state, which corresponds to the state illustrated in FIG. 4A (the $\lambda_1$, $\lambda_2$), and is now recast as case G in FIG. 4G for which $\lambda$ can be identified either as $\lambda_1$ or $\lambda_2$ of FIG. 4A. Case G may be described as the state of loss at $\lambda$ with forward bias below transparency. When the input light or photon beam at $\lambda$ to the medium is strong enough (light beam intensity $I_\lambda > I_{sat}$), the loss medium can be driven to transparency at $\lambda$ by the input light beam. This case is illustrated as case I in FIG. 4I, which corresponds to the state illustrated in FIG. 4C (the STATE OF TRANSPARENCY AT $\lambda_1$ AND LOSS AT $\lambda_2$). More specifically, it corresponds to case 4C induced by the method of 4C-I, and is now recast as the state of case I in FIG. 4I, for which $\lambda$ can be identified as $\lambda_1$ of FIG. 4C. Case 4I may be described as the state of transparency at $\lambda$ with forward bias below transparency.

The case when $C=C_t(\lambda)$ is the state of transparency at $\lambda$, which corresponds to the case illustrated in FIG. 4c (the state of transparency at $\lambda_1$ and loss at $\lambda_2$). More specifically, it corresponds to case 4C induced by the method of 4C-III, and is now recast as the case H in FIG. 4H, for which $\lambda$ can be identified as $\lambda_1$ of FIG. 4C and electrical excitation replaces the role of $\lambda_2$ of FIG. 4C. State 4H may be described as the state of transparency at $\lambda$ with forward bias at transparency.

When $V>V|_{C=C_1(\lambda)}$, the medium will reach a state of gain which corresponds to the state illustrated in FIG. 4B or 4D (state of gain at $\lambda_1$ and loss or transparency at $\lambda_2$), and is now recast as the state of case J (state of gain at $\lambda_1$) in FIG. 4J for which $\lambda$ can be identified as $\lambda_1$ of FIG. 4B or 4D and electrical excitation replaces the role of $\lambda_2$ of FIG. 4B or 4D. State 4J may be described as the state of gain at $\lambda$ with forward bias below transparency.

As is known to those skilled in the art, a reverse bias on a PIN junction will introduce an electric field across the intrinsic (I) region, which will sweep away any electron-hole pairs that are generated within the intrinsic region such as those generated due to absorption of light which excites the electrons to the upper energy level. The carriers that are swept away will form an external "photo" current, which will bring the electrons from the upper energy level, which is commonly known as the conduction band in semiconductor, through the external circuit and return it to the ground energy level, which is commonly known as the valence band in semiconductor. Hence, the effect of a reverse voltage (V<0 in the definition of voltage polarity in FIGS. 4G–K) applied to the PIN junction is the de-excitation of excited electrons, which will maintain the active medium in a state of loss for operating wavelengths above the bandgap wavelength (the bandgap energy). This is the state closely related to the state of case 4C (the state of transparency at $\lambda_1$ and loss at $\lambda_2$) induced by the method of 4C-II and is now recast as case K in FIG. 4K, for which $\lambda$ can be identified as $\lambda_2$ of FIG. 4C and the electrical de-excitation now plays the role of $\lambda_1$ o FIG. 4C. The state K may be described as the state of loss at $\lambda$ with reverse bias.

As is commonly known to those skilled in the art, the bandgap energy is not an unmodifiable property of the medium but can be altered by tens of nanometers in wavelength via the following means:

(a) Franz-Keldysh Effect: The application of an electric field on a bulk semiconductor medium lowers the absorption band edge, causing light with wavelength just below the bandgap energy to go from a transparency state to a loss state. A change in the absorption band edge by about 10 nanometers, for example, can be achieved with an applied electric field of $2.3 \times 10^5$ Volts/meter (V/m).

(b) Quantum-Confined Stark Effect: Similar to the above effect but applied to a quantum well medium instead of a bulk medium. This effect is stronger due to the involvement of quantum well confinement of carriers.

Both of these effects can be utilized to bring a wavelength from a transparency state to a loss state via an applied field. This field can be applied without the use of a PN or PIN junction, although it can also be applied via the use of a PN or PIN junction with reverse bias (forward bias will have little field due to large current flow through the junction).

It should be understood that references in the description to the application of a voltage to bring the active medium to a state of loss can be accomplished through (i) the use of a PN or PIN junction or external circuit to de-excite any excited electrons, (ii) the shifting of the bandgap energy via an applied electric field without the use of a PN or PIN junction, or (iii) the shifting of the bandgap energy via an applied electric field with reverse bias across a PN or PIN junction. Cases (ii) and (iii) can be described in terms of two new states specific to the electro-optic case. Specifically, in the absence of an applied field (V=0), the medium is transparent at wavelength $\lambda$, where $\lambda$ is longer than the bandgap wavelength $\lambda_{gap}$ ($\lambda_0 > \lambda_{gap}(V=0)$). This is illustrated as case E in FIG. 4E. The case 4E may be described as the state of transparency at $\lambda$ with zero applied field.

In the presence of an applied field (V≠0), the medium is absorbing at wavelength $\lambda$ due to lowering of the bandgap wavelength $\lambda_{gap}$ under the influence of the applied field ($\lambda_0 > \lambda_{gap}(V=0), \lambda_0 < \lambda_{gap}(V \neq 0)$) via the Franz-Keldysh effect or the quantum-confined Stark effect. This is illustrated as state F in FIG. 4F. This is the state closely related to state 4C (the state of transparency at $\lambda_1$ and loss at $\lambda_2$) induced by the method of 4C-II and is now recast as state F in FIG. 4F, for which $\lambda$ can be identified as $\lambda_2$ of FIG. 4C and the electrical induced shift in bandgap now plays the role of $\lambda_1$ in FIG. 4C. The state 4F may be described as the state of loss at $\lambda$ with an applied field to shift the bandgap. Going from state E to state F and back allows one to switch on and off the medium absorption at wavelength $\lambda$.

In cases 4E and 4F, the PN or PIN junction is either absent or does not play an active role as a Franz-Keldysh type effect or quantum-confined Stark effect is utilized to shift the bandgap wavelength $\lambda_{gap}$. FIGS. 4G–K utilize a PN or PIN junction to which electrical energy is applied and the PN or PIN junction plays an active role in changing the essential (gain, transparency, or loss) property of the medium.

It should be understood that the above exemplary states and exemplary methods of inducing or bringing about a particular state are illustrated for the purpose of describing the preferable exemplary properties of the medium and should not be taken to limit the embodments of the devices. As is well known to those skilled in the art, there are numerous ways for which a particular state of the medium can be brought about via the actions of one or more light beams or one or more electrical excitations applied to the medium. Furthermore, it is well known to those skilled in the art that the states of the medium form an uncountable or continuum set of states for which the illustrated exemplary finite set of states are meant only to highlight some of the exemplary properties utilized in the device operation. The illustrated finite set of states and the methods of inducing them illustrated in FIGS. 4A–4K are not meant to exhaust all the possible states of the medium useful in the exemplary embodiments of the devices.

III. EXEMPLARY EMBODIMENTS OF THE WAVEGUIDE AND THE ACTIVE MEDIUM

Figure 5A:
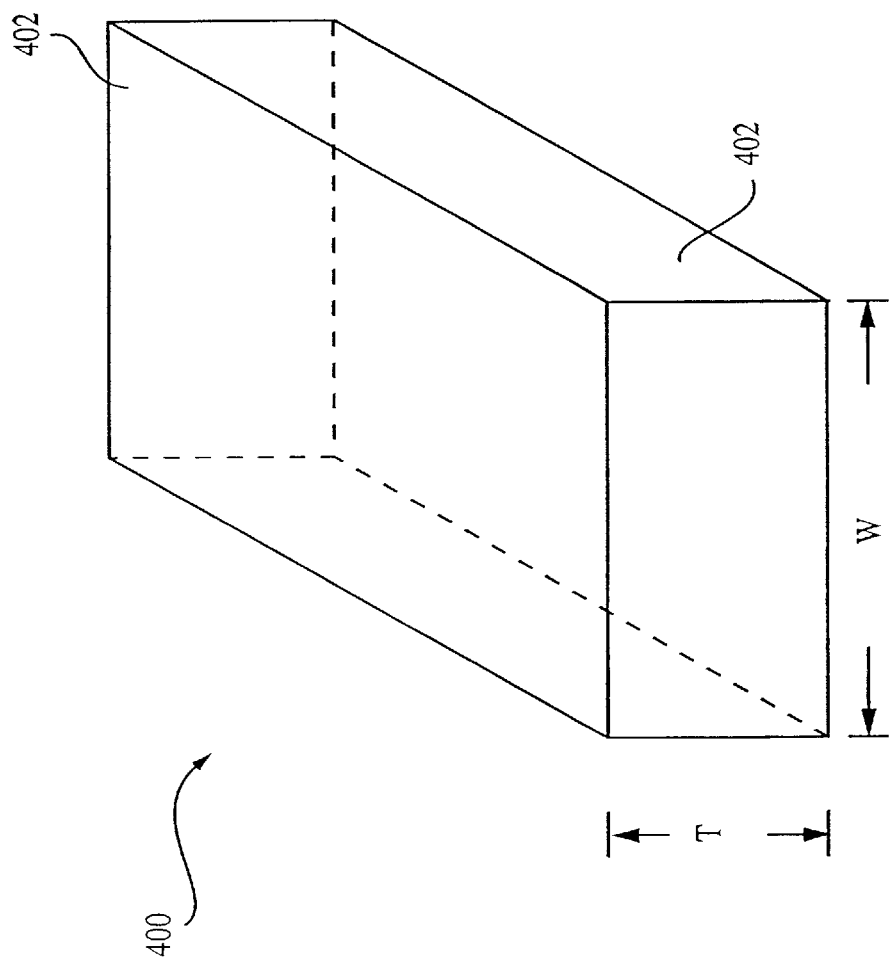
FIG. 5A illustrates an exemplary embodiment of a waveguide having an active medium made up of quantum wells.

FIG. 5A illustrates an exemplary embodiment of a waveguide 400 consisting of at least a waveguide core 402. For applications to 0.8 $\mu$m (or 800 nm) wavelength range, an exemplary material for the waveguide core 402 is $Al_xGa_{1-x}As$ where the alloy composition x is equal to 0.3. For applications to 1.5 $\mu$m (or 1500 nm) wavelength range, an exemplary material for the waveguide core 402 is $In_{1-x}Ga_xAs_{1-y}P_y$ $In_{0.84}$ with x=0.16 and y=0.67. The exemplary waveguide core 402 is not limited to these core materials and other materials appropriate for guided wave action as known to those skilled in the art can be used, for example Gallium Arsenide (GaAs), Indium Phosphide (InP), Indium Aluminum Arsenide Phosphide ($In_{1-x}Al_xAs_{1-y}P_y$), other compound semiconductors, glass ($SiO_2$), silicon nitride ($Si_3N_4$), organic polymers such as PMMA (Poly-Methyl-Methacrylate), and others. It should be understood that the alloy composition and the resulting values are exemplary and the waveguide is not limited to the illustrative values. In an exemplary embodiment, the waveguide core 402 preferably has a width dimension W of 0.4 micrometers ($\mu$m) and a thickness T of 0.25 $\mu$m. It should be understood that the waveguide core 402 is not limited to these dimensions, and other widths and thicknesses can be utilized.

The waveguide core 402, as is known to those skilled in the art, can be fabricated onto a substrate and/or be surrounded by a cladding material with a refractive index lower than the refractive index of the waveguide core. In a useful embodiment, the waveguide core 402 sits above a low refractive index material and can be surrounded from the top and/or from the sides by a similar or equivalent low refractive index material. Some examples of such a low refractive index materials are silicon dioxide $SiO_2$, or silicon nitride $Si_3N_4$, or organic polymers such as PMMA (poly-Methy-Methachrorate), or a transparent conducting oxide such as Indium Tin oxide or Zinc Indium Oxide (e.g., $Zn_xIn_yO_{x+1-5y}$), or a semiconductor with a lower refractive index than the refractive index of the waveguide core. In the presently preferred embodiment, the waveguide core 402 is surrounded with $SiO_2$ having refractive index n=1.5.

The exemplary waveguide core material has an approximate refractive index equivalent to n=3.4. Let us assume the refractive index of the cladding material surrounding the waveguide core is 1.5. As is known to those skilled in the art, these refractive indices and the waveguide thickness of 0.25 $\mu$m provide a planar-waveguide effective propagating refractive index $n_{eff}$ of approximately 2.0 at a wavelength of 1.5 $\mu$m (or 1500 nm) for a transverse magnetic wave with magnetic field polarization parallel to the waveguide width. The effective propagating refractive index $n_{eff}$ is basically related to the phase velocity V of light propagation along the waveguide via $$V = \frac{c}{n_{eff}},$$

where c is the speed of light in vacuum. The use of such effective index allows one to simulate the 3D waveguide as an effective 2D waveguide.

It should be understood that other waveguide structures can be utilized in phosistor embodiments. Such other structures include, but are not limited to, waveguiding devices based on repeated reflection via metal surface structures, photonic-bandgap structures, as well as structures with graded or gradually varying refractive indices, In another exemplary embodiment, waveguide 400 can include an active medium as a section of the waveguide core, as illustrated by waveguide 430 of FIG. 5B. Waveguide 430 includes an active medium 420 in section 408 of length L of the waveguide core. In a presently preferred embodiment, the exemplary active medium 420 fills or occupies the center region of the $Al_xGa_{1-x}As$ or $In_{1-x}Ga_xAs_{1-y}P_y$ waveguide core 402 for a length L, illustrated in FIG. 5B. In a useful embodiment, and as illustrated in FIG. 5C the active medium is made up of five semiconductor quantum wells. The design, fabrication and use of multi-quantum well-structures in optical devices is well known to those skilled in the art. In another embodiment, the active medium can be quantum dots, quantum wires, bulk semiconductor, rare-earth-doped (e.g. erbium-doped) semiconductor, or rare-earth-doped (e.g. erbium-doped) glass. The active medium can also be positioned in the waveguide cladding material instead of in the waveguide core.

FIG. 5C illustrates an exemplary embodiment of an active medium 420 of length L based on a multi-quantum well structure. One or more quantum wells 422 each having thickness $t_q$ are sandwiched with and alternate with four barrier layers 424 each having thickness $t_b$. The number of quantum wells 422 and the number of barrier layers 424 shown in FIG. 5C are illustrative and are not limited to the stated values. The quantum wells 422 and barrier layers 424 preferably have a total thickness $t_{MED}$ as illustrated in FIG. 5C. Preferably, the waveguide core material 402, as illustrated in FIG. 5C serves as a top "layer" 426 and a bottom "layer" 428 for the active medium 420.

In this exemplary embodiment, the quantum wells 422 can be formed of 10 nanometer ("nm") thick GaAs sandwiched by 10 nm thick $Al_{0.3}Ga_{0.7}As$ barriers 424 (for application to 0.8 $\mu$m wavelength range) or 10 nm thick $In_{0.53}Ga_{0.47}As$ sandwiched by 10 nm thick $In_{0.84}Ga_{0.16}As_{0.33}P_{0.67}$ barrier 424 (for application to 1.5 $\mu$m wavelength range). It should be understood that the alloy compositions are not limited to these illustrative values. The total thickness for the quantum wells 422 and barrier layers 424 in this exemplary embodiment with five quantum wells preferably will be 0.09 micrometers or microns ($\mu$m). This thickness is well within an exemplary 0.25 $\mu$m thickness dimension of waveguide core 402. In this embodiment, the waveguide core material 402 serving as a top "layer" 426 and a bottom "layer" 428 for the active medium 420 is made up of $Al_{0.3}Ga_{0.7}As$ (for 0.8 $\mu$m) or $In_{0.84}Ga_{0.16}As_{0.33}P_{0.67}$ (for 1.5 $\mu$m).

Figure 5B:
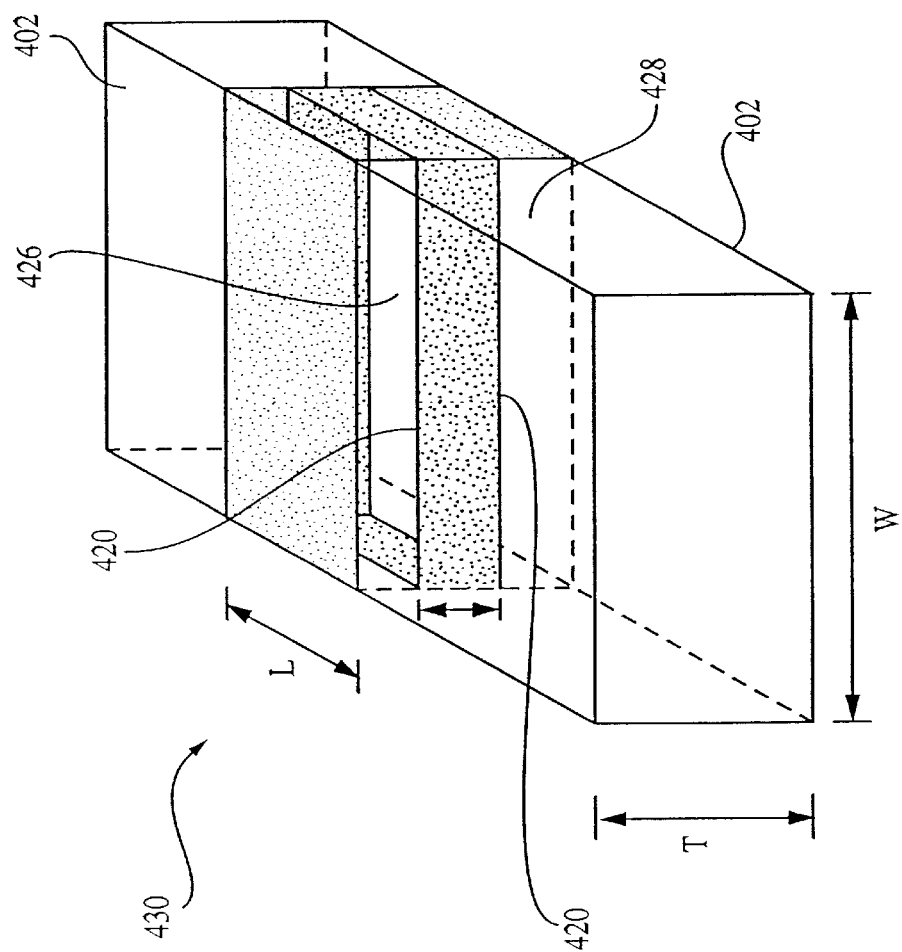
FIG. 5B illustrates an exemplary embodiment of a waveguide having an active medium made up of quantum wells sandwiched by doped waveguide material to form a PIN junction.
Figures 2, 5C:
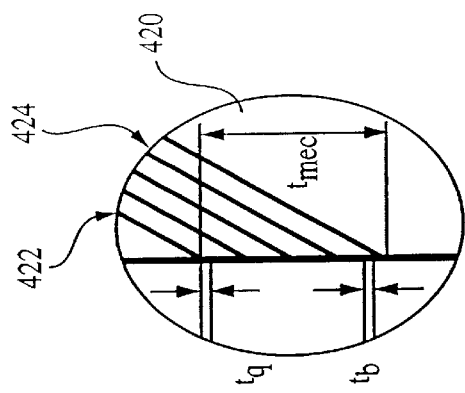
Figures 1, 5C:
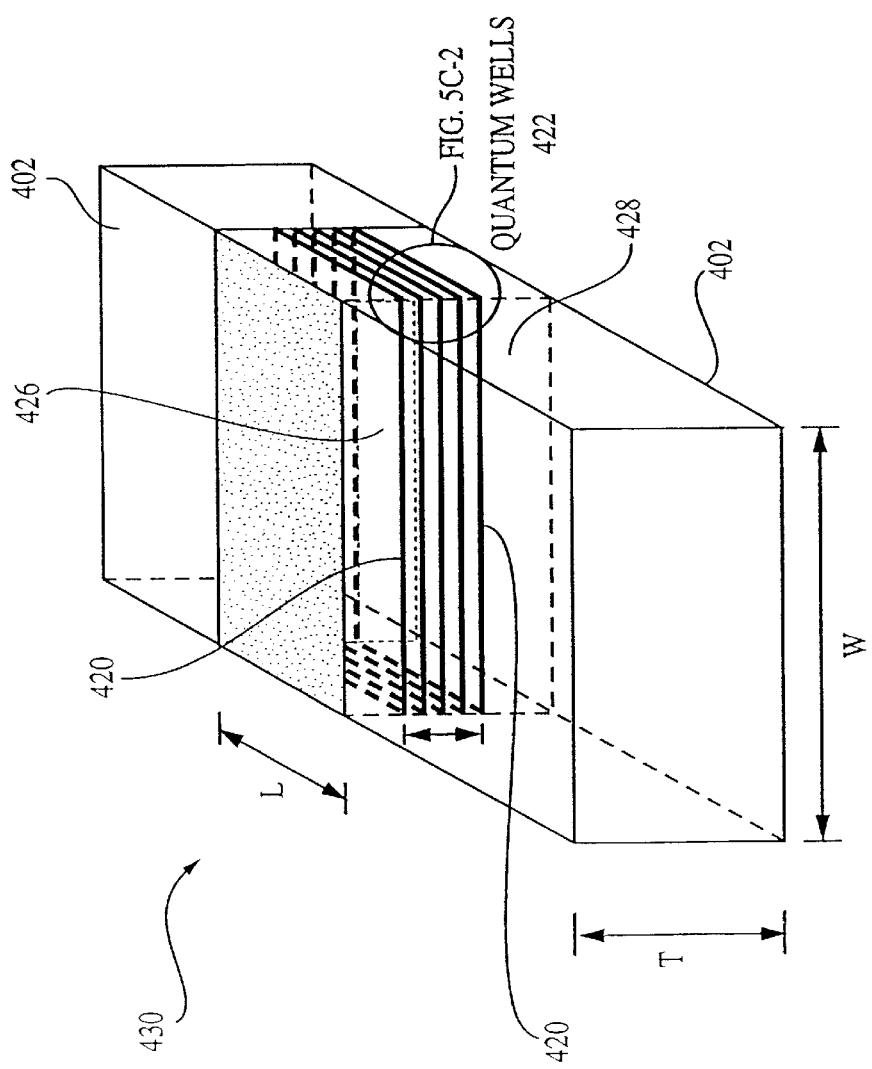
FIGS. 5C and 5D are further exemplary embodiments of waveguides having quantum well.
Figure 5D:
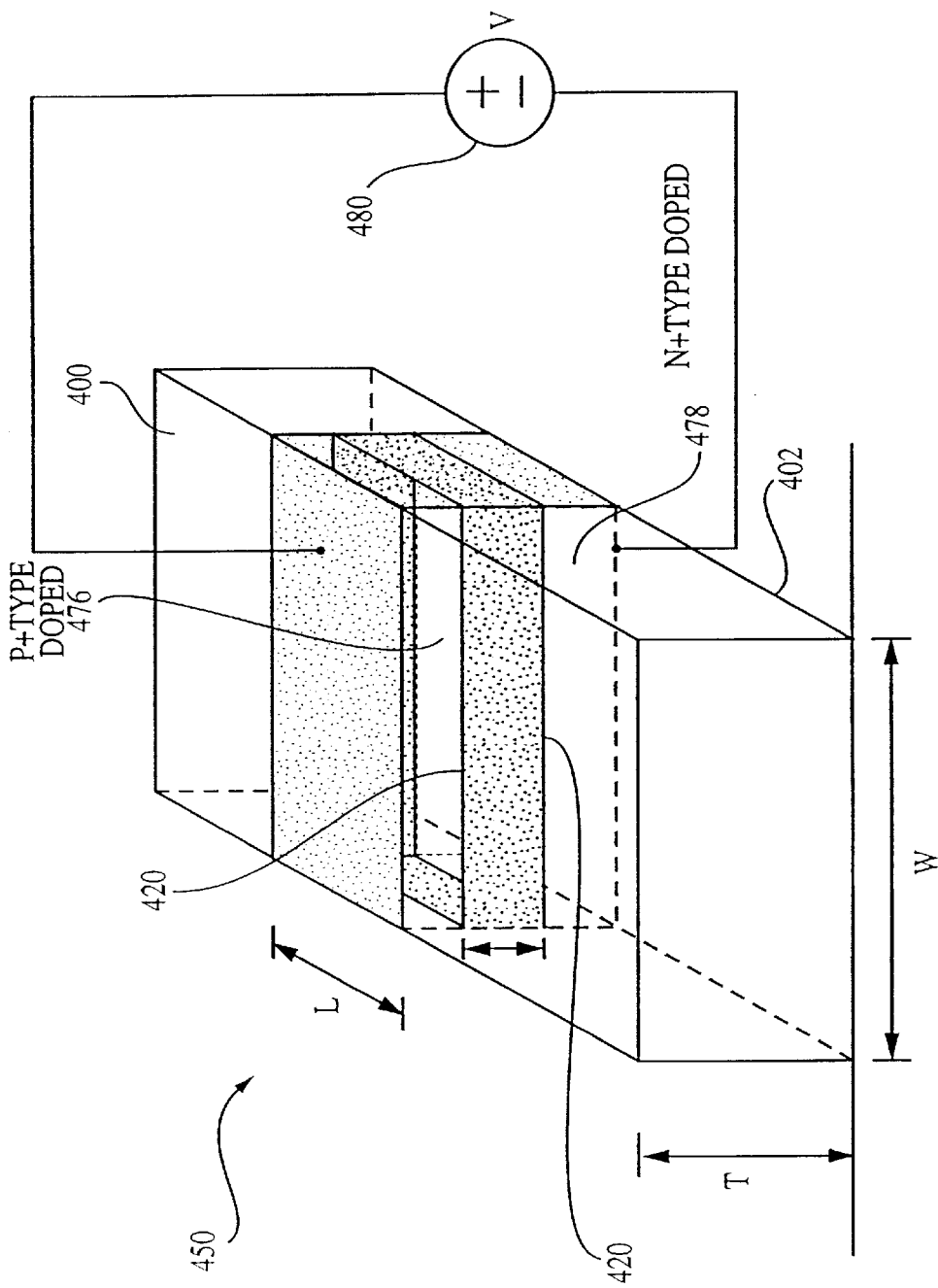

FIG. 5D illustrates as yet another exemplary embodiment for which waveguide 400 includes a PIN-junction at the active medium, as illustrated by waveguide 450 having the active medium 420 of length L based on a multi-quantum well structure. The Waveguide 450 is the same as Waveguide 430 of FIG. 5B except that a top "layer" 476 and a bottom "layer" 478 for the active medium 420 are doped as p and n material respectively, thus forming a PIN junction as described above with the active medium 420. In addition, a variable voltage source 480 having applied voltage V is placed across the PIN junction formed by the active medium 420 and the top and bottom doped layers 476 and 478. As is well known to those skilled in the art, the applied voltage will provide injection current to excite the active region. In the case of reversed bias, the applied voltage will provide an electric field which can shift the bandgap of the active region via the Franz-Keldysh effect or the quantum-confined effect. This scheme can be used to change the absorptive property of the medium as explained in the above section on the use of the Franz-Keldysh effect or the quantum-confined effect. As explained above, the use of PN junction is not even necessary when the Franz-Keldysh effect or the quantum-confined effect is used. However, as is well known to those skilled in the art, the conducting PN region will allow one to apply the voltage closer to the active medium region, thereby resulting in a stronger field. As the P or N region will be used more as a conductor, one can in fact use both N type (or both P type) material on both sides of the active medium. Thus, in another embodiment, no PN junction is used to apply the electric field. In another embodiment, the material on both sides of the active medium is both N type or P type material.

The method of encompassing an P or N type material above or below the active medium is well known to those skilled in the art. In one embodiment, these p and n material regions are part of the waveguide claddings. A specific example will be given later, at the discussion of FIG. 24.

The gain and loss coefficients can be made larger (or smaller) by using more (or fewer) quantum wells. For the preferred embodiments of the phosistor devices, the main parameters characterizing the active medium important to the main functionality of the devices are preferably the gain coefficient at full excitation, loss coefficient at full de-excitation, and the saturation intensity of the medium. The number of quantum wells and the type of active medium being used are typically variable as long as they could provide the preferred medium parameters. Typically, the gain and loss coefficients of the active medium can range from a low value when very few quantum wells are employed up to about 10 per $\mu$m when many quantum wells are employed at low temperature.

It should be understood that while a presently useful embodiment of the phosistor active medium is a multi-quantum well structure utilizing semiconductor materials, it is not the only embodiment or medium that can be utilized. Other than semiconductor media, there are many other atomic, molecular, ionic, or low-dimensional electronic media, such as other quantum wells, quantum wires, or quantum dots, for example, that can satisfy the generally preferred requirements of the medium described and that are known to those skilled in the art.

Presented below are calculations to obtain the gain coefficient g and the loss coefficient $\alpha$ along with discussions of the switching energies and switching times for the active medium 420 for specific light beam intensities for the various light beams in the waveguide 430 or 450. We will show the case of $Al_xGa_{1-x}As$ based materials for applications to 0.8 $\mu$m (or 800 nm) wavelength range. Calculations for the case of $In_{1-x}Ga_xAs_{1-y}P_y$ based materials or other active materials may be done in a similar manner.

Figure 6A:
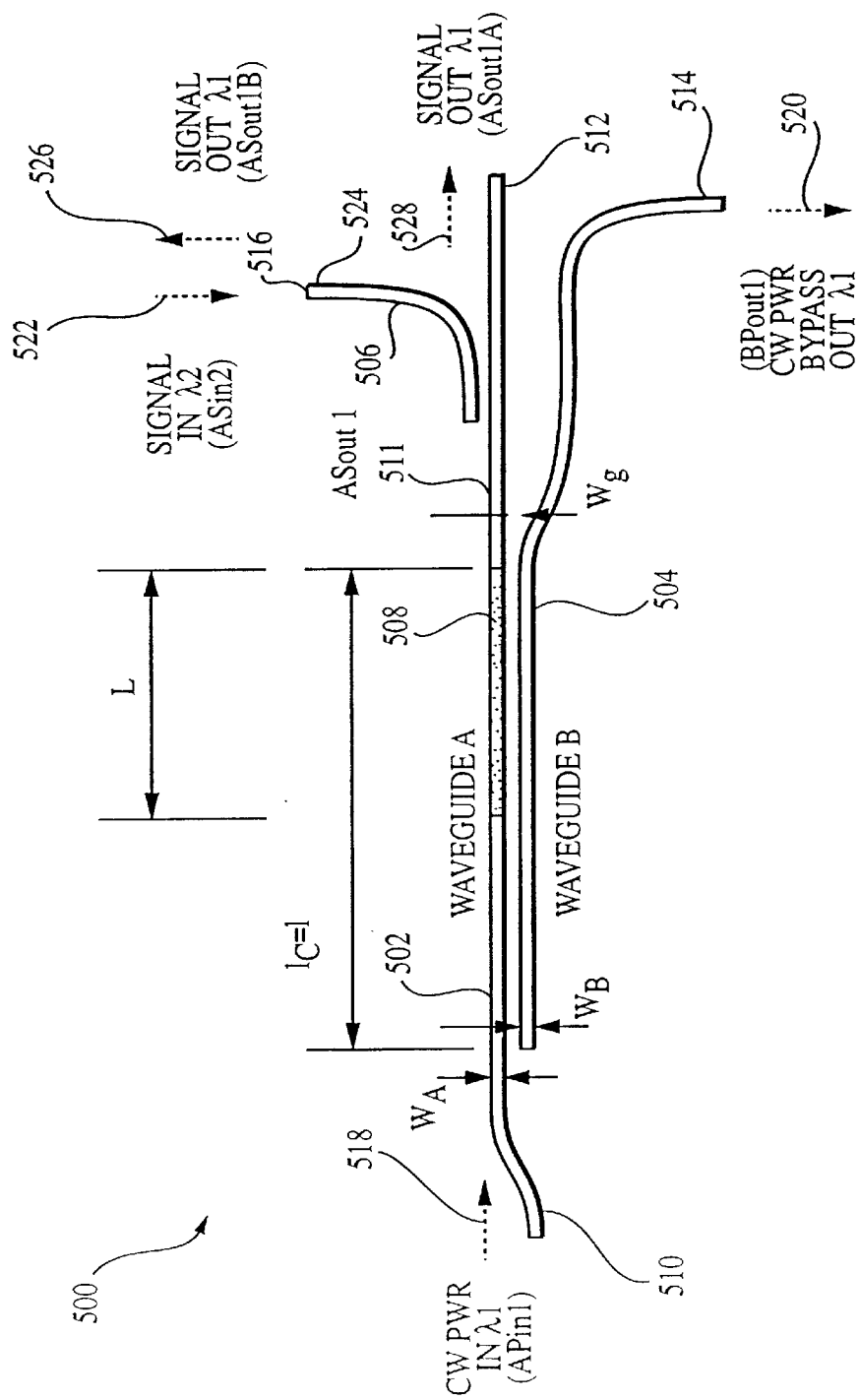
FIG. 6A illustrates an embodiment of a first exemplary phosistor device utilizing directionally coupled waveguides.
Figure 6B:
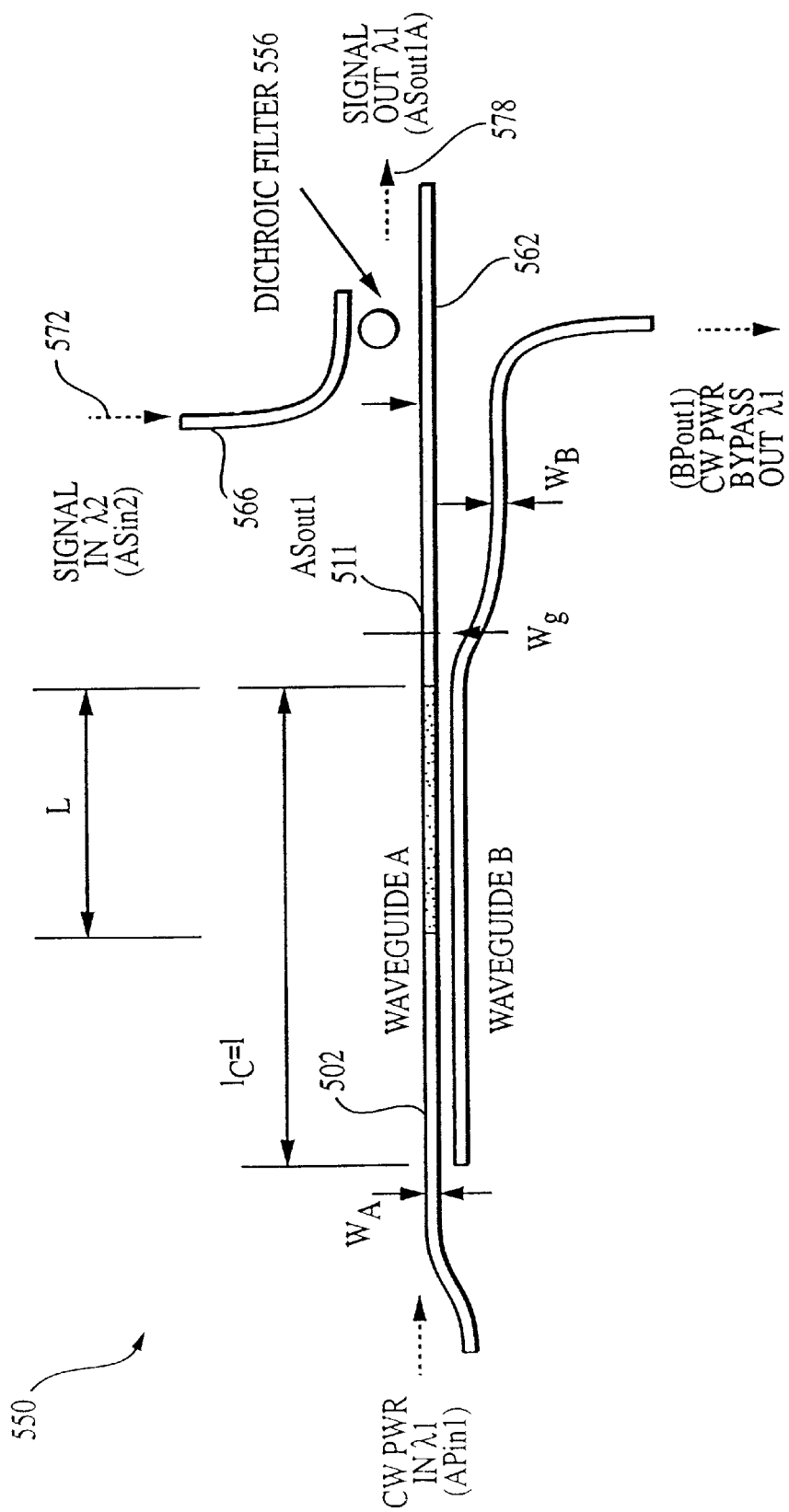
FIG. 6B illustrates another embodiment of the first exemplary phosistor device gate utilizing directionally coupled waveguides and a dichroic filter.
Figure 6C:
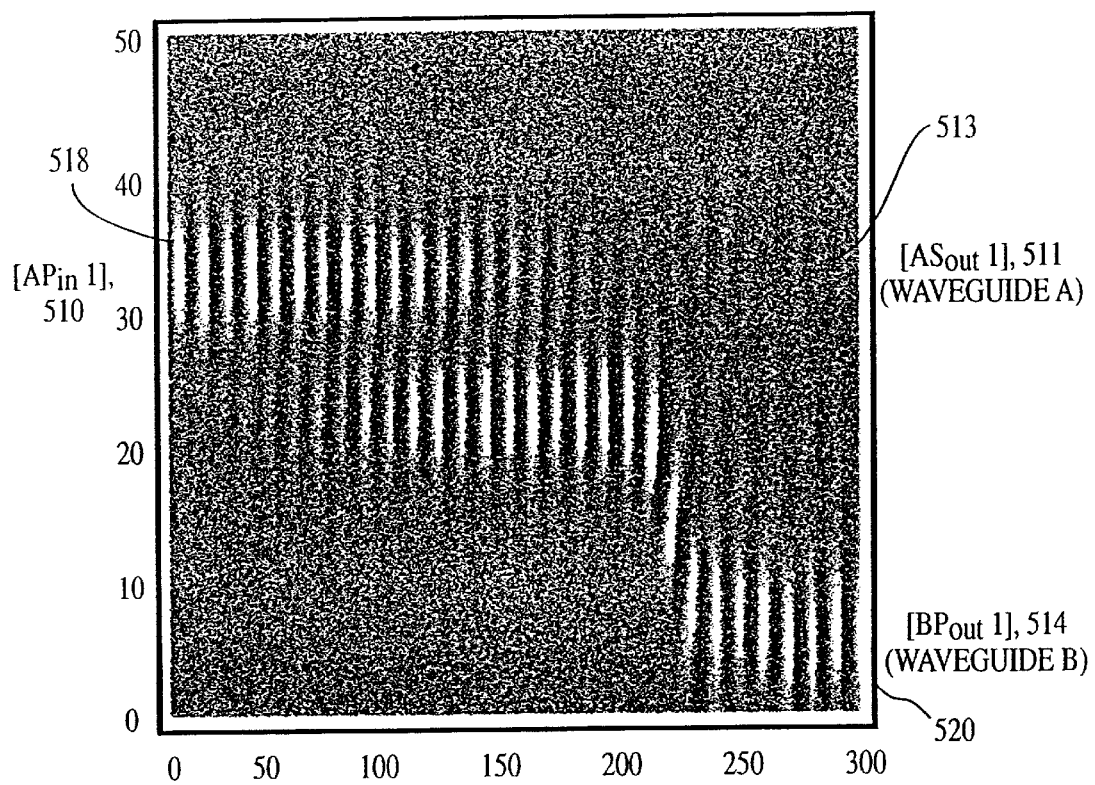
Figure 1:
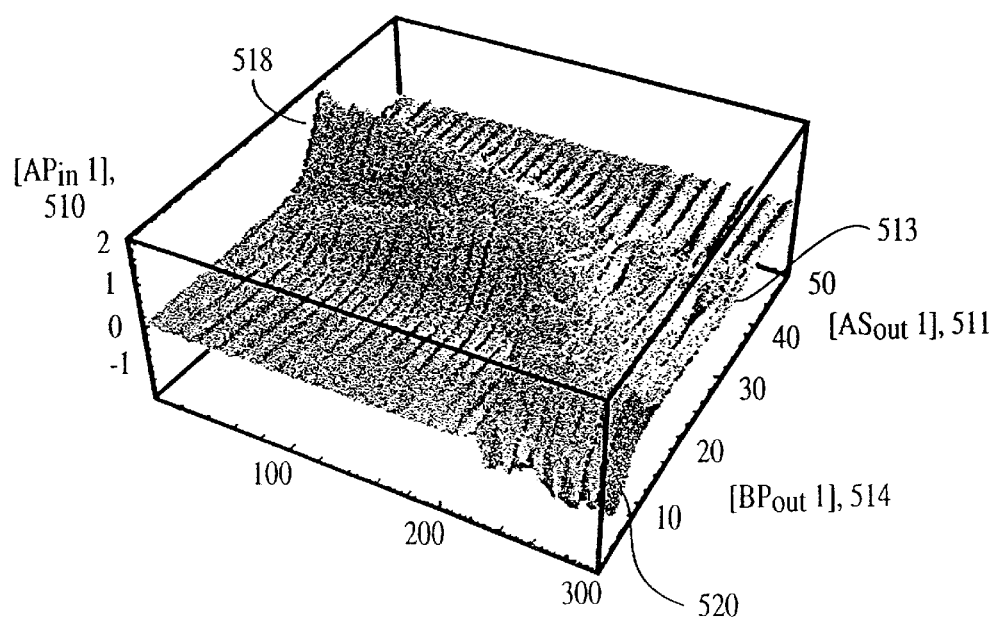
Figure 6C:
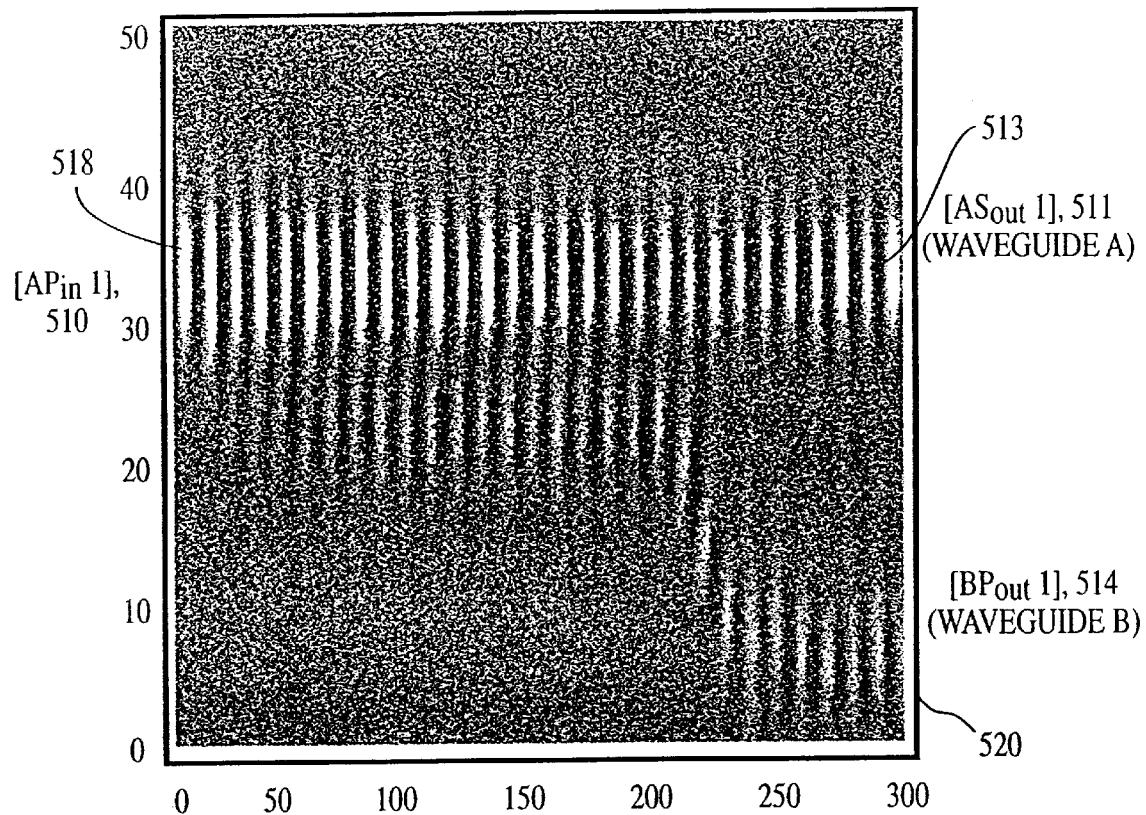
Figure 2:
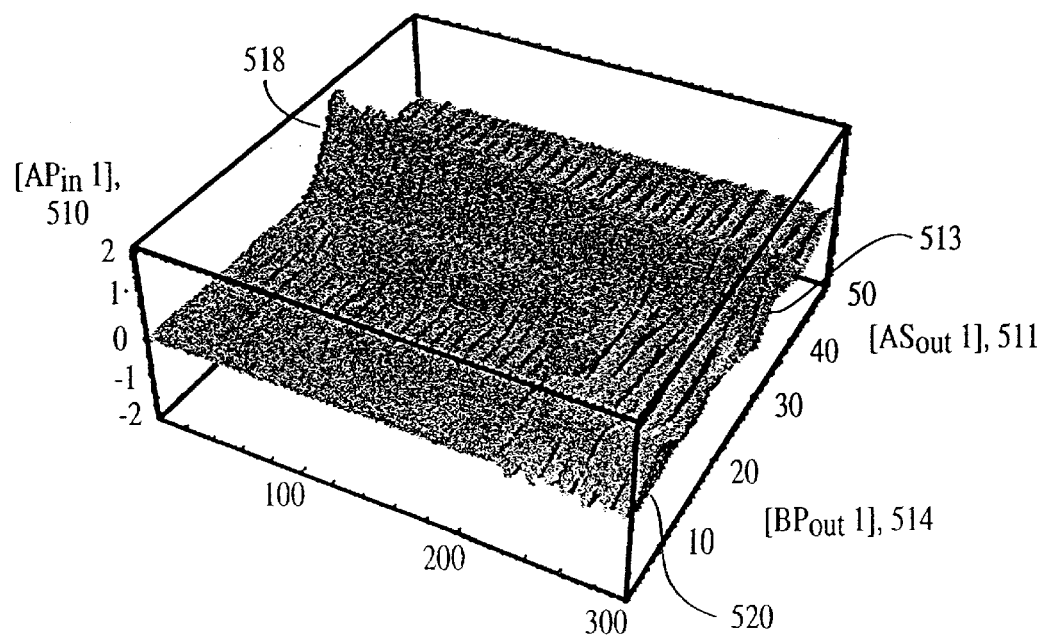
Figure 6C:
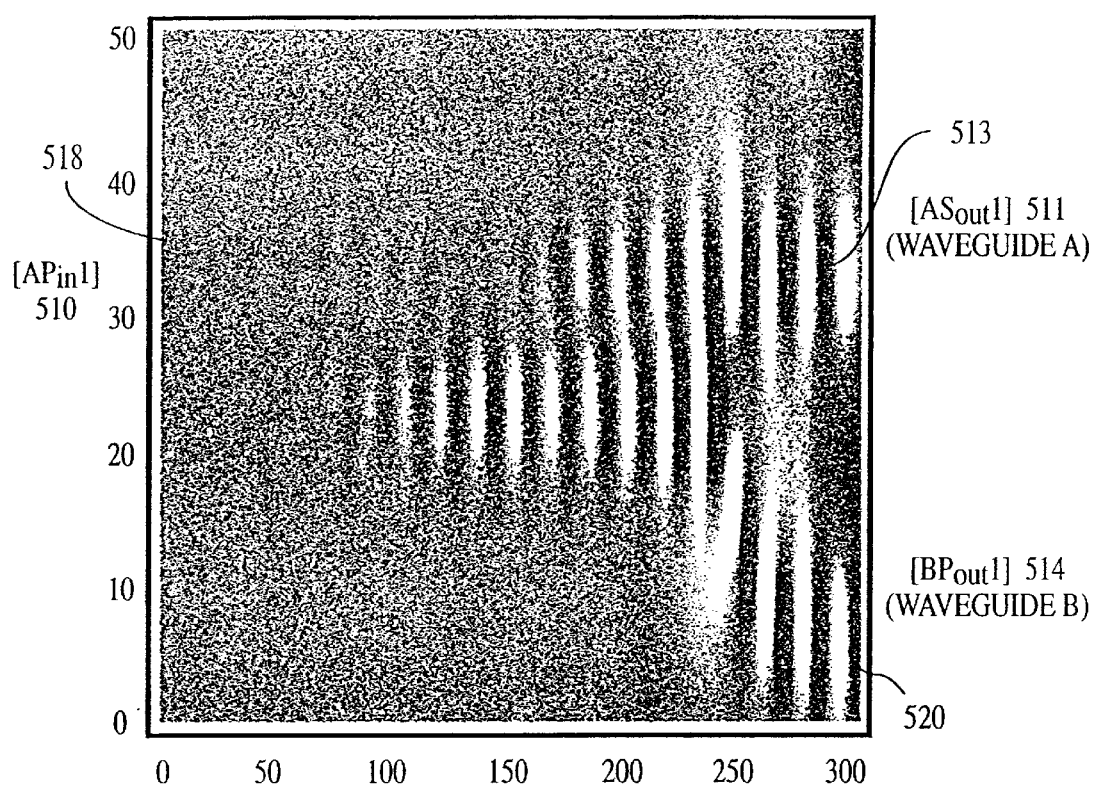
Figures 4, 6C:
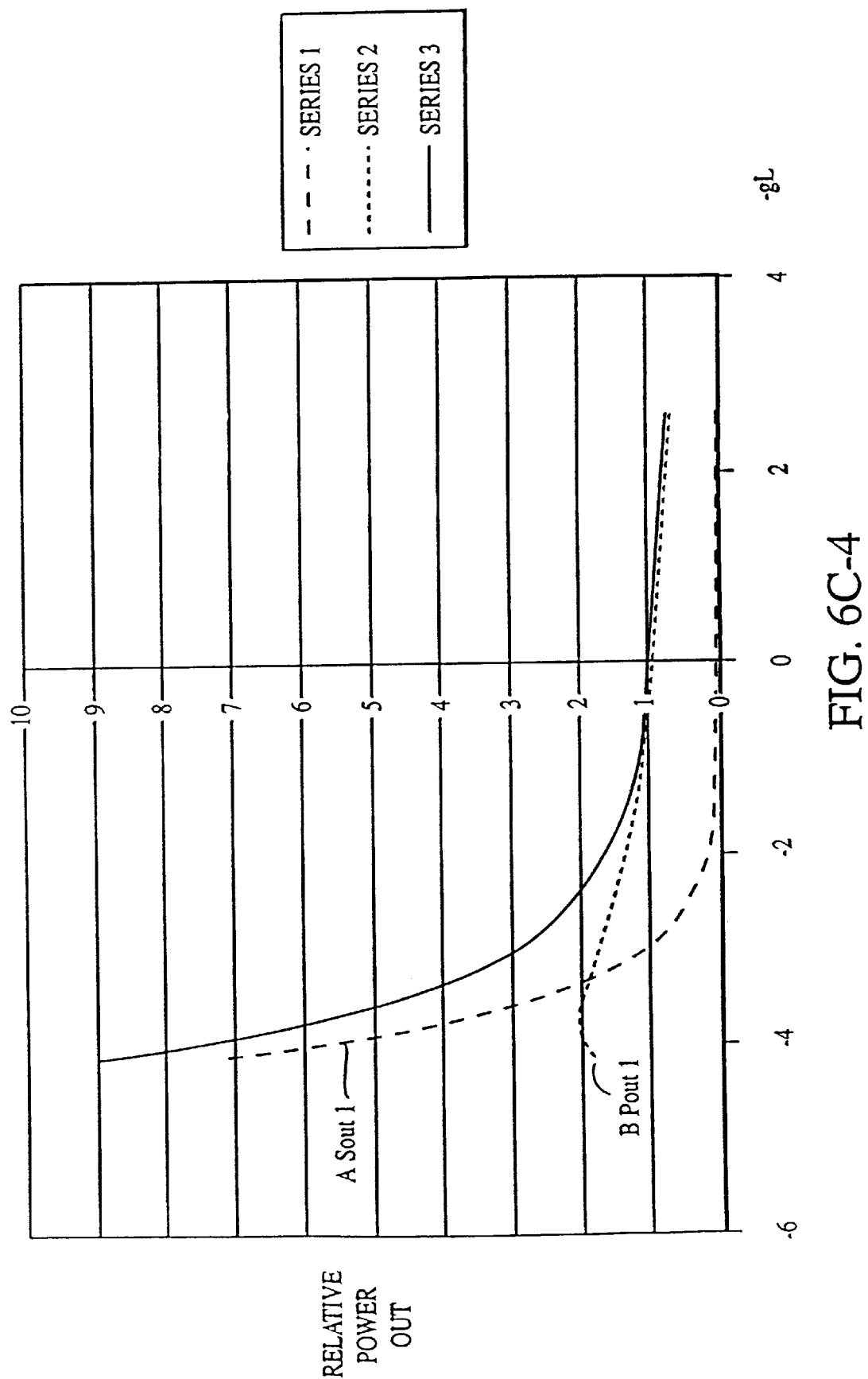
Figure 6D:
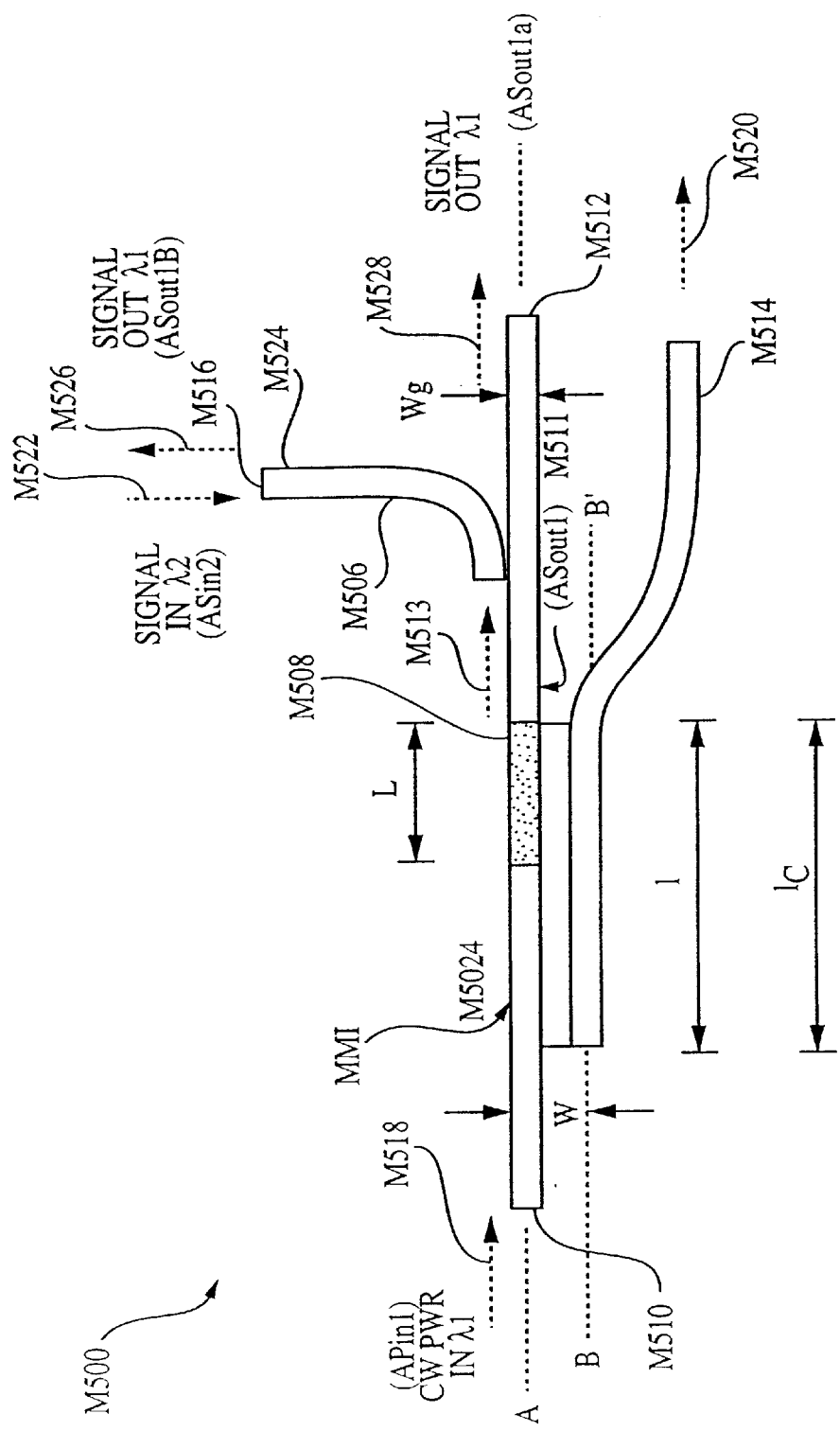
FIG. 6D illustrates an embodiment of the first exemplary phosistor device utilizing a multi-mode interference configuration.
Figure 6E:
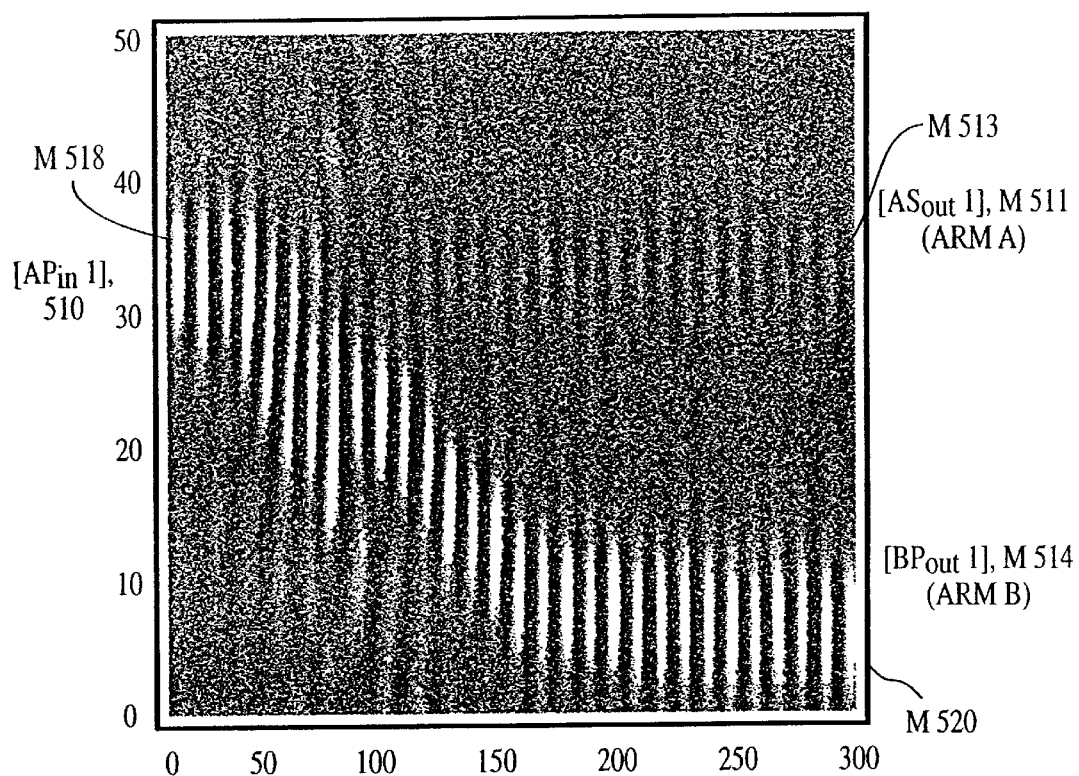
Figure 1:
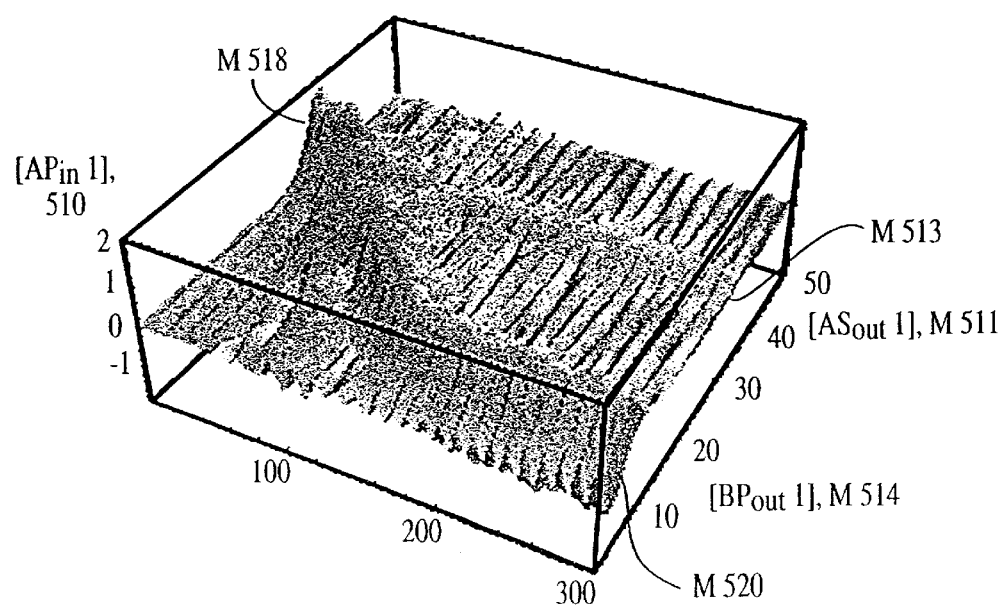
Figure 6E:
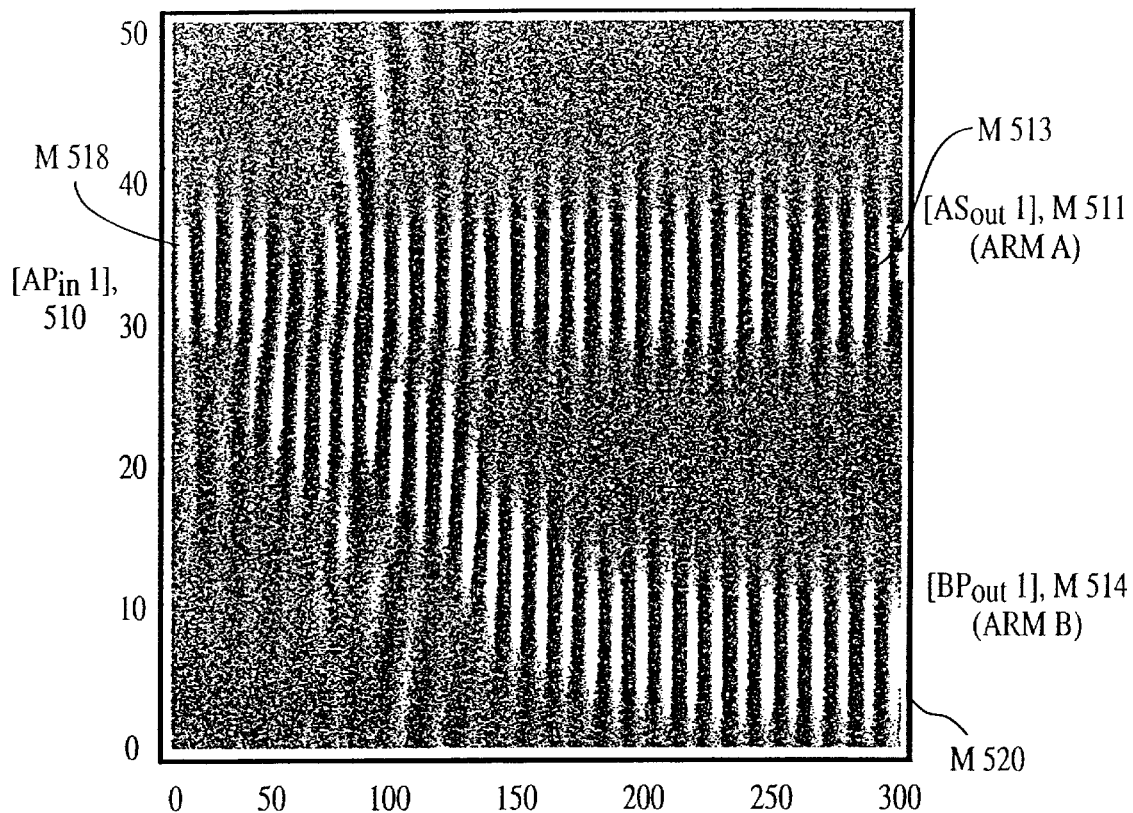
Figure 2:
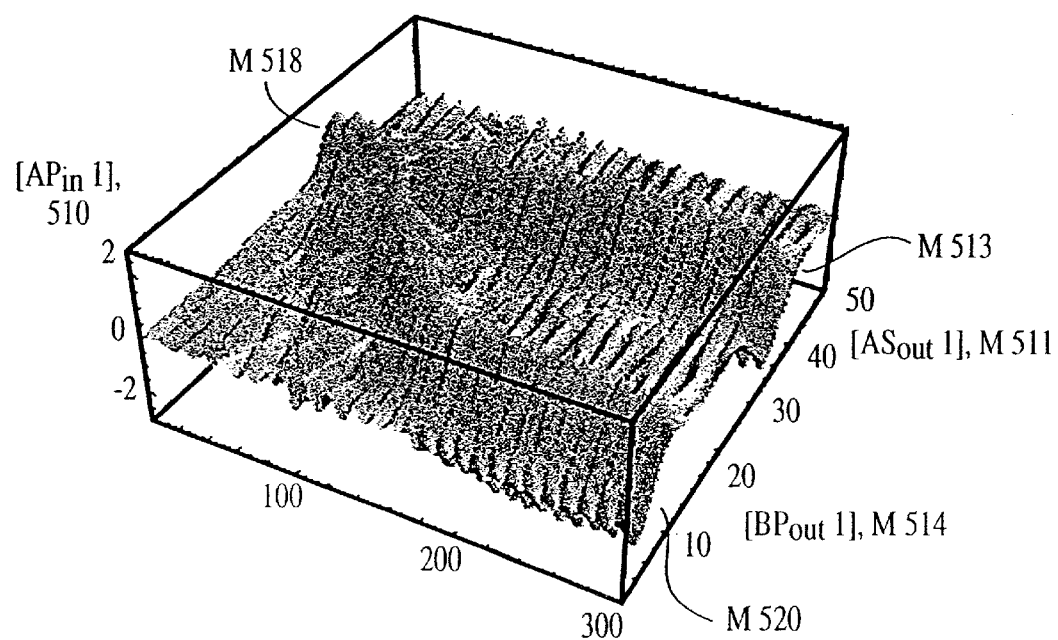
Figures 1, 6F:
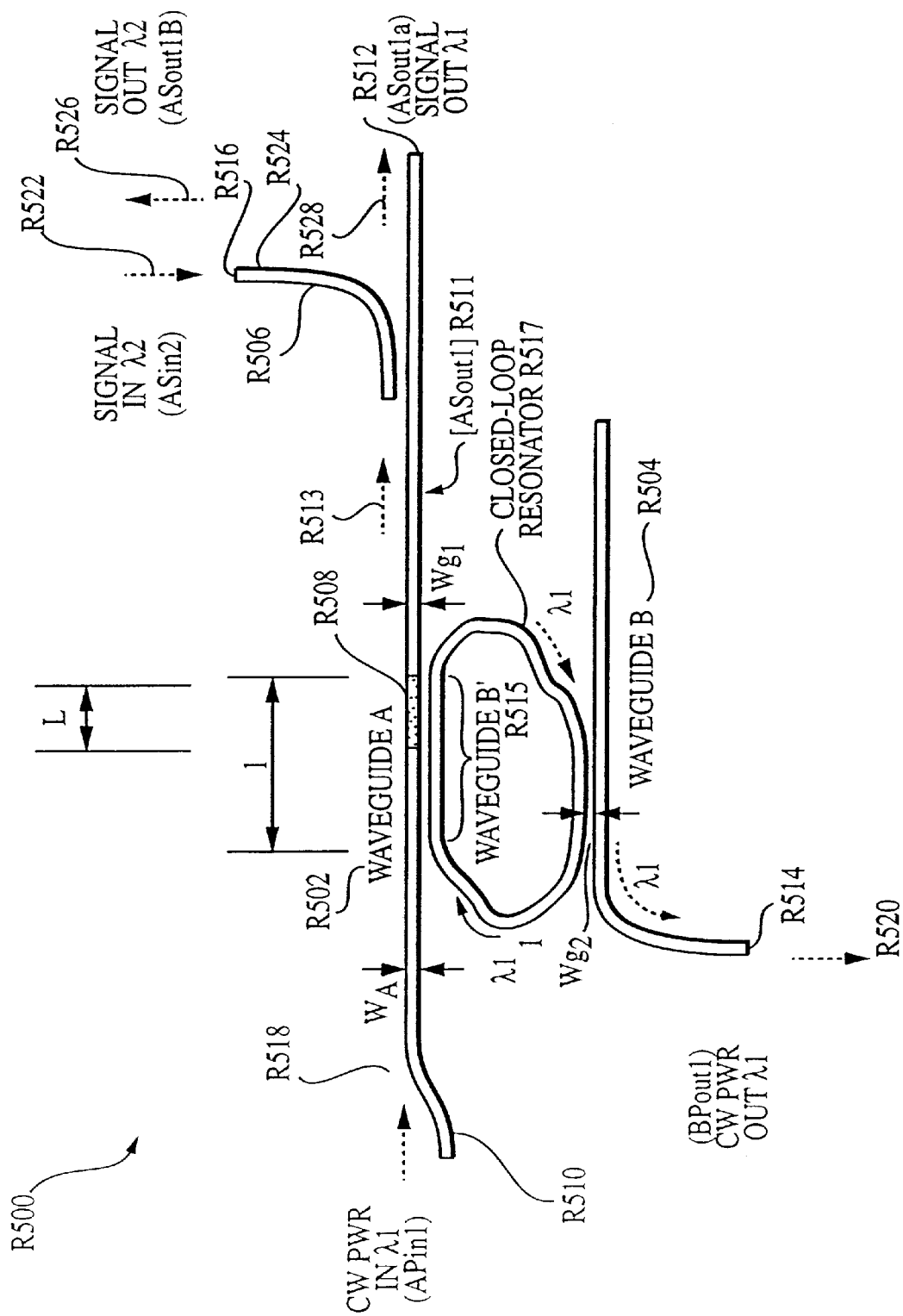
Figures 2, 6F:
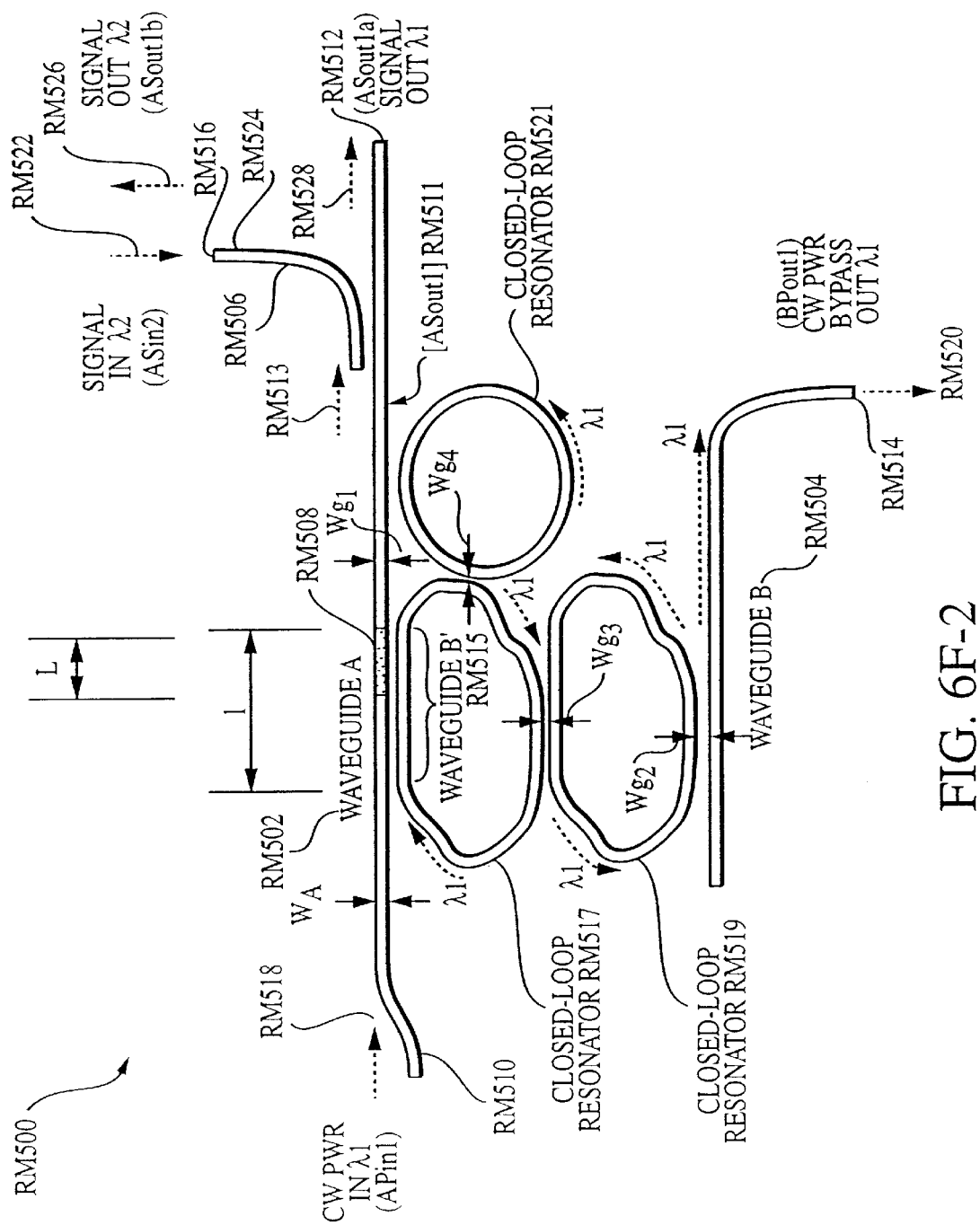
Figures 3, 6F:
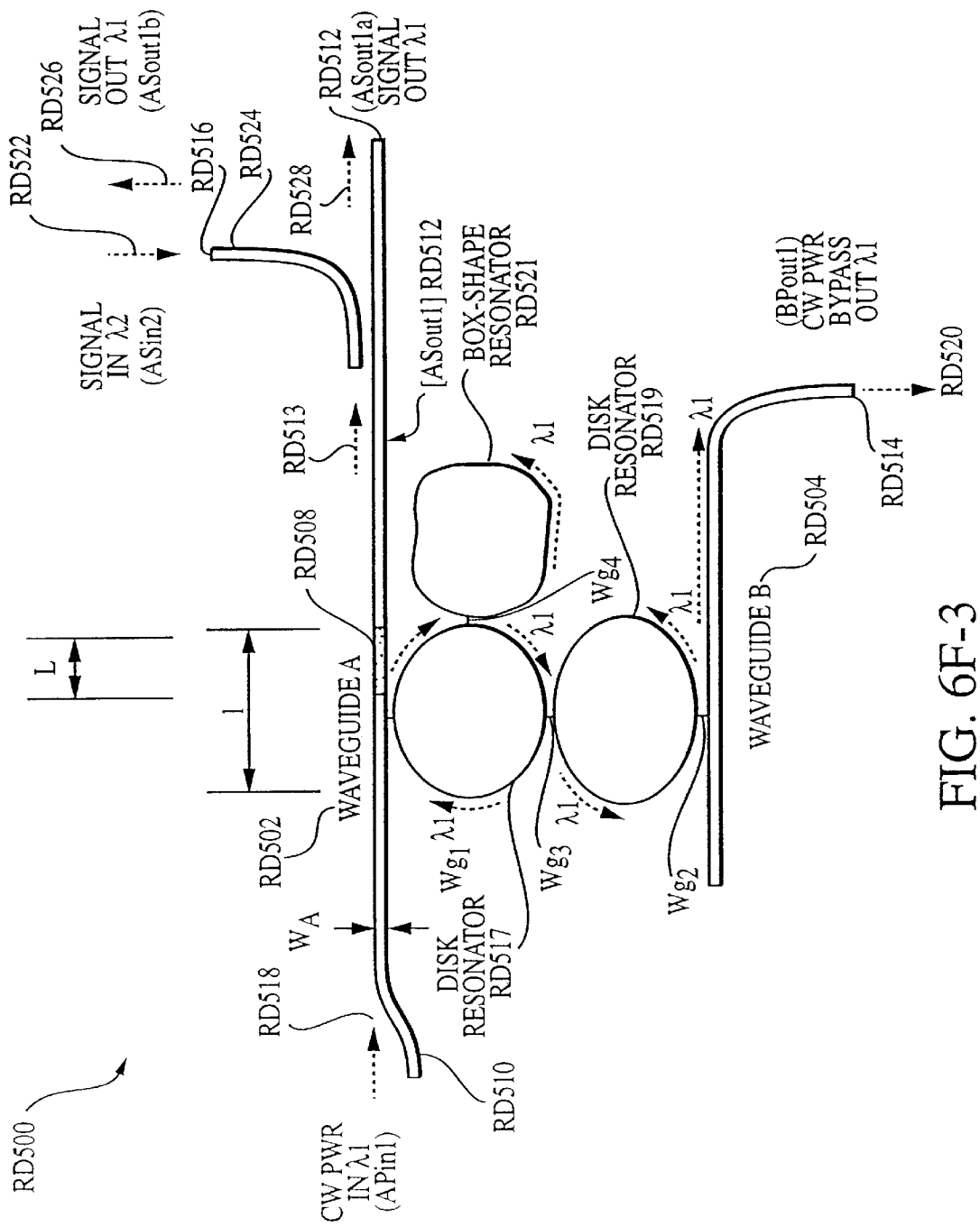
Figures 4, 6F:
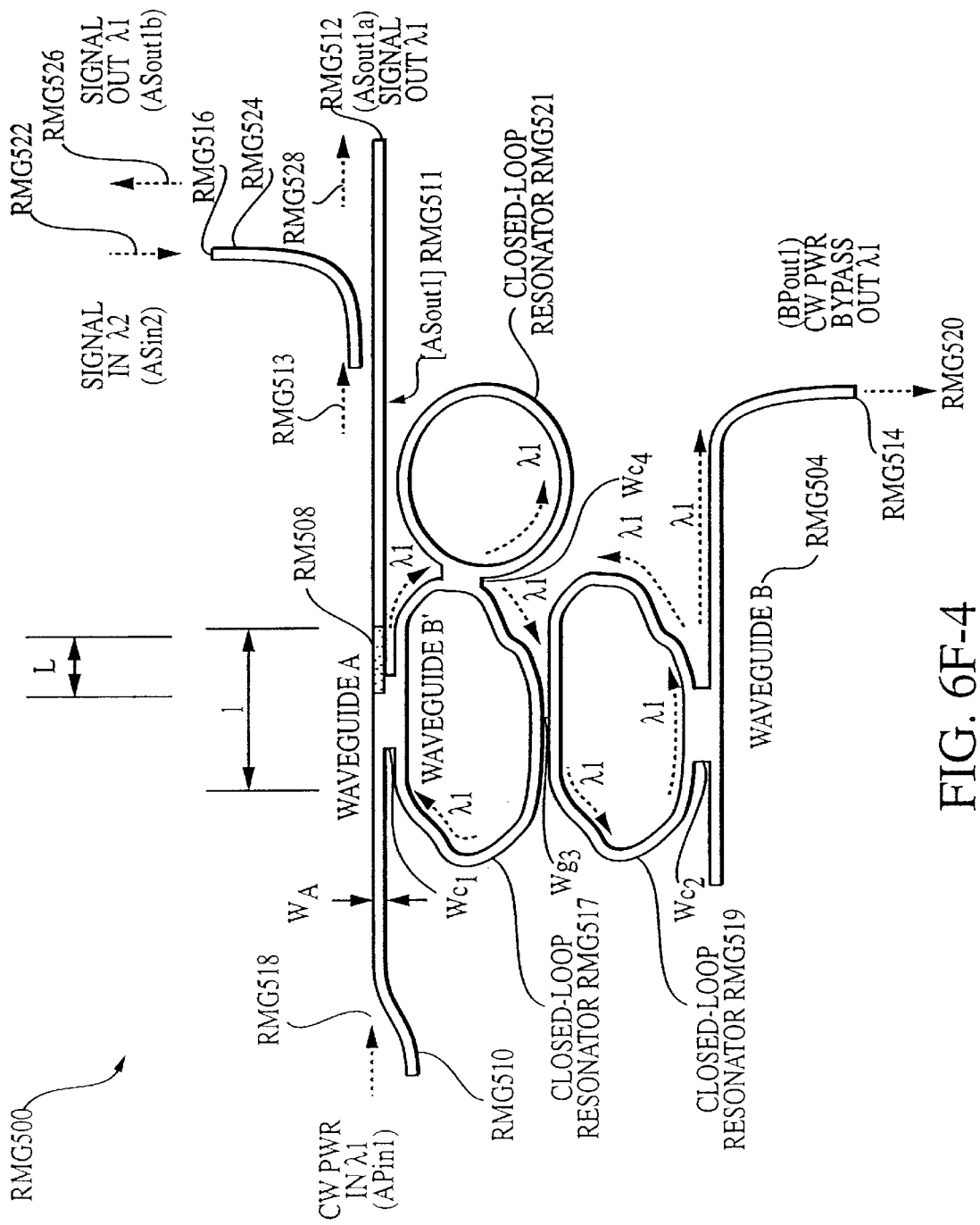
Figures 5, 6F:
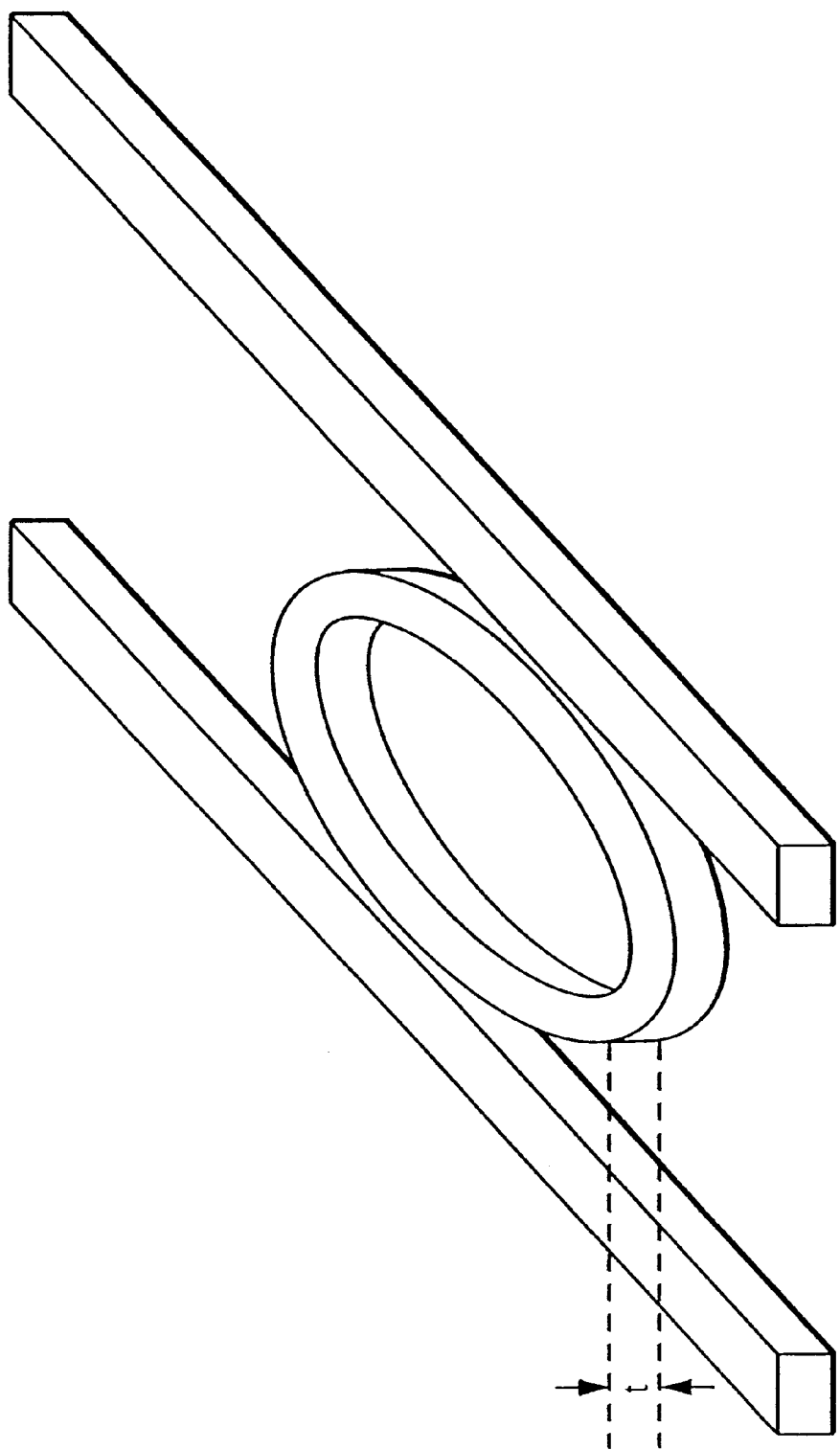

Calculations and derivations were performed based on the exemplary embodiment illustrated in FIG. 5 and having illustrative dimensions described in an exemplary embodiment of waveguide 400, 430, or 450 described above. As described in these illustrative and exemplary calculations presented below, for the case of GaAs quantum wells, the five quantum wells at room temperature will typically provide a gain coefficient of about g=0.25 per $\mu$m when the medium 420 is fully excited for a particular operating wavelength, and a loss coefficient of about $\alpha=-g=0.5$ per $\mu$m when the medium 420 is fully de-excited and is in a loss or absorption state for a particular operating wavelength. In this exemplary embodiment of the medium 420, the energy bandgap $E_{gap}$ of GaAs preferably is at 870 nm, while the absorption wavelength of the quantum well is at about 820 nm.

Preferably, the basic elements in the active medium 420 are electron-hole pairs or excitons. Both can give rise to photon flux transfer operation.

For the case of active medium based on excitons, the number of excitons in a GaAs semiconductor quantum well such as one of the wells 422 in FIG. 5B or FIG. 5C can be estimated by the material volume divided by the exciton volume. The typical diameter for an exciton in bulk GaAs is about 0.0185 $\mu$m, giving an exciton occupation volume of approximately $0.0185^3$ $\mu m^3 = 6.33 \times 10^{-6}$ $\mu m^3$. Hence in a 1 $\mu$m cubic volume, the number of excitons is about $1.6 \times 10^5$, and the exciton number density is $1.6 \times 10^5/\mu m^3$. For the quantum well, the exciton radius can be about ⅓ to ½ smaller, giving an exciton density about 8 to 27 times higher. The exciton emission width, or the spectral width of spontaneous emission from the GaAs quantum well exciton peak can be about 0.3 nm at a low temperature below 77K. The dipole dephasing time can be around 1000 fsec (corresponding to a spectral linewidth of 0.3 nm). The carrier decay time is 3 nsec, giving a spectral linewidth broadening factor of about (1/F)=3 nsec/1000 fsec=3000. This gives a dipole dephasing rate of $\gamma_v = \gamma_{sp}/(2F) = 0.333 \times 10^9 \times 1500 = 0.5 \times 10^{12}$. The exciton contribution to material absorption and gain can be dominating at the low temperature of 4K.

Next let us look at the case of electron-hole, which can be the dominating contribution to material absorption and gain at higher temperature. When an exciton is dissociated, they become electron and hole pair. At room temperature, kT is about 25 meV. Thus the thermal energy corresponds to a spectral width of 11.4 nm. The optical energy for a single photon at 750 nm wavelength is 0.264 atto-Joules (aJ), equal to $(0.264 \times 10^{-18}/1.602 \times 10^{-19}$ eV)=1.65 eV. At room temperature, before the exciton has time to decay, the exciton has already dissolved into an electron-hole pair, which decays at a slower rate. For an electron-hole population decay rate of $\gamma_{sp} = 0.333 \times 10^9$/s and an optical angular frequency of $2.512 \times 10^{15}$/s (at 0.75 $\mu$m), the intrinsic spectral linewidth of the electron hole is $(0.333 \times 10^9/(2.512 \times 10^{15})$ *750 nm=$1 \times 10^{-4}$ nm. The dipole decay rate is $\gamma_v = \gamma_{sp}/(2F)$, where F is called the dipole dephasing broadening factor. The dipole dephasing broadening factor is given by F, where (1/F)=11.4 nm/$1 \times 10^{-4}$ nm=120000.

Next, the saturation intensity can be calculated. For exciton, the saturation intensity with $0.5 \times 10^{12}$/sec dephasing rate is given below.

$$I_{So} = \frac{\pi \hbar \omega n^2 2\gamma_V}{3\lambda_A^2} = \frac{\pi * 0.264 * 10^{-18} * (2 * 0.5 * 10^{12}))}{3 * (0.75 * 10^{-6}/3.4)^2} = 567 \text{ W/cm}^2.$$

For the electron-hole plasma, the saturation intensity is given by:

$$I_{So} = \frac{\pi \hbar \omega n^2 2\gamma_V}{3\lambda_A^2}$$

$$= \frac{\pi * 0.264 * 10^{-18} * (0.33333 * 10^9 * 120000)}{3 * (0.75 * 10^{-6}/3.4)^2}$$

$$= 22692 \text{ W/cm}^2.$$

Next, the exciton and electron-hole absorption coefficients can be determined. For an exciton, the absorption cross section is given by:

$$\sigma_0 = \frac{\hbar \omega \gamma_{sp}}{2I_{So}} = \frac{0.264 * 10^{-18} * (0.33333 * 10^9)}{2 * 567} = 8.8 * 10^{-14} \text{ m}^2,$$

which can also be expressed as $$\sigma_0 = \frac{3F\lambda_A^2}{2\pi n^2},$$

$\alpha_0 = N_e^* \sigma_0 = 1.6 \times 10^{17} \times 2.2 \times 10^{-12} = 1.4 \times 10^4$/cm.

Experimentally, the exciton absorption coefficient is about $2 \times 10^4$/cm.

For electron-holes, the absorption cross section is given by:

$$\sigma_0 = \frac{\hbar \omega \gamma_{sp}}{2I_{So}} = \frac{0.264 * 10^{-18} * (0.3333 * 10^9)}{2 * 22000} = 2 * 10^{-15} \text{ cm}^2.$$

For an electron-hole density of $3.84 \times 10^{18}$/cm³, calculated by:

$$N_e = 1.6 * 10^{17} * \frac{12 \text{ nm}}{0.5 \text{ nm}} = 3.84 * 10^{18}/\text{cm}^3,$$

this gives an absorption coefficient of:

$\alpha_0 = N_e^* \sigma_0 = 7680$/cm.

Thus the absorption coefficient is approximately 10,000/cm for the electron-hole case. Below, an absorption coefficient of about 10,000/cm or 1 per $\mu$m is used. As an example, assuming an active volume of approximately 1 $\mu$m by 0.4 $\mu$m by 0.2 $\mu$m (0.08 $\mu m^3$), and a carrier density of $3.84 \times 10^6/\mu m^3$ then the number of electron and holes will be $(0.08 \times 3.84 \times 10^6) = 0.307 \times 10^6$. A medium length corresponding to the absorption length of 1 $\mu$m is used as most of the energy is expected to be absorbed in this length. This allows us to make an estimation of the saturation intensity using energy conservation that the number of electrons excited is equal to the number of photons absorbed. To fully excite all the electrons, this will require an energy of $0.264 \times 10^{-18} \times 0.307 \times 10^6 = 8.1 \times 10^{-14}$ Joule (J) or 81 femto-joules. To achieve inversion within the natural decay time of 3 nsec, it will be about 27 $\mu$W. The is, a pulse power of 27 $\mu$W will be needed. For 3 psec pulses, it will be 27 mW and 1 psec pulses, it will be 71 mW.

On the other hand, the saturation intensity of 22700 W/cm² can be achieved with an optical power of 17 $\mu$W in a waveguide area of 0.08 $\mu m^2$. To get full inversion, twice the saturation power is needed, which will be 34 $\mu$W, agreeing with the above value of about 27 $\mu$W.

For the case of electron-hole pairs, experimentally measured transparency is achieved with 40 mW power at 15 $\mu$m light beam diameter or a light beam intensity of 22 KW/cm² (at a carrier density of about $2 \times 10^{18}$ per cm³). The decay rate is about 3 nsec. Thus for 3 nsec, the power needed in the waveguide will be 16 $\mu$W, giving for 3 psec switching, a power of about 16 mW, which agrees approximately with the development above.

With use of exciton absorption, the situation can be improved. In that case, the carrier density is $1.6 \times 10^5$ per $\mu m^3$. The number of electron and holes in 0.5 $\mu$m (length) by 0.2 $\mu$m (height) by 0.4 $\mu$m (width) volume (the length is assumed to be half of electron-hole case because of twice higher absorption) will be $0.08 \times 0.5 \times 1.6 \times 10^5 = 0.64 \times 10^4$. This will require an energy of $0.264 \times 10^{-18} \times 1.28 \times 10^4$ J=$1.685 \times 10^{-15}$ J. For 3 nsec pulse, the required peak power will be 0.56 $\mu$W. For 3 psec, it will be 0.56 mW. For 1 psec, it will be 1.68 mW, which is about 20–50 times smaller than that of the electron-hole case.

Below, we shall take the case of an electron hole, which can be dominating at room temperature. For device application, an important quantity is the product of gain coefficient g (or absorption coefficient −g) and the medium length. As an example, for gL=−1, the switching power will be 16 mW for 3 psec. The case of gL=−1 can be achieved as discussed above with the active medium filling the waveguide core (g≈−1/$\mu$m) and with a 1 micron long medium. The typical device here requires gL=2 to 6 and gL<−6 to −50. Because of upperband filling, the gain achieved at the expected carrier number density is less than negative of the absorption coefficient of 1 per $\mu$m, or about 0.5 of the expected, which will be 0.5 per $\mu$m.

For the 5 quantum well case with g=−0.5/$\mu$m The typical device here requires gL=2 to 6 (2 is achievable with 7.5 $\mu$m gain medium) and gL<−6 to −50 (−6 is achievable with 15 $\mu$m absorbing medium). Because of upperband filling, the gain achieved at the expected carrier number density is less than negative of the absorption coefficient of 1 per $\mu$m, or about 0.5 of the expected, which will be 0.5 per $\mu$m.

An example of a device based on gL=2 gain medium will be a five quantum well device (0.05 $\mu$m thick) at the center of the 0.2 $\mu$m thick medium with 7.5 $\mu$m long length, giving a gain of gL=(½)(from 0.5 per $\mu$m)*(¼)(from thickness ratio)*2 (from 2×enhancement at center of medium)*7.5 (from length)=2. In this five quantum well case, the effective gain coefficient is 0.25 per $\mu$m. The switching power can be obtained from the analysis above for the 1 $\mu$m long medium case, multiplied by the larger medium volume because of the longer medium length and the reduced gain coefficient. For example, the expected switching peak power for 1 $\mu$m long gain medium with g=1 per $\mu$m will be 2× of the above transparency power, which for 100 psec (3 psec) switching will be 1 mW (32 mW) or about 100 fJ. Thus for the case of g of two times smaller (g=0.5 per $\mu$m) and a medium length of 7.5 $\mu$m here with an active medium volume of about twice larger (the medium is 4× thinner but the length is 8× longer), it will be approximately 2 times higher switching power or energy (i.e. scaling with the medium volume).

An example of a device based on gL<−6 absorbing medium will be a five quantum well device (0.05 $\mu$m thick) at the center of the 0.2 $\mu$m thick medium with 15 $\mu$m long length, giving a gain-length product of gL=−(1)(from 1 per $\mu$m)*(¼)(from thickness ratio)*2 (from 2×enhancement at center of medium)*15 (from length)=−7.5. Low-loss switching may require gL of about −50 achievable with 100 micron long medium length for the active medium. For the case of the medium here with gL=−6 for which the active medium is 4× thinner than the waveguide thickness and the medium length is about 15 times longer, giving an active volume that is 4 times larger then the expected transparency switching power needed will also be 4 times larger. Thus, for 3 nsec/100 psec/3 psec switching, the switching peak power will be 64 $\mu$W/2 mW/64 mW or about 200 femto-Joules.

With use of excitonic absorption, the switching energy can be below tens of fJ when optimized (as mentioned above, it can be 20 to 50 times lower). The narrow 0.5 nm width of the exciton peak, however, restricts the speed to slower than 3 psec (150 fesc for 11 nm).

From the above calculations, it can be seen that the energy needed for the gain or loss gate operation is typically hundreds of femto-Joules (fJ) or so.

It should be understood that the estimated operating power given here is meant to provide an illustration of how low the switching power can be and is not meant to restrict the applications or the embodiments of the devices.

IV. GENERAL COMMENTS ON DEVICE CLASSIFICATIONS AND OPERATIONS

As mentioned below, there are three different classes of phosistors, namely: (1) all-optical phosistors, (2) electro-optical phosistors, and (3) mechanical-optical phosistors.

In most cases under discussion, light having wavelength $\lambda_n$ is input to the phosistor either (1) in a continuous fashion with respect to time, that is, as continuous wave (CW) light having wavelength $\lambda_n$ or (2) in a switched, or pulsed fashion with respect to time, so that pulsed light having wavelength $\lambda_n$ is present for the duration of the pulse, and is not substantially present otherwise (at least not at wavelength $\lambda_n$). Such pulsed light is more specifically referred to as a positively going pulsed light (light with an increased intensity during the pulse duration). In some instant, a negatively going pulsed light is of interest (light with a reduced intensity during the pulse duration). When unqualified, a pulsed light is understood to be a positively going pulsed light. Such a characterization of light will be familiar to those skilled in the art. Hereafter, for simplicity of description, light or another entity "having wavelength $\lambda_n$" can be referred to as being "at $\lambda_n$."

It should be understood that in the typical operation of the phosistors, including the useful embodiments described below, one or more light inputs or outputs will be described as continuous wave (CW) light. This light can otherwise take the form of pulsed light in some specific applications. It is for the purposes of illustration and not limitation that one or more light inputs or outputs will be described as continuous wave (CW) light.

These phosistors are also classified by their physical principles of operation. Like transistors, a phosistor can have three or more "terminals". A phosistor can involve a wave-coupling junction such as a directional coupler, or a multi-mode interference (MMI) device, or a resonator device, or a photonic bandgap structure. There are also numerous ways to confine waves. As described previously, one way is through a dielectric or metallic waveguide, another way is through a photonic bandgap device. The phosistors can be all-optical type phosistors for which electricity does not play an active role in the operation of the device (i.e. either there is no electrical input or the electrical input is used only passively to bias the active medium with a constant voltage or current). The phosistors can be electro-optical type phosistors for which electrical input is an active part of the device operation (i.e. the electrical input is altered actively to affect the device output). The phosistors can also be of the mechanical-optical type for which a mechanical motion is involved in the active function of device.

In the case of all-optical or electro-optical phosistors, it should be understood that the phosistor devices and exemplary embodiments described herein use a combination of means to resist or enhance the flow of photon flux in a certain direction by preferably altering the interference flux pattern of light and by preferably altering the light transfer control properties of the active medium. Preferably, the interference flux pattern of light identifies, and the light transfer control property of the active medium determines, the propagation direction of the flow of photon flux in the photon transistor(s) at a given time. For the case of optical-mechanical phosistors, the interference flux pattern of light is modified by mechanically moving a material section or a waveguide.

In the preferred embodiments, a coupler device transfers energy from one material region to another via interference. This interference causes the propagation direction of an input light beam to deviate from straight line propagation. In an all-optical or electro-optical phosistor, this path-changing interference is interrupted in the coupler due to an absorbing or a gain medium controlled by another photon flux, an injection current or an applied voltage. This leads to an effective "transfer photon-resistance" for the spatial propagation of the original light beam by enhancing or reducing the resultant energy flux in certain regions of the coupler.

The interference flux pattern of light is the pattern of photon flux (power flow per unit area at a given spatial point) in the device, including the interaction region of the device, due to the interference effect of allowable propagating modes in the interaction region. Preferably, the interference flux pattern of light identifies, and the light transfer control property of the active medium determines, the propagation direction of the flow of photon flux and how the energy of light propagates at various spatial locations in the photon transistor(s) at a given time. In a large spatial region, the interference flux pattern of light is reduced largely to the familiar phenomena of diffraction or Bragg reflection. In a device with a small interaction region having a size of a few or tens of optical wavelengths, depending on the device geometry, the interference flux pattern of light can take on drastically different patterns and can be altered significantly by an active medium such as the active medium 420 described previously.

It should be understood that the interference flux pattern of light is a "snapshot" of the photon flux at a particular moment in time and that several of similar patterns may exist before or after the particular moment in time that generally represent the same phenomenon. Thus, there is no one representative or unique interference flux pattern for a particular state of the phosistor device. However, interference flux patterns of light corresponding to different states are far more readily distinguishable. A particular interference flux pattern for a particular state illustrates generally the preferred overall trend or tendency of light distribution in that particular state. Therefore, for clarity, the interference flux patterns of light that correspond to a particular state of the phosistor will be referred to generally as a single overall interference flux pattern that corresponds to and is representative of that particular state, even though in the strict sense, an uncountable or continuum set of interference flux pattern of light exists that can be said to correspond to that particular state.

The state of an active medium such as active medium 420 can have influence on the interference flux patterns of light. In particular, the interference flux pattern of light when the active medium is in a state of loss is altered from the interference flux pattern of light when the medium is in a state of transparency. This is because loss can alter the mode shape, optical phase front, and the number of allowable propagating modes (usually a reduction in the number of allowable propagating modes) that can participate in the interference. Similarly, the interference flux pattern of light when the active medium is in a state of gain is altered from the interference flux pattern of light when the medium is in a state of transparency. This is because gain can also alter the mode shape, the optical phase front, and the number of allowable propagating modes (usually an increase in the number of allowable propagating modes) that can participate in the interference. Of course, the interference flux pattern of light when the active medium is in a state of gain is altered from the interference flux pattern of light when the medium is in a state of loss, as well. It should be understood that reference to the "light transfer control properties of the active medium" and the actions of "modification" or "modifying" the "light transfer control properties" is intended to refer generally to the capabilities of an active medium such as active medium 420 when implemented with or without a PN or PIN junction (FIGS. 5B, 5C, 5D) with regard to altering the interference flux pattern of light.

V. EXEMPLARY DEVICES AND EMBODIMENTS (ALL-OPTICAL DEVICES)

The presently preferred phosistor embodiments and devices in the case of all-optical operation may be classified by whether they convert a higher energy (lower wavelength) pulse to a lower energy (higher wavelength) pulse or vice versa, or do not convert the pulse energy at all. Presented herein are presently preferred exemplary and useful embodiments of phosistor devices utilizing wave-coupling junction such as in the form of directionally coupled waveguides based on the Waveguide 400. In some instances, one or more arms of the directionally coupled waveguides will have an active region or medium in the form of active medium 420. The coupling length, defined as the length to achieve maximal energy transfer from one waveguide to another, of the directional coupler involved will be denoted as $l_C$.

A. Exemplary Device 1

FIG. 6A illustrates a first general embodiment 500 of a phosistor device employing directionally coupled waveguides. The device can perform as a switching element and can in particular switch or convert a stream of slow or ultrafast (picosecond, femtosecond) optical pulses at high energy and short wavelength to a stream of slow or ultrafast optical pulses at comparatively low energy (comparatively long wavelength). The device 500 is not limited to use as a switching element and can be utilized, for example, as an all-optical logic gate, a light intensity amplifier, a photon duplicator, a light intensity modulator, a light intensity regulator, an optical phase shifter, a lossless signal tap, a quantum-nondemolition (QND) detector, and a variable optical attenuator. It should be understood that these exemplary applications of device 500 are intended to illustrate the wide range of uses for device 500, and are not intended to limit the applications of other exemplary embodiments of device 500 to these examples. The device can be referred to as an "Input-Arm-Gain-Gate High-to-Low-Energy Phosistor" (IGHL Phosistor 500).

Figures 6, 6F:
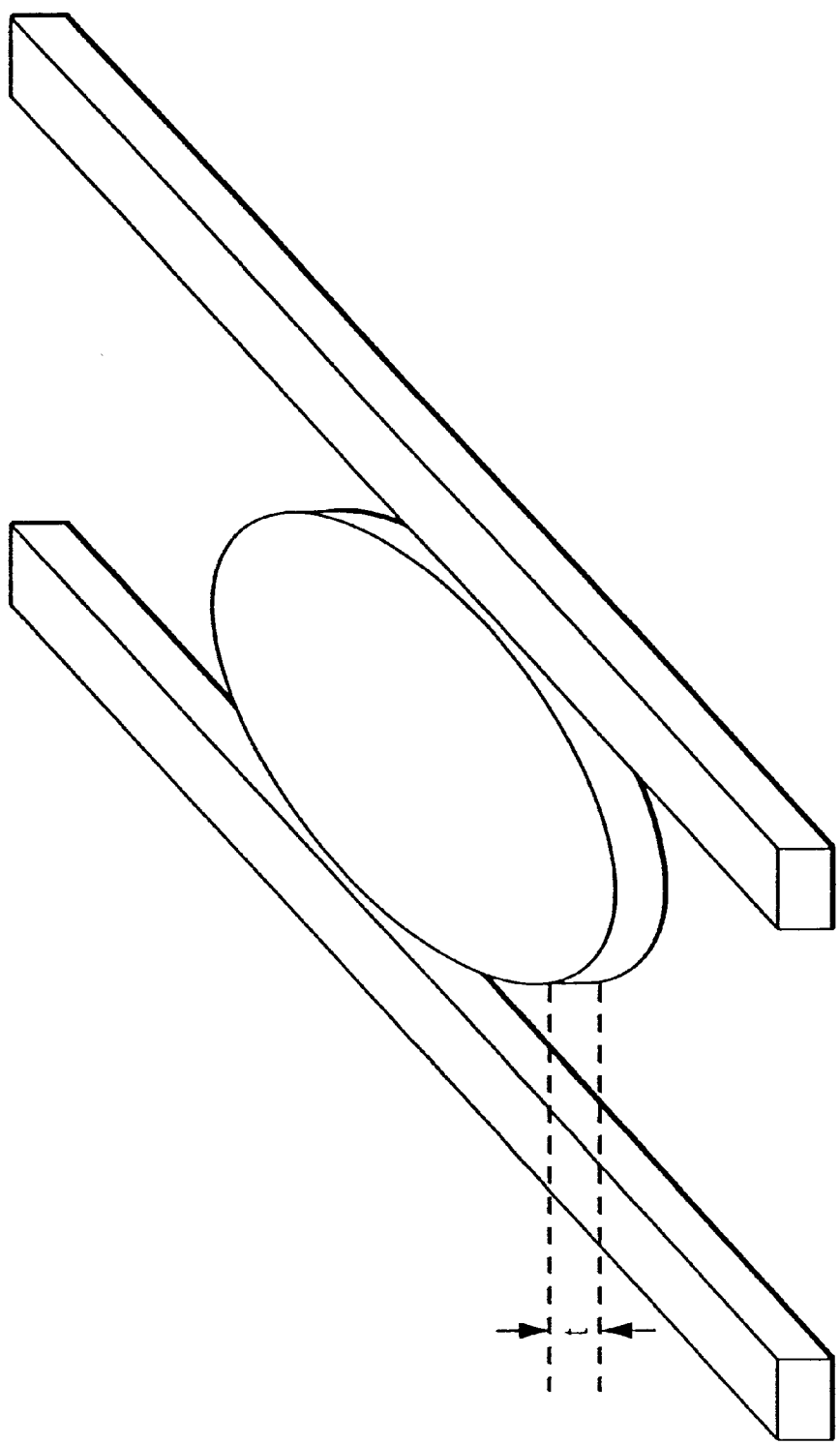

IGHL Phosistor 500 preferably includes a first pathway of light consisting of the spatial region occupied by Waveguide A 502 and a second pathway of light consisting of the spatial region occupied by Waveguide B 504. A third Waveguide 506 is included in Phosistor 500 for coupling an input optical pulse to the Waveguide A 502, but which is otherwise not central to the operation of Phosistor 500. The Waveguide A 502 preferably includes an active medium 508. As described above, Waveguide A 502 can be implemented as waveguide 430 with active medium 420 in a useful embodiment, and waveguide B 504 and the third waveguide 506 can be implemented as waveguide 400. The Waveguide A 502 preferably includes an input port APin 1 510, an inner output port ASout1 511, and an output port ASout1$a$ 512. The Waveguide B 504 preferably includes an output port BPout1 514. The third Waveguide 506 preferably includes an input port ASin2 516 which doubles as an output port ASout1$b$ 524. FIG. 6 illustrates that Waveguide A 502 has width $W_A$ and is located at an approximately parallel distance (coupling gap or distance) $W_g$ from Waveguide B 504, which has width $W_B$, so that a wave in Waveguide A can be coupled to a wave in Waveguide B. The terms "wave" and "light beam" are used interchangeably.

For the input port labeled "APin1" (510), "P" stands for Power-Supply beam, "A" refers to Waveguide A 502, "in" refers to 510 being an input port, and "1" refers to the input wavelength being $\lambda_1$. For the inner output port labeled "ASout1" (511), "S" stands for Signal beam, "A" refers to Waveguide A 502, "out" refers to it being an output port, "1" refers to the output wavelength being $\lambda_1$. For the output port labeled "ASout1a" (512), "S" stands for Signal beam, "A" refers to Waveguide A 502, "out" refers to it being an output port, "1" refers to the output wavelength being $\lambda_1$, and "a" is used to distinguish this port 512 which is along Waveguide A 502. For the output port labeled "ASout1b" (524), "S" stands for Signal beam, "A" refers to Waveguide A 502, "out" refers to it being an output port, "1" refers to the output wavelength being $\lambda_1$, and "b" is used to distinguish this port 524 which is along the third Waveguide 506. For the output port labeled "BPout1" (514), "P" stands for Power-Supply beam, "B" refers to Waveguide B 504, "out" refers to it being an output port, and "1" refers to the output wavelength being $\lambda_1$. For the input port labeled "ASin2" (516), "S" stands for Signal beam, "A" refers to Waveguide A 502, "in" refers to it being an input port, and "2" refers to the input wavelength being $\lambda_2$.

Preferably, input port APin1 510 on the Waveguide A 502 is configured to receive continuous wave (CW) light 518 having wavelength $\lambda_1$ (at $\lambda_1$) (CW PWR IN $\lambda_1$). Under certain conditions described below when the active medium on the waveguide reaches transparency and Waveguides A and B are optically transparent, most of the CW light at $\lambda_1$ 518 propagating along the Waveguide A 502 will be transferred to Waveguide B 504 after a coupling length $l_C$. The CW light at $\lambda_1$ 518 then exits from Waveguide B 504 at the port BPout1 514 as continuous wave (CW) light at $\lambda_1$ (CW PWR BYPASS OUT $\lambda_1$) 520.

The coupling length is defined as the length at which a wave in one waveguide maximally couples into another waveguide that is coupled to the first waveguide. In this exemplary device 500, the interaction length l, defined as the length of interaction between light in Waveguides A 502 and B 504 extends to approximately the full coupling length $l_C$ so that $l=l_C$. In other exemplary devices, the interaction length could be chosen to be multiple odd numbers of the coupling length $l_C$ ($l=3l_C$, $5l_C$, $7l_C$, . . . ). As is known to those skilled in the art, these coupling lengths will also achieve maximal coupling as for the case where $l=l_C$. While the choice of $l=l_C$ is illustrated in this exemplary device, the interaction length may vary from the coupling length $l_C$ (or multiple odd numbers of $l_C$) without affecting the general operating principle of the device. With the use of semiconductor materials, the interaction length l may be less than 150 microns.

As shown in FIG. 6A, the length L of the active medium 508 is about half the interaction length l ($L\approx l/2$). Preferably, the length L of the active medium 508 may be somewhat longer or shorter than half of l. Varying the length L of the active medium 508 relative to the interaction length l will vary the input to output signal conversion efficiency, but will otherwise not affect the general operating principle of the device.

It should be understood that these dimensions and exemplary lengths are presented for purposes of illustrating a useful embodiment of the device 500 (or 550, described below and shown in FIG. 6B) and are not intended to limit other exemplary embodiments of any exemplary device, or the device 500 (or 550). A variety of dimensions and sizes can be used, depending on the application desired as well as the fabrication materials, processes or technologies that are employed. For example, while the choice of $l=l_C$ is illustrated in this exemplary device, other choices of interaction length can be used to achieve similar device functions.

Also, it should be understood that the shape of the waveguides do not generally have to be linear. Curved shapes and different waveguide dimensions may be utilized as long as they achieve the same functions such as waveguiding and wave-coupling. The active medium can be centered at an alternative location along waveguide A other than that illustrated in FIGS. 6A and 6B, and there can be more than one disconnected active medium areas along waveguide A. Furthermore, waveguides that are placed side by side to achieve wave-coupling do not have to be placed side by side in a horizontal manner but can be placed in a top-down vertical manner or any other manners with respect to the horizontal substrate. Also coupled waveguides do not have to be exactly parallel or have the same widths and dimensions as long as the desired effect of wave-coupling is achieved.

In an exemplary embodiment of devices 500, 550 for operation at 800 nm wavelength range, the wavelength $\lambda_1$ can be at 820 nm, $\lambda_2$ can be at 800 nm, and the Waveguide A 502 can be implemented as the Waveguide 430 illustrated in FIGS. 5B and 5C and Waveguide B 504 can be implemented as the Waveguide 400 illustrated in FIG. 5A, in an $Al_xGa_{1-x}As$ embodiment for the waveguide core having alloy composition x at 0.3 giving a bandgap energy of around 690 nm. Thus the core material is transparent at the wavelength $\lambda_1$ of 820 nm. When the active medium is fully de-excited, the active medium absorbs light at both the 800 nm and 820 nm wavelengths. In these embodiments, the active medium preferably is an essentially three-level medium as described in FIGS. 4A–D for which the electrons are free to relax from the upper-energy level corresponding to the 800 nm absorption to the upper-energy level corresponding to the 820 nm absorption.

In an exemplary embodiment of devices 500, 550 for operation at 1500 nm wavelength range, the wavelength $\lambda_1$ can be at 1500 nm, $\lambda_2$ can be at 1480 nm, and the Waveguide A 502 can be implemented as the Waveguide 430 illustrated in FIGS. 5B and 5C and Waveguide B 504 can be implemented as the Waveguide 400 illustrated in FIG. 5A, in an $In_{1-x}Ga_xAs_{1-y}P_y$ embodiment for the waveguide core having alloy compositions x=0.16 and y=0.67 giving a bandgap energy of around 1100 nm. Thus the core material is transparent at the wavelength $\lambda_1$ of 1500 nm. When the active medium is fully de-excited, the active medium absorbs light at both the 1480 nm and 1500 nm wavelengths. The active medium is an essentially three-level medium described in FIGS. 4A–D for which the electrons are free to relax from the upper-energy level corresponding to the 1480 nm absorption to the upper-energy level corresponding to the 1500 nm absorption.

In an exemplary embodiment for application to the 1500 nm (or 1.5 $\mu$m) wavelength range, the cross-sectional dimensions of the waveguide 400 or 430 are 0.4 $\mu$m wide by 0.25 $\mu$m thick. FIGS. 6A & 6B illustrate that Waveguide A 502 has width $W_A$ and is located at an approximately parallel distance (coupling gap or distance) $W_g$ from Waveguide B 504, which has width $W_B$. In this exemplary embodiment, the Waveguide A 502 has width $W_A$ equal to 0.4 $\mu$m and is located at an approximately parallel distance $W_g$ from Waveguide B 504 of 0.4 $\mu$m, while Waveguide B 504 has width $W_B$ equal to 0.4 $\mu$m. In this exemplary embodiment for which the wavelengths of light are at around 1500 nm range, $l_C$ is 15 $\mu$m.

It should be understood that these dimensions, exemplary lengths, and geometry are presented for purposes of illustrating a useful embodiment of the devices 500, 550 and are not intended to limit other exemplary embodiments of any exemplary device, or the devices 500, 550. A variety of dimensions, sizes, and geometry can be used, depending on the application desired as well as the fabrication materials, processes or technologies that are employed.

i). Exemplary Device Operation

An exemplary operation of the device 500 is described follows.

Continuous wave (CW) light having wavelength $\lambda_1$ (at $\lambda_1$) (CW PWR IN $\lambda_1$) 518 enters at the port APin1 510 on the Waveguide A 502. In the initial state, the active medium 508 along Waveguide A 502 is not excited and is in the state of loss analogous to Case A, as illustrated in FIG. 4A. As will be described below, the medium can also initially be in the state of transparency analogous to Case C, as illustrated in FIG. 4C. The CW light at $\lambda_1$ 518 propagates along the Waveguide A 502 and is subsequently transferred to Waveguide B 504 after a coupling length $l_C$. The CW light at $\lambda_1$ 518 then exits from Waveguide B 504 at the port BPout1 514 as continuous wave (CW) light at $\lambda_1$ (CW PWR BYPASS OUT $\lambda_1$) 520.

The input port ASin2 516 on Waveguide 506 effectively serves as another input port of Waveguide A 502, and is the input signal port for pulsed light having wavelength $\lambda_2$ (SIGNAL IN $\lambda_2$) 522. The pulsed light $\lambda_2$ 522 entering the port ASin2 516 will excite the active medium 508, providing gain at the operating wavelength $\lambda_1$ to the active medium 508 located in Waveguide A 502. This state of the active medium 508 is analogous to Case B, as illustrated in FIG. 4B.

The CW light at $\lambda_1$ 518 from input port APin1 510 then gains energy in the active medium 508 and this extra energy at $\lambda_1$ will propagate across the active medium to port ASout1 511 as light beam 513 and be subsequently divided to exit ports ASout1b 524 and ASout1a 512. If the coupling of energy from the port ASin2/ASout1b 516/524 to Waveguide A 502 (or equivalently to port ASout1 511), is a 50/50 coupler, then the energy coupling ratio for light propagating in the opposite direction (i.e. from port 511 to port 516/524) will also be 50/50. As a result, about 50 percent of $\lambda_1$ 513 at port ASout1 511 will go to $\lambda_1$ 526 (SIGNAL OUT $\lambda_1$) at port ASin2/ASout1b 516/524 and 50 percent of $\lambda_1$ 513 at port ASout1 511 will go to $\lambda_1$ 528 (SIGNAL OUT $\lambda_1$) at port ASout1a 512.

In the case of FIG. 6A the net effect is that the pulsed light at $\lambda_2$ 522 into port ASin2 516 generates pulsed light at $\lambda_1$ 513 exiting waveguide section ASout1 511, which proceeds to split the energy of the pulsed light $\lambda_1$ 513 to pulsed light at $\lambda_1$ 528 exiting port ASout1a 512 and pulsed light at $\lambda_1$ 526 exiting port ASout1b 524. While not essential for the basic operation of the device 500, an improved version 550 of the device 500 can be achieved via using a frequency-selective coupler such as grating or a small resonator. Such a frequency dependent coupler is called a dichroic filter or coupler and is shown as part of device 550 in FIG. 6B, replacing Waveguide 506 of FIG. 6A. The dichroic filter 556 will couple most of the pulsed light $\lambda_2$ 572 entering the port ASin2 566 to Waveguide A 502 but not $\lambda_1$. In this case, most of $\lambda_1$ (SIGNAL OUT $\lambda_1$) 578 will not couple from Waveguide A 502 to the port ASin2 566 and will instead propagate its energy to port ASout1a 562. It should be understood that the device 550 is otherwise functionally and operationally identical to the device 500 and descriptions and comments relating to the device 500 are applicable to device 550.

Beside the use of a dichroic filter, it is important to note that other schemes can achieve the same function. For example, alternatively (not shown), a polarization dependent beam splitter or coupler can be used to couple the pulsed light $\lambda_2$ 2572. In such a configuration, light pulses of different polarizations are utilized. Light at $\lambda_1$ 518 can be in a polarization orthogonal to that of pulsed light $\lambda_2$ 572 so that the polarization dependent beam splitter or coupler will couple most of the pulsed light $\lambda_2$ 572 entering the port ASin2 566 to Waveguide A 502 but not $\lambda_1$. In another alternative scheme (not shown), a mode-selective coupler is used to couple the pulsed light $\lambda_2$ 572. In this scheme, pulsed light $\lambda_2$ 572 is coupled to a waveguide mode different from the propagating mode of light at $\lambda_1$ 518. This can be achieved by using multimode waveguides for waveguide A such that light at $\lambda_1$ 518 is propagating in the lowest-order mode of waveguide A and pulsed light $\lambda_2$ 572 is coupled to the second-order mode of waveguide A. As is well known to those skilled in the art, the second order mode will have a larger angle of propagation (i.e. will be closer to the critical angle of escape) and can be designed to have a larger coupling coefficient than the lowest order mode. As a result, the mode selective coupler will couple most of the pulsed light $\lambda_2$ 2572 entering the port ASin2 566 to Waveguide A 502 but will not couple much of $\lambda_1$ from waveguide A to port ASin2 566.

It should be understood that the energy exiting the port BPout1 514 (as continuous wave (CW) light at $\lambda_1$ (CW PWR BYPASS OUT $\lambda_1$) 520) can be designed to be substantially unaffected in this entire process. The energy exiting the port BPout1 514 of the IGHL Phosistor 500, 550 of FIGS. 6A and 6B is cable of being reused to power another phosistor. This feature is analogous to the supply voltage in electronic logic and switching circuitry.

Specifically, there is a range of gain for the gain medium from zero up to a certain critical gain value for which the energy exiting the port BPout1 514 (i.e. the energy of light at $\lambda_1$, CW PWR BYPASS OUT $\lambda_1$ 520), is not substantially affected and the energy exiting the port ASout1 511 gain substantially to approach the energy exiting the port BPout1 514. When the gain begins to exceed this critical value, the intensity of $\lambda_1$ 513 (SIG OUT $\lambda_1$) exiting port ASout1 511 will begin to be substantially higher than the intensity of $\lambda_1$ 520 (CW PWR BYPASS $\lambda_1$) exiting port BPout1 514.

It should be understood that the speed of switching can be fast as the active medium 508 when in the gain state at $\lambda_1$ (Case B in FIG. 4B) will be driven back to the transparency state at $\lambda_1$ (Case C in FIG. 4C) rapidly by the light at $\lambda_1$ 518 passing through the gain medium 508 when pulsed light at $\lambda_2$ 522, 572 is removed. The state of the active medium 508 is again analogous to case C, as illustrated in FIG. 4C. In the longer time scale, the active medium will relax back to the state of loss analogous to Case A, as illustrated in FIG. 4C. As described below, it is some times desirable to keep the initial state of the active medium to be in the state of transparency, There are various ways to maintain the active medium to be initially in the state of transparency. One way is to provide a constant excitation to the active medium from the light at $\lambda_2$ 2522, or from any other constant intensity light at $\lambda_2$. Thus the light $\lambda_2$ 522 can be a pulsed light source above a constant background intensity. Another way is to provide a constant excitation current to the active medium through a PN or PIN junction such as the active medium 450 illustrated in FIG. 5C. This constant excitation current will be biased at the level required to make the medium transparent when there is no excitation light beam interacting with the medium.

ii). General Operation of the Device

An exemplary operation of the device can be illustrated via the results of computer simulations as shown in FIGS.

6C-1, 6C-2, 6C-3, and 6C-4 for operation at 1500 nm wavelength range. For this simulation, the active medium 420 is assumed to have a full-excitation gain coefficient of about 1 per μm, and $l_C$ is 15 μm. FIGS. 6C-1, 6C-2, and 6C-3 show the spatial distribution of the electric field strength for the light input at $\lambda_1$ 518 after propagating into waveguides A and B. The upper parts of FIGS. 6C-1, 6C-2, 6-C3 are 2-D plots for which the brightness shows the relative field strength, and the lower parts of FIGS. 6C-1, 6C-2, 6C-3 are 3-D plots for which the heights show the relative field strength. FIG. 6C-4 shows the relative powers at the output ports of waveguide A (port ASout1) and waveguide B (BPout1) as a function of –gL (negative of the product between the gain coefficient g and the medium length L). In the figure, the output at ASout1 is shown as dashed line, the output at BPout1 is shown as dotted line, and the solid line is the sum of the outputs at ASout1 and Bpout1 (i.e. the dashed line plus the dotted line).

Figure 3:
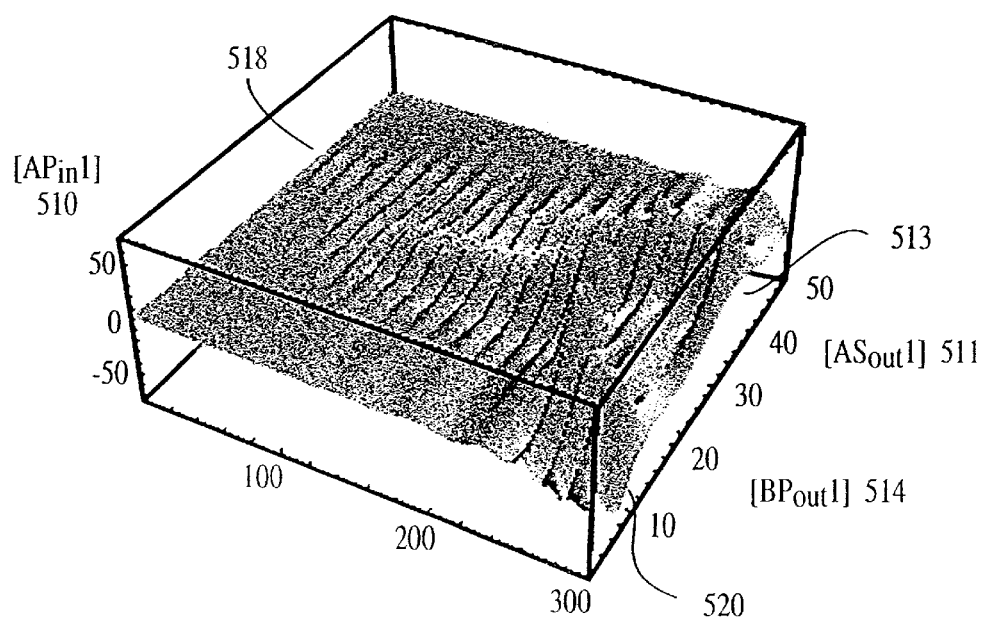

FIG. 6C-1 shows the situation when the gain medium is in the state of loss or transparency (at a gain coefficient of 0 per μm or gL=0). From FIG. 6C-1, it is evident that most of the energy of $\lambda_1$ 518 exits from the Waveguide B 504 at the port BPout1 514. FIG. 6C-2 shows the situation when the medium is excited to the critical gain value (at a gain coefficient of about 0.4 per μm or a gL=3.0) by the pulsed light $\lambda_2$ 572. From FIG. 6C-2 it is evident that approximately an equal amount of energy of $\lambda_1$ exits from Waveguide A and Waveguide B and the energy exiting waveguide B is not substantially affected (it increased by at most a factor of two). FIG. 6C-3 shows the situation when the medium is excited above the critical gain value (at a gain coefficient of about 1 per μm or a gL=7.5) for which the energy exiting waveguides A and B are increased substantially from their values of FIG. 6C-1. From FIG. 6C-4, we see that a good operating point is at just above the critical value for which the energy exiting waveguide A is much more than the energy exiting waveguide B, which means the gain medium is transferring most of its energy to output ASout1 at waveguide A, thereby achieving high energy conversion efficiency.

We note that FIG. 6C-1 and FIG. 6C-2 in particular, show the two representative interference flux patterns of light for the device, which is dependent on the state of the active medium. One can switch between these two representative interference flux patterns of light by changing the state of the active medium through the action of another light beam.

iii). Comments

We note that choosing an interaction length l not equal to $l_C$ will result in some light energy at $\lambda_1$ propagating to port ASout1 511 even when the medium is in a state of transparency and hence less light energy at $\lambda_1$ transferring to port BPout1 514. In this case, when the medium goes to the state of gain, additional light energy at $\lambda_1$ will still be channeled to port ASout1 511 along waveguide A. Hence, other than the initial leakage of light energy at $\lambda_1$ to port ASout1 511, the general operation of the device remains unchanged from the case where l=$l_C$. This initial leakage of light may be useful in photonic circuits based on non-return-to-zero pulse operation for which it is desired that light energy not be returned to the zero value even at the low signal state.

It should be understood that in the typical operation of Phosistors, including the useful embodiments 500, 550, one or more light inputs or outputs are described as continuous wave (CW) light. The light can otherwise be a pulsed light in some specific applications. For the purpose of illustration and not limitation it is taken as CW light.

The pulsed light at $\lambda_2$ 522 entering the port ASin2 516 will excite the active medium 508, providing gain at the operating wavelength $\lambda_1$ to the active medium 508 located in Waveguide A 502.

It should be understood that the pulsed light at $\lambda_2$ 522, 572 can be input to the active medium 508 on Waveguide A 502 in any manner of implementation, in addition to using the input structures 506 and 556 described in FIGS. 6A and 6B. For example, it can impinge on the active medium from outside the waveguides (e.g. from the top at a direction perpendicular to waveguide A).

Since the active medium 508 of devices 500, 550 of FIGS. 6A and 6B is operated in the gain mode, this phosistor has a "gain gate". This gate is in the input arm (Waveguide A 502).

If the medium is originally in the state of transparency, then the number of electrons excited in the active medium 508 would be approximately equal to the number of photons from the pulsed light at $\lambda_2$ absorbed by the medium 508. Likewise, the number of photons generated at $\lambda_1$ and propagated toward the output port(s) of Waveguide A 502 would be approximately equal to the number of electrons excited, if the photons are generated at $\lambda_1$ before the free decay of the electrons which takes place at nanosecond time scale (for semiconductor medium). As a result, the number of photons out at $\lambda_1$ would be close to (i.e. correlated to) the number of photons in at $\lambda_2$ if the medium 508 fully absorbed the photons at $\lambda_2$. This is called quantum-number correlation. When this happens, the devices 500, 550 can be used as high or near unity quantum efficiency devices. The net action of the exemplary devices 500, 550 is to translate a beam of photons to a longer wavelength. Hence, this device can act as a quantum-number correlated wavelength up shifter, for example. Further, this device is non-reversible in that a pulse light of wavelength at $\lambda_1$ propagated backward into the output port ASout1*b* 524 will not generate a pulsed light at $\lambda_2$ 522 exiting the port ASin2 516. Hence, this device may act as an optical diode.

iv). MMI Configuration Device

As mentioned above, this device may be implemented in the form of a multimode interference (MMI) configuration device, device M500, as shown in FIG. 6D, which preferably includes a multimode interference (MMI) Waveguide MMI M5024, in place of the directional coupler formed by waveguide A and B. The multimode interference MMI Waveguide M5024 preferably includes a first arm or pathway (along the line joining A and A' in the Figure) in place of waveguide A and a second arm or pathway (along the line joining B and B' in the figure) in place of waveguide B. The MMI Waveguide M5024 preferably includes an active medium, which is illustrated as a shaded region M508 in FIG. 6D along its first arm. It should be understood that the device M500 is otherwise functionally and operationally identical to the device 500 and descriptions and comments relating to the device 500 are applicable to device M500 (except with Figure labels now carrying prefix M). The exemplary specific physical dimensions are given below. The similarity between the operation of the MMI device and the coupler device may be illustrated by the field pattern shown in FIG. 6E-1, which describe the same situation as FIG. 6C-1 and the field pattern shown in FIG. 6E-2, which describe the same situation as FIG. 6C-2. In the case of FIG. 6E simulation, the preferred and exemplary device dimensions (as indicated in FIG. 6D) are chosen as follows: l is taken to be 4.3 Microns, W is 1.2 microns, Wg is 0.405 microns, and L is 2.15 microns.

v). Resonator Configuration Device

As mentioned above, this device may be implemented in the form of a resonator configuration device, device R500, as shown in FIG. 6F-1, which preferably includes waveguide A R502 coupled to a short waveguide B' R515, which is part of an optical resonator R517 formed by a closed-loop waveguide. These waveguides are the same as waveguide A in that they are preferably made up of high refractive index materials to enable waveguiding. The closed loop resonator R517 is coupled also to another waveguide B R504. The coupling of light energy between the resonator and waveguide A and waveguide B can be achieved, for example, through a gap filled with lower refractive index materials (lower than the refractive index of the waveguide) as indicated by the gap separation Wg1 and Wg2 in the FIG. 6F-1. The resonator can be in the form of a ring having a certain waveguide core thickness t (see FIG. 6F-5), disk having a certain waveguide core thickness t (see FIG. 6F-6), or sphere having a certain diameter d (see FIG. 6F-7), or other geometrical deformation from that of a ring, disk, or sphere as long as the optical resonance effect is achieved. As is well known to those skilled in the art, the waveguide and resonator that are placed side by side to achieve wave-coupling do not have to be placed side by side in a horizontal manner (see FIG. 6F-6 illustrated for the exemplary case of a disk) but can be placed in a top-down vertical manner (see FIG. 6F-8 illustrated for the exemplary case of a disk) or any other manners with respect to the horizontal substrate. Note that the coupling can also be achieved with the use of MMI couplers for which no gap is needed and the coupling region is also filled with high refractive index materials.

Waveguide A R502 and resonator-waveguide B'-R-B (R515, R517, R504) are used in place of the directional coupler formed by waveguides A and B. The amount of light energy coupling from waveguide A to waveguide B' can be low, preferably in the range of a few percentage points (e.g. 5% achievable with an interaction length l of 1.5 to 2 microns for a 0.4 micron gap between waveguides A and B'). As is well known to those skilled in the art, at the resonant frequency the closed-loop resonator allows energy to build up to an intensity level that is much higher than the input light intensity in waveguide A (e.g. 20 times higher). Preferably, part of the light energy (e.g. 5%) in the resonator loop will exit back to waveguide A with a phase opposite from (and an intensity equal to) that of the light originally in waveguide A, thereby canceling the light energy in waveguide A after the coupling region (i.e. the region spanned by waveguide B'). Preferably, part of the light energy (e.g. 5%) in the resonator loop will exit to waveguide B R504, the net result of which is an effective total transfer of light energy from waveguide A R502 to waveguide B R504 through the closed-loop resonator. A clear advantage of the resonator configuration device is the shorter coupling length needed to achieve the same effect (in this case shorter by a factor of 10 for 5% coupling). A disadvantage is the narrow wavelength operating range, which requires the operating wavelength to be at or around the resonance frequency of the resonator.

The Waveguide A R502 preferably includes an active medium R508 preferably just after the intersection point of waveguide A with the resonator, which is illustrated as a gray region in FIG. 6F-1. It should be understood that the device R500 is otherwise generally functionally and operationally identical to the device 500 and descriptions and comments relating to the device 500 are generally applicable to device R500 (except with figure labels now carrying prefix R).

The resonator can also be in other form such as multiple closed-loop resonators as shown by device RM500 in FIG. 6F-2, which shows an example of three closed-loop resonators RM517, RM519, RM521, made up of high refractive index materials similar to those used in waveguide A. The resonator can be in the form of a disk (RD517, RD519) or a box (RD521) or spherical (not shown) shaped resonators as shown by device RD500 in FIG. 6F-3. For these resonators, preferably the center parts of the closed-loops are solid and either whispering-gallery modes or modes formed by repeated reflection from the resonator side walls are utilized to achieve optical resonances. The coupling to the resonators can be through a gap of low refractive index or a small joint in the form of an MMI coupler as illustrated by device RMG500 in FIG. 6F-4. In this device RMG500, three of the coupling regions (Wc1, Wc2 and Wc4) are such MMI couplers. It should be understood that the devices RM500, RD500, RMG500 are otherwise generally functionally and operationally identical to the device 500 and descriptions and comments relating to the device 500 are generally applicable to the devices RM500, RD500, and RMG500 (except with Figure labels now carrying prefixes RM, RD, and RMG, respectively).

vi). PBG Implementation of the Coupler/MMI/Resonator Configuration Device

As mentioned above, the optical waveguide in either the directional coupler configuration or the MMI configuration or the resonator configuration may be implemented in the form of a photonic bandgap (PBG) structure. For the case of the directional coupler configuration, the PBG structure is shown by exemplary device PC500 in FIG. 6G-1. The photonic-bandgap structure preferably includes a photonic bandgap waveguide A PC502 and a photonic bandgap waveguide B PC504. The photonic bandgap PBG Waveguide A or B preferably includes a series of periodically placed holes defined within low-refractive index materials outside the waveguiding region and high-refractive index materials within the waveguiding region of the structure. As is known to those skilled in the art, these series of holes form a forbidden wavelength gap for the propagation of electromagnetic field, resulting in light confining in the region identified as the photonic bandgap structure. For example, for a refractive index contrast of n=3.8 (Black region) to n=1 (white region), the vertical distance between center of the hole to center of the hole can be 0.527 microns, the horizontal distance between the center of the hole to center of the hole can be 0.608 microns, the diameter of the holes can be 0.4 microns, which will provide a photonic bandgap at about a 1.5 $\mu$m (or 1500 nm) wavelength. The interaction length l is chosen to achieve maximal energy coupling. The photonic bandgap waveguide A PC502 preferably includes an active medium, which is illustrated as a shaded region PC508 in FIG. 6G-1. Photonic bandgap waveguide A PC502 or waveguide B PC504 in device PC500 functions as waveguide A 502 or waveguide B 504 in device 500. It should be understood that the device PC500 is otherwise functionally and operationally identical to the device 500 and descriptions and comments relating to the device 500 are generally applicable to device PC500 (except with figure labels now carrying prefix PC).

Figures 6, 6F, 7:
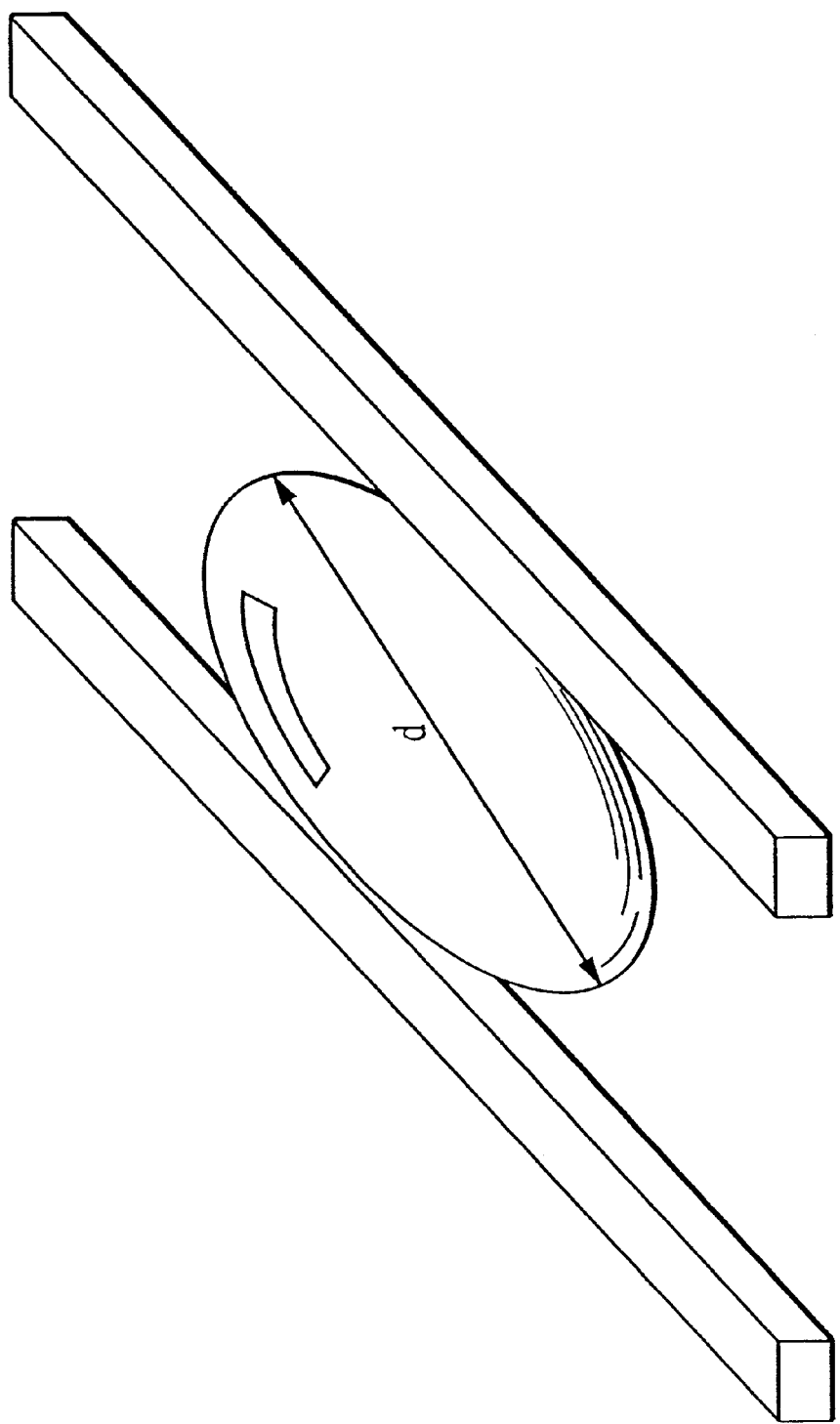
Figures 6, 6F, 7, 8:
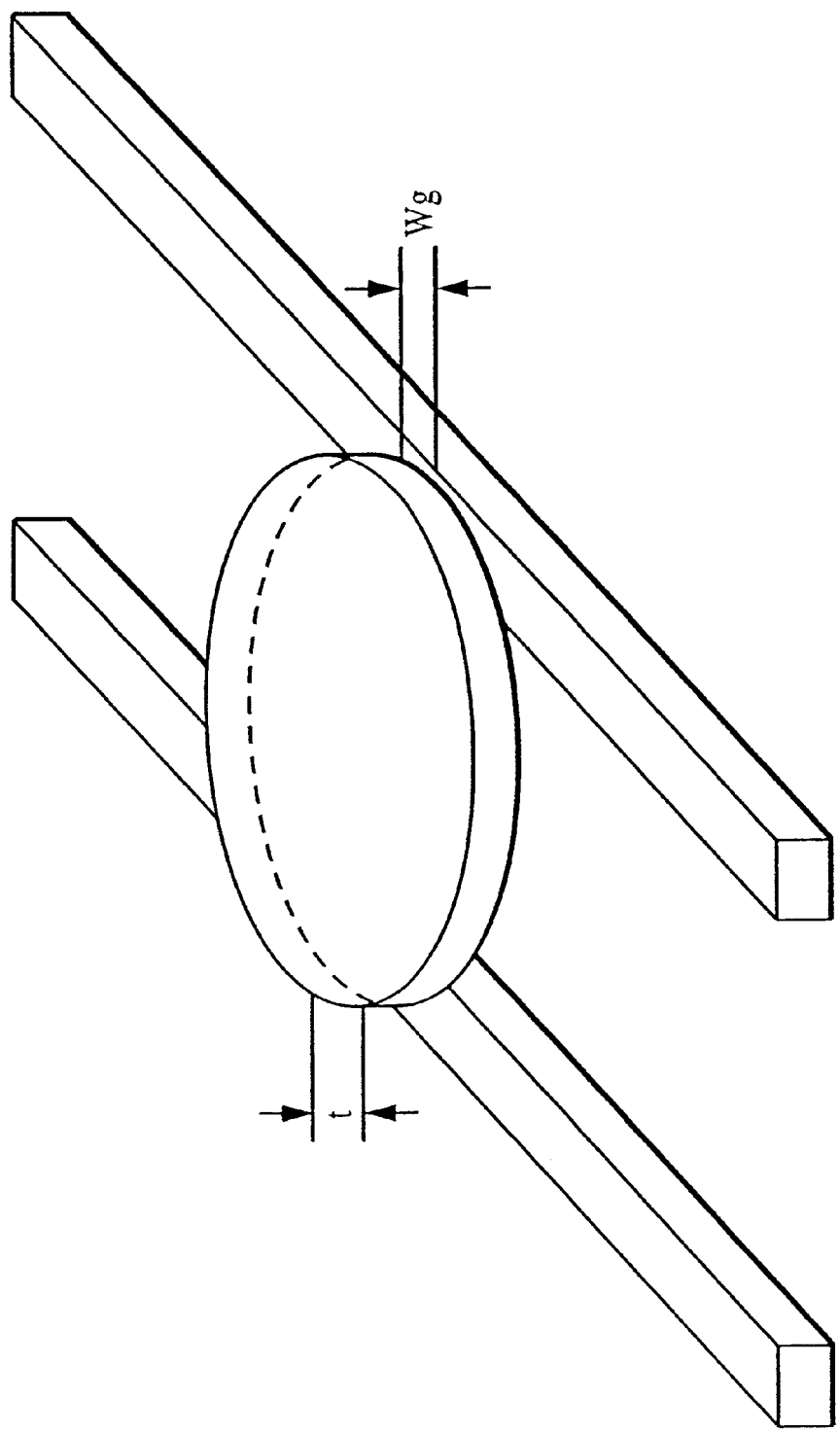
Figures 1, 6G:
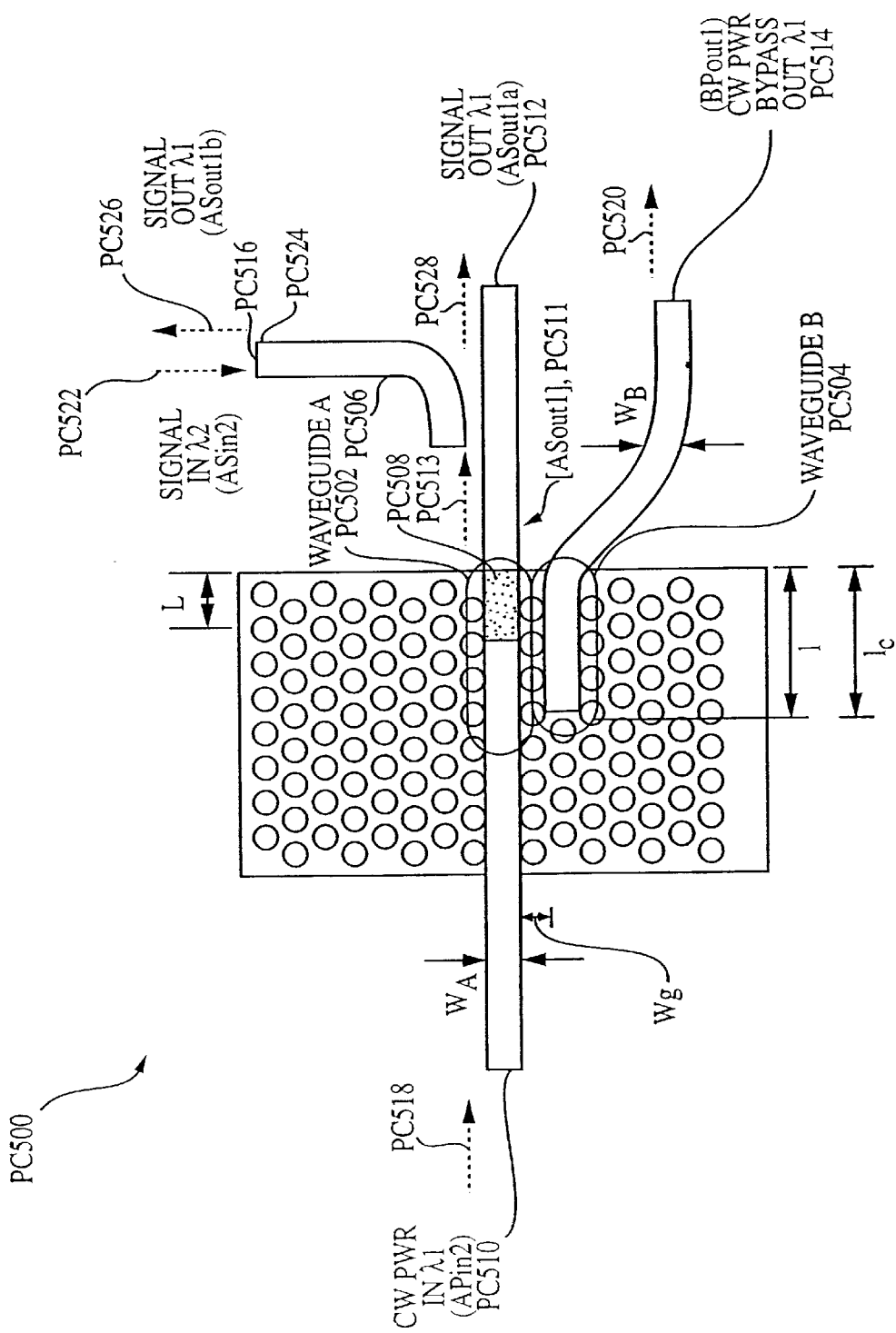
Figures 2, 6G:
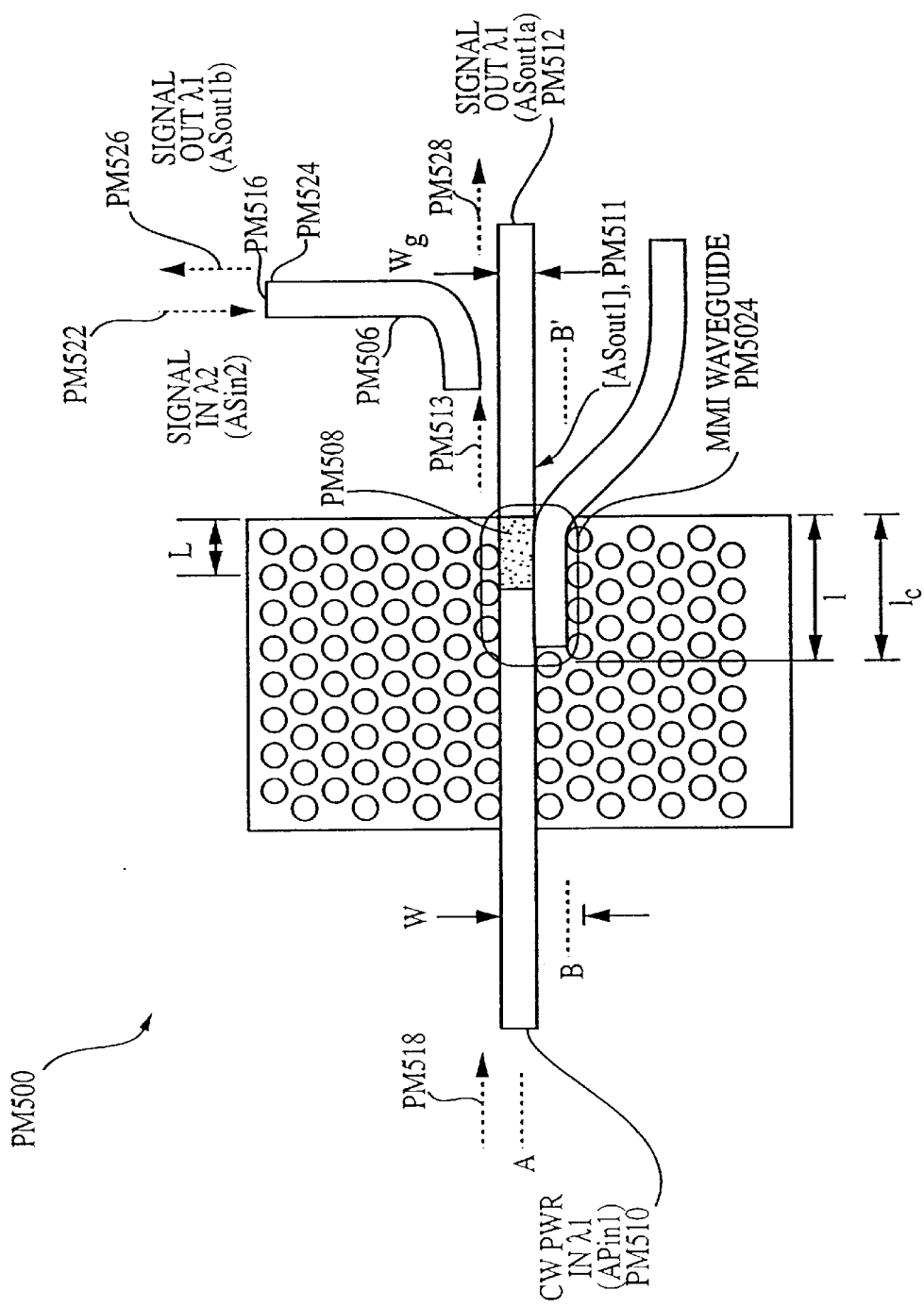
Figures 3, 6G:
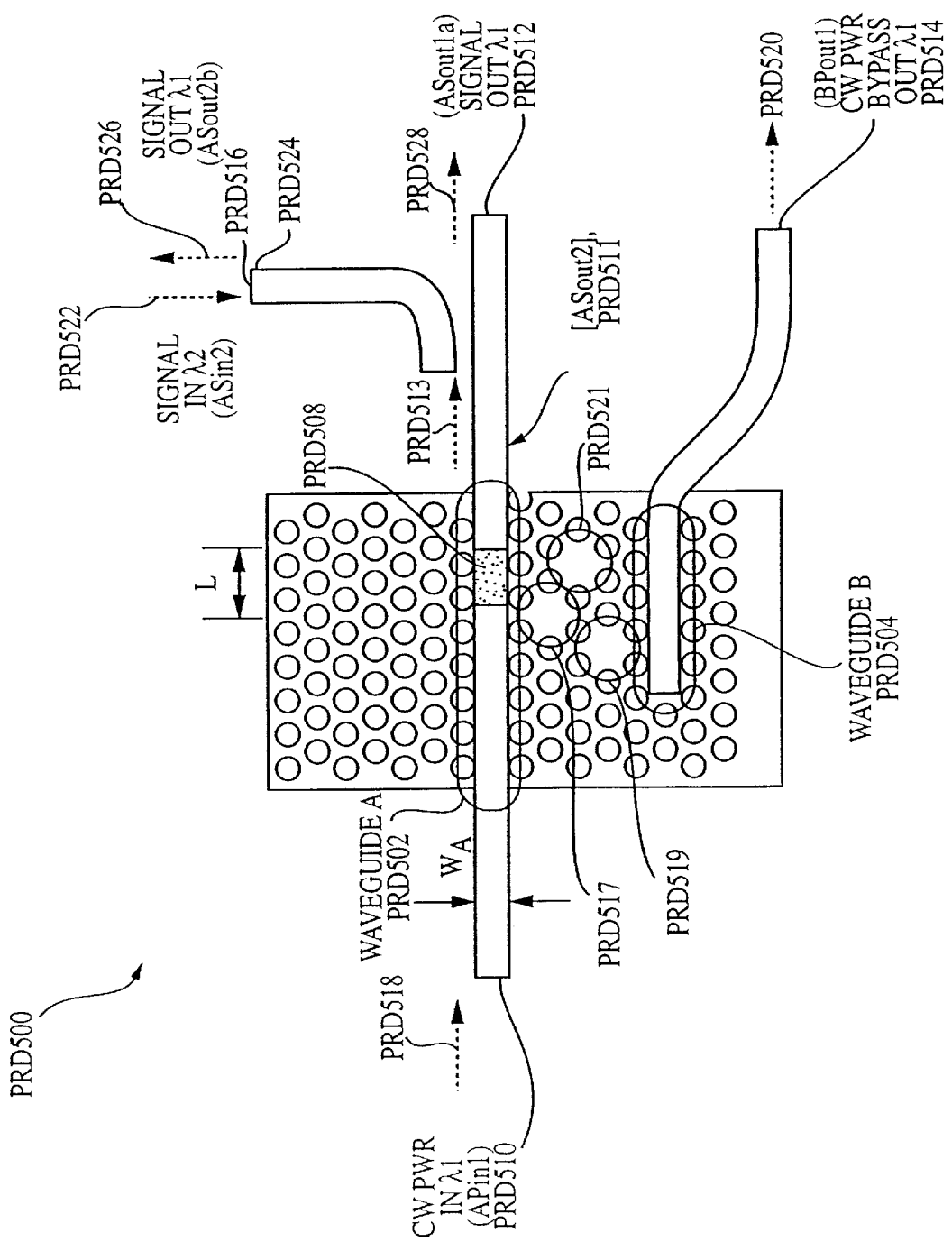

Similarly, the MMI configuration may be implemented in the form of a photonic bandgap structure as shown by device PM500 in FIG. 6G-2. It should be understood that the device PM500 is otherwise generally functionally and operationally identical to the device M500 and descriptions and comments relating to the device M500 are applicable to device PM500. Likewise, the resonator configuration may be implemented in the form of a photonic bandgap structure as shown by device PRD500 in FIG. 6G-3. As is well known to those skilled in the art, resonators can be formed with photonic-bandgap structures by removing a single hole (as is the case for FIG. 6G-3) or groups of holes (not shown). It should be understood that the device PRD500 is otherwise functionally and operationally identical to the device RD500 and descriptions and comments relating to the device RD500 are applicable to device PRD500 (except with figure labels now carrying prefix PRD).

It should be understood that the dimensions and materials for the devices are presented for purposes of illustrating useful embodiments of the devices M500, R500, RM500, RD500, RMG500, PC500, PM500, PRD500 and are not intended to limit other exemplary embodiments of any exemplary device, or the devices M500, R500, RM500, RD500, RMG500, PC500, PM500, PRD500. A variety of dimensions and sizes can be used, depending on the application desired as well as the fabrication materials, processes or technologies that are employed. A variety of materials can be used, for example, the waveguides do not have to be semiconductor and may be optical fibers, glass, or polymer waveguides (as long as the requisite waveguiding or wave-coupling effect is achieved). Furthermore, the active medium does not have to be a semiconductor or quantum well but can be erbium ions doped in glass or active polymers (as long as the requisite gain/loss/transparency properties are achieved), and the resonators do not have to be semiconductor material but can be glass or polymers (as long as the requisite resonance effect is achieved). Also, it should be understood that the shape of the Waveguides, MMI Structures, Photonic Bandgap Structures, or Resonators do not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

Finally, it should be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the implementations of these devices include situations whereby both the gain/transparency/loss property as well as the refractive-index property of the active medium are used during operation of the devices.

B. Exemplary Device 2

FIG. 7 illustrates a second general embodiment 600 of a phosistor device employing directionally coupled waveguides. The device can perform as a switching element and can in particular switch or convert a stream of slow or ultra fast (picosecond, femtosecond) optical pulses at low energy and long wavelength to a stream of slow or ultrafast optical pulses at comparatively high energy (and comparatively short wavelength). The device 600 is not limited to use as a switching element and can be utilized, for example, as an all-optical logic gate, a light intensity amplifier, a photon duplicator, a light intensity modulator, a light intensity regulator, an optical phase shifter, a lossless signal tap, an optical detector, and a variable optical attenuator. It should be understood that these exemplary applications of device 600 are intended to illustrate the wide range of uses for device 600, and are not intended to limit the applications of other exemplary embodiments of device 600 to these examples. The device can be referred to as an "Output-Arm-Loss-Gate Low-to-High-Energy Inversion Phosistor" (OLLH Phosistor 600).

OLLH Phosistor 600 preferably includes a first pathway of light consisting of the spatial region occupied by Waveguide A 602 and a second pathway of light consisting of the spatial region occupied by Waveguide B 604. The Waveguide B 604 preferably includes an active medium 608. As described above, Waveguide B 604 can be implemented as waveguide 430 with active medium 420 and Waveguide A 602 can be implemented as waveguide 400 in a useful embodiment. The Waveguide A 602 preferably includes an input port APin2 610 and an output port ASout2 612. The Waveguide B 604 preferably includes an input port BSin1 606 and an output port BPout2 614 which doubles as a possible input port (not shown in FIG. 7). FIG. 7 shows that Waveguide A 602 has width $W_A$ and is located at an approximately parallel distance (coupling gap or distance) $W_g$ from Waveguide B 604, which has width $W_B$, so that a wave in Waveguide A can be coupled to a wave in Waveguide B. The terms "wave" and "light beam" are used interchangeably.

For the input port labeled "APin2" (610), "P" stands for Power-Supply beam, "A" refers to Waveguide A 602, "in" refers to 610 being an input port, and "2" refers to the input wavelength being $\lambda_2$. For the output port labeled "ASout2" (612), "S" stands for Signal beam, "A" refers to Waveguide A 602, "out" refers to it being an input port, "2" refers to the input wavelength being $\lambda_2$. For the input port labeled "BSin1" (606), "S" stands for Signal beam, "B" refers to Waveguide B 604, "in" refers to 606 being an input port, and "1" refers to the input wavelength being $\lambda_1$. For the output port labeled "BPout2" (614), "P" stands for Power-Supply beam, "B" refers to Waveguide B 604, "out" refers to it being an output port, and "2" refers to the output wavelength being $\lambda_2$.

The input port APin2 610 on the waveguide A is configured to receive continuous wave (CW) light 618 having wavelength $\lambda_2$ (at $\lambda_2$) (CW PWR IN $\lambda_2$). Under certain conditions described below when the active medium on the waveguide reaches transparency and Waveguides A and B are optically transparent, most of the CW light at $\lambda_2$ 618 propagating along the Waveguide A 602 will be transferred to Waveguide B 604 after a coupling length $l_C$. The CW light at $\lambda_2$ 618 then exits from Waveguide B 604 at the port BPout2 614 as light at $\lambda_2$ (NEG SIG OUT $\lambda_2$) 620.

The coupling length is defined as the length at which a wave in one waveguide maximally couples into another waveguide that is coupled to the first waveguide. In this device 600, the interaction length l, defined as the length of interaction between Waveguides A 602 and B 604, is equal to the full coupling length $l_C$ so that $l=l_C$.

As shown in FIG. 7, the length L of the active medium 608 is about the interaction length l (L≅l). The length L of the active medium 608 may be somewhat longer or shorter than l. Varying the length L of the active medium 608 relative to the interaction length l will vary the input to output signal conversion efficiency but will otherwise not affect the general operating principle of the device.

It should be understood that the above dimensions, exemplary lengths, and geometry are presented for purposes of illustrating a useful embodiment of the device 600 and are not intended to limit other exemplary embodiments of any exemplary device, or the device 600. A variety of dimensions, sizes, and geometry can be used, depending on the application desired as well as the fabrication materials, processes or technologies that are employed.

For example, while the choice of $l=l_C$ is illustrated in this exemplary device, the interaction length may vary from the coupling length $l_C$ (or multiple odd numbers of $l_C$) without affecting the general operating principle of the device.

Also, it should be understood that the shape of the waveguides do not generally have to be linear. Curved shapes and different waveguide dimensions may be utilized as long as they achieve the same functions such as waveguiding and wave-coupling. The active medium can be centered at an alternative location along waveguide B other than that illustrated in FIG. 7, and there can be more than one disconnected active medium areas along waveguide B. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same widths and dimensions as long as the desired effect of wave-coupling is achieved.

In an exemplary embodiment of device 600, for operation at 800 nm wavelength range, the wavelength $\lambda_1$ can be at 820 nm, $\lambda_2$ can be at 800 nm, and the Waveguide A 602 can be implemented as the Waveguide 400 illustrated in FIG. 5A and Waveguide B 604 can be implemented as Waveguide 430 with an active medium 420 illustrated in FIGS. 5B and 5C, in an $Al_xGa_{1-x}As$ embodiment for the waveguide core having alloy composition x at 0.3 giving a bandgap energy of around 690 nm. Thus the core material is transparent at the wavelength $\lambda_2$ of 800 nm. When the active medium is fully de-excited, the active medium absorbs light at both 800 nm and 820 nm wavelengths. The active medium is an essentially three-level medium described in FIGS. 4A–D for which electrons are free to relax from the upper-energy level corresponding to the 800 nm absorption to the upper-energy level corresponding to the 820 nm absorption.

In an exemplary embodiment of devices 600, for operation at 1500 nm wavelength range, the wavelength $\lambda_1$ can be at 1500 nm, $\lambda_2$ can be at 1480 nm, and the Waveguide A 602 can be implemented as the Waveguide 400 previously illustrated in FIG. 5A and Waveguide B 604 can be implemented as the Waveguide 430 with an active medium 420 illustrated in FIGS. 5B and 5C, in an $In_{1-x}Ga_xAs_{1-y}P_y$ embodiment for the waveguide core having alloy compositions x=0.16 and y=0.67 giving a bandgap energy of around 1100 nm. Thus the core material is transparent at the wavelength $\lambda_1$ of 1480 nm. When the active medium is fully de-excited, the active medium absorbs light at both 1480 nm and 1500 nm wavelengths. The active medium is an essentially three-level medium described previously in FIGS. 4A–D for which electrons are free to relax from the upper-energy level corresponding to the 1480 nm absorption to the upper-energy level corresponding to the 1500 nm absorption.

In an exemplary embodiment for operation at the 1500 nm wavelength range, the cross-sectional dimensions of the waveguide 400 are 0.4 μm wide by 0.25 μm thick. FIG. 7 illustrates that Waveguide A 602 has width $W_A$ and is located at an approximately parallel distance (coupling gap or distance) $W_g$ from Waveguide B 604, which has width $W_B$. In this exemplary embodiment, the Waveguide A 602 has width $W_A$ equal to 0.4 μm and is located at an approximately parallel distance $W_g$ from Waveguide B 604 of 0.4 μm, while Waveguide B 604 has width $W_B$ equal to 0.4 μm. In this exemplary embodiment, $l_C$ and l are each 15 μm.

It should be understood that the above dimensions, exemplary lengths, and geometry are presented for purposes of illustrating a useful embodiment of the device 600 and are not intended to limit other exemplary embodiments of any exemplary device, or the device 600. A variety of dimensions, sizes, and geometry can be used, depending on the application desired as well as the fabrication materials, processes or technologies that are employed.

i). Exemplary Device Operations

There are various modes for which this device may function. Below, we will describe three exemplary and useful operating modes of the device.

First Exemplary Operating Mode

In the first exemplary and useful operating mode of the device, continuous wave (CW) light having wavelength $\lambda_2$ (at $\lambda_2$) (CW PWR IN $\lambda_2$) 618 enters at the port APin2 610 on the Waveguide A 602. In the initial state, the active medium 608 along Waveguide B 604 is not excited and is in the state of loss analogous to Case A, as illustrated in FIG. 4A. The CW light at $\lambda_2$ 618 propagates along the Waveguide A 602 and some of its energy is leaked to Waveguide B 604 through evanescent coupling. As the portion of CW light at $\lambda_2$ 618 reaches the active medium 608 on Waveguide B, it drives the active medium 608 to a state of transparency at $\lambda_2$. The intensity of $\lambda_2$ must be high enough so that $I_2 > (1/\eta) I_{2Sat}$. That is, the intensity of the light at $\lambda_2$ must exceed the saturation intensity divided by η, the effective percentage of leakage power to the Waveguide B 604 needed to bring the active medium in waveguide B to the state of transparency when there is no pulsed light at $\lambda_1$ 622 entering the port BSin1 606 (i.e., an input off state). This state of the active medium 608 is analogous to Case D, as illustrated in FIG. 4D.

The input port BSin1 606 on Waveguide B 604 is the input signal port for pulsed light having wavelength $\lambda_1$ (SIGNAL IN $\lambda_1$) 622. The pulsed light $\lambda_1$ 622 entering the port BSin1 606 will de-excite or relax the active medium 608, providing loss at the operating wavelength $\lambda_2$ to the active medium 608 located in Waveguide B 604. This state of the active medium 608 is analogous to Case C, as illustrated in FIG. 4C. The CW light at $\lambda_2$ 618 from input port APin2 610 loses energy in the active medium 608, so that most of the CW light at $\lambda_2$ 618 does not transfer to Waveguide B 604 and thus does not exit from the output on BPout2 614. Rather, most of the CW light at $\lambda_2$ 618 propagates through Waveguide A 602 and exits out of the output port ASout2 612 as a pulse of light at $\lambda_2$ (SIGNAL OUT $\lambda_2$) 628 out of the first Waveguide A 602 and its energy exiting port BPout2 614 is substantially reduced when a pulse of light at $\lambda_1$ 622 is present.

When pulsed light at $\lambda_1$ 622 is removed, the active medium will be driven back to the transparency state at $\lambda_2$ (Case D in FIG. 4D) by the light at $\lambda_2$ 618 passing through the loss or absorbing medium 608, and most of CW light at $\lambda_2$ 618 will transfer to Waveguide B 604 and thus will again exit from the output on BPout2 614. The net effect in this first exemplary and useful operating mode of the device of FIG. 7 is that in the initial state, most of the CW light at $\lambda_2$ 618 from input port APin2 610 couples to Waveguide B 604 and exits out of output port BPout2 614 as CW $\lambda_2$ 620. The pulsed light at $\lambda_1$ 622 into port BSin1 606 generates a positively going pulse of light (light with an increased intensity during the pulse duration) at $\lambda_2$ 628 exiting port ASout2 612 and a negatively going pulse of light (light with a reduced intensity during the pulse duration) at $\lambda_2$ 620 exiting port BPout2 614. Upon cessation of the pulsed light at $\lambda_1$ 622, the light at $\lambda_2$ 628 returns to its initial state and most of the light at $\lambda_2$ 628 exits out of output port BPout2 614 as CW $\lambda_2$ 620.

Second Exemplary Operating Mode

In the second exemplary and useful operating mode of the device, the intensity of $\lambda_2$ 618 is lower than the intensity required to driving the active medium to the state of transparency at $\lambda_2$. In this case the CW light at $\lambda_2$ 618 will not be able to drive the medium back to transparency by itself after pulsed light at $\lambda_1$ 622 is removed. A separate third input light beam with a wavelength $\lambda_{tr}$ equal to or short than $\lambda_2$ is introduced to drive the active medium back to transparency. This third light beam $\lambda_{tr}$ 624 can be input through port BPout2 614 propagating towards the active medium 608. The intensity of this third light beam $I_{tr}$ should be high enough to bring the active medium to a state of transparency upon the removal of pulsed light at $\lambda_1$ 622. The third light beam $\lambda_{tr}$ 624 can be present in a pulsed manner such as after (or in alternation with) the input light beam $\lambda_1$ 622 or can be present as a CW beam. In the case where both light beams $\lambda_{tr}$ 624 and $\lambda_1$ 622 are concurrently present, it is desirable that the intensity $I_{tr}$ of light beam $\lambda_{tr}$ 624 not be so high as to prevent light beam $\lambda_1$ 622 from de-exciting the active medium. The net effect in this second exemplary and useful operating mode of the device of FIG. 7 is that in the initial state, most of the CW light at $\lambda_2$ 618 from input port APin2 610 couples to Waveguide B 604 and exits out of output port BPout2 614 as CW $\lambda_2$ 620. The pulsed light at $\lambda_1$ 622 into port BSin1 606 generates a positively going pulse of light (light with an increased intensity during the pulse duration) at $\lambda_2$ 628 exiting port ASout2 612 and a negatively going pulse of light (light with a reduced intensity during the pulse duration) at $\lambda_2$ 620 exiting port BPout2 614. In the case where light beam $\lambda_{tr}$ 624 is present in a CW manner, upon cessation of the pulsed light at $\lambda_1$ 622, the light at $\lambda_2$ 628 returns to its initial state and most of the light at $\lambda_2$ 628 exits out of output port BPout2 614 as CW $\lambda_2$ 620. In the case where light beam $\lambda_{tr}$ 624 is present in a pulsed manner, upon cessation of the pulsed light at $\lambda_1$ 622 and after a pulse of light beam $\lambda_{tr}$ 624 is introduced, the light at $\lambda_2$ 628 returns to its initial state and most of the light at $\lambda_2$ 628 exits out of output port BPout2 614 as CW $\lambda_2$ 620.

In order for light beams $\lambda_1$ 622 or $\lambda_{tr}$ 624 to interact with the active medium effectively, it may be desirable that they do not couple much of their energy from waveguide B to waveguide A, though such coupling will not affect the general operating principle of the device. This can be achieved for example by placing light beams $\lambda_1$ 622 or $\lambda_{tr}$ 624 in a polarization different from that of light beam $\lambda_2$ 618, and by having weak or negligible coupling between waveguides A and B for light beams $\lambda_1$ 622 or $\lambda_{tr}$ 624 but strong coupling for light beam $\lambda_2$ 618. That is by having waveguides A and B to be a polarization dependent coupler. Alternatively, the can be achieved by having waveguides A and B to be a mode selective coupler and by having light beams $\lambda_1$ 622 or $\lambda_{tr}$ 624 to be in a different propagating waveguide modes (e.g. to be in the first order propagating mode) from that of light beam $\lambda_2$ 618 (e.g. to be in the second order propagating mode).

Third Exemplary Operating Mode

In the third exemplary and useful operating mode of the device, the intensity of $\lambda_2$ 618 is lower than the intensity required to drive the active medium to the state of transparency at $\lambda_2$. In this case the CW light at $\lambda_2$ 618 will not be able to drive the medium back to transparency by itself after pulsed light at $\lambda_1$ 622 is removed. In this case an active medium with a PN or PIN junction, such as active medium 425 illustrated in 5D, is used in place of active medium 420 along waveguide B. A constant forward bias voltage and current is applied to medium 425 to drive the active medium back to transparency. This forward bias current should be high enough to bring the active medium to a state of transparency upon the removal of pulsed light at $\lambda_1$ 622. However, it is desirable that this forward bias current not be so high as to prevent light beam $\mu_1$ 622 from de-exciting the active medium. The state of the active medium is in the state of transparency analogous to Case C, as illustrated in FIG. 4C. The net effect in this third exemplary and useful operating mode of the device of FIG. 7 is that in the initial state, most of the CW light at $\lambda_2$ 618 from input port APin2 610 couples to Waveguide B 604 and exits out of output port BPout2 614 as CW $\lambda_2$ 620. The pulsed light at $\lambda_1$ 622 into port BSin1 606 generates a positively going pulse of light (light with an increased intensity during the pulse duration) at $\lambda_2$ 628 exiting port ASout2 612 and a negatively going pulse of light (light with a reduced intensity during the pulse duration) at $\lambda_2$ 620 exiting port BPout2 614. Upon cessation of the pulsed light at $\lambda_1$ 622, the light at $\lambda_2$ 628 returns to its initial state and most of it exits out of output port BPout2 614 as CW $\lambda_2$ 620.

ii). General Operation of the Device

Figure 7:
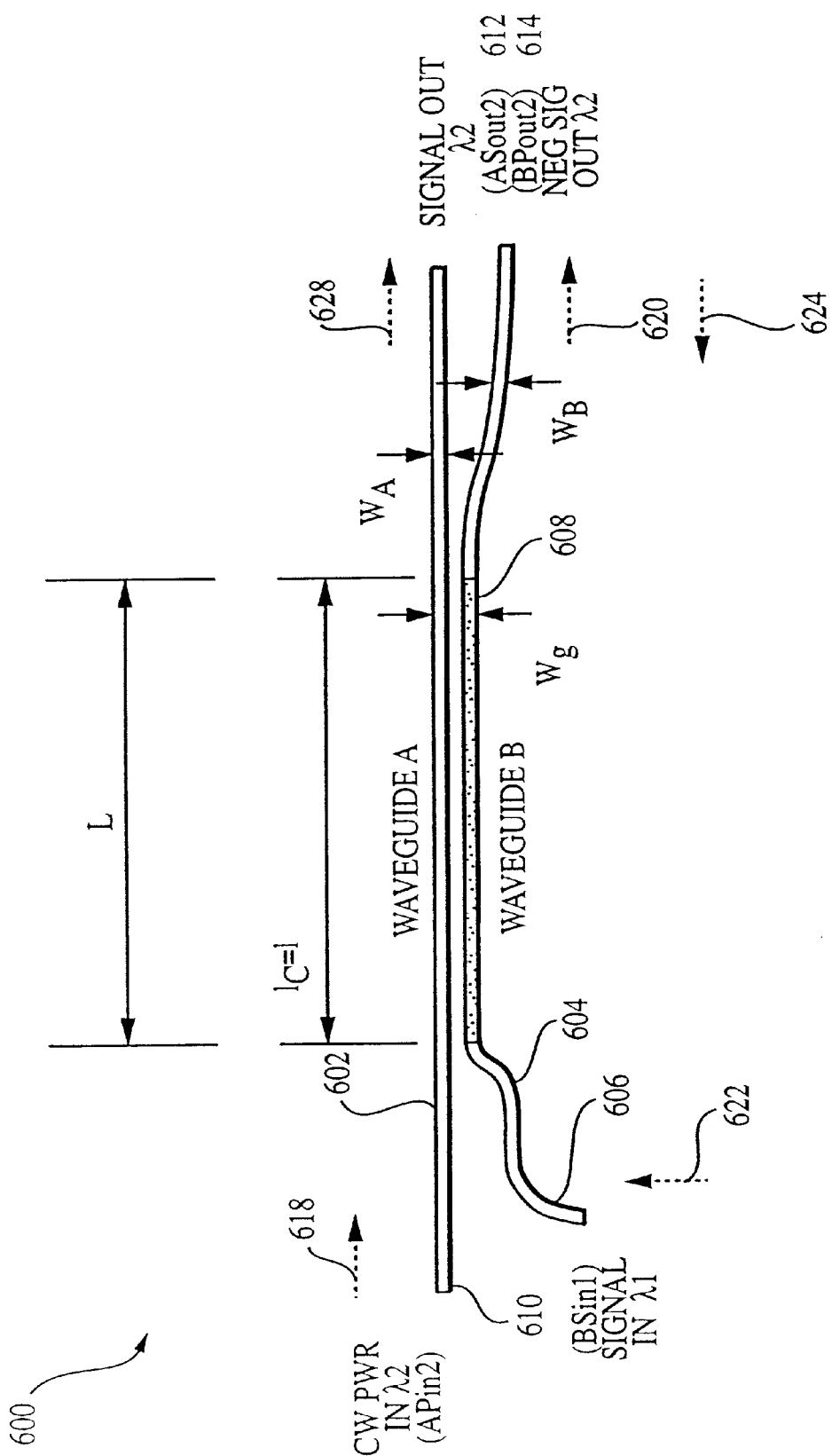
Figure 7A:
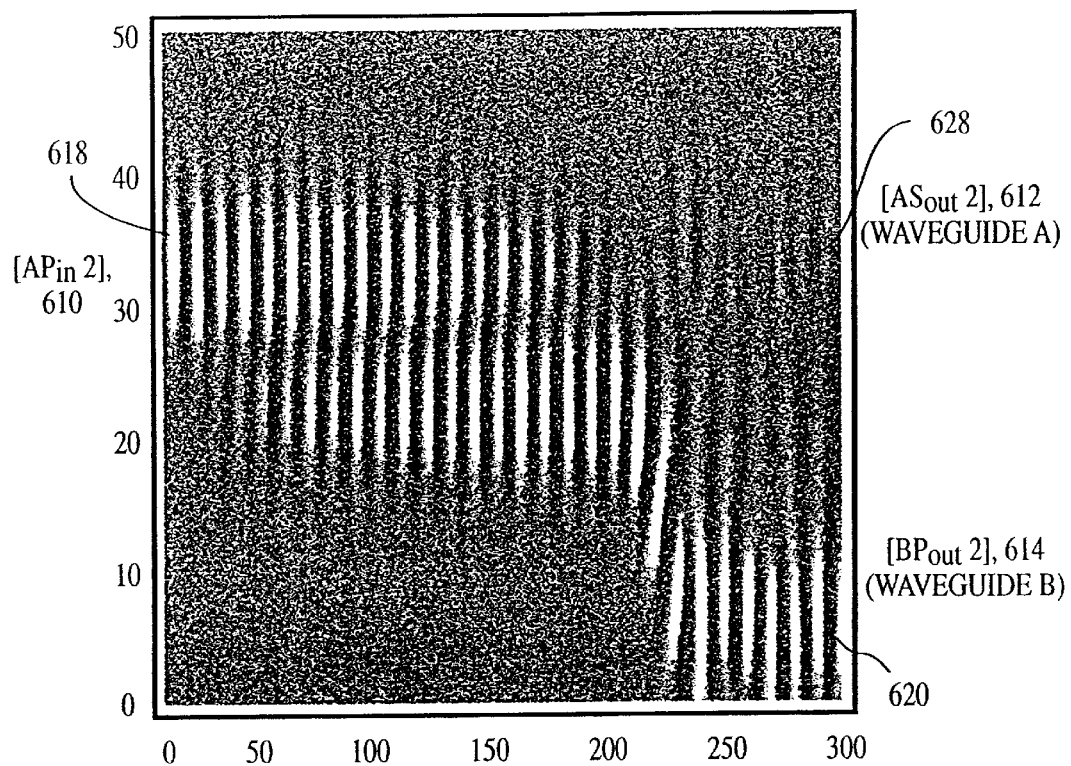
Figure 1:
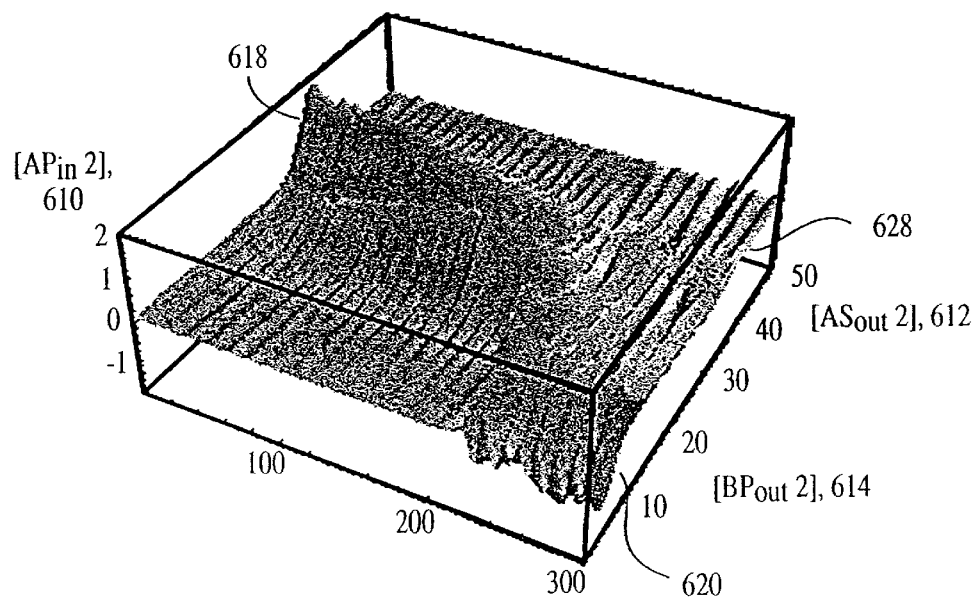
Figure 7A:
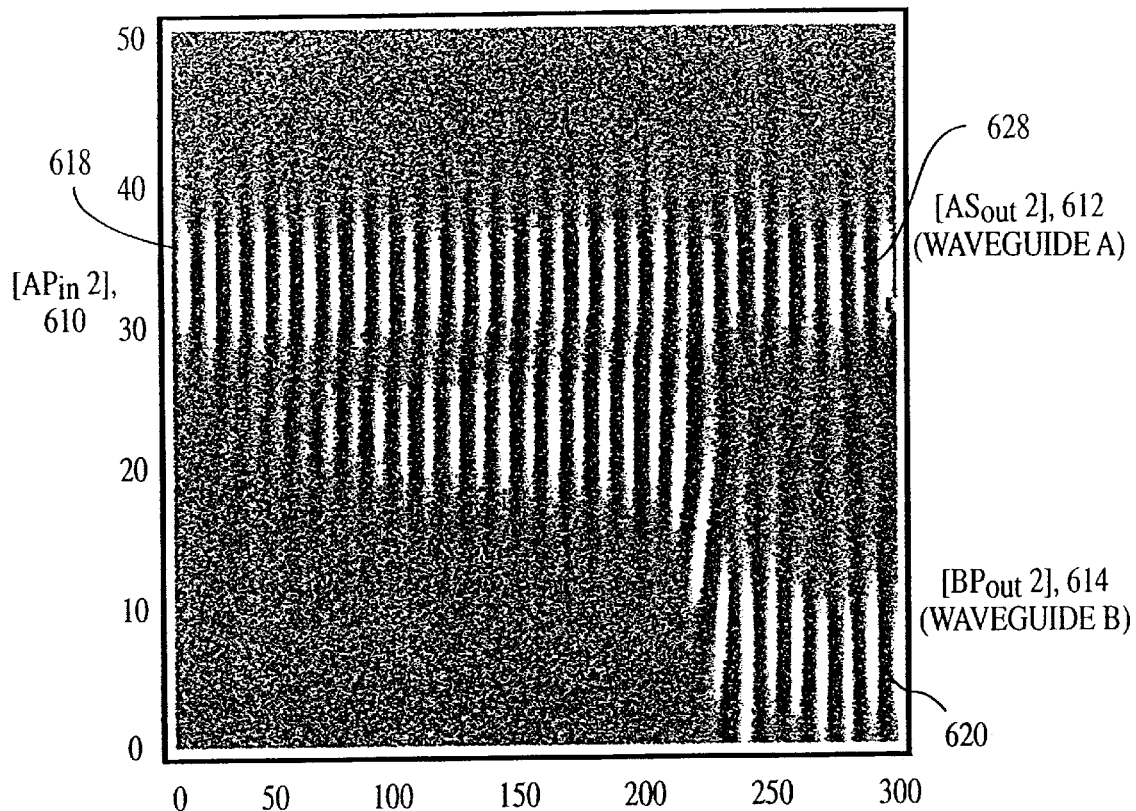
Figure 2:
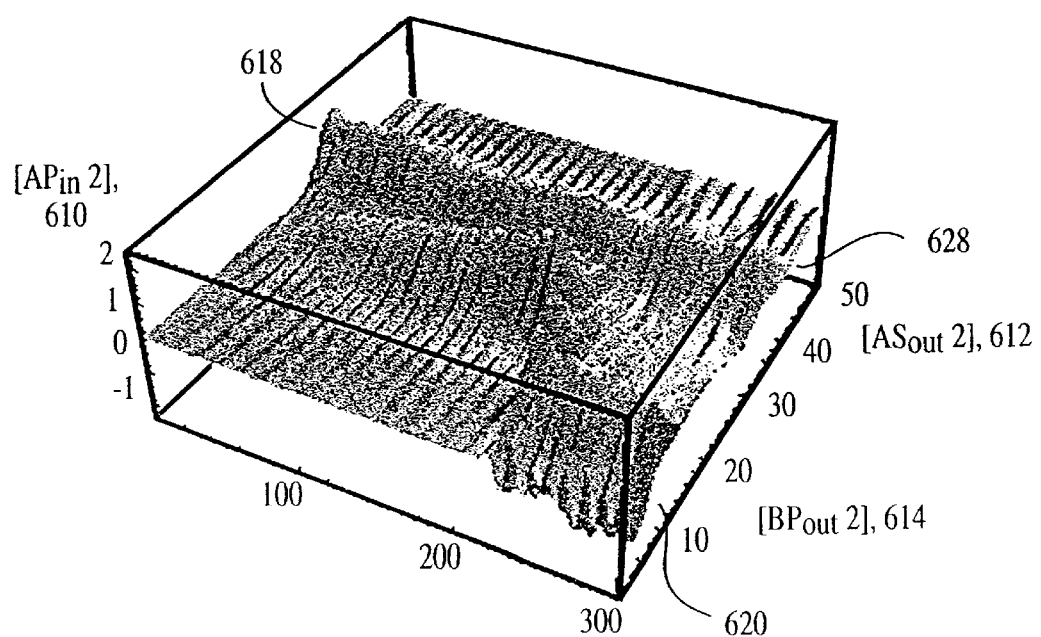
Figures 3, 7A:
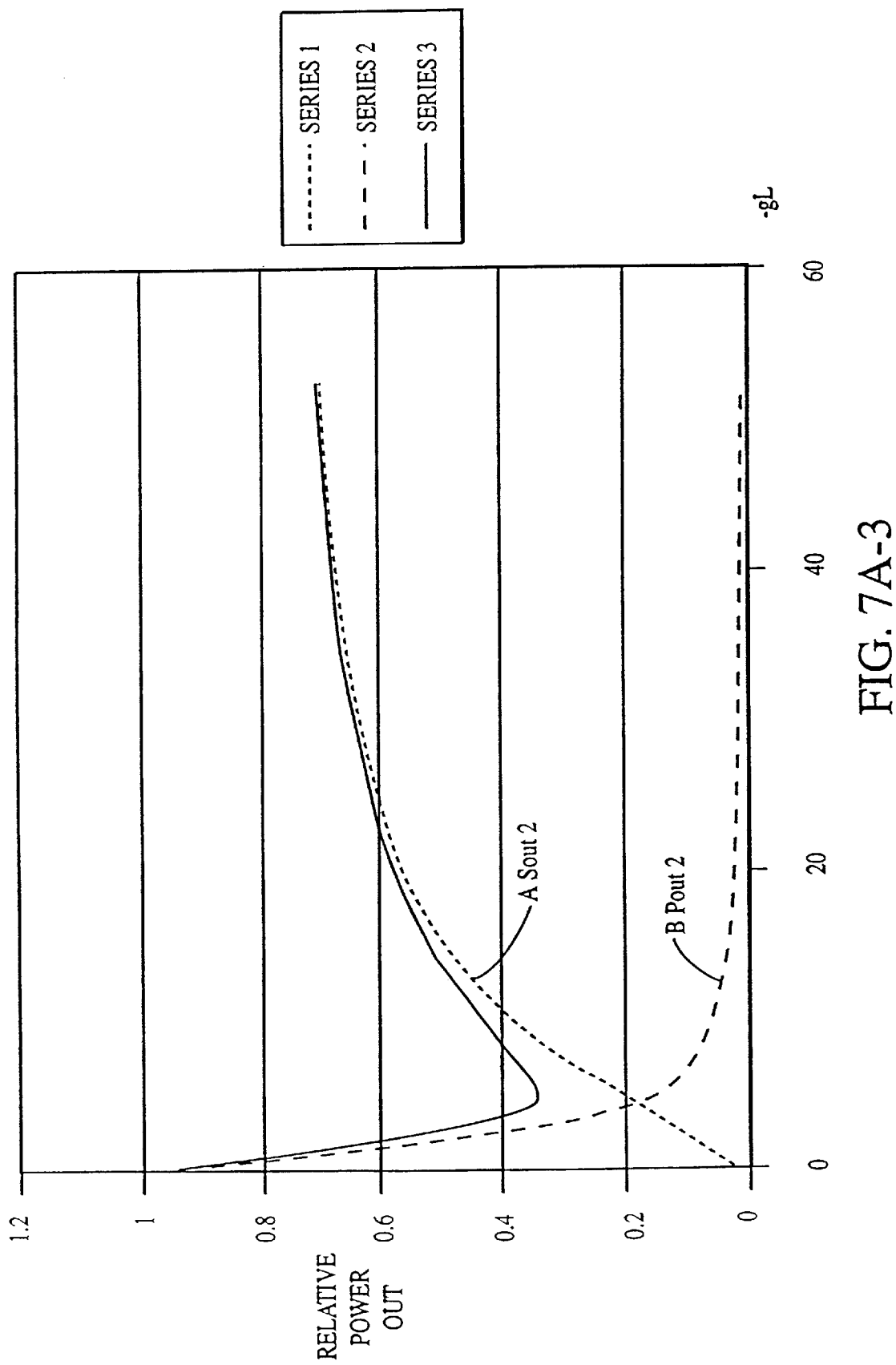
Figure 7A:
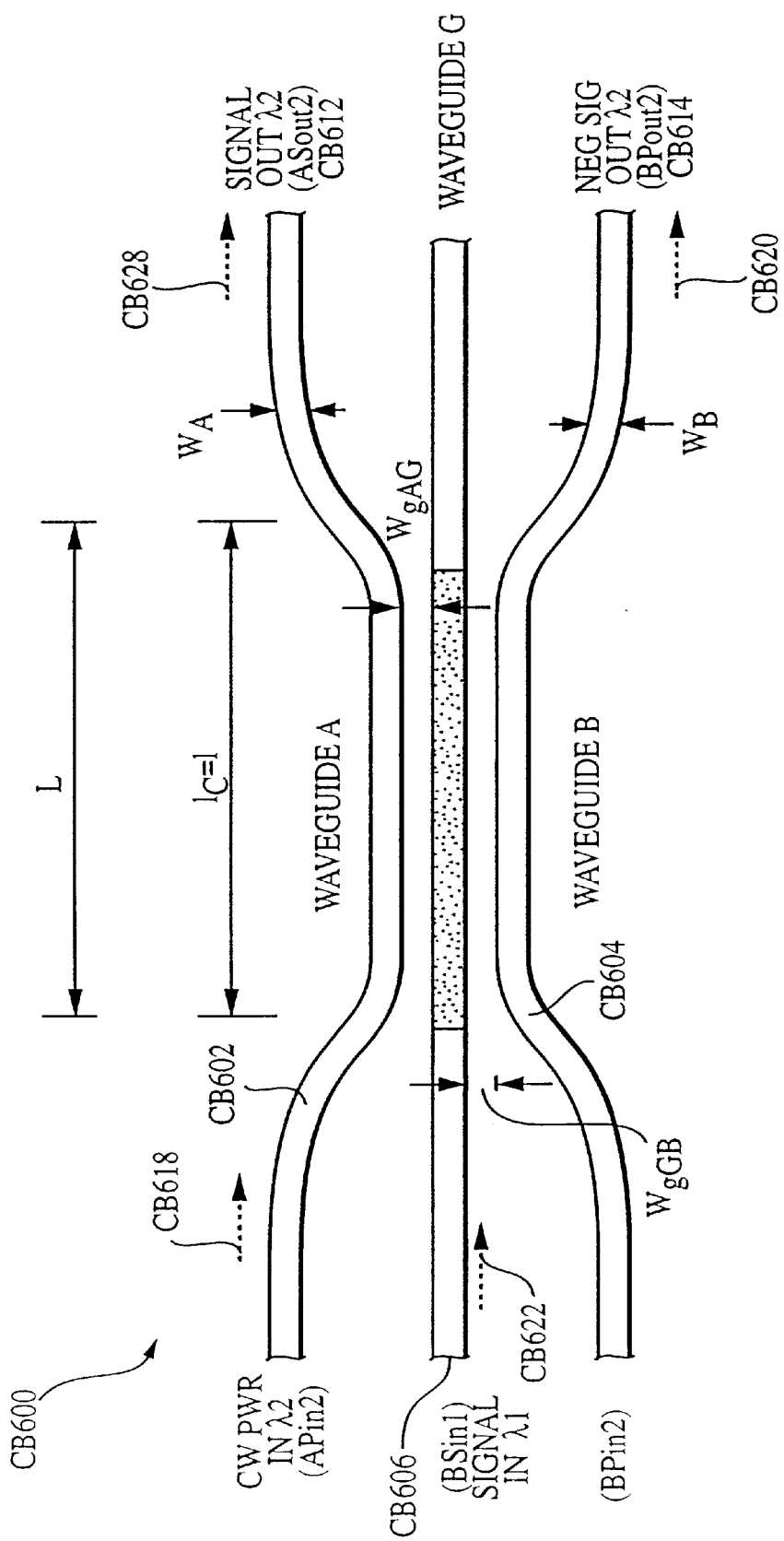

An exemplary operation of the device can be illustrated via the result of computer simulation as shown in FIGS. 7A-1, 7A-2, and 7A-3 for operation at the 1500 nm wavelength range. FIGS. 7A-1 and 7A-2 show the spatial distribution of the electric field strength for the light input at $\lambda_2$ 618 after propagating into waveguides A and B. The upper parts of FIGS. 7A-1 and 7A-2 are 2-D plots for which the brightness shows the relative field strength, and the lower parts of FIGS. 7A-1 and 7A-2 are 3-D plots for which the heights show the relative field strength. FIG. 7A-3 shows the relative power at the output ports of waveguide A (port ASout2 612) and waveguide B (port BPout2 614) as a function of –gL (the product of the loss coefficient –g and the medium length L). In the figure, the output at ASout2 is shown as dotted line, the output at BPout2 is shown as dashed line, and the solid line is the sum of the outputs at ASout2 and BPout2 (i.e. the dashed line plus the dotted line). FIG. 7A-1 shows the situation when the gain medium is in the state of transparency (at a loss coefficient of 0 per $\mu$m or –gL=0). From FIG. 7A-1, it is evident that most of the energy of $\lambda_2$ 618 exits from Waveguide B 604 at the port BPout2 614. FIG. 7A-2 shows the situation when the medium is de-excited to the state of loss at $\lambda_2$ by the pulsed light at $\lambda_1$ 622 (at a gain coefficient of about –3.3 per $\mu$m or –gL=50). From FIG. 7A-2, it is evident that most of the energy of $\lambda_2$ exits from Waveguide A. FIG. 7A-1 and FIG. 7A-2 show the two representative interference flux patterns of light for the device, which is dependent on the state of the active medium. In particular, one can switch between these two representative interference flux patterns of light by changing the state of the active medium through the action of another light beam. Note that beside these two states, there are other states, for example the intermediate state at –gL=6 shown in FIG. 7A-3, for which there is substantial total energy absorbed by the loss medium so that both output ports at waveguide A and waveguide B have low output power.

iii). Comments

In should be understood that in the typical operation of Phosistors, including the useful embodiment 600, one or more light inputs or outputs are described as continuous wave (CW) light. The light can otherwise be a pulsed light in some specific applications. For the purpose of illustration and not limitation it is taken as CW light.

The phosistor device 600 is capable of providing photon gain under certain operating condition. This is due to the fact that a light pulse at $\lambda_1$ can create an output pulse having an increased number of photons. This increase can be quite significant.

It should be understood that the speed of switching can be fast as the active medium 608, when in the loss state at $\lambda_2$ (Case C in FIG. 4C), will be driven back to the transparency state at $\lambda_2$ (Case D in FIG. 4D) rapidly by the light at $\lambda_2$ 618 passing through the loss or absorbing medium 608 when pulsed light at $\lambda_1$ 622 is removed. The state of the active medium 608 is again analogous to Case D, as illustrated in FIG. 4D.

It should be understood that the pulsed light at $\lambda_1$ 622 can be input to the active medium 608 on Waveguide B 604 in any manner of implementation. In particular, the pulsed light at $\lambda_1$ 622 can enter either input port BSin1 606 or output port BPout2 614 which doubles as a possible input port (not shown in FIG. 7). It can also impinge on the active medium from outside the waveguides (e.g. from the top at a direction perpendicular to waveguide B). The problem of any mixing of light that might occur can be addressed with use of a dichroic filter/coupler or polarization-selective coupler or mode-selective coupler (not shown).

Since the active medium 608 of device 600 of FIG. 7 is operated at the absorbing or loss mode, this phosistor has a "loss gate". This gate is in the output arm (Waveguide B 604).

iv). Exemplary Device 2 as a Wavelength Multiplexer/De-Multiplexer or Wavelength Selective Switch In another useful embodiment of device 2, the waveguide A and B have unequal widths $W_A$ and $W_B$. As is well known to those skilled in the art, waveguide couplers with unequal waveguide widths will have strong wavelength sensitivity. In particular, when the active medium is in the transparency state, only certain wavelength of light will couple maximally from waveguide A to waveguide B, thus allowing the device to act not only as a switch but as a wavelength selective switch. Except the difference in the waveguide widths providing wavelength sensitivity, this embodiment of the device is otherwise functionally and operationally identical to the device 600 and descriptions and comments relating to the device 600 are generally applicable to this device.

v). Multiple Waveguide Version of Device 2

As a variation of geometry, device 2 can be realized in the form of a multiple-waveguide device such as a three-waveguide structure. This device, device CB600, is shown in FIG. 7AA, where light beam in Waveguide A is first coupled to light beam in Waveguide G, which contains the active medium. Light beam in Waveguide G is then coupled to light beam in waveguide B. The waveguide widths of Waveguides A, B, and G can be identical or different from each others, as long as the required couplings of light beams are achieved. The input port for SIGNAL IN $\lambda_1$ (BSin1) is preferably connected to waveguide G so that the input pulse at $\lambda_1$ can reach the active medium as before. The interaction length l is chosen so that when the medium is in the state of transparency, preferably most of the energy in waveguide A will be coupled to waveguide B (through waveguide G). Let us denote this length as $l=l_C'$. It should be understood that the device CB600 is otherwise functionally and operationally identical to the device 600 and descriptions and comments relating to the device 600 are applicable to device CB600 (except with figure labels now carrying prefix CB). This three-waveguide structure can be generalized to more than three waveguides by inserting more parallel coupled waveguides between waveguide A and B.

This version of device 2 has an advantage in that the active medium is now on waveguide G, which makes it easier to introduce pulsed light at $\lambda_1$ to interact with the active medium. Furthermore, this is a symmetric structure so that port BPin2 functions like port APin2 and port BPout2 functions like port ASout2. Hence, when the medium is in the state of transparency, light at $\lambda_2$ input to port APin2 will exit port BPout2 and light at $\lambda_2$ input into port BPin2 will exit port ASout2 (this is referred to as a Cross state). When the medium is in the state of loss, light at $\lambda_2$ input to port APin2 will stay in waveguide A and exit port BSout2 and light at $\lambda_2$ input into port BPin2 will stay in waveguide B and exit port BPout2 (this is referred to as a Bar state). Such property allows one to realize a Cross-Bar Switch or a 2×2 optical switch. As is well known to those skilled in the art, a 2×2 optical switch can be cascaded to implement an N×M optical switch.

vi). MMI Configuration Device

Figure 7B:
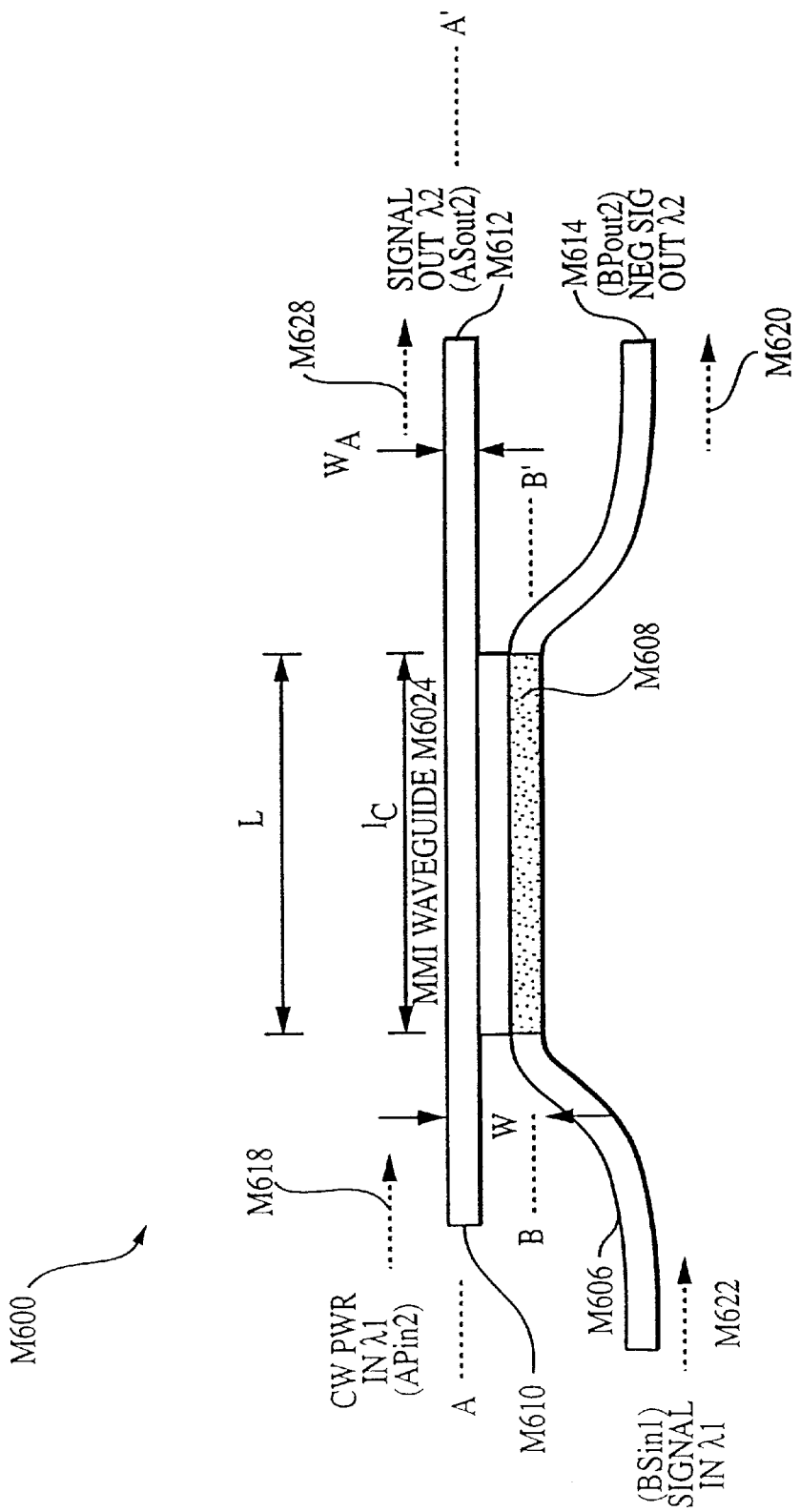
FIG. 7B illustrates an embodiment of the second exemplary phosistor device utilizing a multi-mode interference configuration.
Figure 7C:
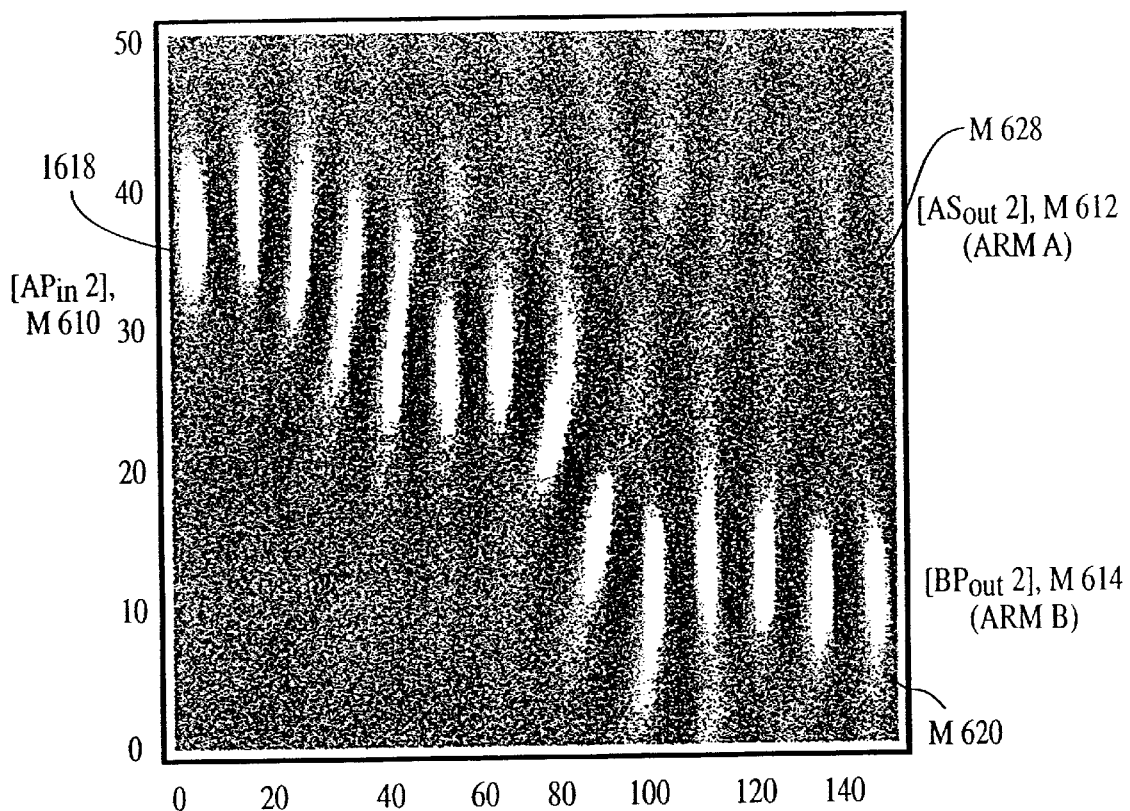
Figure 1:
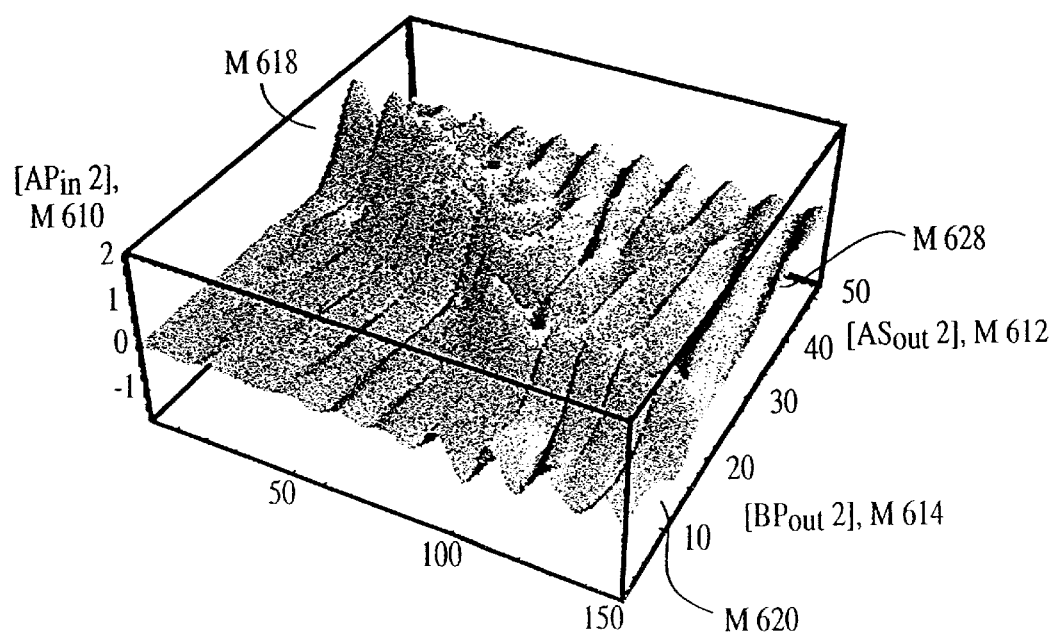
Figure 7C:
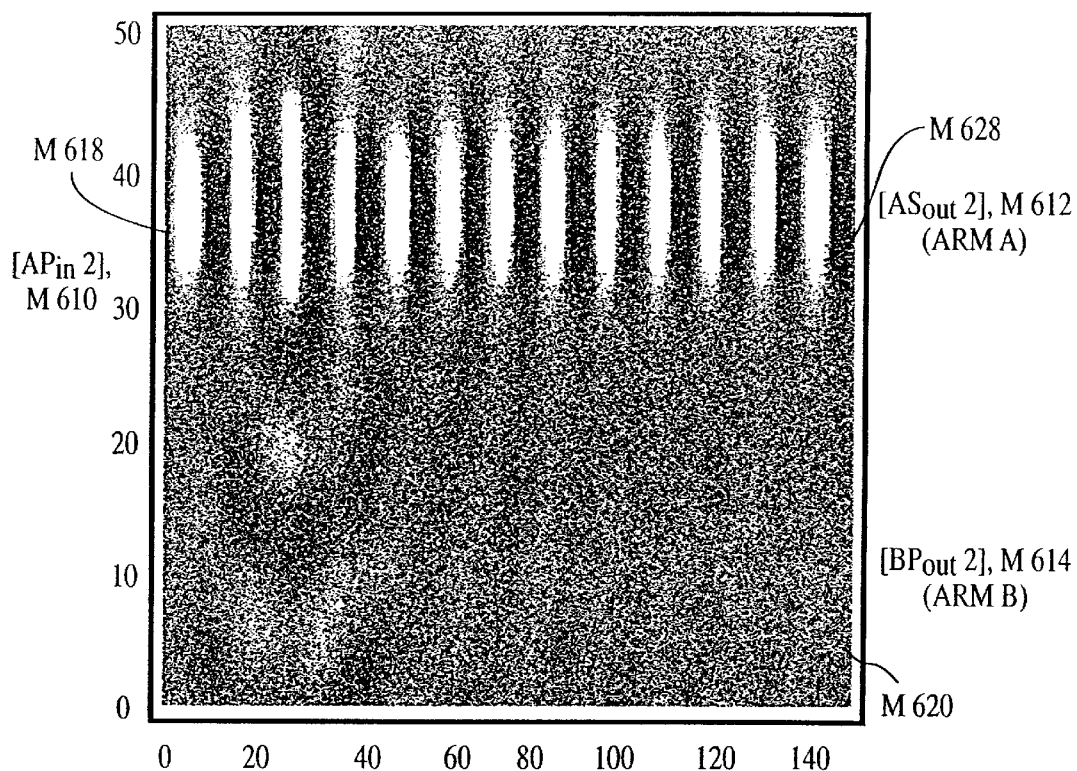
Figure 2:
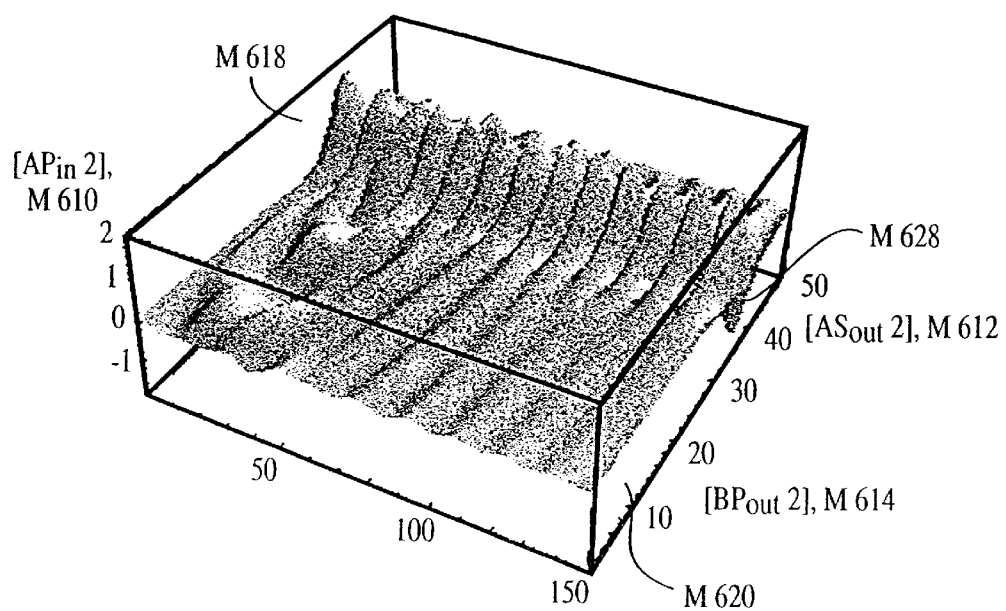

As mentioned above, this device may be implemented in the form of a multimode interference (MMI) configuration device, device M600, as shown in FIG. 7B, which preferably includes a multimode interference (MMI) Waveguide M6024, in place of the directional coupler formed by waveguide A and B. The multimode interference MMI Waveguide M6024 preferably includes a first arm or pathway (along the line joining A and A' in the figure) in place of waveguide A and a second arm or pathway (along the line joining B and B' in the figure) in place of waveguide B. The MMI Waveguide M5024 preferably includes an active medium M608, which is illustrated as a gray region in FIG. 7B along its first arm. It should be understood that the device M600 is otherwise functionally and operationally identical to the device 600 and descriptions and comments relating to the device 600 are applicable to device M600 (except with figure labels now carrying prefix M). The exemplary specific physical dimensions are given below. The similarity between the operation of the MMI device and the coupler device may be illustrated by the field pattern shown in FIG. 7C-1, which describes a similar situation as FIG. 7A-1 and the field pattern shown in FIG. 7C-2, which describes a similar situation as FIG. 7A-2. In the case of FIG. 7C simulation, the device dimensions (as indicated in FIG. 7B) are chosen as follows: l is taken to be 4.3 Microns, W is 1.2 microns, Wg is 0.405 microns, and L is 2.15 microns.

vii). Resonator Configuration I Device

As mentioned above, this device may be implemented in the form of a resonator configuration device. There are two such configurations. An example for configuration I is device R600 shown in FIG. 7D-1, which preferably includes waveguide A R602 coupled to a short waveguide B' R615, which is part of an optical resonator R617 formed by a closed-loop waveguide. These waveguides are the same as waveguide A in that they are made up of high refractive index materials. The closed loop resonator R617 is coupled also to another waveguide B R604. The coupling of light energy between the resonator and waveguide A and waveguide B can be achieved, for example, through a gap filled with lower refractive index materials (lower than the refractive index of the waveguide) as indicated by the gap separation Wg1 and Wg2 in the figure. The resonator can be in the form of a ring (see FIG. 6F-5), disk (see FIG. 6F-6), or sphere (see FIG. 6F-7), or other geometrical deformation from that of a ring, disk, or sphere as long as the optical resonance effect is achieved. As is well known to those skilled in the art, the waveguide and resonator that are placed side by side to achieve wave-coupling do not have to be placed side by side in a horizontal manner (see FIG. 6F-6 illustrated for the exemplary case of a disk) but can be placed in a top-down vertical manner (see FIG. 6F-8 illustrated for the exemplary case of a disk) or any other manners with respect to the horizontal substrate. We not that the coupling can also be done with the use of MMI couplers for which no gap is needed and the coupling region is also filled with high refractive index materials.

Waveguide A R602 and resonator-waveguide B'-R-B (R615, R617, R604) are used in place of the directional coupler formed by waveguides A and B. The amount of light energy coupling from waveguide A to waveguide B' can be low, preferably within the range of a few percentage points (e.g. 5% achievable with an interaction length l of 1.5 to 2 microns for a 0.4 micron gap between waveguides A and B'). As is well known to those skilled in the art, at the resonant frequency the closed-loop resonator allows energy to build up to an intensity level that is much higher than the input light intensity in waveguide A (e.g. 20 times higher). Preferably, part of the light energy (e.g., 5%) in the resonator loop will exit back to waveguide A with a phase opposite from (and an intensity equal to) that of the light originally in waveguide A, thereby canceling the light energy in waveguide A after the coupling region (i.e. the region spanned by waveguide B'). Preferably, part of the light energy (e.g. 5%) in the resonator loop will exit to waveguide B R604, the net result of which is an effective total transfer of light energy from waveguide A R602 to waveguide B R604 through the closed-loop resonator. A clear advantage of the resonator configuration device is the shorter coupling length needed to achieve the same effect (in this case shorter by a factor of 10 for 5% coupling). A disadvantage is the narrow wavelength operating range, which requires the operating wavelength to be at or around the resonant frequency of the resonator.

The closed-loop resonator R617 preferably includes an active medium. The active medium can be located either at the coupling point between waveguide A and the resonator (Region I) R608a or located around any other parts of the resonator (e.g. Region II) R608b, or located at both regions I and II, including the case of having the active medium filling the entire resonator volume. Having the medium in region II will spoil the Q value of the resonator and prevent the field from building up in the resonator, and hence prevent the coupling of substantial energy from waveguide A to waveguide B. Having the active medium in region I will cut off the coupling between waveguide A and the resonator when the active medium is in a loss state, which is in addition to spoiling the Q of the resonator, and hence will be more effective in preventing the coupling of substantial energy from waveguide A to waveguide B. Thus, when the active medium is in the state of loss, the resonator is said to be in the OFF state for which light will remain in waveguide A. When the active medium is in the state of transparency, the resonator is said to be in the ON state for which light will be transferred to waveguide B. A pulsed light at $\lambda_1$ will de-excite the active medium R608, providing loss at the operating wavelength $\lambda_2$ to the active medium R608 located in the resonator R604. This pulse light can reach the active medium in a number of ways, including the use of a mode-selective coupler to couple light into the resonator with a separate waveguide from port BSin1 as shown in the figure. Other means of input is possible for the pulsed light at $\lambda_1$, including the use of polarization-selective coupler, dichroic filter/coupler, mode-selective coupler, or from outside the resonator via free-space propagation such as from the top of the resonator in a direction perpendicular to the plane of the resonator.

Figures 1, 7D:
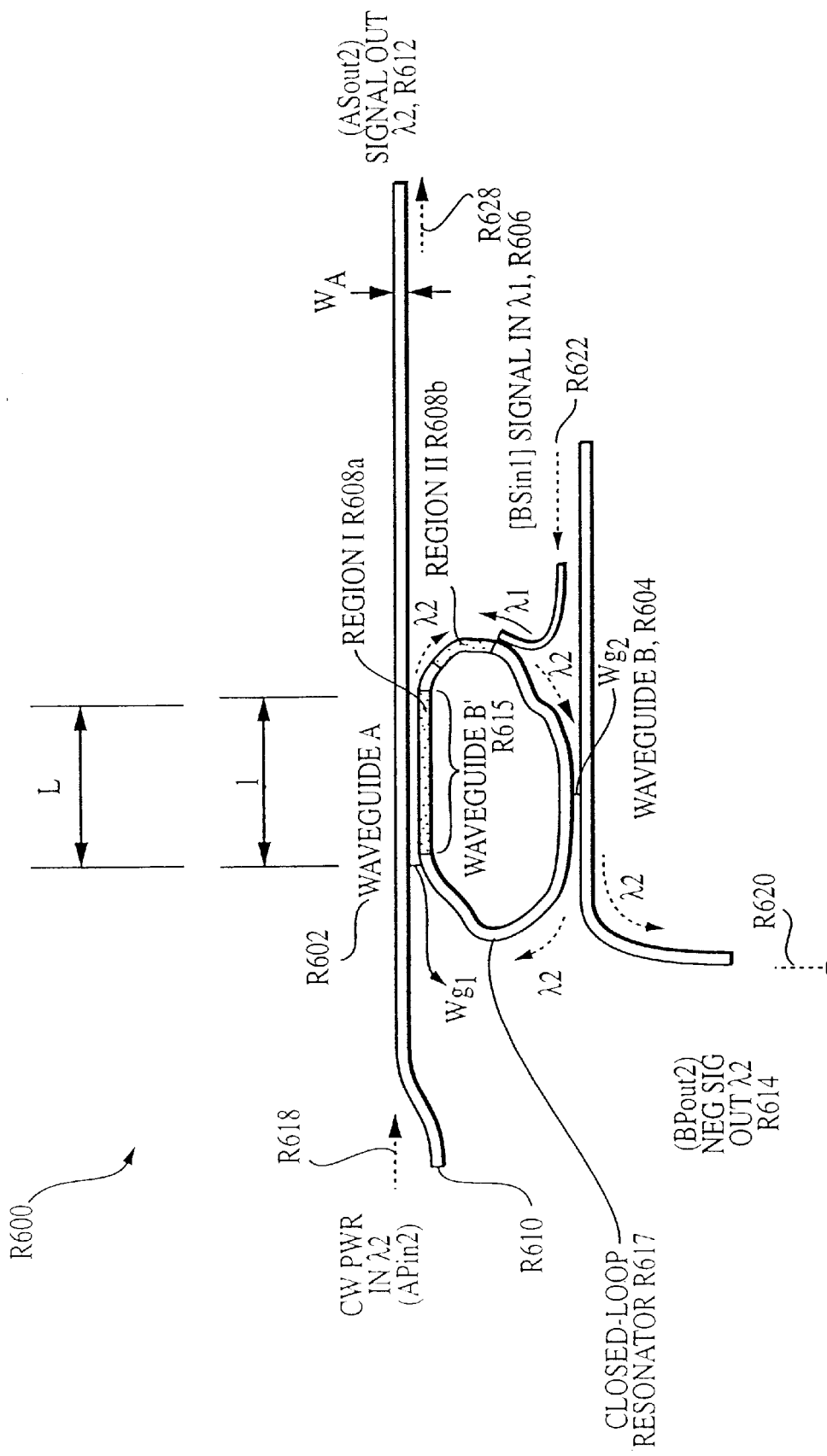
Figures 2, 7D:
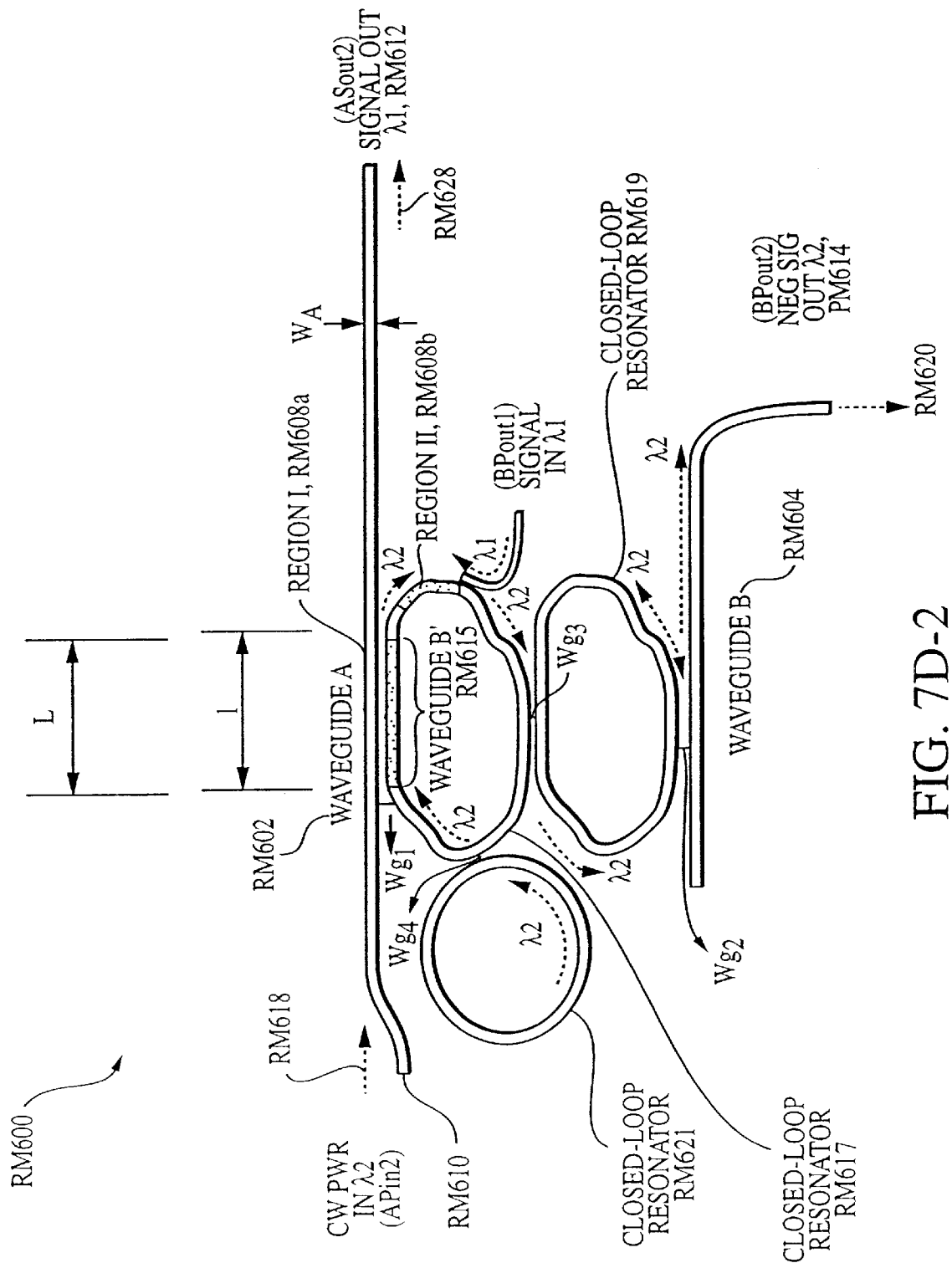
Figures 3, 7D:
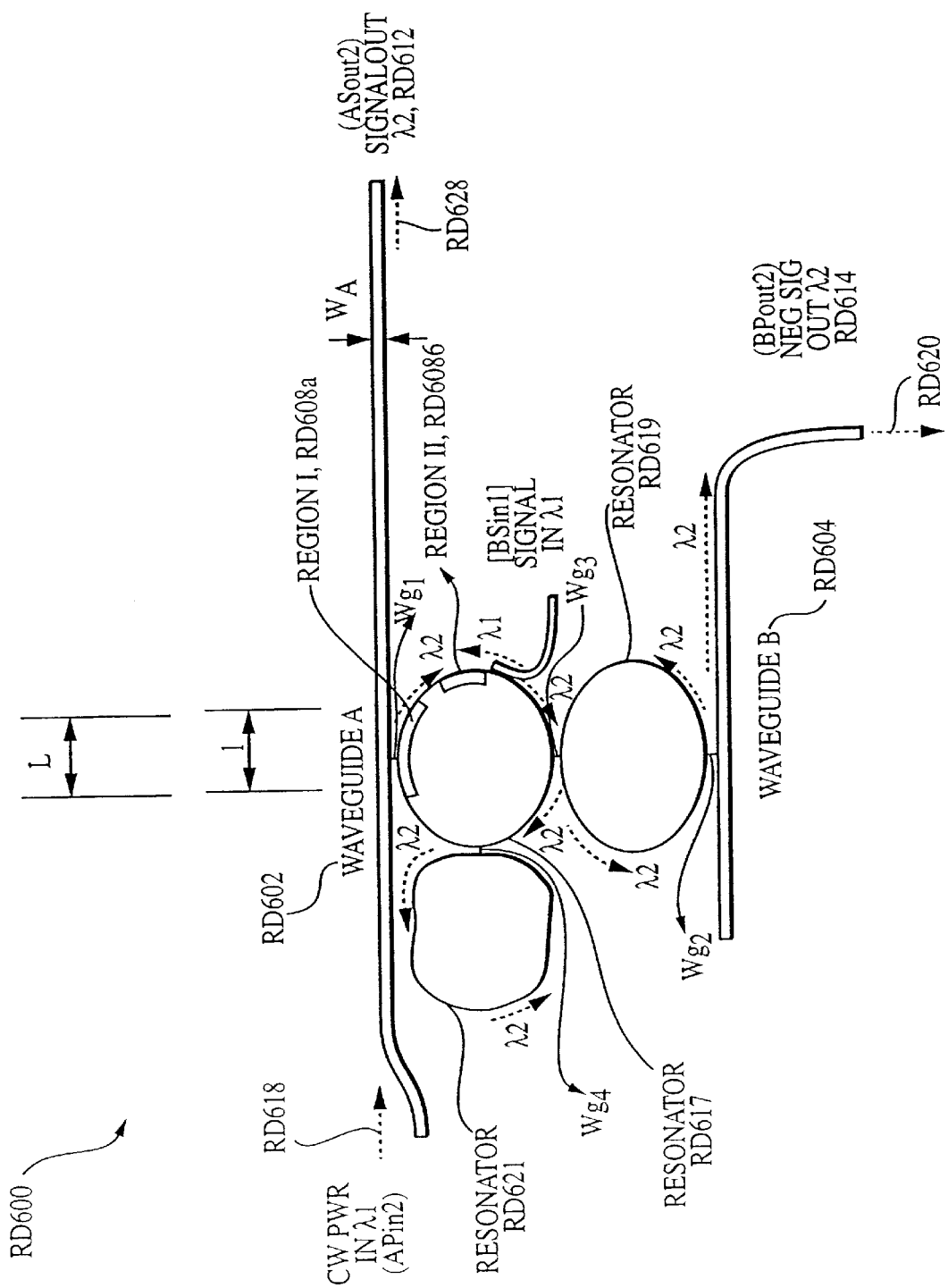
Figures 4, 7D:
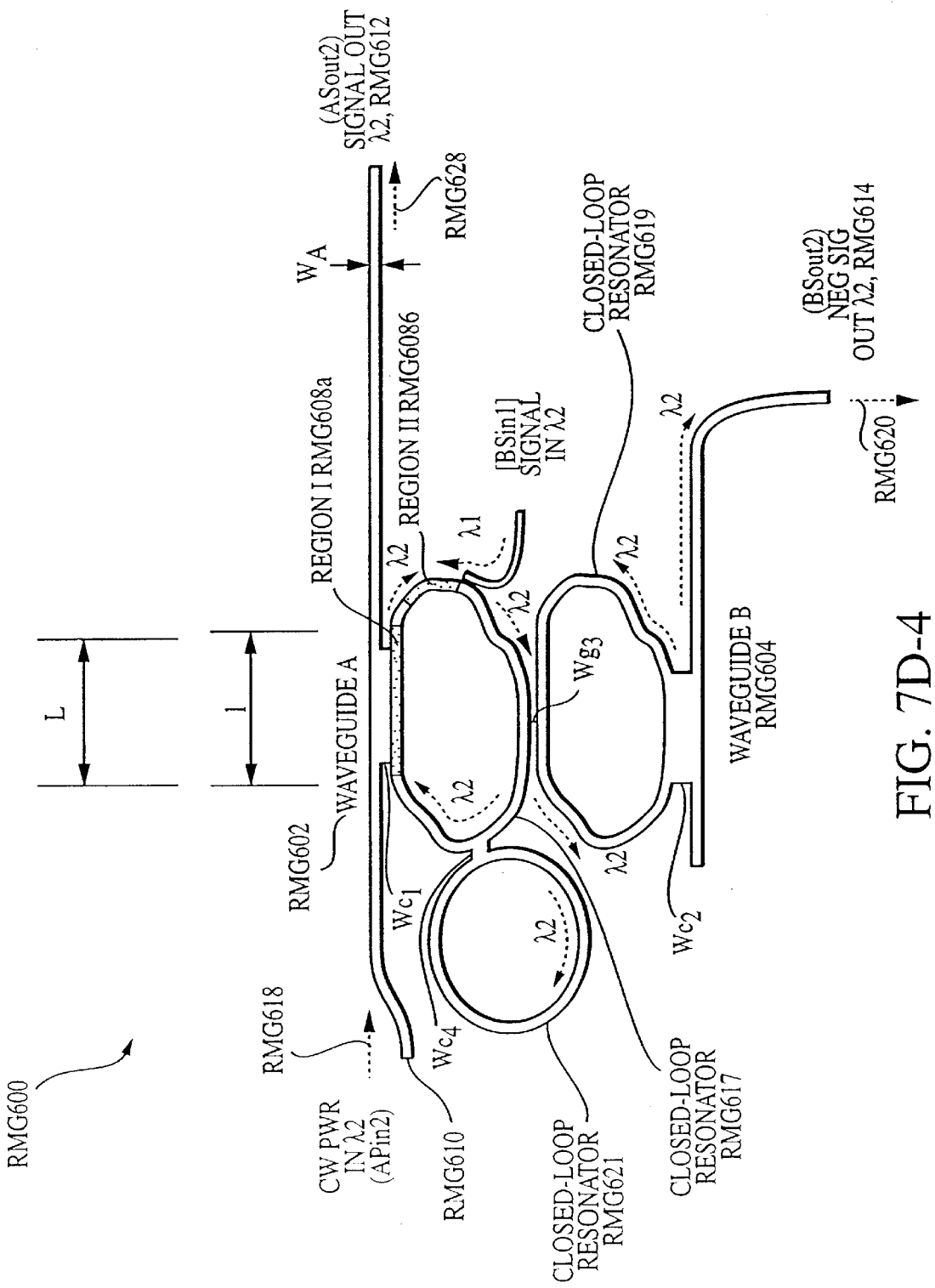

When the active medium is in a state of loss, the CW light at $\lambda_2$ R618 from input port APin2 R610 loses energy in the active medium R608 (in this case through the action of a resonator) so that most of the CW light at $\lambda_2$ R618 does not transfer to Waveguide R604 and thus does not exit from the output on BPout2 R614. Rather, most of the CW light at $\lambda_2$ R618 propagates through Waveguide A R602 and exits out of output port ASout2 R612 as a pulse of light at $\lambda_2$ (SIGNAL OUT $\lambda_2$) R628 out of the first Waveguide A R602 and its energy exiting port BPout2 R614 is substantially reduced when a pulse of light at $\lambda_1$ R622 is present. In the case of FIG. 7D-1 the net effect is that the pulsed light at $\lambda_1$ R622 into port BSin1 R606 generates a pulse of light at $\lambda_2$ R628 exiting port ASout2 R612.

Thus it should be understood that the device R600 is otherwise functionally and operationally identical to the device 600 and descriptions and comments relating to the device 600 are applicable to device R600 (except with figure labels now carrying prefix R).

The resonator can also be in other form such as multiple closed-loop resonators as shown by device RM600 in FIG. 7D-2, which shows an example of three closed-loop resonators RM617, RM619, RM621 made up of high refractive index materials as waveguide A. The resonator can be in the form of disk (RD617, RD619) or box (RD621) or spherical (not shown) shaped resonators as shown by device RD600 in FIG. 7D-3. Preferably, for these resonators, the center parts of the closed-loops are solid and either whispering-gallery modes or modes formed by repeated reflection from the resonator side walls are utilized to achieve optical resonances. The coupling to the resonators can be through a gap of low refractive index or a small joint in the form of a MMI coupler as illustrated by device RMG600 in FIG. 7D-4 for which three of the coupling regions (Wc1, Wc2 and Wc4) are such MMI couplers. It should be understood that the devices RM600, RD600, RMG 600 are otherwise functionally and operationally identical to the device 600 and descriptions and comments relating to the device 600 are generally applicable to the devices RM600, RD600, and RMG600 (except with figure labels now carrying prefixes RM, RD, and RMG, respectively).

viii). Resonator Configuration II Device

Figures 1, 7E:
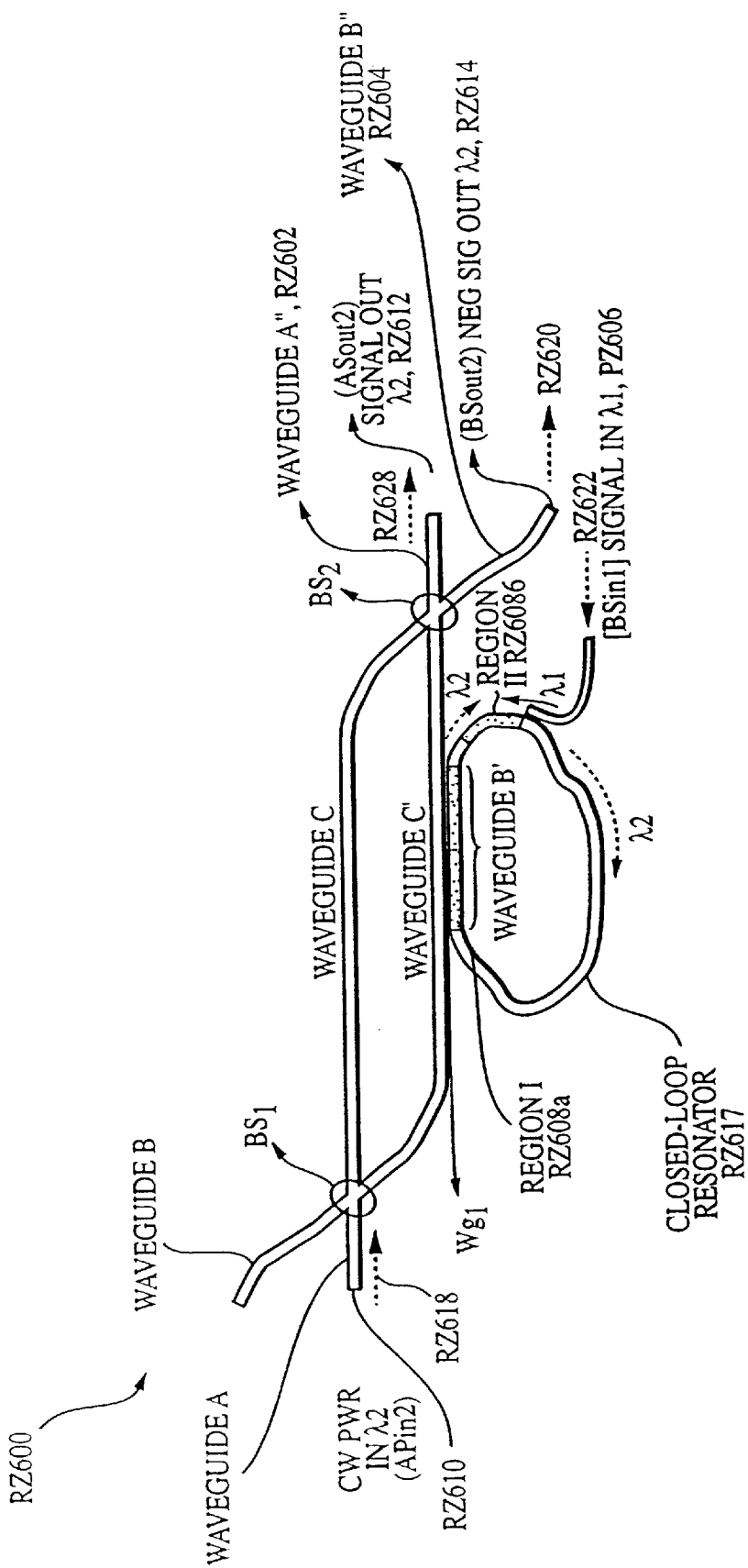
Figures 2, 7E:
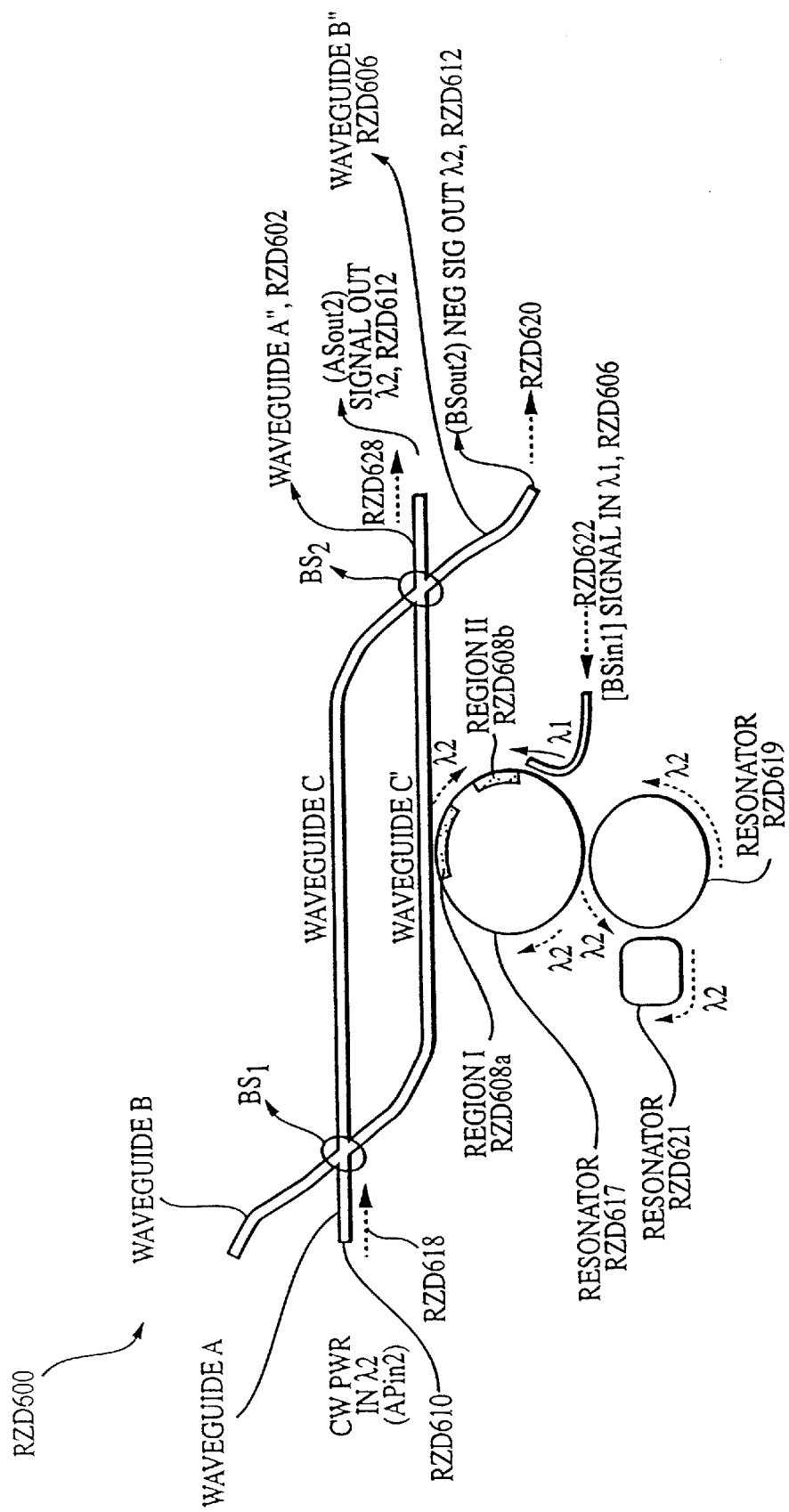
Figures 3, 7E:
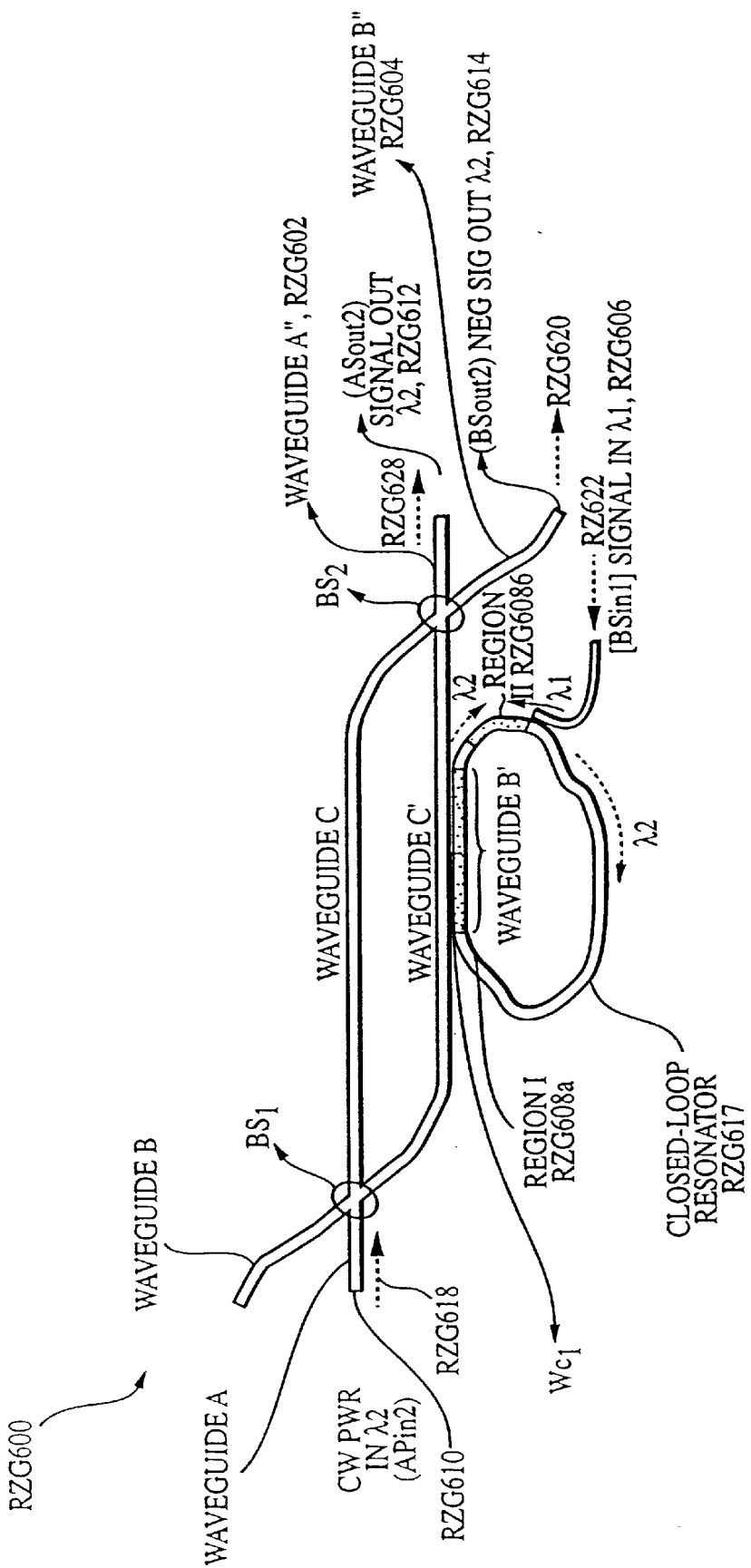

Another implementation (configuration II) of a resonator configuration is shown by Device RZ600 in FIG. 7E-1, which preferably includes waveguide C' coupled to a short waveguide B' that is part of an optical resonator RZ617 formed by a closed-loop waveguide. The amount of coupling to waveguide B' can be low, preferably within the range of a few percentage points (e.g. 5%). As is well known to those skilled in the art, at the resonant frequency the closed-loop resonator allows energy to build up to an intensity level that is much higher than the input light intensity in waveguide C' (e.g. 40 times higher). Preferably, part of the light energy (e.g. 5%) in the resonator loop will exit back to waveguide C' with a phase opposite from and an intensity equal to that of the light originally in waveguide C', thereby resulting in shifting the phase of the light energy in waveguide C' by a Pi phase. By placing waveguide C' on one arm of an optical interferometer, this phase shift can be translated to an intensity switching. In FIG. 7E-1, the interferometer is formed by input waveguides A and B, a 50/50 beam splitter BS1, which splits light from input waveguide A to two arms of the interferometer C and C', another 50/50 beam splitter BS2, which combines light from C and C' and channel them to output waveguides A" and B". In some implementation, such as an ON/OFF type device or a 1×2 switch, one of the input waveguides (A and B) can be absent, or one of the output waveguides (A" and B") can be absent, or one of the input waveguides (A and B) and one of the output waveguides (A" and B") can be both absent.

The resonator contains an active medium and can be in the On or OFF state as described in configuration I. When the resonator is in the OFF state (i.e. the medium is in the loss state), light at $\lambda_2$ entering waveguide A will exit waveguide A" due to constructive interference of the light at waveguide A" after the combining beam splitter BS2 of the interferometer. When the resonator is in the ON state, an additional Pi phase shift in the C' arm of the interferometer will result in destructive interference of the light at waveguide A" but constructive interference of the light at waveguide B" and the light at $\lambda_2$ entering waveguide A will exit waveguide B". A pulsed light at $\lambda_1$ will de-excite the active medium RZ608 (i.e. RZ608a or RZ608b as described in the case of device R600), providing loss at the operating wavelength $\lambda_2$ to the active medium RZ608 located in the resonator RZ617. This pulse light can reach the active medium in a number of ways, including the use of a polarization-selective coupler, dichroic filter/coupler, or mode-selective coupler to couple light into the resonator with a separate waveguide from the input port RZ622 as shown in FIG. 7E-1 or from outside the resonator via free-space propagation such as from the top of the resonator in a direction perpendicular to the plane of the resonator.

Light at $\lambda_2$ entering waveguide A and exiting waveguide A" after propagating through waveguides C and C' forms a first interference flux pattern of light. Light at $\lambda_2$ entering waveguide A and exiting waveguide B" after propagating through waveguides C and C' forms a second interference flux pathway of light. When the active medium is in a state of loss, the CW light at $\lambda_2$ RZ618 from input port APin2 RZ610 loses energy in the active medium RZ608, which alters the interference flux pattern of light (in this case through the action of a resonator) so that most of the CW light at $\lambda_2$ RZ618 does not transfer to Waveguide B" RZ604 and thus does not exit from the output on BPout2 RZ614. Rather, most of the CW light at $\lambda_2$ RZ618 propagates to Waveguide A" RZ602 and exits out of output port ASout2 RZ612 as a pulse of light at $\lambda_2$ (SIGNAL OUT $\lambda_2$) RZ628 out of the first Waveguide A" RZ602 and its energy exiting port BPout2 RZ614 is substantially reduced when a pulse of light at $\lambda_1$ RZ622 is present. In the case of FIG. 7E-1 the net effect is that the pulsed light at $\lambda_1$ RZ622 into port BSin1 RZ606 generates a pulse of light at $\lambda_2$ RZ628 exiting port ASout2 RZ612.

Thus it should be understood that the device RZ600 is otherwise functionally and operationally identical to the device 600 and descriptions and comments relating to the device 600 are generally applicable to device RZ600 (except with figure labels now carrying prefix RZ).

The resonator can also be in other form such as multiple resonators as shown by device RZD600 in FIG. 7E-2, which shows an example of three resonators RZD617, RZD619, RZD621 made up of high refractive index materials as waveguide A. The resonator can be in the form of closed-loop resonators, or as disk (RD617, RD619) or box (RD521) or spherical (not shown) shaped resonators as shown by device RZD600 in FIG. 7E-2. Preferably, for these resonators, the center parts of the closed-loops are solid and either whispering-gallery modes or modes formed by repeated reflection from the resonator side walls are utilized to achieve optical resonances. The coupling to the resonators can be through a gap of low refractive index or a small joint in the form of a MMI coupler as illustrated by device RZG 600 in FIG. 7E-3 for which the coupling region (Wc1) represents such an MMI coupler. It should be understood that the devices RZ600, RZD600, RZG600 are otherwise functionally and operationally identical to the device 600 and descriptions and comments relating to the device 600 are generally applicable to the devices RZ600, RZD600, and RZGG600 (except with figure labels now carrying prefixes RZ, RZD, and RZG, respectively).

viiii). PBG Implementation of the Coupler/MMI/Resonator Configuration Device

As mentioned above, the optical waveguide in either the directional coupler configuration or the MMI configuration or the resonator configuration I or resonator configuration II may be implemented in the form of a photonic (PBG) structure. For the case of the directional coupler configuration, the PBG structure is shown by device PC600 in FIG. 7F-1. The photonic-bandgap structure preferably includes a photonic bandgap waveguide A PC602 and a photonic bandgap waveguide B PC604. The photonic bandgap PBG Waveguide A or B preferably includes a series of periodically placed holes formed by low refractive index materials outside the waveguiding region with high refractive index. As is known to those skilled in the art, these series of holes form a forbidden wavelength gap for the propagation of electromagnetic field, resulting in light confining in the region identified as photonic bandgap waveguide A or B. For example, for a refractive contrast of n=3.8 (Black region) to n=1 (white region), the vertical distance between center of the hole to center of the hole can be 0.527 microns, the horizontal distance between the center of the hole to center of the hole can be 0.608 microns, the diameter of the holes can be 0.4 microns, which will provide a photonic bandgap at about a 1.5 $\mu$m (or 1500 nm) wavelength. The interaction length l is chosen to achieve maximal energy coupling. The photonic bandgap waveguide B PC604 preferably includes an active medium PC608, which is illustrated as a gray region in FIG. 7F-1. Photonic bandgap waveguide A PC602 or B PC604 in device PC600 functions as waveguide A 602 or B 604 in device 600. It should be understood that the device PC600 is otherwise functionally and operationally identical to the device 600 and descriptions and comments relating to the device 600 are generally applicable to device PC600 (except with figure labels now carrying prefix PC).

Figures 1, 7F:
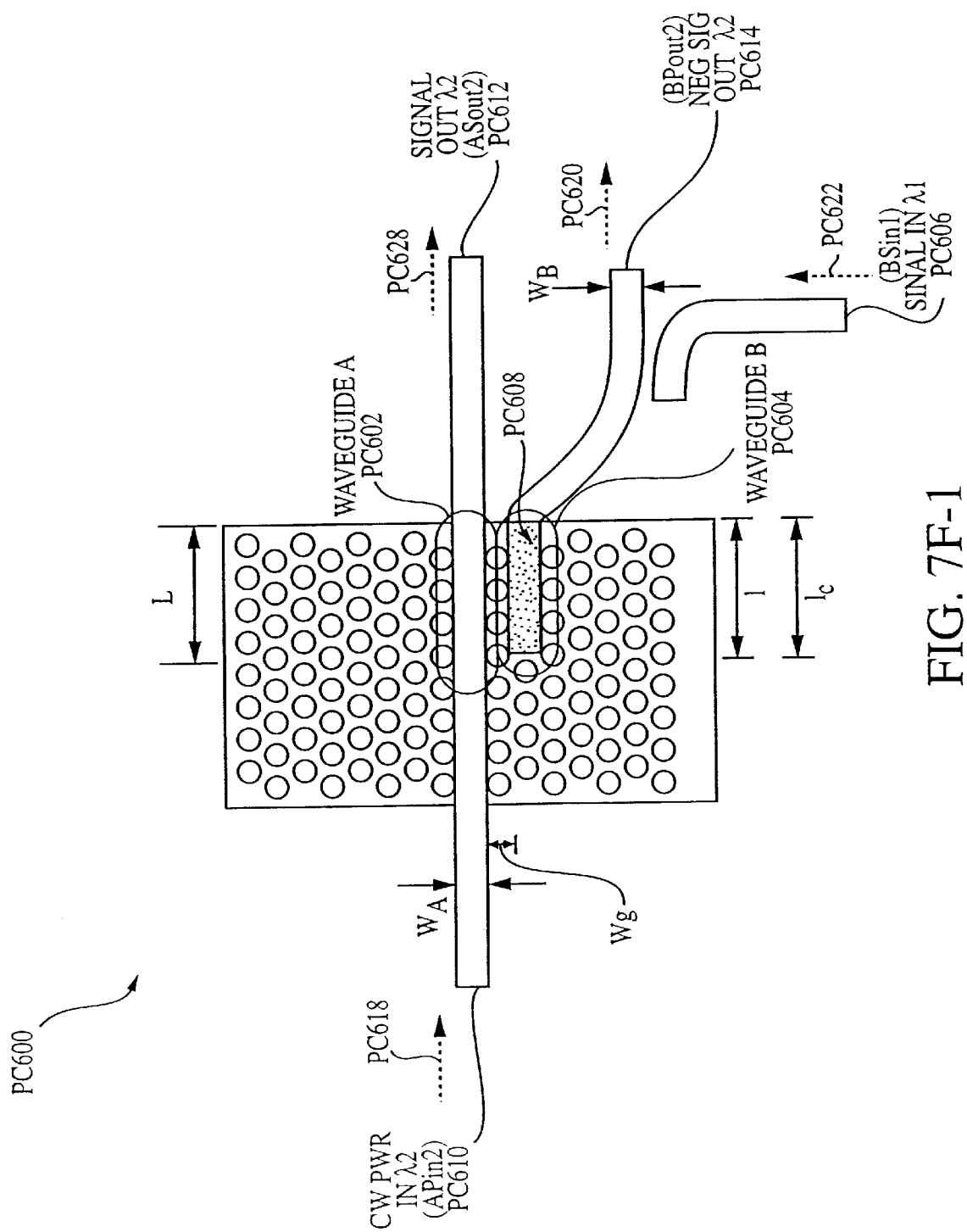
Figures 2, 7F:
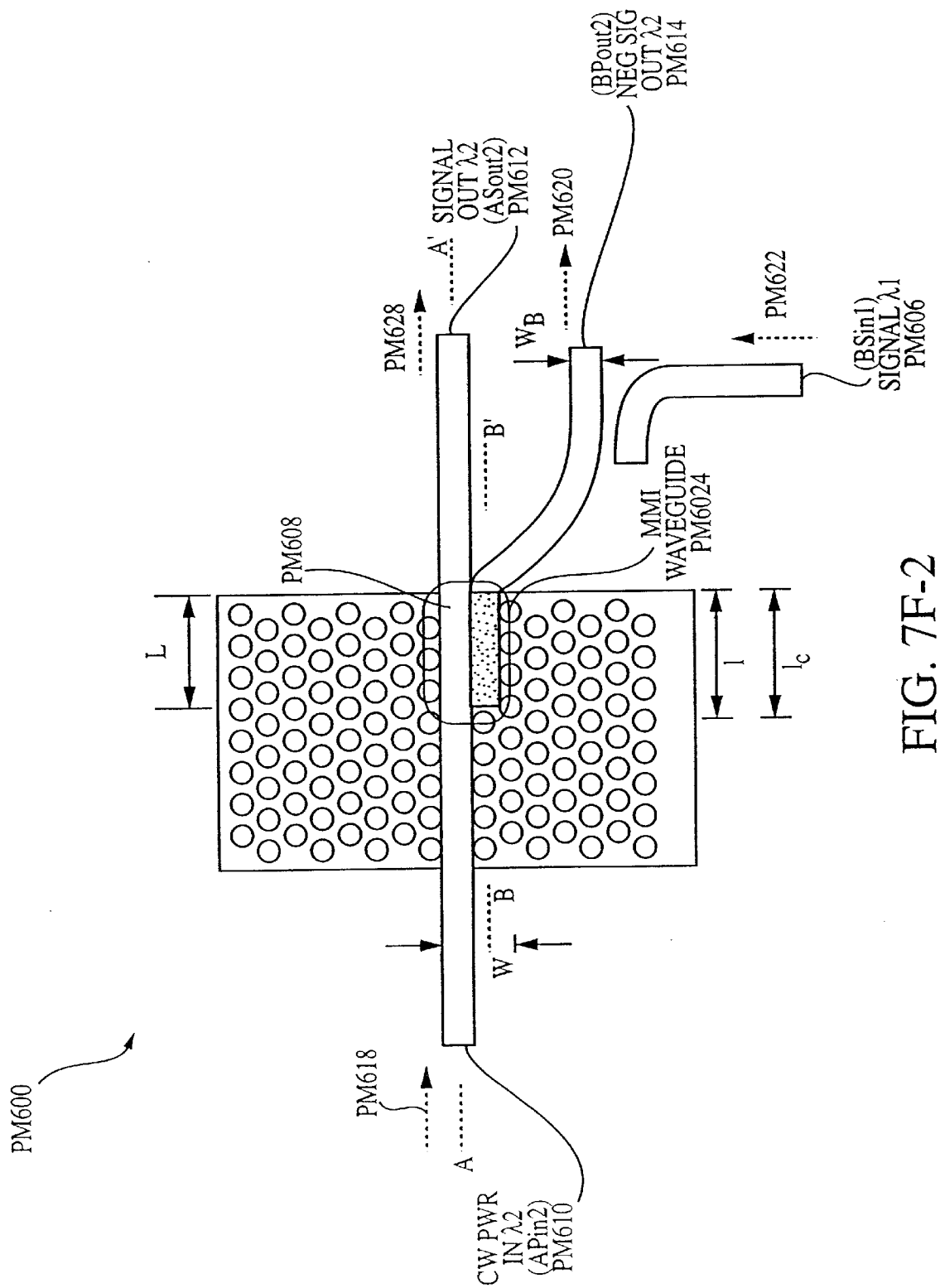
Figures 3, 7F:
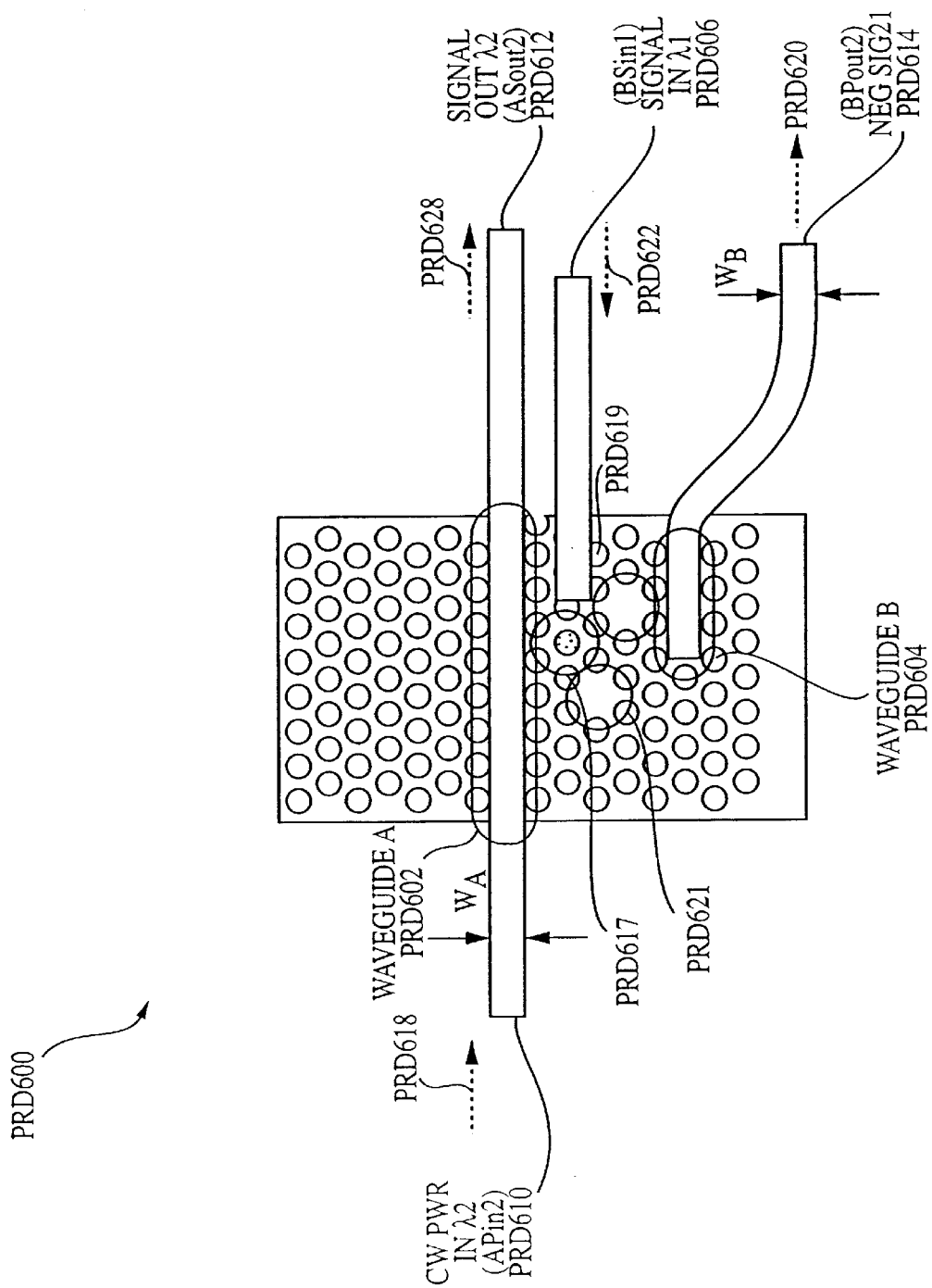

Similarly, the MMI configuration may be implemented in the form of a photonic bandgap structure as shown by device PM600 in FIG. 7F-2. It should be understood that the device PM600 is otherwise functionally and operationally identical to the device M600 and descriptions and comments relating to the device M600 are generally applicable to device PM600. Likewise, the resonator configuration may be implemented in the form of a photonic bandgap structure. As an example, the photonic bandgap implementation of resonator configuration I is shown by device PRD600 in FIG. 7F-3. As is well known to those skilled in the art, resonators can be formed with photonic-bandgap structures by removing a single hole (as is the case for FIG. 7F-3) or groups of holes (not shown). It should be understood that the device PRD600 is otherwise functionally and operationally identical to the device RD600 and descriptions and comments relating to the device RD600 are generally applicable to device PRD600 (except with figure labels now carrying prefix PRD). The photonic bandgap implementation of resonator configuration II can likewise be realized by replacing waveguides and resonators with photonic bandgap implementation of waveguides and resonators in a manner similar to that demonstrated by the photonic bandgap implementation of configuration I.

It should be understood that the dimensions and materials for the devices are presented for purposes of illustrating a useful embodiment of the devices M600, R600, RM600, RD600, RZ600, RZD600, RZG600, PC600, PM600, and PRD600 are not intended to limit other exemplary embodiments of any exemplary device, or the devices M600, R600, RM600, RD600, RZ600, RZD600, RZG600, PC600, PM600, and PRD600. A variety of dimensions and sizes can be used, depending on the application desired as well as the fabrication materials, processes or technologies that are employed. A variety of materials can be used, for examples, the waveguides do not have to be semiconductor and may be optical fibers or polymer waveguides (as long as the requisite waveguiding or wave-coupling effect is achieved), the active medium does not have to be semiconductor or quantum well but can be erbium ions doped in glass or active polymers (as long as the requisite gain/loss/transparency properties are achieved), and the resonators do not have to be semiconductor but can be glass or polymers (as long as the requisite resonance effect is achieved). Also, it should be understood that the shape of the Waveguides, MMI Structures, Photonic Bandgap Structures, or Resonators do not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

It should be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the working of these devices include those cases whereby both the gain/transparency/loss property as well as the refractive-index property of the active medium are used in bringing about the device operation.

C. Exemplary Device 3

Figure 8A:
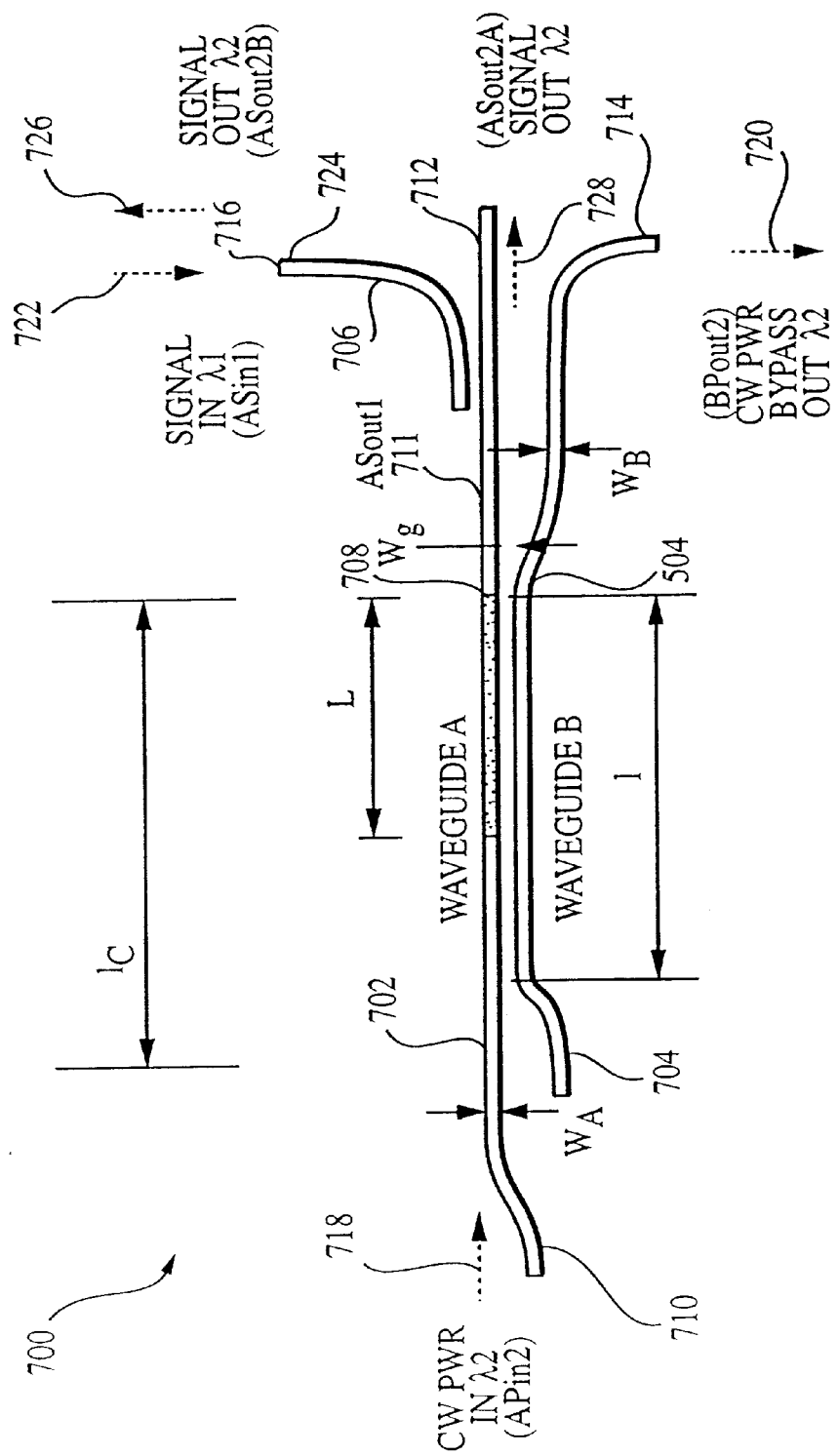
FIG. 8A illustrates an embodiment of a third exemplary phosistor device utilizing directionally coupled waveguides.

FIG. 8A illustrates a first embodiment 700 of a phosistor device employing directionally coupled waveguides. This device has very similar geometry as exemplary device 1 but with the active medium operated in the loss mode. The device can perform as a switching element and can in particular switch or convert a stream of slow or ultrafast (picosecond, femtosecond) optical pulses at low energy and long wavelength to a stream of slow or ultrafast optical pulses at comparatively high energy (comparatively short wavelength). The device 700 is not limited to use as a switching element and can be utilized, for example, as an all-optical logic gate, a light intensity amplifier, a photon duplicator, a light intensity modulator, a light intensity regulator, an optical phase shifter, a lossless signal tap, a quantum-nondemolition (QND) detector, and a variable optical attenuator. It should be understood that these exemplary applications of device 700 are intended to illustrate the wide range of uses for device 700, and are not intended to limit the applications of other exemplary embodiments of device 700 to these examples. The device can be referred to as an "Input-Arm-Loss-Gate Low-to-High-Energy Inversion Phosistor" (ILLH Phosistor 700).

ILLH Phosistor 700 preferably includes a first pathway of light consisting of the spatial region occupied by Waveguide A 702 and a second pathway of light consisting of the spatial region occupied by Waveguide B 704. A third Waveguide 706 is included in Phosistor 700 for coupling an input optical pulse to the Waveguide A 702 but which is otherwise not central to the operation of Phosistor 700. The Waveguide A 702 preferably includes an active medium 708. As described above, Waveguide A 702 can be implemented as waveguide 430 with active medium 420 in a useful embodiment, and waveguide B 704 and the third waveguide 706 can be implemented as waveguide 400. The Waveguide A 702 preferably includes an input port APin2 710 and an inner output port ASout2 711, and an output port ASout2a 712. The Waveguide B 704 preferably includes an output port BPout2 714. The third Waveguide 706 preferably includes an input port ASin1 716 which doubles as an output port ASout2b 724. FIG. 8 illustrates that Waveguide A 702 has width $W_A$ and is located at an approximately parallel distance (coupling gap or distance) $W_g$ from Waveguide B 704, which has width $W_B$, so that a wave in Waveguide A can be coupled to a wave in Waveguide B. The terms "wave" and "light beam" are used interchangeably.

For the input port labeled "APin2" (710), "P" stands for Power-Supply beam, "A" refers to Waveguide A 702, "in" refers to 710 being an input port, and "2" refers to the input wavelength being $\lambda_2$. For the inner output port labeled "ASout2" (711), "S" stands for Signal beam, "A" refers to Waveguide A 702, "out" refers to it being an output port, "2" refers to the output wavelength being $\lambda_2$. For the output port labeled "ASout2a" (712), "S" stands for Signal beam, "A" refers to Waveguide A 702, "out" refers to it being an output port, "2" refers to the output wavelength being $\lambda_2$, and "a" is used to distinguish this port 712 which is along Waveguide A 702. For the output port labeled "ASout2b" (724), "S" stands for Signal beam, "A" refers to Waveguide A 702, "out" refers to it being an output port, "2" refers to the output wavelength being $\lambda_2$, and "b" is used to distinguish this port 724 which is along the third Waveguide 706. For the output port labeled "BPout2" (714), "P" stands for Power-Supply beam, "B" refers to Waveguide B 704, "out" refers to it being an output port, and "2" refers to the output wavelength being $\lambda_2$. For the input port labeled "ASin1" (716), "S" stands for Signal beam, "A" refers to Waveguide A 702, "in" refers to it being an input port, and "1" refers to the input wavelength being $\lambda_1$.

The input port APin2 710 on the waveguide A 702 is configured to receive continuous wave (CW) light 718 having wavelength $\lambda_2$ (at $\lambda_2$) (CW PWR IN $\lambda_2$). Under certain condition described below when the active medium on the waveguide reaches transparency and Waveguides A and B are optically transparent, part of the CW light at $\lambda_2$ 718 propagating along the Waveguide A 702 will be transferred to Waveguide B 704. The CW light at $\lambda_2$ 718 then exits from Waveguide B 704 at the port BPout2 714 as continuous wave (CW) light at $\lambda_2$ (CW PWR BYPASS OUT $\lambda_2$) 720.

The coupling length is defined as the length at which a wave in one waveguide maximally couples into another waveguide that is coupled to the first waveguide. In this device 700, the interaction length l, defined as the length of interaction between Waveguides A 702 and B 704, is less than the full coupling length $l_C$ so that $l<l_C$. In FIG. 8A, the interaction region between Waveguide B 704 and Waveguide A 702, the region for which the two waveguides run in parallel and are separated by a small gap, is shown extending less than the full coupling length.

Since $l<l_C$, some portion of CW light at $\lambda_2$ 718 still propagates along the Waveguide A 702 across the active medium 708 to the inner output port ASout2 711. As the portion of CW light at $\lambda_2$ 718 propagates across the active medium 708, the portion of CW light at $\lambda_2$ 718 drives the active medium 708 to a state of transparency at $\lambda_2$. This state of the active medium 708 is analogous to Case D, as illustrated in FIG. 4D.

As shown in FIG. 8A, the length L of the active medium 708 is about half the interaction length l (L≅½). The length L of the active medium 708 may be somewhat longer or shorter than half of l. Varying the length L of the active medium 708 relative to the interaction length l will vary the input to output signal conversion efficiency but will otherwise not affect the general operating principle of the device.

It should be understood that these dimensions, exemplary lengths, and geometry are presented for purposes of illustrating a useful embodiment of the devices 700, 750 and are not intended to limit other exemplary embodiments of any exemplary device 3, or the devices 700, 750. A variety of dimensions, sizes, and geometry can be used, depending on the application desired as well as the fabrication materials, processes or technologies that are employed. For example, while the choice of l<$l_C$ is illustrated in this exemplary device, other choices of interaction length can be used to achieve similar device functions.

Also, it should be understood that the shape of the waveguides do not generally have to be linear. Curved shapes and different waveguide dimensions may be utilized as long as they achieve the same functions such as waveguiding and wave-coupling. The active medium can be centered at an alternative location along waveguide A other than that illustrated in FIGS. 8A and 8B, and there can be more than one disconnected active medium areas along waveguide A. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same waveguide widths and dimensions as long as the desired effect of wave-coupling is achieved.

In an exemplary embodiment of devices 700, 750, for operation at 800 nm wavelength range, the wavelength $\lambda_1$ can be at 820 nm, $\lambda_2$ can be at 800 nm, and the Waveguides A 702 can be implemented as the Waveguide 430 with an active medium 420 illustrated in FIGS. 5B and 5C and waveguide B 704 can be implemented as Waveguide 400 in FIG. 5A, in an $Al_xGa_{1-x}As$ embodiment for the waveguide core having alloy composition x at 0.3 giving a bandgap energy of around 690 nm. Thus the core material is transparent at the wavelength $\lambda_2$ of 800 nm. When the active medium is fully de-excited, the active medium absorbs light at both 800 nm and 820 nm wavelengths. The active medium is an essentially three-level medium described in FIGS. 4A–D for which electrons are free to relax from the upper-energy level corresponding to the 800 nm absorption to the upper-energy level corresponding to the 820 nm absorption.

In an exemplary embodiment of devices 700, 750 for operation at 1500 nm wavelength range, the wavelength $\lambda_1$ can be at 1500 nm, $\lambda_2$ can be at 1480 nm, and the Waveguide A 702 can be implemented as the Waveguide 430 with active medium 720 illustrated in FIGS. 5B and 5C and Waveguide B 704 can be implemented as the Waveguide 400 illustrated in 5A, in an $In_{1-x}Ga_xAs_{1-y}P_y$ embodiment for the waveguide core having alloy compositions x=0.16 and y=0.67 giving a bandgap energy of around 1100 nm. Thus the core material is transparent at the wavelength $\lambda_1$ of 1480 nm. When the active medium is fully de-excited, the active medium absorbs light at both 1480 nm and 1500 nm wavelengths. The active medium is an essentially three-level medium described in FIGS. 4A–D for which electrons are free to relax from the upper-energy level corresponding to the 1480 nm absorption to the upper-energy level corresponding to the 1500 nm absorption.

Figure 8B:
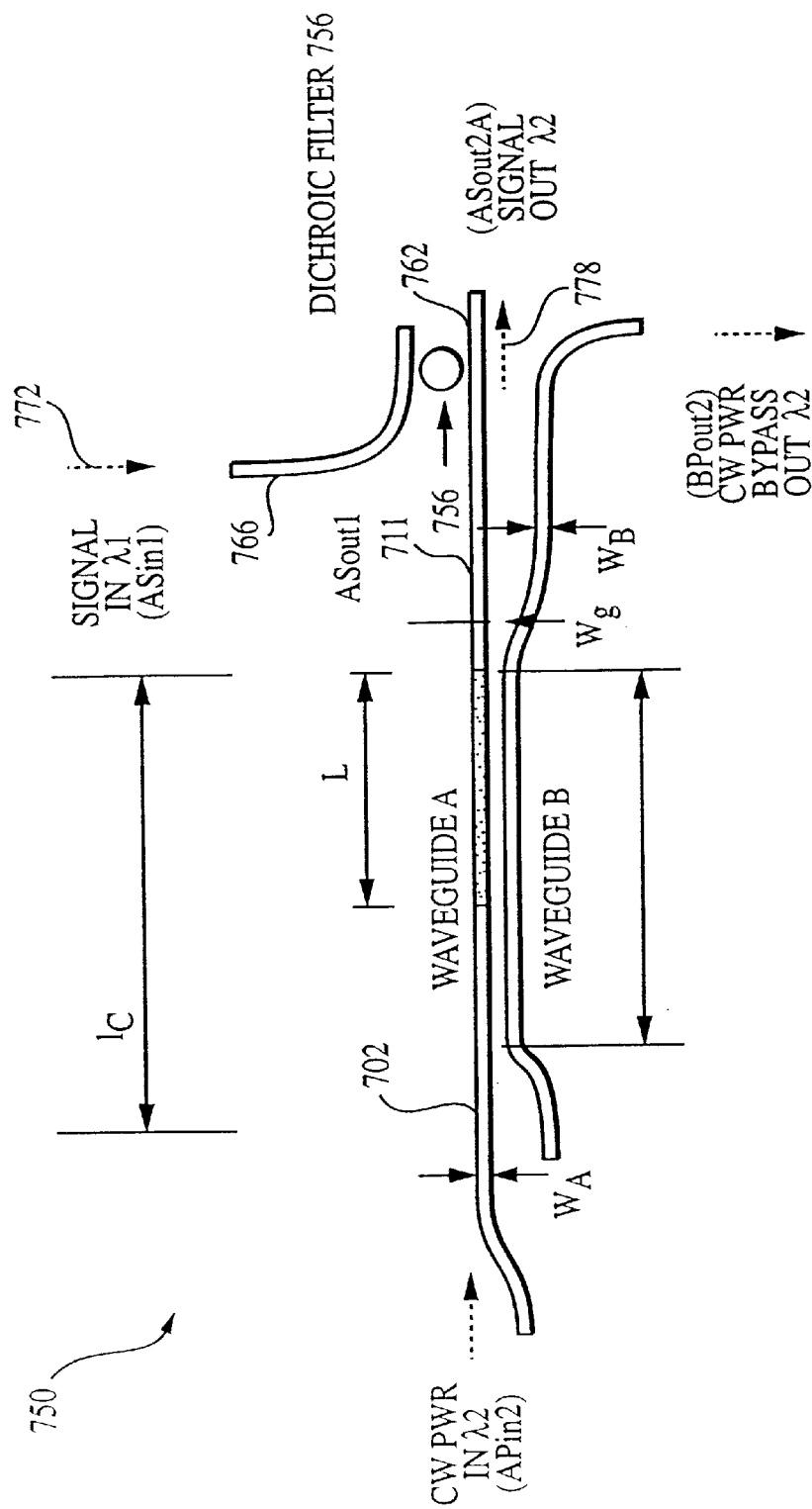
FIG. 8B illustrates another embodiment of the third exemplary phosistor device utilizing directionally coupled waveguides and a dichroic filter.

In an exemplary embodiment for operation at the 1500 nm wavelength range, the cross-sectional dimensions of the waveguide 400 are 0.4 μm wide by 0.25 μm thick. FIGS. 8A & 8B illustrate that Waveguide A 702 has width $W_A$ and is located at an approximately parallel distance (coupling gap or distance) $W_g$ from Waveguide B 704, which has width $W_B$. In this exemplary embodiment, the Waveguide A 702 has width $W_A$ equal to 0.4 μm and is located at an approximately parallel distance $W_g$ from Waveguide B 704 of 0.4 μm, while Waveguide B 704 has width $W_B$ equal to 0.4 μm. In this exemplary embodiment, $l_C$ is 15 μm and l is 12 μm, so that l<$l_C$.

It should be understood that these dimensions, exemplary lengths, and geometry are presented for purposes of illustrating a useful embodiment of the devices 700, 750 and are not intended to limit other exemplary embodiments of any exemplary device 3, or the devices 700, 750. A variety of dimensions, sizes, and geometry can be used, depending on the application desired as well as the fabrication materials, processes or technologies that are employed.

i). Exemplary Device Operation

An exemplary operation of the device is described below.

Continuous wave (CW) light having wavelength $\lambda_2$ (at $\lambda_2$) (CW PWR IN $\lambda_2$) 718 enters at the port APin2 710 on the Waveguide A 702. In the initial state, the active medium 708 along Waveguide A 702 is not excited and is in the state of loss analogous to CaseA, as illustrated in FIG. 4A. The CW light at $\lambda_2$ 718 propagates along the Waveguide A 702 and some of it is subsequently transferred to Waveguide B 704. Since l<$l_C$, some portion of CW light at $\lambda_2$ 718 still propagates along the Waveguide A 702 across the active medium 708 to the inner output port ASout2 711. As the portion of CW light at $\lambda_2$ 718 propagates across the active medium 708, the portion of CW light at $\lambda_2$ 718 will drive the active medium 708 to a state of transparency at $\lambda_2$ if this portion of CW light at $\lambda_2$ 718 has a high enough intensity. This state of the active medium 708 is analogous to Case D, as illustrated in FIG. 4D.

The portion of CW light at $\lambda_2$ 718 will propagate across the active medium 708 to port ASout2 711 as light beam 713 and be subsequently divided to exit ports ASout2*a* 712 and ASout2*b* 724. If the coupling of energy from the port ASin1/ASout2*b* 716/724 to Waveguide A 702 (or equivalently to port ASout2 511) is a 50/50 coupler, then the energy coupling ratio for light propagating in the opposite direction (i.e. port 511 to port 716/724) will also be 50/50. As a result, about 50 percent of $\lambda_2$ 723 at port ASout2 711 will go to $\lambda_2$ 726 at port ASin1/ASout2*b* 716/724 and 50 percent of $\lambda_2$ 723 at port ASout2 711 will go to $\lambda_2$ 728 at port ASout2*a* 712.

The input port ASin1 716 on the third Waveguide 706 effectively serves as another input port of Waveguide A 702, and is the input signal port for pulsed light having wavelength $\lambda_1$ (SIGNAL IN $\lambda_1$) 722. The pulsed light $\lambda_1$ 722 entering the port ASin1 716 will de-excite or relax the active medium 708, providing loss at the operating wavelength $\lambda_2$ to the active medium 708 located in Waveguide A 702. This state of the active medium 708 is analogous to Case C, as illustrated in FIG. 4C.

The CW light at $\lambda_2$ 718 from input port APin2 710 loses energy in the active medium 708 so that the portion of CW light at $\lambda_2$ 718 no longer propagates out of the active medium 708 and thus no longer propagates towards port ASout2 711 or subsequently ports ASout2*a* 712 and ASout2*b* 724. Preferably, all signals at $\lambda_2$ (SIGNAL OUT $\lambda_2$ 726, SIGNAL OUT $\lambda_2$ 728) out of the first Waveguide A 702 are substantially reduced when a pulsed of light at $\lambda_1$ 722 is present.

In the case of FIG. 8A the net effect is that the pulsed light at $\lambda_1$ 722 into port ASin1 716 generates a negatively going signal pulse of light (light with a reduced intensity during the pulse duration) at $\lambda_2$ 713 exiting waveguide section ASout2 711, which proceeds to split its energy to a negatively going signal pulse of light at $\lambda_2$ 726 exiting port ASout2b 716 and a negatively going signal pulse of light at $\lambda_2$ 728 exiting port ASout2a 712. While not essential for the basic operation of the device 700, an improved version 750 of the device 700 can be achieved via using a frequency-selective coupler such as grating or a small resonator. Such a frequency dependent coupler is called a dichroic filter or coupler and is shown as part of device 750 in FIG. 8B, replacing Waveguide 706 of FIG. 8A. The dichroic filter 756 will couple most of the pulsed light $\lambda_1$ 772 entering the port ASin1 766 to Waveguide A 702 but not $\lambda_2$. In this case, most of $\lambda_2$ (SIGNAL OUT $\lambda_2$) 778 will not couple from Waveguide A 702 to the port ASin1 766 and will instead propagate preferably its energy to port ASout2a 762. It should be understood that the device 750 is otherwise functionally and operationally identical to the device 700 and descriptions and comments relating to the device 700 are applicable to device 750. As in device 1, alternatively, a polarization dependent coupler or a mode-selective coupler can be used to couple pulsed light $\lambda_1$ 772.

It should be understood that the energy exiting the port BPout2 714 (as continuous wave (CW) light at $\lambda_2$ (CW PWR BYPASS OUT $\lambda_2$) 720 can be designed to be not substantially affected in this entire process. The energy exiting the port BPout2 714 of the ILLH Phosistor 700, 750 of FIGS. 8A and 8B is capable of being reused to power another phosistor. This feature is analogous to the supply voltage in electronic logic and switching circuitry.

It should be understood that the speed of switching can be fast as the active medium 708 when in the loss state at $\lambda_2$ (Case C in FIG. 4C) will be driven back to the transparency state at $\lambda_2$ (Case D in FIG. 4D) rapidly by the light at $\lambda_2$ 718 passing through the loss medium 708 when pulsed light at $\lambda_1$ 722, 772 is removed. The state of the active medium 708 is again analogous to Case D, as illustrated in FIG. 4D.

ii). Comments

It should be understood that in the typical operation of Phosistors, including the useful embodiments 700, 750, one or more light inputs or outputs are described as continuous wave (CW) light. The light can otherwise be a pulsed light in some specific applications. For the purpose of illustration and not limitation it is taken as CW light.

The pulsed light at $\lambda_1$ 722 entering the port ASin1 716 will de-excite the active medium 708, providing loss at the operating wavelength $\lambda_2$ to the active medium 708 located in Waveguide A 702.

It should be understood that the pulsed light at $\lambda_1$ 722, 772 can be input to the active medium 708 on Waveguide A 702 in any manner of implementation, in addition to the input structures 706 and 756 described in FIGS. 8A and 8B. For example, it can impinge on the active medium from outside the waveguides (e.g. from the top at a direction perpendicular to waveguide A).

Since the active medium 708 of devices 700, 750 of FIGS. 8A and 8B is operated at the absorbing or loss mode, this phosistor has a "loss gate". This gate is in the input arm (Waveguide A 702).

It should be understood that due to the signal inversion of this device, i.e. a pulse at $\lambda_1$ in ("high" energy) causes a negatively going signal pulse of light at $\lambda_2$ out ("low" energy), and, conversely, while no pulse at $\lambda_1$ is input ("low" energy), a pulse at $\lambda_2$ will be output ("high" energy). Thus, this device can function as an inverter.

iii). MMI/Resonator Configuration Device

It should be evident to those skilled in the art that the MMI/Resonator configuration for device 3 would be topologically similar to the MMI/Resonator configuration of Device 1. As in device 1, it should be understood that the MMI/Resonator Configuration Devices are otherwise functionally and operationally identical to the device 700 and descriptions and comments relating to the device 700 are generally applicable to the MMI/Resonator Configuration Devices.

iv). PBG Implementation of the Coupler/MMI/Resonator Configuration Device

It should be evident to those skilled in the art that the PBG implementations for the Coupler/MMI/Resonator configuration of device 3 would be topologically similar to the PBG implementations for the Coupler/MMI/Resonator configuration of device 1. As in device 1, it should be understood that the PBG implementations for the Coupler/MMI/Resonator configuration of device 3 are otherwise functionally and operationally identical to the device 700 and descriptions and comments relating to the device 700 are generally applicable to the PBG implementations for the Coupler/MMI/Resonator configuration of device 3.

It should be understood that, as in the above embodiments, the dimensions and materials for the devices are presented for purposes of illustrating a useful embodiment of the device 700 and its MMI/PBG/Resonator versions, and are not intended to limit other exemplary embodiments of any exemplary device, or the device 700 its MMI/PBG/Resonator versions. A variety of dimensions and sizes can be used, depending on the application desired as well as the fabrication materials, processes or technologies that are employed. A variety of materials can be used, for examples, the waveguides do not have to be semiconductor and may be optical fibers or polymer waveguides (as long as the requisite waveguiding or wave-coupling effect is achieved), the active medium does not have to be semiconductor or quantum well but can be erbium ions doped in glass or active polymers (as long as the requisite gain/loss/transparency properties are achived), and the resonators do not have to be semiconductor but can be glass or polymers (as long as the requisite resonance effect is achieved). Also, it should be understood that the shape of the Waveguides, MMI Structures, Photonic Bandgap Structures, or Resonators do not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

It should be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the working of these devices include those cases whereby both the gain/transparency/loss property as well as the refractive-index property of the active medium are used in bringing about the device operation.

D. Exemplary Device 4

Figure 9:
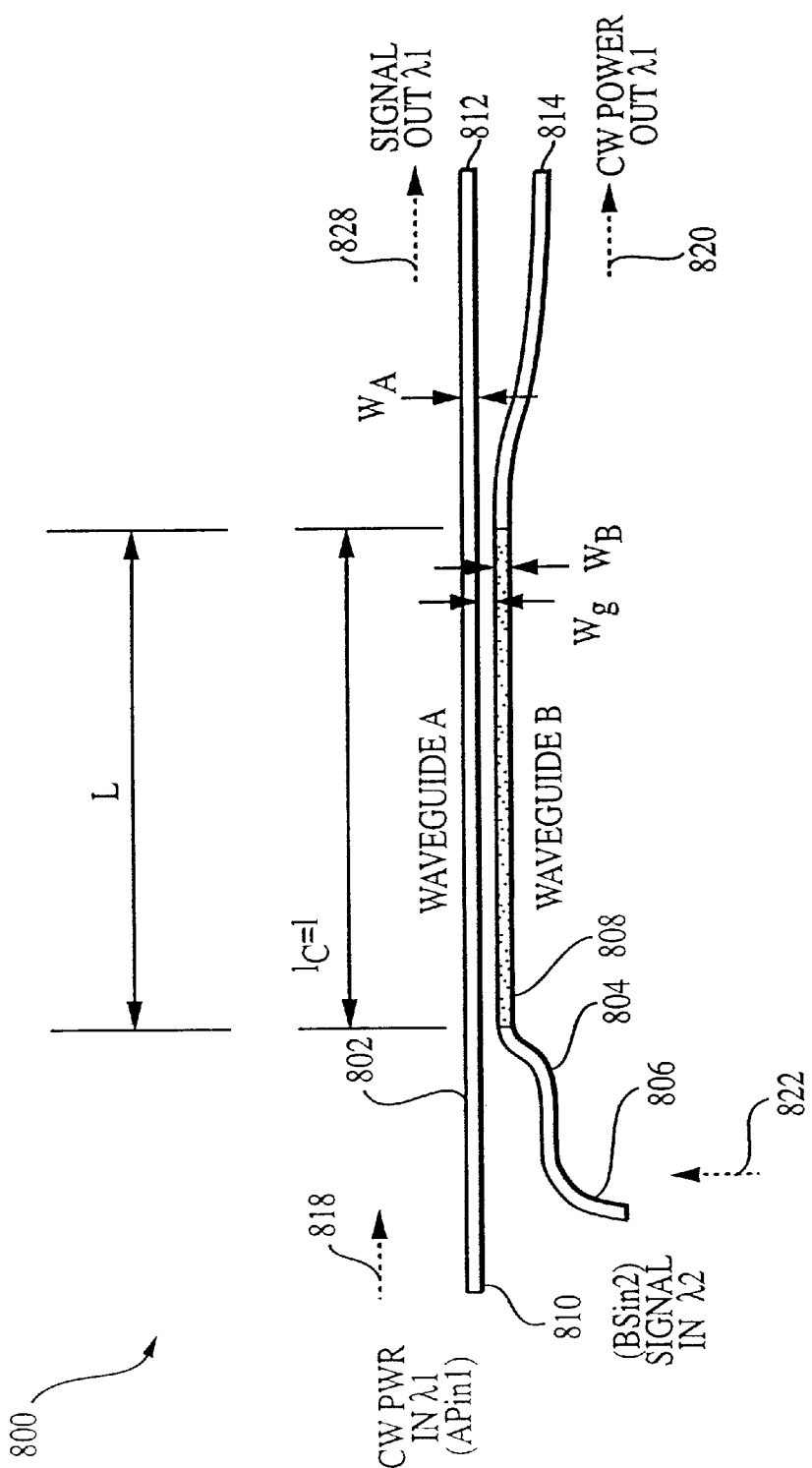
FIG. 9 illustrates an embodiment of a fourth exemplary phosistor device utilizing directionally coupled waveguides.

FIG. 9 illustrates a fourth general embodiment 800 of a phosistor device employing directionally coupled waveguides. This device has very similar geometry to exemplary device 2 but with the active medium operated in the gain mode, the device can perform as a switching element and can in particular switch or convert a stream of slow or ultrafast (picosecond, femtosecond) optical pulses at high energy and short wavelength to a stream of slow or ultrafast optical pulses at comparatively low energy (comparatively long wavelength). The device 800 is not limited to use as a switching element and can be utilized, for example, as an all-optical logic gate, a light intensity amplifier, a photon duplicator, a light intensity modulator, a light intensity regulator, an optical phase shifter, a lossless signal tap, an optical detector, and a variable optical attenuator. It should be understood that these exemplary applications of device 800 are intended to illustrate the wide range of uses for device 800, and are not intended to limit the applications of other exemplary embodiments of device 800 to these examples. The device can be referred to as an "Output-Arm-Gain-Gate High-to-Low-Energy Phosistor" (OGHL Phosistor 800).

OGHL Phosistor 800 preferably includes a first pathway of light consisting of the spatial region occupied by Waveguide A 802 and a second pathway of light consisting of the spatial region occupied by Waveguide B 804. The Waveguide B 804 preferably includes an active medium 808. As described above, Waveguide B 804 can be implemented as waveguide 430 with active medium 420 and Waveguide A 802 can be implemented as waveguide 400 in a useful embodiment. The Waveguide A 802 preferably includes an input port APin1 810 and an output port ASout1 812. The Waveguide B 804 preferably includes an input port BSin2 806 and an output port BPout1 814 which doubles as a possible input port (not shown in FIG. 9). FIG. 9 illustrates that Waveguide A 802 has width $W_A$ and is located at an approximately parallel distance (coupling gap or distance) $W_g$ from Waveguide B 804, which has width $W_B$, so that a wave in Waveguide A can be coupled to a wave in Waveguide B. The terms "wave" and "light beam" are used interchangeably.

For the input port labeled "APin1" (810), "P" stands for Power-Supply beam, "A" refers to Waveguide A 802, "in" refers to 810 being an input port, and "1" refers to the input wavelength being $\lambda_1$. For the output port labeled "ASout1" (812), "S" stands for Signal beam, "A" refers to Waveguide A 802, "out" refers to 812 being an output port, "1" refers to the output wavelength being $\lambda_1$. For the input port labeled "BSin2" (806), "S" stands for Signal beam, "B" refers to Waveguide B 804, "in" refers to 806 being an input port, and "2" refers to the input wavelength being $\lambda_2$. For the output port labeled "BPout1" (814), "P" stands for Power-Supply beam, "B" refers to Waveguide B 804, "out" refers to 814 being an output port, and "1" refers to the output wavelength being $\lambda_1$.

The input port APin1 810 on the Waveguide A 802 is configured to receive continuous wave (CW) light 818 having wavelength $\lambda_1$ (at $\lambda_1$) (CW PWR IN $\lambda_1$). Under certain condition described below when the active medium on the waveguide reaches transparency and Waveguides A and B are optically transparent, most of the CW light at $\lambda_1$ 818 propagating along the Waveguide A 802 will be transferred to Waveguide B 804 after a coupling length $l_C$. The CW light at $\lambda_1$ 818 then exits from Waveguide B 804 at the port BPout1 814 as CW light at $\lambda_1$ (CW POWER OUT) 820.

The coupling length is defined as the length at which a wave in one waveguide maximally couples into another waveguide that is coupled to the first waveguide. In this device 800, the interaction length l, defined as the length of interaction between Waveguides A 802 and B 804, is equal to the full coupling length $l_C$ so that $l=l_C$.

As shown in FIG. 9, the length L of the active medium 808 is about the interaction length l (L≅l). The length L of the active medium 808 may be somewhat longer or shorter than l. Varying the length L of the active medium 808 relative to the interaction length l will vary the input to output signal conversion efficiency but will otherwise not affect the general operating principle of the device.

It should be understood that these dimensions, exemplary lengths, and geometry are presented for purposes of illustrating a useful embodiment of the device 800 and are not intended to limit other exemplary embodiments of any exemplary device, or the device 800. A variety of dimensions, sizes, and geometry can be used, depending on the application desired as well as the fabrication materials, processes or technologies that are employed. For example, while the choice of $l=l_C$ is illustrated in this exemplary device, the interaction length may vary from the coupling length $l_C$ (or multiple odd numbers of $l_C$) without affecting the general operating principle of the device.

Also, it should be understood that the shape of the waveguides do not generally have to be linear. Curved shapes and different waveguide dimensions may be utilized as long as they achieve the same functions such as waveguiding and wave-coupling. The active medium can be centered at an alternative location along waveguide B other than that illustrated in FIG. 9, and there may be more than one disconnected active medium areas along waveguide B. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same widths and dimensions as long as the desired effect of wave-coupling is achieved.

In an exemplary embodiment of device 800, for operation at 800 nm wavelength range, the wavelength $\lambda_1$ can be at 820 nm, $\lambda_2$ can be at 800 nm, and the Waveguides A 802 can be implemented as the Waveguide 400 illustrated in FIG. 5A and waveguide B 804 can be implemented as Waveguide 430 with an active medium 420 illustrated in FIGS. 5B and 5C, in an $Al_xGa_{1-x}As$ embodiment having alloy composition x=0.3 giving a bandgap energy of around 690 nm. Thus the core material is transparent at the wavelength $\lambda_2$ of 800 nm. The active medium absorbs light at 800 nm and 820 nm wavelengths when the active medium is fully de-excited, and corresponds to an essentially three-level medium described in FIGS. 4A–D for which electrons are free to relax from the upper-energy level corresponding to the 800 nm absorption to the upper-energy level corresponding to the 820 nm absorption.

In an exemplary embodiment of devices 800, for operation at 1500 nm wavelength range, the wavelength $\lambda_1$ can be at 1500 nm, $\lambda_2$ can be at 1480 nm, and the Waveguide A 802 can be implemented as the Waveguide 400 illustrated in FIG. 5A and Waveguide B 804 can be implemented as the Waveguide 430. Both have an active medium 420 illustrated in FIGS. 5B and 5C, in an $\underline{In_{1-x}Ga_xAs_{1-y}P_y}$ embodiment having alloy compositions x=0.16 and y=0.67 giving a bandgap energy of around 1100 nm. Thus the core material is transparent at the wavelength $\lambda_1$ of 1480 nm. The active medium absorbs light at 1480 nm and 1500 nm wavelengths when the active medium is fully de-excited, and corresponds to an essentially three-level medium described in FIGS. 4A–D for which electrons are free to relax from the upper-energy level corresponding to the 1480 nm absorption to the upper-energy level corresponding to the 1500 nm absorption.

In an exemplary embodiment for operation at the 1500 nm wavelength range, the cross-sectional dimensions of the waveguide 400 are 0.4 μm wide by 0.25 μm thick. FIG. 9 illustrates that Waveguide A 802 has width $W_A$ and is located at an approximately parallel distance (coupling gap or distance) $W_g$ from Waveguide B 804, which has width $W_B$. In this exemplary embodiment, the Waveguide A 802 has width $W_A$ equal to 0.4 μm and is located at an approximately parallel distance $W_g$ from Waveguide B 804 of 0.4 μm, while Waveguide B 804 has width $W_B$ equal to 0.4 μm. In this exemplary embodiment, $l_C$ and l are each 15 μm.

It should be understood that these dimensions, exemplary lengths, and geometry are presented for purposes of illustrating a useful embodiment of the device 800 and are not intended to limit other exemplary embodiments of any exemplary device, or the device 800. A variety of dimensions, sizes, and geometry can be used, depending on the application desired as well as the fabrication materials, processes or technologies that are employed.

i). Exemplary Device Operation

There are various modes for which this device may function. Below, we will describe three exemplary and useful operating modes of the device.

First Exemplary Operating Mode

In the first exemplary and useful operating mode of the device, continuous wave (CW) light having wavelength $\lambda_1$ (at $\lambda_1$) (CW PWR IN $\lambda_1$) 818 enters at the port APin1 810 on the Waveguide A 802. In the initial state, the active medium 808 along Waveguide B 804 is not excited and is in the state of loss analogous to Case A, as illustrated in FIG. 4A. The CW light at $\lambda_1$ 818 propagates along the Waveguide A 802 and some of its energy is leaked to Waveguide B 804 through evanescent coupling. As the portion of CW light at $\lambda_1$ 818 reaches the active medium 808 on Waveguide B, it drives the active medium 808 to a state of transparency at $\lambda_1$. The intensity of $\lambda_1$ must be high enough so that $I_1 > (1/\eta) I_{1Sat}$. That is, the intensity of the light at $\lambda_1$ must exceed the saturation intensity divided by η, the effective percentage of leakage power to the Waveguide B 804 needed to bring the active medium in waveguide B to the state of transparency when there is no pulsed light at $\lambda_2$ 822 entering the port BSin1 806 (i.e., an input off state). This state of the active medium 808 is analogous to Case C, as illustrated in FIG. 4C.

The input port BSin2 806 on Waveguide B 804 is the input signal port for pulsed light having wavelength $\lambda_2$ (SIGNAL IN $\lambda_2$) 822. The pulsed light $\lambda_2$ 822 entering the port BSin2 806 will excite the active medium 808, providing gain at the operating wavelength $\lambda_1$ to the active medium 808 located in Waveguide B 804. This state of the active medium 808 is analogous to Case B, as illustrated in FIG. 4B. The CW light at $\lambda_1$ 818 from input port APin1 810 gains energy in the active medium 808 so that a portion of the CW light at $\lambda_1$ 818 does not transfer to Waveguide B 804 and thus does not exit from the output BPout1 814. Rather, this portion of the CW light at $\lambda_1$ 818 propagates through Waveguide A 802 and exits out of output port ASout1 812 as a pulse of light at $\lambda_1$ (SIGNAL OUT $\lambda_1$) 828.

When pulsed light at $\lambda_2$ 822 is removed, the active medium will be driven back to the transparency state at $\lambda_1$ (Case D in FIG. 4D) by the light at $\lambda_1$ 818 passing through the loss or absorbing medium 808, and most of CW light at $\lambda_1$ 818 will transfer to Waveguide B 804 and thus will again exit from the output on BPout1 814. The net effect in this first exemplary and useful operating mode of the device of FIG. 9 is that in the initial state, most of the CW light at $\lambda_1$ 818 from input port APin1 810 couples to Waveguide B 804 and exits out of output port BPout1 814 as CW $\lambda_1$ 820. The pulsed light at $\lambda_2$ 822 into port BSin2 806 generates a positively going pulse of light at $\lambda_1$ 828 exiting port ASout1 812 and a positively going pulse of light at $\lambda_1$ 820 exiting port BPout1 814. Upon cessation of the pulsed light at $\lambda_2$ 822, the light at $\lambda_1$ 828 returns to its initial state and most of the light at $\lambda_1$ 828 exits out of output port BPout1 814 as CW $\lambda_1$ 820.

Second Exemplary Operating Mode

In the second exemplary and useful operating mode of the device, the intensity of $\lambda_1$ 818 is lower than the intensity required to driving the active medium to the state of transparency at $\lambda_1$. In this case the CW light at $\lambda_1$ 818 will not drive the medium to transparency by itself. In the absent of the pulsed light at $\lambda_2$ 822 the active medium along waveguide B 804 will decay back to the state of loss at $\lambda_1$. As a result, most of the CW light at $\lambda_1$ 818 will not transfer from Waveguide A 802 to waveguide B 804 and will instead propagate along Waveguide A 802 and have most of its energy exiting port ASout1 812. When pulsed light $\lambda_2$ 822 is introduced with an appropriate light intensity, the pulsed light $\lambda_2$ 822 entering the port BSin2 806 will excite the active medium 808, providing transparency at the operating wavelength $\lambda_1$ to the active medium 808 along Waveguide B 804. This state of the active medium 808 is analogous to Case C, as illustrated in FIG. 4C. After the active medium is in the state of transparency, most of the energy of the CW light at $\lambda_1$ 818 from input port APin1 810 will transfer from Waveguide A 802 to Waveguide B 804 and will exit from the output BPout1 814. The net effect in this second exemplary and useful operating mode of the device of FIG. 9 is that in the initial state, most of the CW light at $\lambda_1$ 818 from input port APin1 810 propagates through Waveguide A 802 and exits out of output port ASout1 812 as CW $\lambda_1$ 828. The pulsed light at $\lambda_2$ 822 into port BSin2 806 generates a positively going pulse of light at $\lambda_1$ 820 exiting port BPout1 814 and a negatively going pulse of light at $\lambda_1$ 828 exiting port ASout1 812. Upon cessation of the pulsed light at $\lambda_2$ 822, and after the medium has enough time to decay to the state of loss, the light at $\lambda_1$ 828 returns to its initial state most of the light at $\lambda_1$ 828 exits out of output port ASout1 812 as CW $\lambda_1$ 828.

In order for light beam $\lambda_2$ 822 to interact with the active medium effectively, it may be desirable that they do not couple much of their energy from waveguide B to waveguide A, though such coupling will not affect the general operating principle of the device. This can be achieved for example by placing light beams $\lambda_2$ 822 in a polarization different from that of light beam $\lambda_1$ 818, and by having weak or negligible coupling between waveguides A and B for light beams $\lambda_2$ 822 but strong coupling for light beam $\lambda_1$ 818. That is, waveguides A and B a polarization dependent coupler. Alternatively, this can be achieved by having waveguides A and B be a mode selective coupler and by having light beams $\lambda_2$ 822 to be in a different propagating waveguide modes (e.g. to be in the first order propagating mode) from that of light beam $\lambda_1$ 818 (e.g. to be in the second order propagating mode).

Third Exemplary Operating Mode

In the third exemplary and useful operating mode of the device, the situation is essentially the same as the second operating mode of the device, except that the intensity of pulsed light $\lambda_2$ 822 is so high as to drive the active medium to a state of gain. This state of the active medium is analogous to Case B in FIG. 4B. In this case, CW light at $\lambda_1$ 818 from input port APin1 810, beside transferring part of its energy from Waveguide A 602 to Waveguide B 604, will gain energy in the active medium 808 of waveguide B so that a portion of the CW light at $\lambda_1$ 818 does not transfer to Waveguide B 804 and will propagate through Waveguide A 802 and exit out of output port ASout1 812 as a pulse of light at $\lambda_1$ (SIGNAL OUT $\lambda_1$) 828. The net effect in this third exemplary and useful operating mode of device of FIG. 9 is that in the initial state, most of the CW light at $\lambda_1$ 818 from input port APin1 810 propagates through Waveguide A 802 and exits out of output port ASout1 812 as CW $\lambda_1$ 828. The pulsed light at $\lambda_2$ 822 into port BSin2 806 generates a positively going pulse of light at $\lambda_1$ 820 exiting port BPout1 814 and a pulse of light at $\lambda_1$ 828 exiting port ASout1 812 that is a less negatively going pulse of light than that of the second operating mode, or even a positively going pulse of light, if the intensity of light at $\lambda_2$ 822 is high enough. Upon cessation of the pulsed light at $\lambda_2$ 822, and after the medium has enough time to decay to the state of loss, the light at $\lambda_1$ 828 returns to its initial state and most of the light at $\lambda_1$ 828 exits out of output port ASout1 812 as CW $\lambda_1$ 828.

ii). General Operation of the Device

Figure 9A:
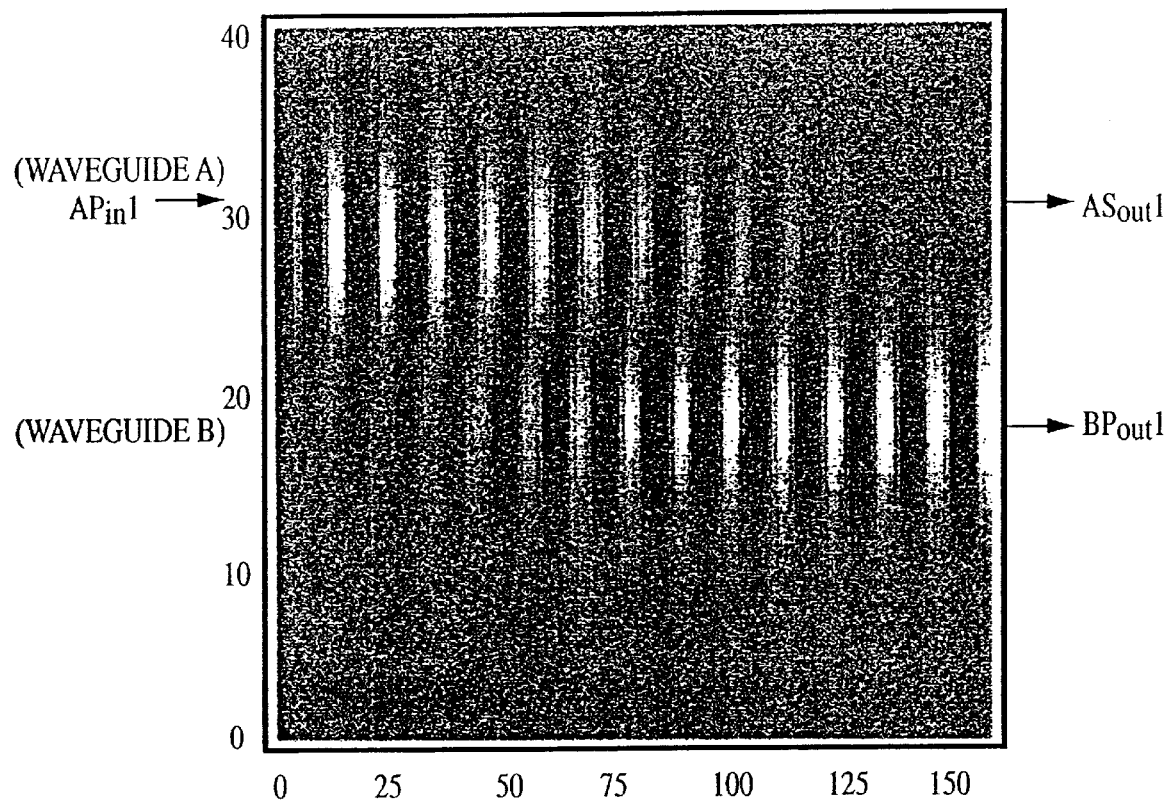
Figure 1:
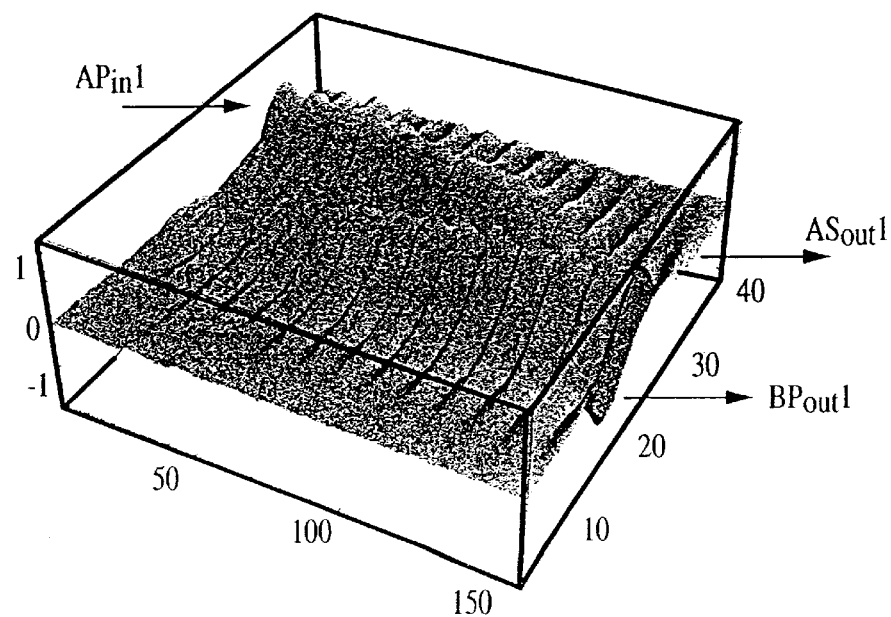
Figure 9A:
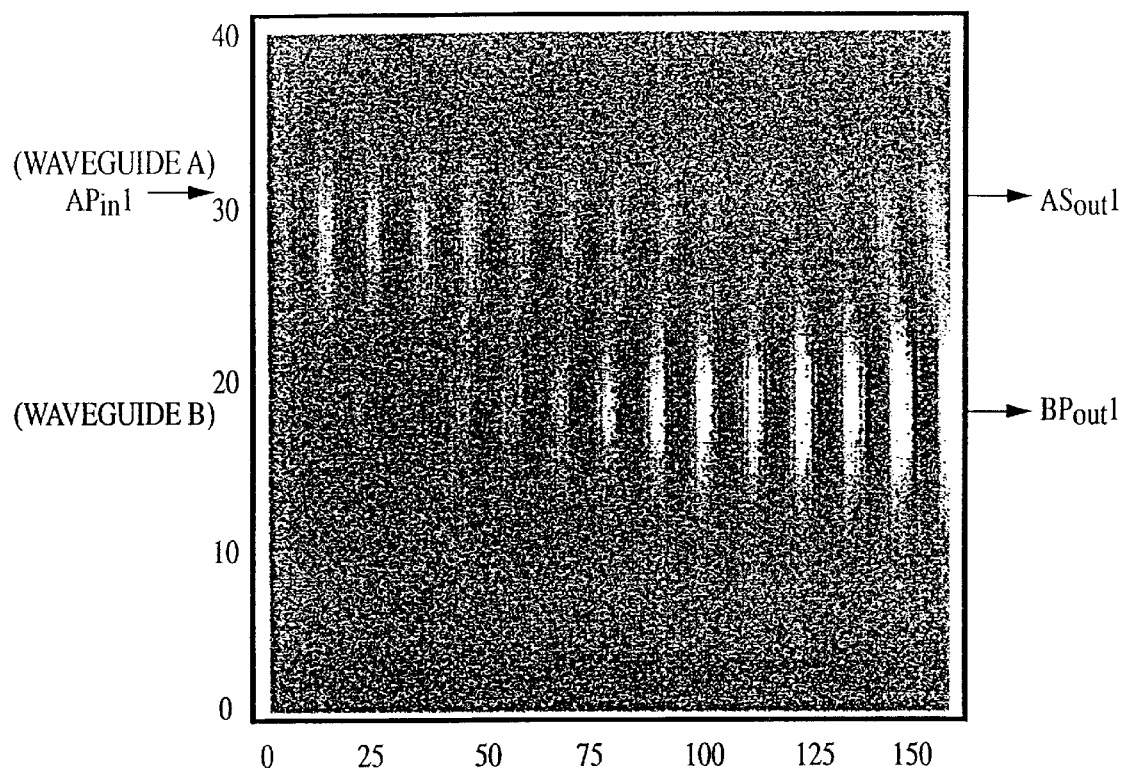
Figure 2:
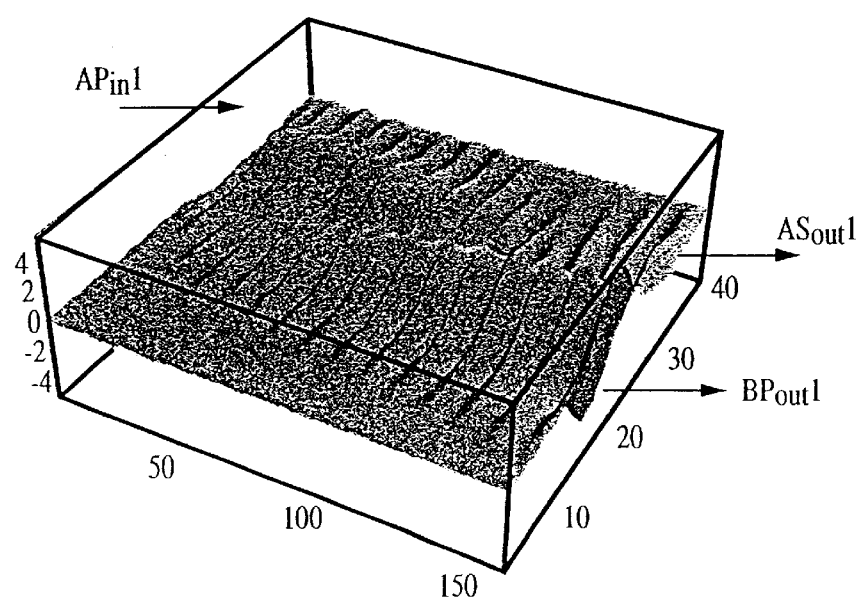
Figures 3, 9A:
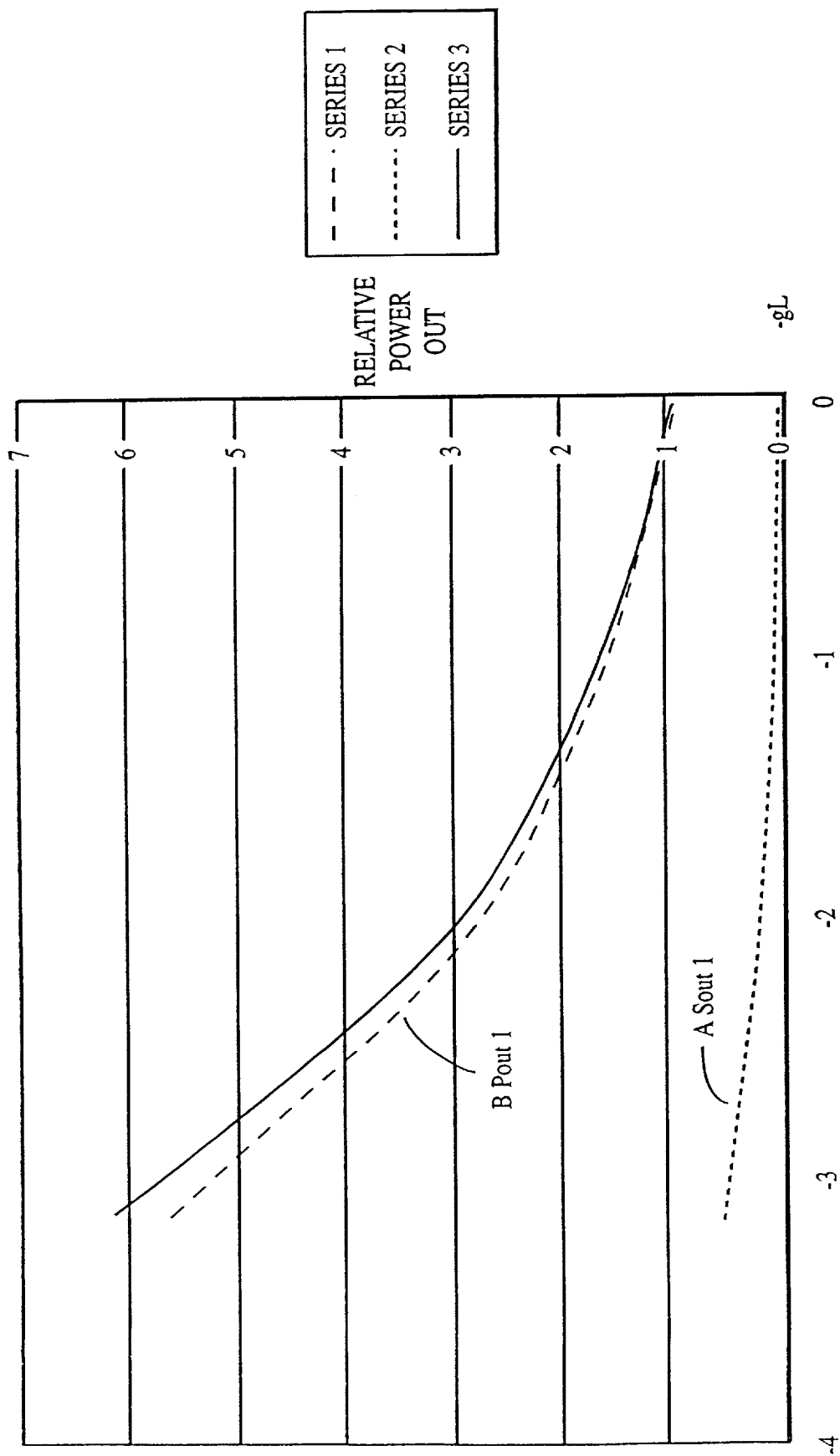

An exemplary operation of the device can be illustrated via the result of computer simulation as shown in FIGS. 9A-1 and 9A-2. FIGS. 9A-1 and 9A-2 show the spatial distribution of the electric field strength for the light input at $\lambda_2$ 818 after propagating into waveguides A and B. The upper parts of FIGS. 9A-1 and 9A-2 are 2-D plots for which the brightness shows the relative field strength, and the lower parts of FIGS. 9A-1 and 9A-2 are 3-D plots for which the heights show the relative field strength. FIG. 9A-3 shows the relative power at the output ports of waveguide A (port ASout2 812) and waveguide B (port BPout2 814) as a function of $-gL$ (the product of the loss coefficient $-g$ and the medium length L). In the figure, the output at ASout1 is shown as a dotted line, the output at BPout1 is shown as a dashed line, and the solid line is the sum of the outputs at ASout1 and BPout1 (i.e. the dashed line plus the dotted line). FIG. 9A-1 shows the situation when the gain medium is in the state of transparency (at a loss coefficient of 0 per $\mu$m or $-gL=0$). From FIG. 9A-1, it is evident that most of the energy of $\lambda_2$ 818 exits from Waveguide B 804 at the port BPout2 814. FIG. 9A-2 shows the situation when the medium is excited to the state of gain at $\lambda_1$ by the pulsed light at $\lambda_2$ 822 (at a gain coefficient of about 0.1 per $\mu$m or $gL=1.5$). From FIG. 9A-2, it is evident that additional energy of $\lambda_1$ exits from Waveguide A. FIG. 9A-1 and FIG. 9A-2 show the two representative interference flux patterns of light for the device, which are dependent on the state of the active medium. In particular, one can switch between these two representative interference flux patterns of light by changing the state of the active medium through the action of another light beam.

iii). Comments

In should be understood that in the typical operation of Phosistors, including the useful embodiment 800, one or more light inputs and outputs are described as continuous wave (CW) light. The light can otherwise be a pulsed light in some specific applications. For the purpose of illustration and not limitation the light is taken as CW light.

It should also be understood that the speed of switching can be fast as the active medium 808, when in the gain state at $\lambda_1$ (Case B in FIG. 4B), will be driven back to the transparency state at $\lambda_1$ (Case C in FIG. 4C) rapidly by the light at $\lambda_1$ 818 passing through the gain medium 808 when pulsed light at $\lambda_2$ 822 is removed. The state of the active medium 808 is again analogous to Case C, as illustrated in FIG. 4C.

Furthermore, it should be understood that the pulsed light at $\lambda_2$ 822 can be input to the active medium 808 on Waveguide B 804 in any manner of implementation. For example, it can impinge on the active medium from outside the waveguides (e.g. from the top at a direction perpendicular to waveguide B). Furthermore, the pulsed light at $\lambda_2$ 822 can also enter either input port BSin2 806 or output port BPout1 814 which doubles as a possible input port (not shown in FIG. 9). The problem of any mixing of light that might occur can be addressed with use of a dichroic filter or coupler (not shown). As in device 2, alternatively, a polarization dependent coupler or a mode-selective coupler can be used instead of a dichroic filter or coupler.

Since the active medium 808 of device 800 of FIG. 9 is operated at the gain mode, this phosistor has a "gain gate". This gate is in the output arm (Waveguide B 804).

iv). Exemplary Device 4 as a Wavelength Multiplexer/De-Multiplexer or Wavelength Selective Switch In another useful embodiment of device 4, the waveguide A and B have unequal widths $W_A$ and $W_B$. As is well known to those skilled in the art, waveguide couplers with unequal waveguide widths will have strong wavelength sensitivity. In particular, when the active medium is in the transparency state, only certain wavelengths of light will couple maximally from waveguide A to waveguide B, thus allowing the device to act not only as a switch but as a wavelength selective switch. Except for the difference in the waveguide widths providing wavelength sensitivity, this embodiment of the device is otherwise functionally and operationally identical to the device 800 and descriptions and comments relating to the device 800 are generally applicable to this device.

v). Multiple Waveguide Version of Device 4

As a variation of geometry, device 4 can be realized in the form of a multiple waveguide device such as a three-waveguide structure. It should be evident to those skilled in the art that the three-waveguide device for device 4 would be topologically similar to the three-waveguide device of Device 2. As in device 2, it should be understood that the three-waveguide device is otherwise functionally and operationally identical to the device 800 and descriptions and comments relating to the device 800 are generally applicable to the three-waveguide device. As in device 2, such a three-waveguide device can be generalized to a multiple-waveguide device.

vi). MMI/Resonator Configuration Device

It should be evident to those skilled in the art that the MMI/Resonator I/Resonator II configuration for device 4 would be topologically similar to the MMI/Resonator I/Resonator II configuration of Device 2. As in device 2, it should be understood that the MMI/Resonator I/Resonator II Configuration Devices are otherwise functionally and operationally identical to the device 800 and descriptions and comments relating to the device 800 are generally applicable to the MMI/Resonator I/Resonator II Configuration Devices.

vii). PBG Implementation of the Coupler/MMI/Resonator Configuration Device

It should be evident to those skilled in the art that the PBG implementations for the Coupler/MMI/Resonator I/Resonator II configuration of device 4 would be topologically similar to the PBG implementations for the Coupler/MMI/Resonator I/Resonator II configuration of device 2. As in device 2, it should be understood that the PBG implementations for the Coupler/MMI/Resonator I/Resonator II configuration of device 4 are otherwise functionally and operationally identical to the device 800 and the descriptions and comments relating to the device 800 are generally applicable to the PBG implementations for the Coupler/MMI/Resonator I/Resonator II configuration of device 4.

It should be understood that, as in the previous embodiment, the dimensions and materials for the devices are presented for purposes of illustrating a useful embodiment of the device 800 and its MMI/PBG/Resonator versions, and are not intended to limit other exemplary embodiments of any exemplary device, or the device 800 its MMI/PBG/Resonator versions. A variety of dimensions and sizes can be used, depending on the application desired as well as the fabrication materials, processes or technologies that are employed. A variety of materials can be used, for examples, the waveguides do not have to be semiconductors and may be optical fibers or polymer waveguides (as long as the requisite waveguiding or wave-coupling effect is achieved), the active medium does not have to be a semiconductor or quantum well but can be erbium ions doped in glass or active polymers (as long as the requisite gain/loss/transparency properties are achived), and the resonators do not have to be semiconductors but can be glass or polymers (as long as the requisite resonance effect is achieved). Also, it should be understood that the shape of the Waveguides, MMI Structures, Photonic Bandgap Structures, or Resonators does not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

It should also be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the working of these devices include those cases whereby both the gain/transparency/loss property as well as the refractive-index property of the active medium are used in bringing about the device operation.

E. Exemplary Device 5: A Flip-Flop Based on Exemplary Device 2

Several versions of Photonic Flip-Flops, Photonic logic gates, and Photonic Random Access Memory (RAM) with latching, enable, and reset devices can be constructed and implemented utilizing the exemplary embodiments 1 through 4.

Figure 10:
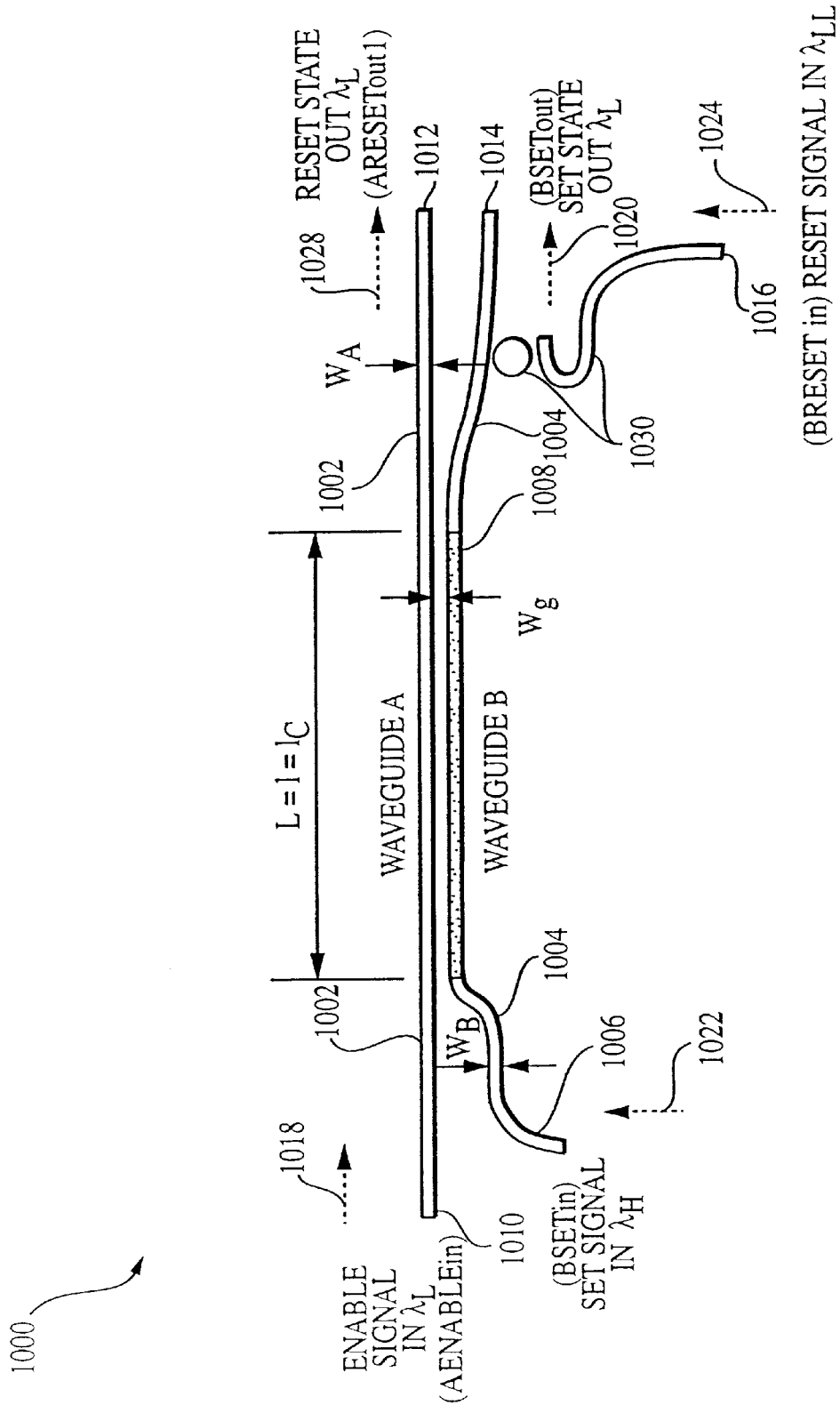
FIG. 10 illustrates an embodiment of a fifth exemplary phosistor device implementing a phosistor flip-flop gate based on the second exemplary phosistor device and utilizing directionally coupled waveguides.

For example, FIG. 10 illustrates a fifth general embodiment 1000 of a phosistor device employing directionally coupled waveguides. The device can operate as a flip-flop or storage element by management of, including optional switching of, streams of slow or ultrafast (picosecond, femtosecond) optical pulses of equivalent, comparable, or differing energies and wavelengths. The device can be referred to as a "Flip-Flop Memory State Phosistor" and in this exemplary embodiment 1000 as an "Output-Arm-Loss-Gate High-or-Low Energy Flip-Flop Phosistor".

Phosistor 1000 preferably includes a first pathway of light consisting of the spatial region occupied by Waveguide A 1002 and a second pathway of light consisting of the spatial region occupied by Waveguide B 1004. The Waveguide B 1004 preferably includes an active medium 1008. As described above, Waveguide B 1004 can be implemented as waveguide 400 with active medium 420 (see FIG. 5A) in a useful embodiment.

In an exemplary embodiment, the Waveguides A and B 1002, 1004 can each be implemented as the Waveguide 400 illustrated in FIG. 5A, in an $Al_xGa_{1-x}As$ embodiment having alloy composition x at 0.3 giving a bandgap energy of around 690 nm.

In an exemplary embodiment, the cross-sectional dimensions of the waveguide 400 are 0.4 μm wide by 0.25 μm thick. FIG. 10 illustrates that Waveguide A 1002 has width $W_A$ and is located at an approximately parallel distance (coupling gap or distance) $W_g$ from Waveguide B 1004, which has width $W_B$. In an exemplary embodiment, the Waveguide A 1002 has width $W_A$ equal to 0.4 μm and is located at an approximately parallel distance $W_g$ from Waveguide B 1004 of 0.4 μm, while Waveguide B 1004 has width $W_B$ equal to 0.4 μm.

It should be understood that these dimensions and exemplary lengths are presented for purposes of illustrating a useful embodiment of the device 1000 and are not intended to limit other exemplary embodiments of any exemplary device, or the device 1000. A variety of dimensions and sizes can be used, depending on the application desired as well as the fabrication materials, processes or technologies that are employed. Also, it should be understood that the shape of the waveguides does not generally have to be linear. Curved shapes and different waveguide dimensions may be utilized as long as they achieve the same functions such as waveguiding and wave-coupling. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel as long as the desired effect of wave-coupling is achieved.

The coupling length $l_C$ is defined as the length at which a wave in one waveguide maximally couples into another waveguide that is coupled to the first waveguide. In this device 1000, the interaction length l, defined as the length of interaction between Waveguides A 1002 and B 1004, is approximately equal to the full coupling length $l_C$ so that $l=l_C$. In an exemplary embodiment, $l_C$ and l are each 15 μm. As shown in FIG. 10, the length L of the active medium 1008 is about the interaction length l (L≈l). The length L of the active medium 1008 may be somewhat longer or shorter than l. Varying the length L of the active medium 1008 relative to the interaction length l will vary the input to output signal conversion efficiency but will otherwise not affect the general operating principle of the device.

It should be understood that these dimensions and exemplary lengths are presented for purposes of illustrating a useful embodiment of the device 1000 and are not intended to limit other exemplary embodiments of any exemplary device, or the device 1000. A variety of dimensions and sizes can be used, depending on the application desired as well as the fabrication materials, processes or technologies that are employed. For example, while the choice of $l=l_C$ is illustrated in this exemplary device, the interaction length may vary from the coupling length $l_C$ (or multiple odd numbers of $l_C$) without affecting the general operating principle of the device.

The Waveguide A 1002 preferably includes an input port AENABLEin 1010 and an output port ARESETout 1012. The Waveguide B 1004 preferably includes an input port BSETin 1006 and an output port BSETout 1014 which can double as an input port for a "reset pulse" (this case is not illustrated in FIG. 10). While not essential for the basic operation of this flip-flop phosistor, a frequency-selective coupler such as a grating or a small resonator can be used to couple a "reset" pulse. Alternatively, a polarization dependent beam splitter or coupler that can be used to couple the "reset" pulse of light pulses of different polarization are utilized to operate the device. Or as in device 1 or 2, alternatively, a mode-selective coupler can be used instead of the polarization dependent coupler. In the version of the Phosistor 1000 illustrated in FIG. 10, a dichroic filter 1030 is used to couple a "reset" pulse entering an input port BRESETin 1016 to the Waveguide B. It should be understood that embodiments of the Phosistor 1000 are not limited to the use of this frequency-selective filter. In other embodiments, for example, Waveguide B 1004 is capable of receiving a "reset" pulse into port 1006, 1014 or both, with no separate frequency dependent coupler or filter. Still other embodiments use one or more frequency dependent couplers or filters to couple input signals, including but not limited to "reset" pulses into the appropriate waveguide.

The input port AENABLEin 1010 on the Waveguide A 1002 is configured to receive pulsed light having wavelength $\lambda_L$ (at $\lambda_L$) (ENABLE SIGNAL IN $\lambda_L$) 1018. The pulsed light at $\lambda_L$ 1018 can be referred to as an "enable" signal since the introduction of this signal sends the flip-flop Phosistor 1000 into an "enable" state, or "enables" the Phosistor 1000. Depending on the state of the Phosistor 1000, light can be output from the output port BSETout 1014 as pulsed light having wavelength $\lambda_L$ (SET STATE OUT $\lambda_L$) 1020. Light is also capable of being output from the output port ARESETout 1012 as pulsed light having wavelength $\lambda_L$ (RESET STATE OUT $\lambda_L$) 1028.

The input port BSETin 1006 on the Waveguide B 1004 is configured to receive pulsed light having wavelength $\lambda_H$ (SET SIGNAL IN $\lambda_H$) 1022. The pulsed light at $\lambda_H$ 1022 can be referred to as a "set" signal or pulse since the introduction of this signal sends the flip-flop Phosistor 1000 into a "set" state, or "sets" the Phosistor 1000. The input port BRESETin 1016 on the dichroic filter 1030 is configured to receive pulsed light having wavelength $\lambda_{LL}$ (RESET SIGNAL IN $\lambda_{LL}$) 1024. The pulsed light at $\lambda_{LL}$ 1024 can be referred to as a "reset" signal or pulse since the introduction of this signal sends the flip-flop Phosistor 1000 into a "reset" state, or "resets" the Phosistor 1000.

It should be understood that the output port BSETout 1014 of Waveguide B 1004 can also serve as the input signal port for pulsed light having wavelength $\lambda_H$ (SET SIGNAL IN $\lambda_H$) 1022. More generally, it should be understood that the pulsed light at $\lambda_H$ 1022 can be input to the active medium 1008 on Waveguide B 1004 in any manner of implementation. For example, it can impinge on the active medium from outside the waveguides (e.g. from the top at a direction perpendicular to waveguide B). Furthermore, the pulsed light at $\lambda_H$ 1022 can also enter either input port BSETin 1006 or output port BSETout 1014 which doubles as a possible input port (not shown in FIG. 10). The problem of any mixing of light that might occur can be addressed with use of a dichroic filter of coupler as described above for the input port BRESETin 1016 or by using light of mutually orthogonal polarization with use of a polarization dependent beam splitter or coupler. Or as in device 1 or 2, alternatively, a mode-selective coupler can be used instead of the polarization dependent coupler.

Exemplary device 2 600 of FIG. 7 was discussed above with reference to the way in which the device 600 could be switched between two states, the first state corresponding to Case "D" of FIG. 4D, and the second state corresponding to Case "C" of FIG. 4C. In the case of Phosistor 1000, manipulating the intensity $I_L$ of the pulsed light at $\lambda_L$ 1018 can create an additional operational state corresponding to Case "A" of FIG. 4A. This operational state is exploited in Phosistor 1000.

In a preferred embodiment, the Phosistor 1000 operates as a flip-flop according to restrictions that are placed on the relative magnitudes of the operating wavelengths $\lambda_L$, $\lambda_H$, and $\lambda_{LL}$ of the light inputs 1018, 1022, and 1024, respectively. First, the pulsed light at $\lambda_H$ 1022 (i.e., the "set" beam) preferably has a wavelength $\lambda_H$ that is shorter than or equal to the wavelength $\lambda_L$ of the pulsed light at $\lambda_L$ 1018 (the "enable" beam), that is, $\lambda_H \leq \lambda_L$. Second, the pulsed light at $\lambda_{LL}$ 1024 (i.e., the "reset" beam) preferably has a wavelength that is longer than the wavelength $\lambda_L$ of the pulsed light at $\lambda_L$ 1018 as well as the pulsed light at $\lambda_H$ 1022, that is, $\lambda_{LL} > \lambda_L \geq \lambda_H$.

The former restriction ($\lambda_H \leq \lambda_L$) for the exemplary embodiment of Phosistor 1000 has implications with regard to the two general wavelengths $\lambda_1$ and $X_2$, where $\lambda_1$ has the longer wavelength as defined above with reference to exemplary devices 1–4. As such, the Phosistor 1000 can operate with $\lambda_L = \lambda_H = \lambda_1$, or $\lambda_L = \lambda_H = \lambda_2$, or $\lambda_L = \lambda_1$ and $\lambda_H = \lambda_2$.

i). The Enable State

For this Enable state of Phosistor 1000, the enable beam at $\lambda_L$ 1018 is turned "on," while the set beam at $\lambda_H$ 1022 and the reset beam at $\lambda_{LL}$ 1024 are both "off."

To create the first operational state of the Phosistor Flip-Flop 1000 the pulsed light at $\lambda_L$ 1018 (the "enable" beam) is turned "on" and is maintained at relatively low intensity so that the active medium 1008 will not be driven to transparency due to the small leakage from Waveguide A 1002 to Waveguide B 1004. The intensity $I_L$ of the light at $\lambda_L$ 1018 is kept purposely low enough so that $I_L < (1/\eta)I_{LSat}$, that is, the intensity $I_L$ does not exceed the saturation intensity divided by $\eta$, the effective percentage of leakage power to the Waveguide B 1004 needed to bring the active medium in waveguide B 1004 to the state of transparency when there is no set beam at $\lambda_H$ 1022 entering the port BSETin 1006. The enable beam at $\lambda_L$ 1018 does not have a high enough intensity to drive the active medium 1008 in Waveguide B 1004 to transparency at $\lambda_L$ by itself from Waveguide A 1002. In this situation, most of the power of the light beam at $\lambda_L$ will exit port ARESETout.

In this case, the active medium 1008 provides loss at $\lambda_L$ 1018. Essentially, the net result is that more electrons in the active medium 1008 relax from high energy states (i.e. spontaneously decay) than are excited to high energy states. This state of the active medium 1008 is analogous to Case A, as illustrated in FIG. 4A.

ii). The Set State

For this Set state of Phosistor 1000, the enable beam at $\lambda_L$ 1018 is "on," the set beam at $\lambda_H$ 1022 is turned "on," and the reset beam at $\lambda_{LL}$ 1024 remains "off." Once the set beam at $\lambda_H$ 1022 is turned "on," the Phosistor 1000 is "latched" and remains in the Set state, even if the set beam at $\lambda_H$ 1022 is turned "off," while the enable beam at $\lambda_L$ 1018 is "on" and until the Phosistor is "reset."

By itself, the enable beam at $\lambda_L$ 1018 does not have a high enough intensity to drive the active medium 1008 in Waveguide B 1004 to transparency at $\lambda_L$ from Waveguide A 1002. By design, the enable beam at $\lambda_L$ 1018 requires the assistance of the set beam at $\lambda_H$ 1022 to drive the active medium 1008 to transparency at $\lambda_L$. The set beam at $\lambda_H$ 1022 preferably has a wavelength $\lambda_H$ that is shorter than or equal to $\lambda_L$ as described above.

The set beam at $\lambda_H$ 1022 turns on and consequently drives the active medium 1008 to a state of transparency at $\lambda_L$. Now, the enable beam at $\lambda_L$ 1018 propagates along the Waveguide A 1002 and is subsequently transferred to propagate across the active medium in Waveguide B 1004 after the coupling length $l_C$. The enable beam at $\lambda_L$ 1018 then exits from Waveguide B 1004 at the port BSETout 1014 as light at $\lambda_L$ 1020. This state of the active medium 1008 is analogous to Case D, as illustrated in FIG. 4D.

In effect, the set beam at $\lambda_H$ 1022 latches the Phosistor 1000 flip-flop so that the active medium 1008 remains in a state of transparency at $\lambda_L$, even when the set beam at $\lambda_H$ 1022 is turned off and is no longer present. That is, the enable beam at $\lambda_L$ 1018 is purposely maintained at an intensity $I_L$ that is too low to drive the medium 1008 to transparency at $\lambda_L$ by itself, but the additional power latched to propagate through the active medium 1108 in Waveguide B 1004 by the set beam at $\lambda_H$ 1022 is sufficient to maintain the transparency at $\lambda_L$ once the set beam at $\lambda_H$ 1022 is turned off and is no longer present.

iii). The Reset State (Enable-1; Set=0; Reset=0→1→0)

For this Reset state of Phosistor 1000, the enable beam at $\lambda_L$ 1018 is "on," the set beam at $\lambda_H$ 1022 is turned "off," and the reset beam at $\lambda_{LL}$ 1024 is turned "on." Once the reset beam at $\lambda_{LL}$ 1024 is turned "on," the Phosistor 1000 is "unlatched" or "reset." When the reset beam at $\lambda_{LL}$ 1024 is turned "off," the Phosistor 1000 returns to the Enable state, while the enable beam at $\lambda_L$ 1018 is "on."

The reset beam at $\lambda_{LL}$ 1024 entering the port BRESETin 1016 will de-excite or relax the active medium 1008 on Waveguide B 1004, providing loss at the operating wavelength $\lambda_L$ to the active medium 1008. This state of the active medium 1008 is analogous to Case C, as illustrated in FIG. 4C.

The enable beam at $\lambda_L$ 1018 from input port AENABLEin 1010 loses energy in the active medium 1008 so that most of the pulsed light at $\lambda_L$ 1018 does not transfer to Waveguide B 1004 and thus does not exit from the output on BSETout 1014. Rather, most of the pulsed light at $\lambda_L$ 1018 propagates through Waveguide A 1002 and exits mainly out of output port ARESETout 1012 as pulsed light at $\lambda_L$ 1028 out of the first Waveguide A 1002.

In the case of FIG. 10, the net effect is that once the Phosistor 1000 is enabled by the enable beam at $\lambda_L$ 1018, application of a pulse of light at $\lambda_H$ 1022 (the set beam) into port BSETin 1006 generates light at $\lambda_L$ 1020 exiting port BSETout 1014. The Phosistor 1000 will remain latched in this set state until the application of a reset pulse of light at $\lambda_{LL}$ 1024, which in turn generates a light at $\lambda_L$ 1028 exiting port ARESETout 1012.

It should be understood that in accordance with standard logical operation of Set-Reset flip-flops, the Phosistor 1000 when utilized as a flip-flop, preferably, simultaneous application of set and reset pulses of light 1022, 1024, respectively, should be avoided.

It should be understood that in the typical operation of the Phosistors, including the useful embodiment 1000, one or more light inputs and outputs are described as pulsed light. This light can otherwise take the form of continuous wave (CW) light in some specific applications. For the purpose of illustration and not limitation it is taken as pulsed light.

Since the active medium 1008 of device 1000 of FIG. 10 is operated at the absorbing or loss mode, this phosistor has a "loss gate". This gate is in the output arm (Waveguide B 1004).

iv). MMI/Resonator Configuration Device

It should be evident to those skilled in the art that the MMI/Resonator I/Resonator II configuration for device 5 would be topologically similar to the MMI/ Resonator I/Resonator II configuration of Device 2. As in device 2, it should be understood that the MMI/Resonator I/Resonator II Configuration Devices are otherwise functionally and operationally identical to the device 1000 and descriptions and comments relating to the device 1000 are generally applicable to the MMI/Resonator I/Resonator II Configuration Devices.

v). PBG Implementation of the Coupler/MMI/Resonator Configuration Device

It should be evident to those skilled in the art that the PBG implementations for the Coupler/MMI/Resonator I/Resonator II configuration of device 5 would be topologically similar to the PBG implementations for the Coupler/ MMI/Resonator I/Resonator II configuration of device 2. As in device 2, it should be understood that the PBG implementations for the Coupler/MMI/Resonator I/Resonator II configuration of device 5 are otherwise functionally and operationally identical to the device 1000 and descriptions and comments relating to the device 1000 are generally applicable to the PBG implementations for the Coupler/ MMI/Resonator I/Resonator II configuration of device 5.

F. Exemplary Device 6: Flip-Flop Based on Exemplary Device 3

Another Photonic Flip-Flop can be constructed and implemented utilizing the exemplary device 3.

Figure 11:
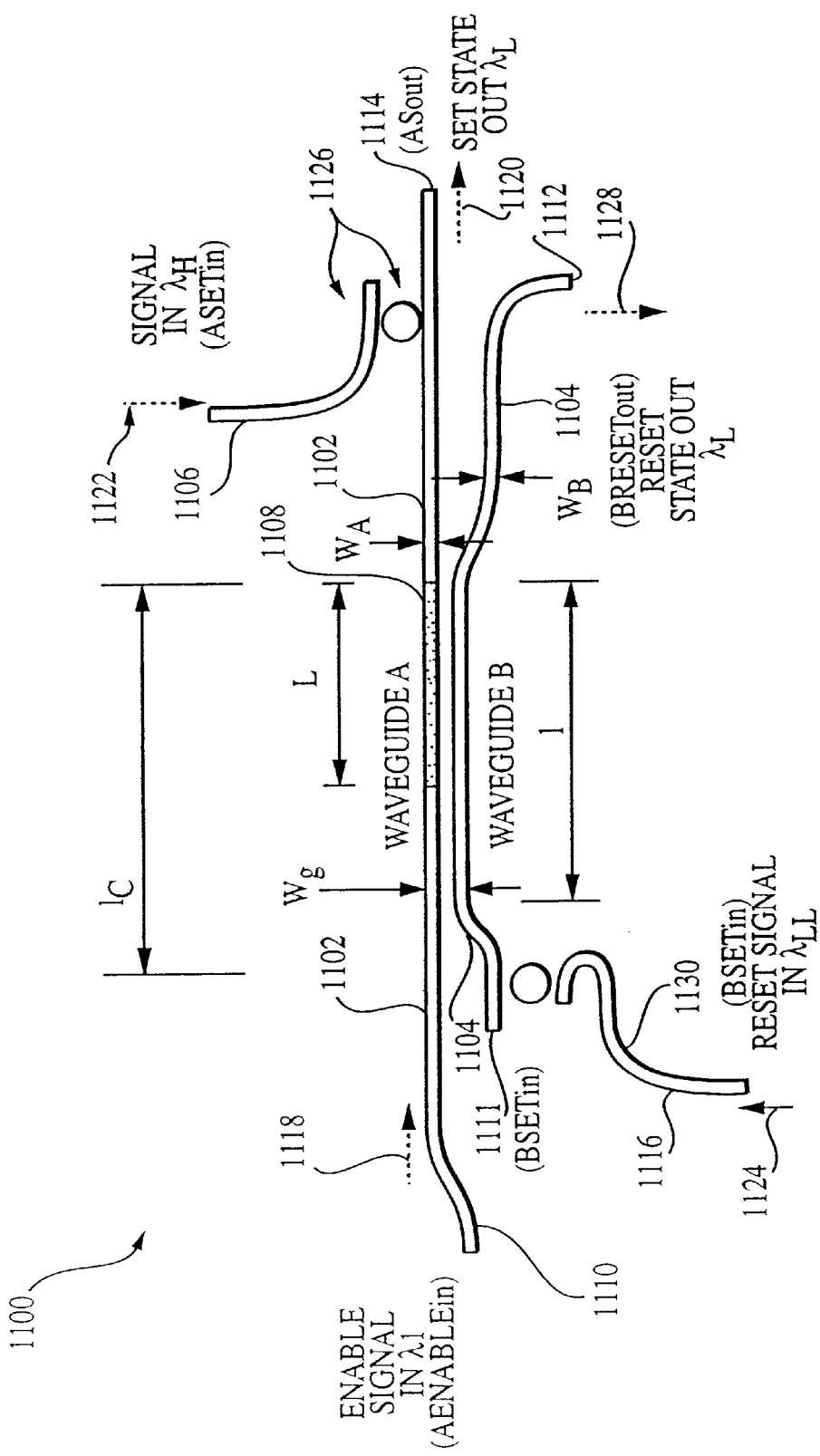
FIG. 11 illustrates an embodiment of a sixth exemplary phosistor device implementing a phosistor flip-flop gate based on the third exemplary phosistor device and utilizing directionally coupled waveguides.

For example, FIG. 11 illustrates a sixth general embodiment 1100 of a phosistor device employing directionally coupled waveguides. The device can operate as a flip-flop or storage element by management of, including optional switching of, streams of slow or ultrafast (picosecond, femtosecond) optical pulses of equivalent, comparable, or differing energies and wavelengths. The device can be referred to as a "Flip-Flop Memory State Phosistor" and in this exemplary embodiment 1100 as an "Input-Arm-Loss-Gate High-or-Low Energy Flip-Flop Phosistor".

Phosistor 1100 preferably includes a first pathway of light consisting of the spatial region occupied by Waveguide A 1102 and a second pathway of light consisting of the spatial region occupied by Waveguide B 1104. The Waveguide A 1102 preferably includes an active medium 1108. As described above, Waveguide B 1104 can be implemented as waveguide 400 with active medium 420 (see FIGS. 5B and 5C) in a useful embodiment.

In an exemplary embodiment, the Waveguides A and B 1102, 1104 can each be implemented as the Waveguide 400 illustrated in FIG. 5A, in an $Al_xGa_{1-x}As$ embodiment having alloy composition x at 0.3 giving a bandgap energy of around 690 nm.

In an exemplary embodiment, the cross-sectional dimensions of the waveguide 400 are 0.4 μm wide by 0.25 μm thick. FIG. 11 illustrates that Waveguide A 1102 has width $W_A$ and is located at an approximately parallel distance (coupling gap or distance) $W_g$ from Waveguide B 1104, which has width $W_B$. Preferably, the Waveguide A 1102 has width $W_A$ equal to 0.4 μm and is located at an approximately parallel distance $W_g$ from Waveguide B 1104 of 0.4 μm, while Waveguide B 1104 has width $W_B$ equal to 0.4 μm.

As with the previous embodiments, it should be understood that these dimensions and exemplary lengths are presented for purposes of illustrating a useful embodiment of the device 1100 and are not intended to limit other exemplary embodiments of any exemplary device, or the device 1100. A variety of dimensions and sizes can be used, depending on the application desired as well as the fabrication materials, processes or technologies that are employed. Also, it should be understood that the shape of the waveguides does not generally have to be linear. Curved shapes and different waveguide dimensions may be utilized as long as they achieve the same functions such as waveguiding and wave-coupling. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel as long as the desired effect of wave-coupling is achieved.

The coupling length $l_C$ is defined as the length at which a wave in one waveguide maximally couples into another waveguide that is coupled to the first waveguide. In this device 1100, the interaction length l, defined as the length of interaction between Waveguides A 1102 and B 1104, is less than the full coupling length $l_C$ so that $l<l_C$. In FIG. 11, the interaction section of Waveguides B 1104 and A 1102 is shown extending less than the full coupling length. In an exemplary embodiment, $l_C$ is 15 μm and l is 12 μm, so that $l<l_C$. As shown in FIG. 11, the length L of the active medium 1108 is about half the interaction length l (L≅½). The length L of the active medium 1108 may be somewhat longer or shorter than half of l. Varying the length L of the active medium 1108 relative to the interaction length l will vary the input to output signal conversion efficiency but will otherwise not affect the general operating principle of the device.

It should be understood that these dimensions and exemplary lengths are presented for purposes of illustrating a useful embodiment of the device 1100 and are not intended to limit other exemplary embodiments of any exemplary device, or the device 1100. A variety of dimensions and sizes can be used, depending on the application desired as well as the fabrication materials, processes or technologies that are employed. For example, while the choice of $l<l_C$ is illustrated in this exemplary device, other choices for the interaction length can be used to achieve similar device functions.

The Waveguide A 1102 preferably includes an input port AENABLEin 1110 for an "enable signal." The Waveguide B 1104 preferably includes an input port for a "reset pulse". While not essential for the basic operation of this flip-flop phosistor, a frequency-selective coupler such as a grating or a small resonator can be used to couple the "reset" pulse. Alternatively, a polarization dependent beam splitter or coupler can be used to couple the "reset" pulse if light pulses of different polarization are utilized to operate the device. In the version of the Phosistor 1100 illustrated in FIG. 11, a dichroic filter 1130 is used to couple the "reset" pulse entering an input port BRESETin 1116 to the Waveguide B 1104.

Preferably, the Waveguide A 1102 further includes an output port ASETout 1114 which can double as an input port for a "set pulse" (this case is not illustrated in FIG. 11). While not essential for the basic operation of this flip-flop phosistor, a frequency-selective coupler such as a grating or a small resonator, or a polarization dependent beam splitter or coupler can be used to couple the "set" pulse. Or as in device 1 or 2, alternatively, a mode-selective coupler can be used instead of the polarization dependent coupler. In the version of the Phosistor 1100 illustrated in FIG. 11, a dichroic filter 1126 is used to couple a "set" pulse into an input port ASETin 1106. Finally, the Waveguide B 1104 preferably includes an output port BRESETout 1112.

It should be understood that embodiments of the Phosistor 1100 are not limited to the use of the frequency-selective filters 1126, 1130. In other embodiments, for example, Waveguide A 1102 is capable of receiving "reset" or "set" pulses into ports 1110, 1114 or both, with no separate frequency dependent coupler or filter. Still other embodiments use one or more frequency dependent couplers or filters, or polarization dependent beam splitters or couplers to couple input signals, including but not limited to "reset" pulses and "set" pulses into the appropriate waveguide. Or as in device 1 or 2, alternatively, a mode-selective coupler can be used instead of the polarization dependent coupler.

The input port AENABLEin 1110 on the Waveguide A 1102 is configured to receive pulsed light having wavelength $\lambda_L$ (at $\lambda_L$) (ENABLE SIGNAL IN $\lambda_L$) 1118. The pulsed light at $\lambda_L$ 1118 can be referred to as an "enable" signal since the introduction of this signal sends the flip-flop Phosistor 1100 into an "enable" state, or "enables" the Phosistor 1100. Depending on the state of the Phosistor 1100, light can be output from the output port ASETout 1114 as pulsed light having wavelength $\lambda_L$ (SET STATE OUT $\lambda_L$) 1120. Light is also capable of being output from the output port BRESETout 1112 as pulsed light having wavelength $\lambda_L$ (RESET STATE OUT $\lambda_L$) 1128.

The input port ASETin 1106 on the dichroic filter 1126 is configured to receive pulsed light having wavelength $\lambda_H$ (SET SIGNAL IN $\lambda_H$) 1122. The pulsed light at $\lambda_H$ 1122 can be referred to as a "set" signal or pulse since the introduction of this signal sends the flip-flop Phosistor 1100 into a "set" state, or "sets" the Phosistor 1100. The input port BRESETin 1116 on the dichroic filter 1130 is configured to receive pulsed light having wavelength $\lambda_{LL}$ (RESET SIGNAL IN $\lambda_{LL}$) 1124. The pulsed light at $\lambda_{LL}$ 1124 can be referred to as a "reset" signal or pulse since the introduction of this signal sends the flip-flop Phosistor 1100 into a "reset" state, or "resets" the Phosistor 1100.

It should be understood, however, that the pulsed light at $\lambda_H$ 1122 can be input to the active medium 1108 on Waveguide A 1102 in any manner of implementation. For example, it can impinge on the active medium from outside the waveguides (e.g. from the top at a direction perpendicular to waveguide A). Furthermore, the pulsed light at $\lambda_H$ 1122 can also enter either input port BSETin 1111 or BRESETin 1116 or output port ASETout 1114 which doubles as a possible input port (not shown in FIG. 11). It should be further understood that the pulsed light at $\lambda_{LL}$ 1124 can be input to the active medium 1108 on Waveguide A 1102 in any manner of implementation. For example, it can impinge on the active medium from outside the waveguides (e.g. from the top at a direction perpendicular to waveguide A). Furthermore, e.g., the pulsed light at $\lambda_{LL}$ 1124 can also enter either input port BSETin 1111 or BRESETin 1116 or output port ASETout 1114 which doubles as a possible input port (not shown in FIG. 11). Preferably, the problem of any mixing of light that might occur is addressed by utilizing the dichroic filters 1126 and 1130, in the exemplary manner illustrated in FIG. 11 or by using light of mutually orthogonal polarization with use of a polarization dependent beam splitter of coupler.

The exemplary embodiments 700 and 750 of exemplary device 3, illustrated in FIGS. 8A and 8B, respectively, were discussed above with reference to the way in which the devices 700, 750 could be switched between two states, the first state corresponding to Case "D" of FIG. 4D, and the second state corresponding to Case "C" of FIG. 4C. In the case of Phosistor 1100, manipulating the intensity $I_L$ of the pulsed light at $\lambda_L$ 1118 can create an additional operational state corresponding to Case "A" of FIG. 4A. This operational state is exploited in Phosistor 1100.

In a preferred embodiment, the Phosistor 1100 operates as a flip-flop according to restrictions that are placed on the relative magnitudes of the operating wavelengths $\lambda_L$, $\lambda_H$, and $\lambda_{LL}$ of the light inputs 1118, 1122, and 1124, respectively. First, the pulsed light at $\lambda_H$ 1122 (i.e., the "set" beam) has a wavelength $\lambda_H$ that is shorter than or equal to the wavelength $\lambda_L$ of the pulsed light at $\lambda_L$ 1118 (the "enable" beam), that is, $\lambda_H \leq \lambda_L$. Second, the pulsed light at $\lambda_{LL}$ 1124 (i.e., the "reset" beam) has a wavelength that is longer than the wavelength $\lambda_L$ of the pulsed light at $\lambda_L$ 1118 as well as the pulsed light at $\lambda_H$, that is, $\lambda_{LL} > \lambda_L \geq \lambda_H$.

The former restriction ($\lambda_H \leq \lambda_L$) for the exemplary embodiment of Phosistor 1100 has implications with regard to the two general wavelengths $\lambda_1$ and $\lambda_2$, where $\lambda_1$ has the longer wavelength as defined above with reference to exemplary devices 1–4. As such, the Phosistor 1100 can operate with $\lambda_L = \lambda_H = \lambda_1$, or $\lambda_L = \lambda_H = \lambda_2$, or $\lambda_L = \lambda_1$ and $\lambda_H = \lambda_2$.

i). The Enable State

For this Enable state of Phosistor 1100, the enable beam at $\lambda_L$ 1118 is turned "on," while the set beam at $\lambda_H$ 1122 and the reset beam at $\lambda_{LL}$ 1124 are both "off."

To create the first operational state of the Phosistor Flip-Flop 1100 the pulsed light at $\lambda_L$ 1118 (the "enable" beam) is turned "on" and is maintained at relatively low intensity so that the active medium 1108 on Waveguide A 1102 will not be driven to transparency at $\lambda_L$. The intensity $I_L$ of the light at $\lambda_L$ 1118 is kept purposely low enough so that $I_L < (1/\eta) I_{LSat}$, that is, the intensity $I_L$ does not exceed the saturation intensity divided by $\eta$, the effective percentage of leakage power to the active medium 1108 needed to bring the active medium to the state of transparency when there is no set beam at $\lambda_H$ 1122 entering the port ASETin 1106. The enable beam at $\lambda_L$ 1118 does not have a high enough intensity to drive the active medium 1108 in Waveguide A 1102 to transparency at $\lambda_L$ by itself. In this situation, most of the power of the light beam at $\lambda_L$ will exit port BRESETout 1112.

In this case, the active medium 1108 provides loss at $\lambda_L$ 1118. Essentially, the net result is that more electrons in the active medium 1108 relax from high energy states (i.e. spontaneously decay) than are excited to high energy states. This state of the active medium 1108 is analogous to Case A, as illustrated in FIG. 4A.

ii). The Set State

For this Set state of Phosistor 1100, the enable beam at $\lambda_L$ 1118 is "on," the set beam at $\lambda_H$ 1122 is turned "on," and the reset beam at $\lambda_{LL}$ 1124 remains "off." Once the set beam at $\lambda_H$ 1122 is turned "on," the Phosistor 1100 is "latched" and remains in the Set state, even if the set beam at $\lambda_H$ 1122 is turned "off," while the enable beam at $\lambda_L$ 1118 is "on" and until the Phosistor 1100 is "reset."

By itself, the enable beam at $\lambda_L$ 1118 does not have a high enough intensity to drive the active medium 1108 in Waveguide A 1102 to transparency at $\lambda_L$. By design, the enable beam at $\lambda_L$ 1118 requires the assistance of the set beam at $\lambda_H$ 1122 entering the port ASETin 1106 on dichroic filter 1126 to drive the active medium 1108 to transparency at $\lambda_L$. The set beam at $\lambda_H$ 1122 preferably has a wavelength $\lambda_H$ that is shorter than or equal to $\lambda_L$ as described above.

The set beam at $\lambda_H$ 1122 turns on and consequently drives the active medium 1108 to a state of transparency at $\lambda_L$. Preferably, part of the power of the enable beam at $\lambda_L$ 1118 now splits to propagate through the active medium 1108 along the Waveguide A 1102 and subsequently exits from Waveguide A 1102 at the port ASETout 1114 as light at $\lambda_L$ 1120. This state of the active medium 1108 is analogous to Case D, as illustrated in FIG. 4D.

In effect, the set beam at $\lambda_H$ 1122 latches the Phosistor 1100 flip-flop so that the active medium 1108 remains in a state of transparency at $\lambda_L$, even when the set beam at $\lambda_H$ 1122 is turned off and is no longer present. That is, the enable beam at $\lambda_L$ 1118 is purposely maintained at an intensity $I_L$ that is too low to drive the medium 1108 to transparency at $\lambda_L$ by itself, but the additional power latched to propagate through the active medium 1108 by the set beam at $\lambda_H$ 1122 is sufficient to maintain the transparency at $\lambda_L$ once the set beam at $\lambda_H$ 1122 is turned off and is no longer present.

iii). The Reset State (Enable=1; Set=0; Reset=0→1→0)

For this Reset state of Phosistor 1100, the enable beam at $\lambda_L$ 1118 is "on," the set beam at $\lambda_H$ 1122 is turned "off," and the reset beam at $\lambda_{LL}$ 1124 is turned "on." Once the reset beam at $\lambda_{LL}$ 1124 is turned "on," the Phosistor 1100 is "unlatched" or "reset." When the reset beam at $\lambda_{LL}$ 1124 is turned "off," the Phosistor 1100 returns to the Enable state, while the enable beam at $\lambda_L$ 1118 is "on."

The reset beam at $\lambda_{LL}$ 1124 entering the port BRESETin 1116 on dichroic filter 1130 will be coupled from Waveguide B 1104 to Waveguide A 1102 and will reach the active medium 1108 in Waveguide A and will de-excite or relax the active medium 1108 on Waveguide A 1102, providing loss at the operating wavelength $\lambda_L$ to the active medium 1108. This state of the active medium 1108 is analogous to Case C, as illustrated in FIG. 4C.

The enable beam at $\lambda_L$ 1118 from input port AENABLEin 1110 loses energy in the active medium 1108 so that most of the pulsed light at $\lambda_L$ 1118 does not propagate all the way through the active medium and thus does not exit from the output port ASETout 1114 on Waveguide A 1102. Rather, most of the pulsed light at $\lambda_L$ 1118 propagates through Waveguide A 1102 along the interaction length l and couples or transfers to Waveguide B 1104 and exits out of output port BRESETout 1114 as pulsed light at $\lambda_L$ 1128 out of the Waveguide B 1104.

In the case of FIG. 11, the net effect is that once the Phosistor 1100 is enabled by the enable beam at $\lambda_L$ 1118, application of a pulse of light at $\lambda_H$ 1122 (the set beam) into port ASETin 1106 generates light at $\lambda_L$ 1120 exiting port ASETout 1114. The Phosistor 1100 will remain latched in this set state until the application of a reset pulse of light at $\lambda_{LL}$ 1124, which in turn generates a light at $\lambda_L$ 1128 exiting port BRESETout 1112.

It should be understood that in accordance with standard logical operation of Set-Reset flip-flops, the Phosistor 1100 when utilized as a flip-flop, preferably, simultaneous application of set and reset pulses of light 1122, 1124, respectively, should be avoided.

It should be understood that in the typical operation of the Phosistors, including the useful embodiment 1100, one or more light inputs and outputs are described as pulsed light. This light can otherwise take the form of continuous wave (CW) light in some specific applications. For the purpose of illustration and not limitation, it is taken as pulsed light.

Since the active medium 1108 of device 1100 of FIG. 11 is operated at the absorbing or loss mode, this phosistor has a "loss gate". This gate is in the input arm (Waveguide A 1102).

iv). MMI/Resonator Configuration Device

It should be evident to those skilled in the art that the MMI/Resonator configuration for device 6 would be topologically similar to the MMI/Resonator configuration of Device 1. As in device 1, it should be understood that the MMI/Resonator Configuration Devices are otherwise functionally and operationally identical to the device 1100 and descriptions and comments relating to the device 1100 are generally applicable to the MMI/Resonator Configuration Devices.

v). PBG Implementation of the Coupler/MMI/Resonator Configuration Device

It should be evident to those skilled in the art that the PBG implementations for the Coupler/MMI/Resonator I/Resonator II configuration of device 6 would be topologically similar to the PBG implementations for the Coupler/MMI/Resonator configuration of device 1. As in device 1, it should be understood that the PBG implementations for the Coupler/MMI/Resonator configuration of device 6 are otherwise functionally and operationally identical to the device 1100 and descriptions and comments relating to the device 1100 are generally applicable to the PBG implementations for the Coupler/MMI/Resonator configuration of device 6.

G. Exemplary Device 7: An Optical Amplifier

For purposes of illustration and not limitation, an Optical Amplifier can be constructed and implemented with the exemplary devices 1 and 2 cascaded together.

Figure 12:
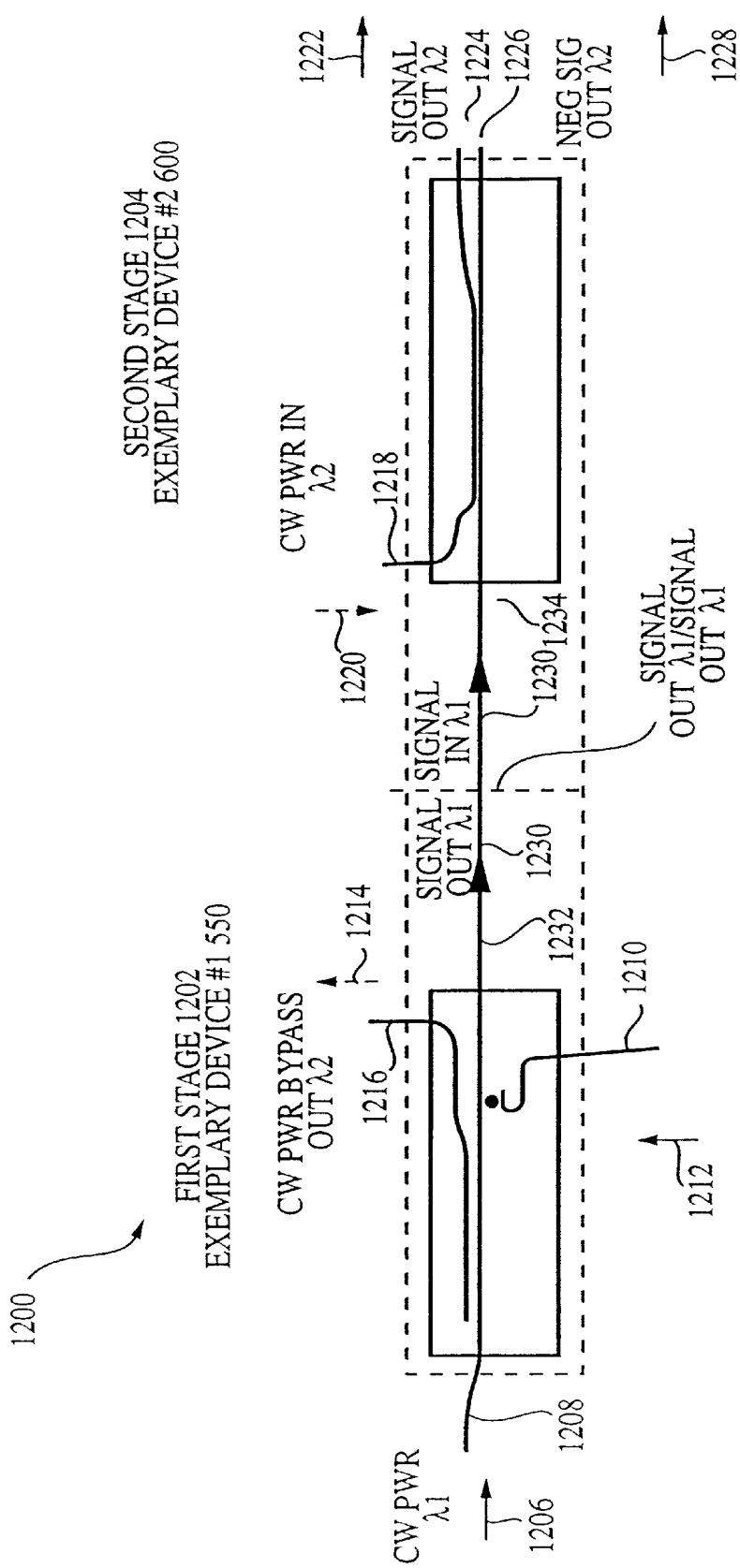
FIG. 12 illustrates an embodiment of a seventh exemplary phosistor device implementing a phosistor optical amplifier gate based on cascading the first and second exemplary phosistor devices together and utilizing directionally coupled waveguides.

For example, FIG. 12 illustrates a seventh general embodiment 1200 of a phosistor device employing directionally coupled waveguides. The device can operate as an optical amplifier by management of, including optional switching of, streams of slow or ultrafast (picosecond, femtosecond) optical pulses of equivalent, comparable, or differing energies and wavelengths. The device in this exemplary embodiment 1100 can be referred to as an "Optical Amplifier Phosistor."

Optical Amplifier Phosistor 1200 shown in FIG. 12 preferably includes a first stage 1202 based on exemplary device 1550 (described above and shown in FIG. 6B) cascaded with a second stage 1204 based on exemplary device 2 600 (described above and shown in FIG. 7). Those skilled in the art will appreciate that the detailed workings of the first and second stages 1202, 1204 can be understood by with reference to the detailed descriptions provided for the exemplary embodiments 550 and 600 of exemplary devices 1 and 2, respectively. For clarity the signals presented to and output from the first and second stages 1202, 1204 of the Phosistor 1200 are described using consistent nomenclature to that used to describe the exemplary embodiments 550 and 600 of exemplary devices 1 and 2, respectively.

An amplifier input port 1208 of Optical Amplifier Phosistor 1200 is configured to receive continuous wave (CW) light at wavelength $\lambda_1$ (CW PWR IN $\lambda_1$) 1206. Another input port 1210 of Phosistor 1200 is configured to receive pulsed light at wavelength $\lambda_2$ (SIGNAL IN $\lambda_2$) 1212. An output port 1216 for exiting CW light at wavelength $\lambda_1$ (CW PWR BYPASS OUT $\lambda_1$) 1214 is included on Phosistor 1200. Preferably, ports 1208, 1210, and 1216 all service the first stage 1202 of the Optical Amplifier Phosistor 1200.

An amplifier input port 1218 of Optical Amplifier Phosistor 1200 is configured to receive continuous wave (CW) light at wavelength 2 (CW PWR IN $\lambda_2$) 1220. An output port 1224 for exiting pulsed light at wavelength $\lambda_2$ (SIGNAL IN $\lambda_2$) 1222 and another output port 1226 for exiting pulsed light at wavelength $\lambda_2$ (NEG SIG OUT $\lambda_2$) 1228 are included on Phosistor 1200. Preferably, ports 1218, 1224, and 1226 all service the second stage 1202 of the Optical Amplifier Phosistor 1200.

Internal input and output ports 1232, 1234 are included in Phosistor 1200 to interface between the first and second stages 1202, 1204 of the Phosistor 1200. Pulsed light at wavelength $\lambda_1$ (SIGNAL OUT $\lambda_1$/SIGNAL IN $\lambda_1$/) 1230 exits from port 1232 and enters port 1234.

i). The First Stage (Exemplary Device 1)

CW light at $\lambda_1$ 1206 enters the first stage 1202 (exemplary device 1 550) of Phosistor 1200 via the port 1208, drives the active medium internal to the first stage 1202 to transparency at $\lambda_1$ (Case C in FIG. 4C), and subsequently transfers via directionally coupled waveguides to the port 1216, exiting as CW light at $\lambda_1$ 1214. Application of pulsed light at $\lambda_2$ 1212 excites and provides gain at $\lambda_1$ to the active medium (Case B in FIG. 4B), generating pulsed light at $\lambda_1$ 1230, exiting from the port 1232. In certain exemplary embodiments of the device 550, the CW light at $\lambda_1$ 1214 exiting the port 1216 is not substantially affected by the pulsed light at $\lambda_2$ 1212 so that the CW light at $\lambda_1$ 1214 can be used to power another Phosistor. Turning off the light at $\lambda_2$ 1212 allows the active medium to be driven back to a state of transparency at $\lambda_1$ (Case C in FIG. 4C) and light at $\lambda_1$ 1230 no longer exits from the port 1232.

ii). The Second Stage (Exemplary Device 2)

CW light at $\lambda_2$ 1220 enters the second stage 1204 (exemplary device 2 600) of Phosistor 1200 via the port 1218, drives the active medium internal to the first stage 1202 to transparency at $\lambda_2$ (Case D in FIG. 4D), and subsequently transfers via directionally coupled Waveguides to the port 1226, exiting as light at $\lambda_2$ 1228. Application of pulsed light at $\lambda_1$ 1230 (from the first stage 1202) de-excites and provides loss at $\lambda_2$ to the active medium (Case C in FIG. 4C), so that at least a part of the CW light power at $\lambda_2$ 1220 does not transfer via the directionally coupled waveguides to the port 1226 but rather exits from the port 1224 as light at $\lambda_2$ 1222. In certain exemplary embodiments of the device 600, the device 600 is capable of providing photon gain, that is, a number X of photons at $\lambda_1$ (pulsed light at $\lambda_1$ 1230) into the port 1234 results in a number Y of photons at $\lambda_2$ (light at $\lambda_2$ 1222) out of the port 1224 where the number Y is capable of being greater than the number X.

Turning off the light at $\lambda_1$ 1230 allows the active medium to be driven back to a state of transparency at $\lambda_2$ (Case C in FIG. 4C) and light at $\lambda_2$ 1222 no longer exits from the port 1224.

In summary, the first stage 1202 (exemplary device 1550) of Phosistor 1200 shown in FIG. 12 translates the signal beam at $\lambda_2$ 1212 to the signal beam at $\lambda_1$ 1230. The second stage 1204 (exemplary device 2 600), cascaded together in Phosistor 1200 with the first stage 1202, translates the signal beam at $\lambda_1$ 1230 to the signal beam at $\lambda_2$ 1222 with amplification of the photon number. The net result is that first and second stages 1202, 1204 cascaded together as Phosistor 1200 realize an optical amplifier where the output optical signal, signal beam at $\lambda_2$ 1222, has an increased number of photons relative to the input optical signal, signal beam at $\lambda_2$ 1212. The increased number of photons on the output represents amplification of the input optical signal.

In an exemplary embodiment of Optical Amplifier Phosistor 1200, the waveguide structures connecting and including the first and second stages 1202, 1204 can be implemented as the Waveguide 400 illustrated in FIG. 5A, in an $Al_xGa_{1-x}As$ embodiment having alloy composition x=0.3 giving a bandgap energy of around 690 nm. In an exemplary embodiment, the cross-sectional dimensions of the waveguide 400 are 0.4 μm wide by 0.25 μm thick. In an exemplary embodiment of device 1200, the waveguide structures of FIG. 12 are 0.4 μm wide and are located at approximately parallel distances from each other over coupling and interaction ranges of 0.4 μm.

It should be understood that these dimensions and exemplary lengths are presented for purposes of illustrating a useful embodiment of the device 1200 and are not intended to limit other exemplary embodiments of any exemplary device, or the device 1200. A variety of dimensions and sizes can be used, depending on the application desired as well as the fabrication materials, processes or technologies that are employed. Also, it should be understood that the shape of the waveguides does not generally have to be linear. Curved shapes and different waveguide dimensions may be utilized as long as they achieve the same functions such as waveguiding and wave-coupling. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same widths and dimensions as long as the desired effect of wave-coupling is achieved.

It will be understood by those skilled in the art that the particular operating details of the first and second stages 1202, 1204 beyond those described above can be explained with reference to the detailed descriptions provided for the exemplary embodiments 550 and 600 of exemplary devices 1 and 2, respectively.

It will be understood by those skilled in the art that the first and second stages 1202, 1204 can be in other forms or configurations such as the MMI or resonator configuration or other forms of implementation such as the photonic bandgap or metallic waveguide implementation.

VI. ELECTRO-OPTIC DEVICES

The presently preferred electro-optic phosistor embodiments and devices may be classified by such exemplary features as whether they manipulate the intensity levels of light signals, the functions performed by and unique to particular devices, and the state or states of the active medium that drive the operation of the device. In most cases under discussion, light having wavelength $\lambda_n$ preferably is input to the electro-optic phosistor either (1) in a continuous fashion with respect to time, that is, as continuous wave (CW) light having wavelength $\lambda_n$ or (2) in a switched, or pulsed fashion with respect to time, so that pulsed light having wavelength $\lambda_n$ is present for the duration of the pulse, and is not substantially present otherwise (at least not at wavelength $\lambda_n$). Such a characterization of light will be familiar to those skilled in the art. Hereafter, for simplicity of description, light or another entity "having wavelength $\lambda_n$" can be referred to as being "at $\lambda_n$."

It should be understood that in the typical operation of the Electro-Optic Phosistors, including the useful embodiments described below, one or more light inputs or outputs will be described as continuous wave (CW) light. This light can otherwise take the form of pulsed light in some specific applications. It is for the purposes of illustration and not limitation that one or more light inputs or outputs will be described as continuous wave (CW) light.

These electro-optic phosistors are also classified by their physical principles of operation. Like a transistor, an electro-optic phosistor can have three or more "terminals". An electro-optic phosistor can involve a wave-coupling junction such as a directional coupler, or a multi-mode interference (MMI) device or a resonator device or a photonic bandgap structure. There are many ways to achieve a wave-coupling effect. One way is through coupled waveguides. Another way is through a multi-mode interference (MMI) device. There are also numerous ways to confine waves. One way is through a waveguide, another way is through a photonic bandgap device, and yet another way is through a metal coated or a metallic waveguide. Regardless, it should be understood that the electro-optic phosistor devices and exemplary embodiments described herein use a combination of means to resist or enhance the flow of photon flux in a certain direction by preferably altering the interference flux pattern of light via the action of an applied voltage on the medium. Preferably, the interference flux pattern of light identifies, and the light transfer control property of the active medium determines, the propagation direction of the flow of photon flux in the electro-optic phosistor (photon transistor) at a given time.

A coupler device as herein described preferably transfers energy from one material region to another via interference. This interference causes the propagation direction of an input photon beam to deviate from straight line propagation. In an electro-optic phosistor, this path-changing interference is interrupted in the coupler due to an absorbing or a gain medium controlled by an applied voltage, which leads to an effective "transfer photon-resistance" for the spatial propagation of the original photon beam resulting in an enhancement or reduction in the resultant energy flux in certain regions of the coupler.

Presented herein are presently preferred and useful embodiments of electro-optic phosistor devices utilizing directional coupled waveguides in the form of waveguide 400 of FIG. 5A or waveguide 450 of FIG. 5D. In some instances one or more arms of the directionally coupled waveguides will have an active region or medium in the form of active medium 420 (see FIG. 5D). In some instances, resonator configurations are used to reduce the operating voltages or currents.

It should be understood that other waveguides, besides conventional waveguides with high refractive index core surrounded by low refractive index cladding such as waveguide 450, can be utilized in electro-optic phosistor embodiments including other types of waveguiding devices such as those based on repeated reflection via metal surface structures or photonic-bandgap structures.

VII. ADDITIONAL EXEMPLARY DEVICES AND EMBODIMENTS

A. Exemplary Device 8 (Electro-Optic)

Figure 13:
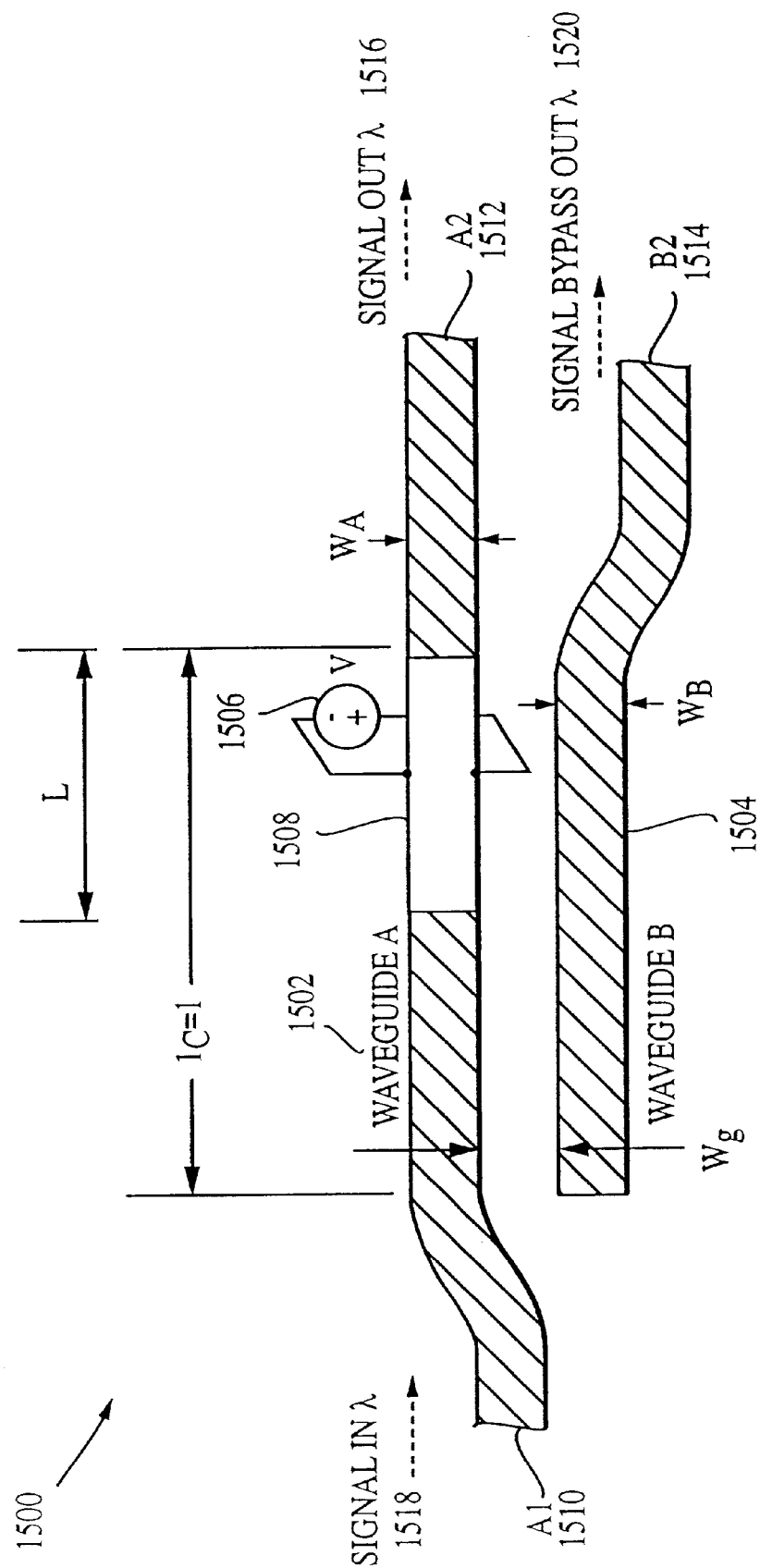
FIG. 13 illustrates an embodiment of a eighth exemplary phosistor device utilizing directionally coupled waveguides and employing electro-optics.

FIG. 13 illustrates an eighth exemplary device and a first general embodiment 1500 of an electro-optic phosistor device employing directionally coupled waveguides. For purposes of illustration and not limitation, the device is described according to one useful function as a switching element for slow or ultrafast optical pulses of sufficient energy and wavelength. The device 1500 is not limited to use as a switching element and can be utilized, for example, as a photon duplicator, a light intensity modulator, a light intensity regulator, a lossless signal tap, a quantum-nondemolition (QND) detector, and a variable optical attenuator. It should be understood that these exemplary applications of device 1500 are intended to illustrate the wide range of uses for device 1500, and are not intended to limit the applications of other exemplary embodiments of device 1500 to these examples. The device can be referred to as an "Electro-Optic Input-Arm-Gain-Loss Gate Phosistor" (EO IGL Phosistor 1500).

EO IGL Phosistor 1500 preferably includes a first pathway of light consisting of the spatial region occupied by Waveguide A 1502 and a second pathway of light consisting of the spatial region occupied by Waveguide B 1504. The Waveguide A 1502 preferably includes an active medium 1508. A Voltage Source 1506 having a variable voltage V is applied across the active medium 1508. As described above, Waveguide A 1502 can be implemented as waveguide 450 illustrated in FIG. 5D with active medium 420 and Waveguide B 1504 can be implemented as Waveguide 400 illustrated in FIG. 5A in a useful embodiment. The Waveguide A 1502 preferably includes an input port A1 1510 and an output port A2 1512. The Waveguide B 1504 preferably includes an output port B2 1514. FIG. 13 illustrates that Waveguide A 1502 has width $W_A$ and is located at an approximately parallel distance (coupling gap or distance) $W_g$ from Waveguide B 1504, which has width $W_B$.

The input port A1 1510 on the Waveguide A 1502 is configured to receive light having wavelength λ (at λ) (SIGNAL IN λ) 1518. In a useful embodiment, this light at λ 1518 is continuous wave (CW) light. Depending on the state of the electro-optic phosistor 1500, light can be output from the output port B2 1514 as light having wavelength λ (at λ) (SIGNAL BYPASS OUT λ) 1520. In a useful embodiment, this light at λ 1520 is continuous wave (CW) light. Light is also capable of being output from the output port A2 1512 as light having wavelength λ (at λ) (SIGNAL OUT λ) 1516. In a useful embodiment, this light at λ 1516 is pulsed light. Under certain condition described below when the active medium on the waveguide reaches transparency and Waveguides A and B are optically transparent, most of the CW light at λ 1518 propagating along the Waveguide A 1502 will be transferred to Waveguide B 1504 after a coupling length $l_C$. It should be understood that the light signals into and out of IGL Phosistor 1500 and other useful embodiments can include pulsed light signals, continuous wave (CW) light signals, or both, depending on which of the various operating modes of the embodiments are utilized in a particular application.

The coupling length $l_C|_{X-Y}$ is defined as the length at which a wave in a first waveguide (X) maximally couples into a second waveguide (Y) that is coupled to the first waveguide (X). In this device 1500, the interaction length l, defined as the length of interaction between waves in Waveguides A 1502 and B 1504 extends to approximately the full coupling length $l_C$ so that $l=l_C$ in one embodiment of the device. In the case of FIG. 13, the interaction length is defined geometrically by the length for which waveguides A and B run closely parallel to each other. In other exemplary devices, the interaction length could be chosen to be multiple odd numbers of the coupling length $l_C$ ($l=3l_C$, $5l_C$, $7l_C$ . . . ). As is known to those skilled in the art, these coupling lengths will also achieve maximal coupling as for the case where $l=l_C$. While the choice of $l=l_C$ is illustrated in this exemplary device, the interaction length may vary from the coupling length $l_C$ (or multiple odd numbers of $l_C$) without affecting the general operating principle of the device.

As shown in FIG. 13, the length L of the active medium 1508 is about half the interaction length l (L≈½) The length L of the active medium 1508 may be somewhat longer or shorter than half of l. Varying the length L of the active medium 1508 relative to the interaction length l will vary the input to output signal conversion efficiency but will otherwise not affect the general operating principle of the device.

It should be understood that the above dimensions, exemplary lengths, and geometry are presented for purposes of illustrating a useful embodiment of the device 1500 and are not intended to limit other exemplary embodiments of any exemplary device, or the device 1500. A variety of dimensions, sizes, and geometry can be used, depending on the application desired as well as the fabrication materials, processes or technologies that are employed. For example, while the choice of $l=l_C$ is illustrated in this exemplary device, the interaction length may vary from the coupling length $l_C$ and still achieve similar device functions.

Also, it should be understood that the shape of the waveguides does not generally have to be linear. Curved shapes and different waveguide dimensions may be utilized as long as they achieve the same functions such as waveguiding and wave-coupling. The active medium can be centered at an alternative location along waveguide B other than that illustrated in FIG. 13, and there can be more than one disconnected active medium areas along waveguide B. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same widths as long as the desired effect of wave-coupling is achieved.

In an exemplary embodiment of device 1500 for operation at 800 nm wavelength range, the wavelength λ can be at 820 nm and the Waveguide A 1502 can be implemented as the Waveguide 450 with an active medium 420 illustrated in FIG. 5D and Waveguide B 1504 can be implemented as the Waveguide 400 illustrated in FIG. 5A, in an $Al_xGa_{1-x}As$ embodiment for the waveguide core having alloy composition x=0.3, giving a bandgap energy of around 690 nm. Thus the core material in waveguides A and B is transparent at the wavelength λ of 820 nm. When the active medium in waveguide A is fully de-excited, the active medium absorbs light at 820 nm wavelength. The active medium is an essentially three-level medium for which the electrons supplied from current injection are free to relax from an upper-energy level to the upper-energy level corresponding to the 820 nm absorption.

In an exemplary embodiment of device 1500 for operation at 1500 nm wavelength range, the wavelength λ can be at 1500 nm and the Waveguide A 1502 can be implemented as the Waveguide 450 with an active medium 420 illustrated in FIG. 5D and Waveguide B 1504 can be implemented as the Waveguide 400 illustrated in FIG. 5A, in an $In_{1-x}Ga_xAs_{1-y}P_y$ embodiment for the waveguide core having alloy compositions x=0.16 and y=0.67, giving a bandgap energy of around 1100 nm. Thus the core material in waveguides A and B is transparent at the wavelength λ of 1500 nm. When the active medium in waveguide A is fully de-excited, the active medium absorbs light at 1500 nm wavelength. The active medium is an essentially three-level medium for which the electrons supplied from current injection are free to relax from an upper-energy level to the upper-energy level corresponding to the 1500 nm absorption.

In an exemplary embodiment for application to the 1500 nm (or 1.5 μm) wavelength range, the cross-sectional dimensions of the waveguide 400 or 450 are 0.4 μm wide by 0.25 μm thick. In this exemplary embodiment, the Waveguide A 1502 has width $W_A$ equal to 0.4 μm and is located at an approximately parallel distance $W_g$ from Waveguide B 1504 of 0.4 μm, while Waveguide B 1504 has width $W_B$ equal to 0.4 μm. The material refractive indices of the Waveguides A, the Waveguide G, and the Waveguide B are denoted as $n_A$, $n_B$, and $n_C$, respectively, and are taken to be $n_A=n_B=n_G=3.4$. These refractive indices give an effective planar-waveguide propagating refractive index of about 2 in a planar waveguide structure with a thickness of 0.25 μm. The material refractive index outside the waveguides is taken to be 1.5, which will be the case if the material outside the waveguide is silicon dioxide. In this exemplary embodiment for which the wavelengths of light are at around 1500 nm range, $l_C$ is about 15 μm.

It should be understood that these dimensions, exemplary lengths, and geometry are presented for purposes of illustrating a useful embodiment of the devices 1500 and are not intended to limit other exemplary embodiments of any exemplary device, or the devices 1500. A variety of dimensions, sizes, and geometry can be used, depending on the application desired as well as the fabrication materials, processes or technologies that are employed.

i). General Operation of the Device

The main action of the injection current or applied voltage to the active medium preferably is to bring the medium from a state of loss or transparency to a state of gain. The loss, transparency, or gain state of the medium then affects the transfer of light from various inputs to various outputs. The general operation of the device can be illustrated via computer simulation of such light transfer as a function of the medium's loss/gain coefficient (gain and loss coefficients are related as loss coefficient can be described as a negative gain coefficient).

Figure 13A:
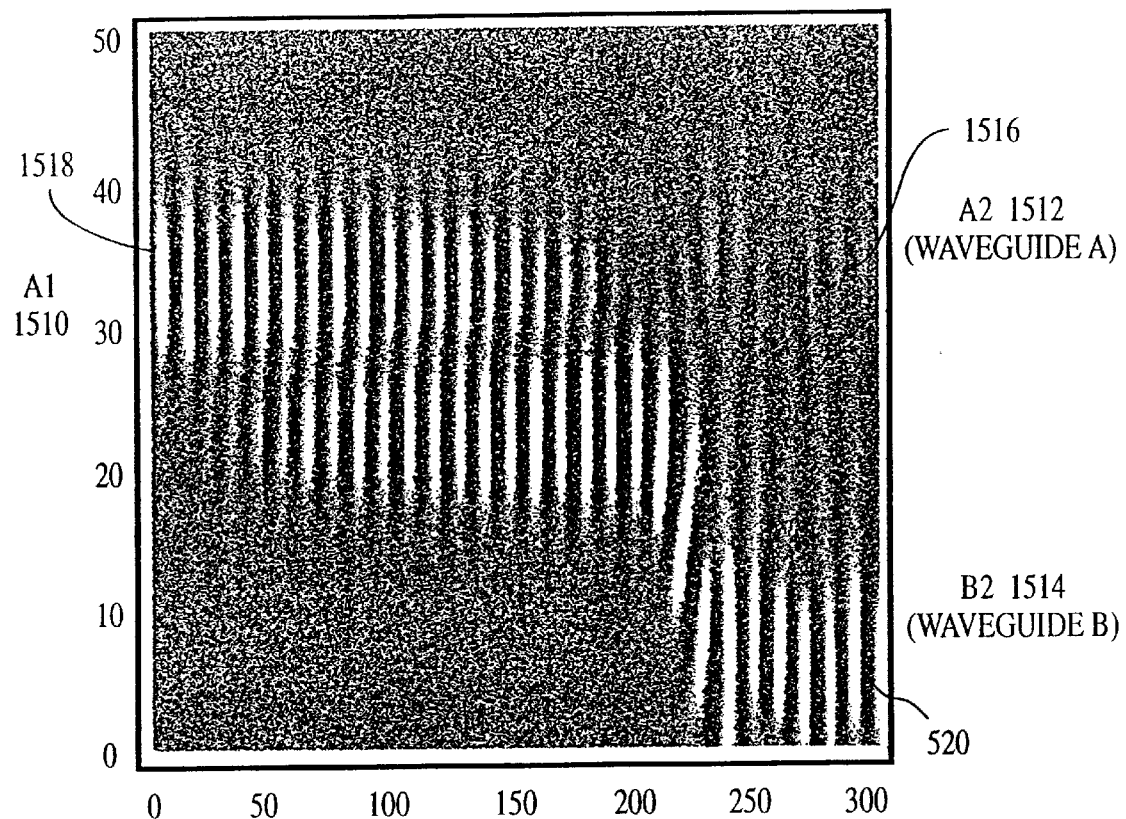
FIGS. 13A–13C are computer simulations of the spatial distribution of the electrical field strength of the device of FIG. 13.
Figure 13A:
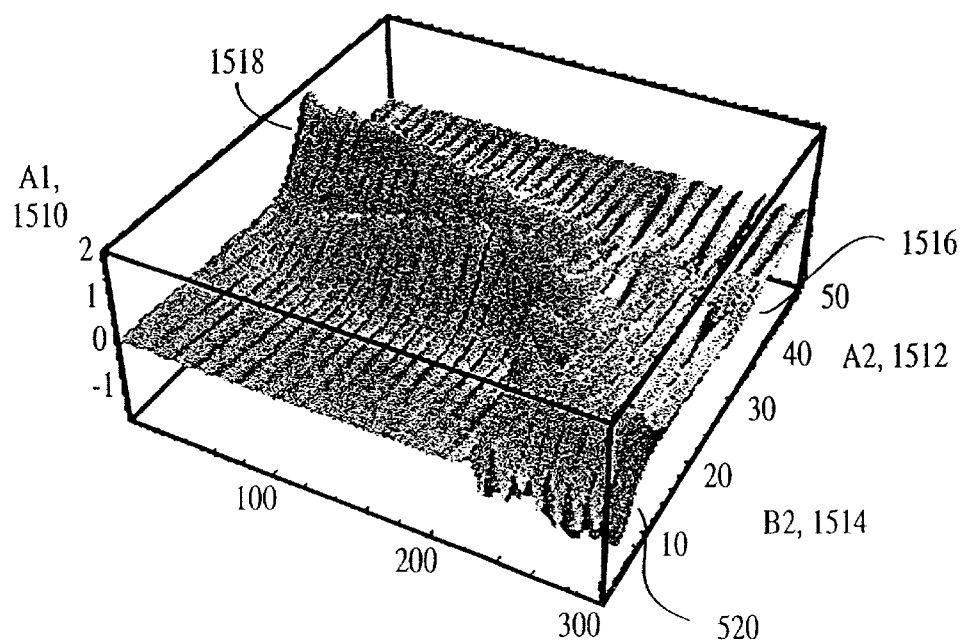
Figure 13B:
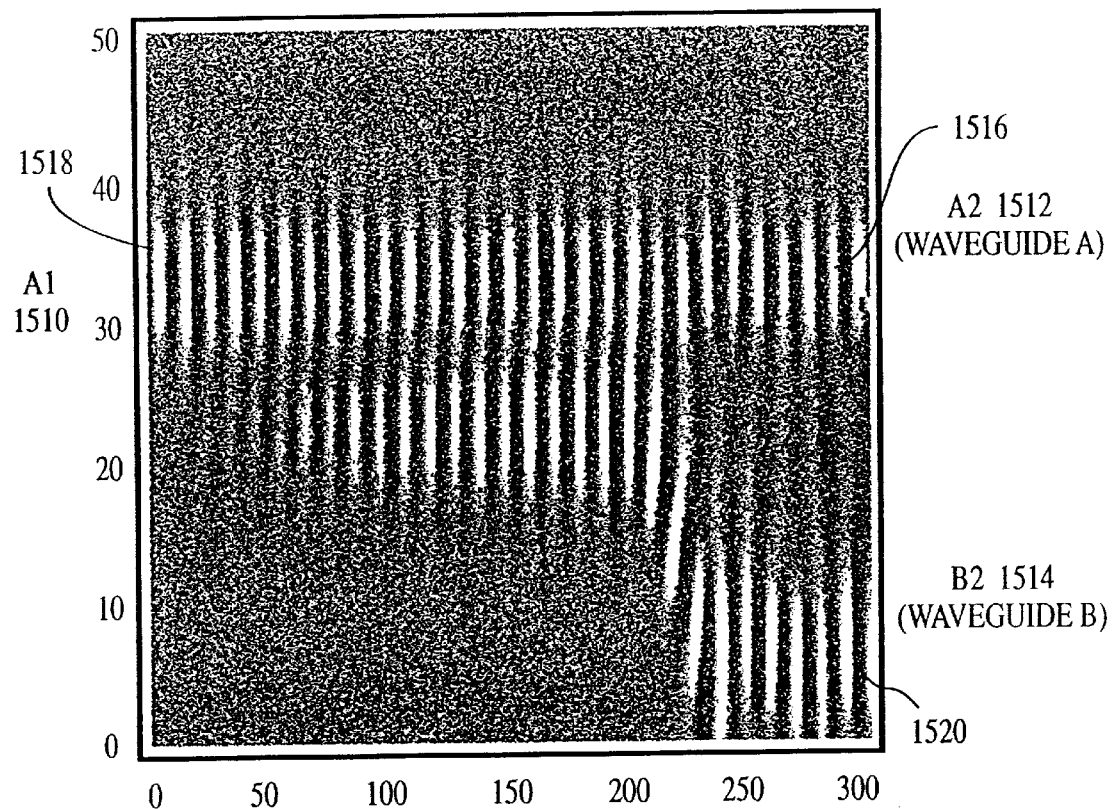
Figure 13B:
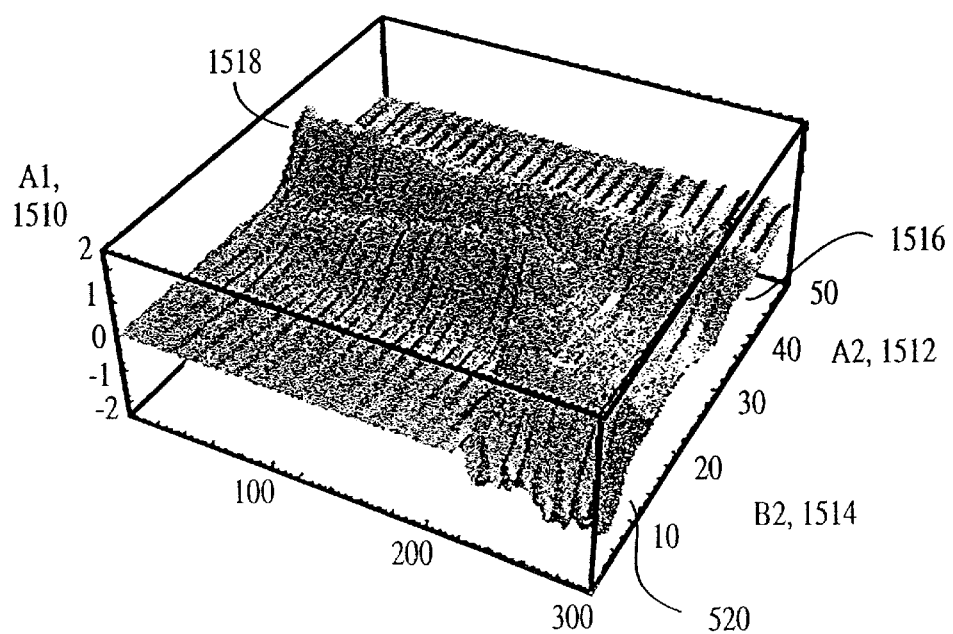
Figure 13C:
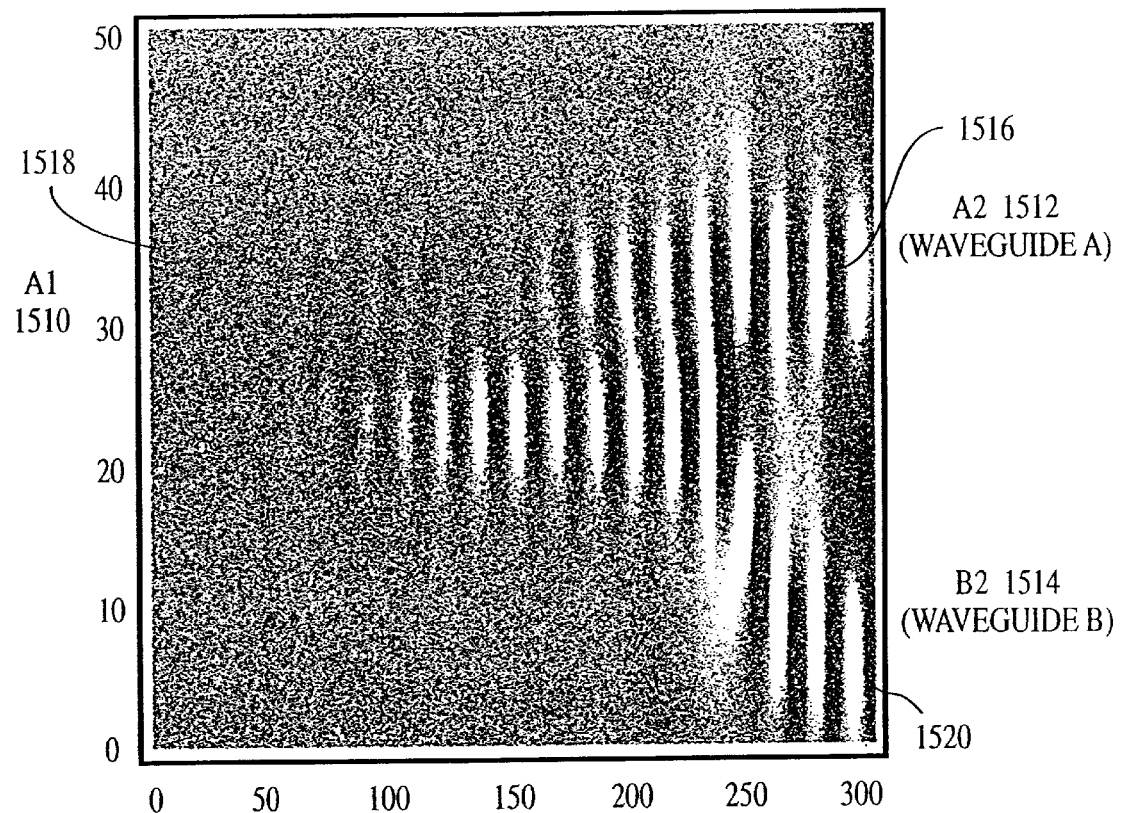
Figure 13C:
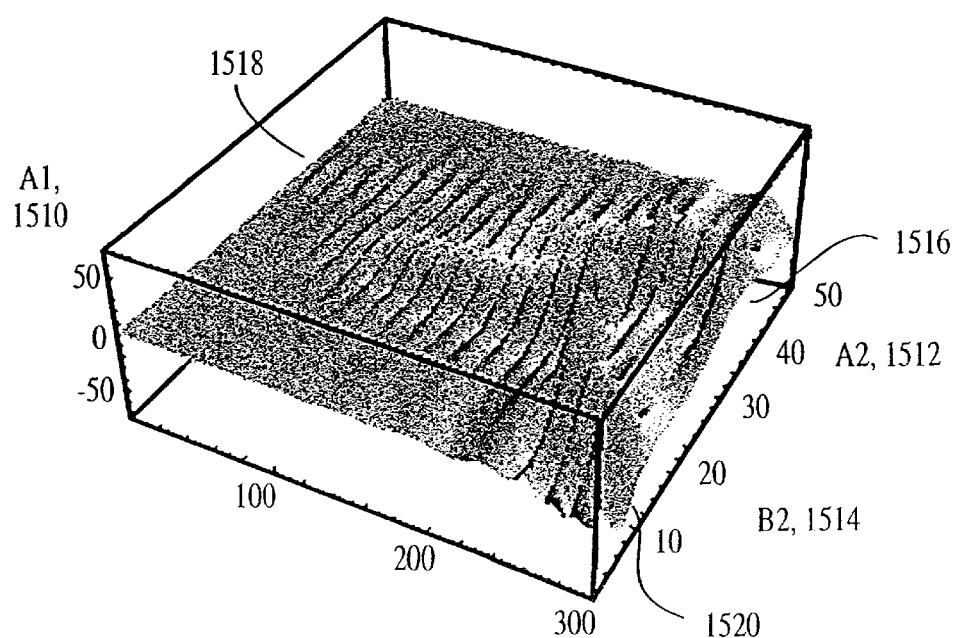
Figure 13D:
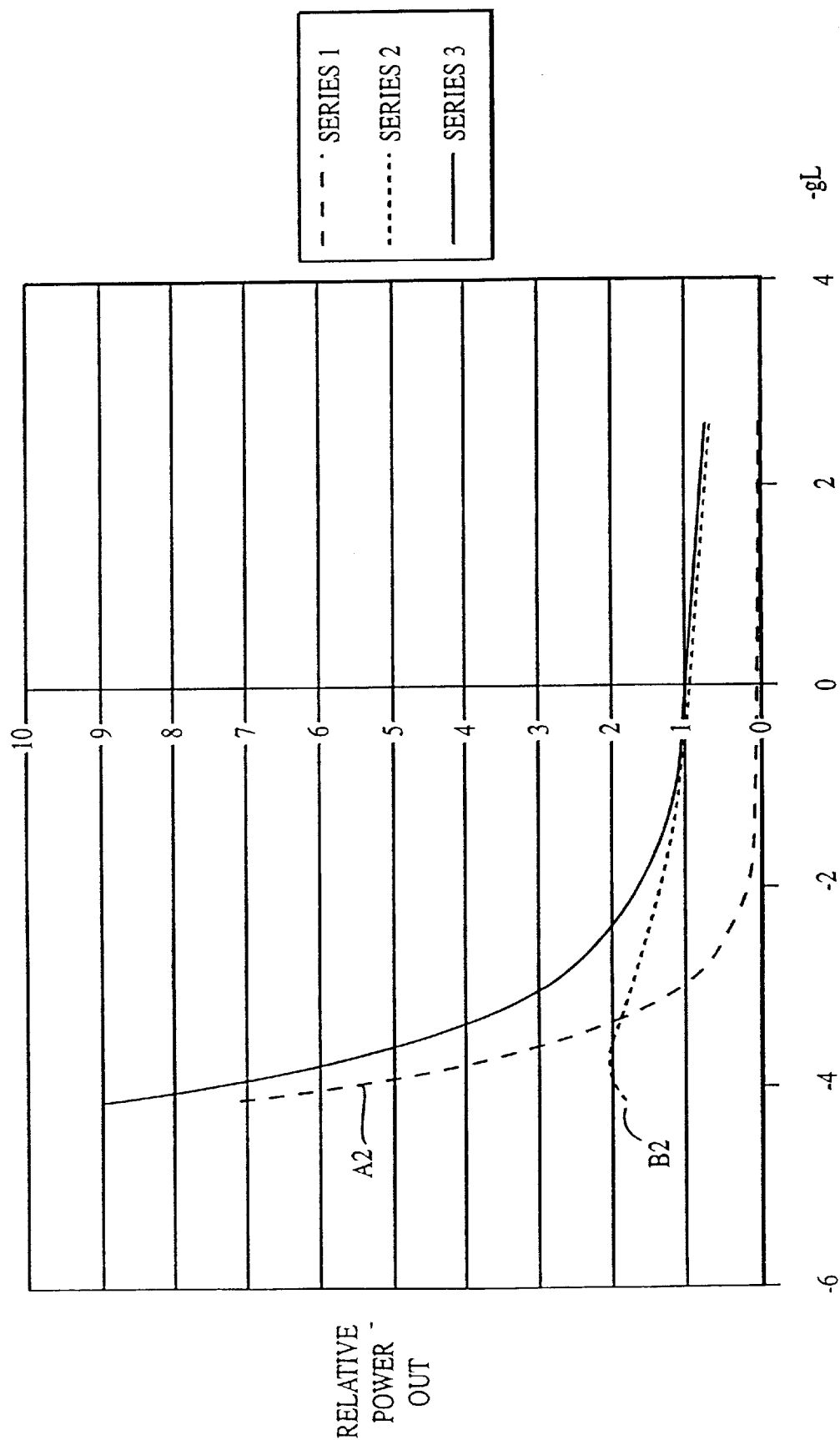
FIG. 13D is a graphical portrayal of the performance of the device of FIG. 13.

An exemplary operation of the device can be illustrated via the result of computer simulation as shown in FIGS. 13A, 13B, 13C, and 13D for operation at 1500 nm wavelength range. The geometry for the device simulated is as described by the exemplary embodiment given above for application to the 1500 nm wavelength range. For this simulation, the active medium 420 is assumed to have a full-excitation gain coefficient of about 1 per $\mu$m, and $l_C$ is 15 $\mu$m. FIGS. 13A, 13B, and 13C show the spatial distribution of the electric field strength for the light input at $\lambda$1518 after propagating into waveguides A and B. The upper parts of FIGS. 13A, 13B, and 13C are 2-D plots for which the brightness shows the relative field strength, and the lower parts of FIGS. 13A, 13B, and 13C are 3-D plots for which the heights show the relative field strength. FIG. 13D shows the relative power at the output ports of waveguide A (port A2) and waveguide B (port B2) as a function of –gL (negative of the product between the gain coefficient g and the medium length L). In the figure, the output at A2 is shown as dotted line, the output at B2 is shown as a dashed line, and the solid line is the sum of the outputs at A2 and B2 (i.e. the dashed line plus the dotted line). In FIG. 13D, negative gL means the medium is in a state of loss. FIG. 13A shows the situation when the gain medium is in the state of loss or transparency (at a gain coefficient of 0 per $\mu$m or gL=0). From FIG. 13A, it is evident that most of the energy of $\lambda$1518 exits from Waveguide B 1504 at the port B2 1514. FIG. 13B shows the situation when the medium is excited to the critical gain value (at a gain coefficient of about 0.4 per $\mu$m or a gL=3.0) by the injection current. From FIG. 13B it is evident that approximately an equal amount of energy of $\lambda$ exits from Waveguide A and Waveguide B and the energy exiting waveguide B is not substantially affected (it increases by at most a factor of two). FIG. 13C shows the situation when the medium is excited above the critical gain value (at a gain coefficient of about 1 per $\mu$m or a gL=7.5) for which the energy exiting waveguides A and B are increased substantially from their values of FIG. 13A. From FIG. 13D, we see that a good operating point is just above the critical value for which the energy exiting waveguide A is much more than the energy exiting waveguide B, which means the gain medium is transferring most of its energy to output A2 at waveguide A, thereby achieving high energy conversion efficiency.

We note that FIG. 13A and FIG. 13B in particular, show the two representative interference flux patterns of light for the device, which is dependent on the state of the active medium. One can switch between these two representative interference flux patterns of light by changing the state of the active medium through the action of an applied voltage or injection current.

ii). Exemplary Device States

Various operating modes of a general active region or medium (such as active medium 420 operating as a PN or PIN junction) with an applied voltage V (or injection current C) were defined and described above and illustrated in FIGS. 4G–K. Since the electro-optic phosistors such as device 1500 and related exemplary embodiments thereto preferably include one or more active regions, the devices and embodiments thereto can be characterized according to the states illustrated in FIGS. 4G–K.

In a preferred and useful embodiment, the electro-optic phosistor 1500 operates as a switching element. The wavelength of the light at $\lambda$ input to the device 1500 is preferably around the bandgap energy (associated with $\lambda_{gap}$).

It should be understood that the light signals into and out of IGL Phosistor 1500 and other useful embodiments can include pulsed light signals, continuous wave (CW) light signals, or both, depending on which of the various operating modes of the embodiments are utilized in a particular application.

It should be understood that the action of the exemplary Phosistor 1500 is defined by the paths taken by the light beams in the device 1500. The paths taken by the light beams in the device 1500 are preferably dependent on the state of the active medium in the interaction region of the Phosistor 1500 (e.g. state of loss, transparency, or gain).

The combination of the state of the active medium and the state of light beam propagation in the device define the state of the device. The various operations of the device 1500 can be more precisely described in terms of such device states. It should be understood however that more or fewer device states can be applied to and described instructively with respect to device 1500 in this or in other useful embodiments and/or applications.

In particular, the operation of the device can be described as making transitions from one class of states to another class of states under the influence of some external inputs such as the power of the input beam, the locations where the input beam is received, and applied electrical energy, preferably including applied voltages or currents.

iii). A First Exemplary Device State

For this first exemplary device state of the electro-optic phosistor 1500, the light beam at $\lambda$ 1518 is turned "on." The wavelength $\lambda$ is at the wavelength of absorption and gain of the active medium, which is slightly shorter than the bandgap wavelength $\lambda_g$ of the active medium ($\lambda<\lambda_g$). The intensity $I_\lambda$ of the light beam at $\lambda$ 1518 can be greater than, equal to, or less than the saturation intensity $I_{sat}$ of the active medium 1508. The voltage V of the variable voltage source 1506 that is applied across the PN or PIN junction (where "I" refers to intrinsic semiconductor that may include quantum wells), including the active medium 1508, is less than approximately zero volts (i.e., V<0 volts). The state of the active medium is analogous to State K as illustrated in FIG. 4K. At this value, the PN or PIN junction including the active medium 1508 is reverse-biased by the applied voltage V.

Light at $\lambda$ 1518 enters at the port A1 1510 on the Waveguide A 1502. The light at $\lambda$ 1518 propagates along the Waveguide A 1502 and most of the light at $\lambda$ 1518 is subsequently transferred to Waveguide B 1504 after a coupling length $l_C$. Most of the light at $\lambda$ 1518 then exits from Waveguide B 1504 at the port B2 1514 as light at $\lambda$ 1520. The active medium 1508 is in a state of loss at $\lambda$ and maintains this state while the applied voltage V is below approximately zero volts.

iv). A Second Exemplary Device State

Figure 4H:
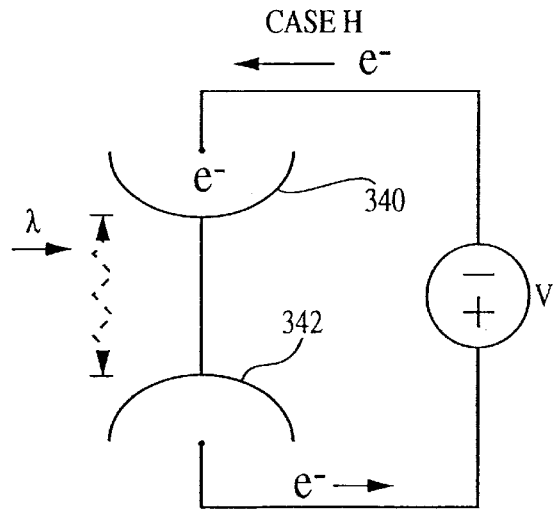

For this second exemplary device state of the electro-optic phosistor 1500, the light beam at $\lambda$ 1518 is turned "on." The wavelength $\lambda$ is at the wavelength of absorption and gain of the active medium, which is slightly shorter than the bandgap wavelength $\lambda_g$ of the active medium ($\lambda<\lambda_g$). The intensity $I_\lambda$ of the light beam at $\lambda$ 1518 can be either greater than, equal to or less than the saturation intensity $I_{sat}$ of the active medium 1508. The voltage V of the variable voltage source 1506 that is applied across the PN or PIN junction including the active medium 1508, is approximately equal to the value of the voltage that is associated with a critical value of the injection current, $C_t(\lambda)$ (i.e., $V \cong V|_{C=C_t(\lambda)}$), called the transparency current. At this value, the PN or PIN junction including the active medium 1508 is forward-biased by the applied voltage V. This transparency current, $C_t(\lambda)$ is the approximate value of the current when the active medium 1508 is driven to a state of transparency at wavelength $\lambda$ by the current. The corresponding voltage $V|_{C=C_t(\lambda)}$ that gives rise to this transparency current $C_t(\lambda)$, is called the transparency voltage. This state of the active medium is analogous to State H as illustrated in FIG. 4H.

Light at $\lambda$ 1518 enters at the port A1 1510 on the Waveguide A 1502. The light at $\lambda$ 1518 propagates along the Waveguide A 1502 and most of the light at $\lambda$ 1518 is subsequently transferred to Waveguide B 1504 after a coupling length $l_C$. Most of the light at $\lambda$ 1518 then exits from Waveguide B 1504 at the port B2 1514 as light at $\lambda$ 1520. The active medium 1508 is in a state of transparency at $\lambda$ and maintains this state while the applied voltage V is approximately at the transparency voltage $V|_{C=C_t(\lambda)}$. Not enough electron excitations are supplied by the applied voltage/injection current to drive the active medium to a gain state at $\lambda$. This state of the active medium 1508 is analogous to State H, as illustrated in FIG. 4H.

v). A Third Exemplary Device State

For this third exemplary device state of the electro-optic phosistor 1500, the light beam at $\lambda$ 1518 is turned "on." The wavelength $\lambda$ is at the wavelength of absorption and gain of the active medium, which is slightly shorter than the bandgap wavelength $\lambda_g$ of the active medium ($\lambda<\lambda_g$). The intensity $I_\lambda$ of the light beam at $\lambda$ 1518 can be greater than, equal to, or less than the saturation intensity $I_{sat}$ of the active medium 1508. The voltage V of the variable voltage source 1506 that is applied across the PN or PIN junction including the active medium 1508, is greater than the value of the voltage (transparency voltage) that is associated with the value of the transparency injection current, $C_t$ (i.e., $V>V|_{C=C_t(\lambda)}$).

As the applied voltage V of the variable voltage source 1506 increases beyond the transparency voltage at $V=V|_{C=C_t(\lambda)}$ the applied voltage V will excite the active medium 1508, providing gain at the operating wavelength $\lambda$ to the active medium 1508 located in Waveguide A 1502. This state of the active medium 1508 is analogous to State J, as illustrated in FIG. 4J.

This state (State J of FIG. 4J) is characterized by a relatively fast electron excitation due to the increased injection current C and applied voltage V compared with the second exemplary device state of the exemplary device (State H of FIG. 4H).

Part of the light at $\lambda$ 1518 from input port A1 1510 gains energy in the active medium 1508 and this extra energy propagates towards and exits port A2 1512. This state of the active medium 1508 is analogous to State J, as illustrated in FIG. 4J.

It should be understood that, in an exemplary embodiment, the energy exiting the port B2 1514 on Waveguide B 1504 (as light at $\lambda$ 1520) can be designed to be not substantially affected in this state. The energy exiting the port B2 1514 of the electro-optic phosistor 1500 of FIG. 13 is capable of being reused to supply signal or power input(s) to other electro-optic phosistors.

For this third exemplary device state, if the applied Voltage V is increased beyond a decoupling voltage $V_{decouple}$ (i.e. $V>V_{decouple}>V|c=C_t$), then the gain at $\lambda$ of the active medium 1508 will increase to a level such that the light at $\lambda$ 1518 will no longer couple to or transfer to Waveguide B 1504 from Waveguide A 1505 without substantial change in power. Rather the light at $\lambda$ 1516 exiting port A2 1512 and port B2 1514 will increase in intensity relative to the intensity of $I_\lambda$ of the light at $\lambda$ 1518, due to the increased gain at $\lambda$ of the active medium 1508 on Waveguide A 1502.

vi). Transitions for the Active Medium States and Device States

Transition from one active medium state to another is brought about by changing the applied voltage. The change in the active medium state then brings about a corresponding change in the device state, resulting in a change in the behavior of the light beams propagating through the device.

As an example of such transitions, suppose we start with a forward-biased voltage at above the transparency voltage $V>V|_{C=C_t(\lambda)}$. In this case, the active medium 1508 is in the state of gain analogous to State J, as illustrated in FIG. 4J (the third exemplary device state of the exemplary device 8). The active medium 1508 when in the gain state at $\lambda$ (State J in FIG. 4J) will be driven back to the transparency state at $\lambda$ (State H in FIG. 4H) when the applied voltage V of the variable voltage source 1506 decreases to become approximately equivalent to the transparency voltage at $V=V|_{C=C_t(\lambda)}$. The state of the active medium 1508 is again analogous to State H, as illustrated in FIG. 4H (the second exemplary device state of the exemplary device 8). This state (State H of FIG. 4H) is characterized by a relatively low electron excitation compared with State J of FIG. 4J (the third exemplary device state of the exemplary device 8).

When the voltage V is further reduced from $V|_{C=C_t(\lambda)}$ to zero and then to a reverse bias (V<0), any excited electrons will be de-excited and the medium will be driven to and will maintain a loss state. The state of the active medium 1508 is again analogous to State K, as illustrated in FIG. 4K (the first exemplary device state of the exemplary device 8).

vii). Exemplary Device 8 as a Switching or Modulation Element

For a given light input at $\lambda$ 1518, in the case of device 1500 of FIG. 13, the net effect of varying the voltage applied to the active medium 1508 is that increasing the applied voltage V beyond the transparency voltage $V|_{C=C_t(\lambda)}$ generates light at $\lambda$ 1516 exiting port A2 1512. Decreasing the applied voltage V below $V|_{C=C_t(\lambda)}$ removes most of the light at $\lambda$ 1516 exiting port A2 1512. In this way, the electro-optic phosistor 1500 can be used as a voltage-controlled switching element between the second and third exemplary device states described above.

As the number of electrons excited in the active medium 1508 is approximately equal to the number of electrons from the injection current flowing into the upper-energy level of the medium 1508, so the number of photons generated at $\lambda$ and propagated toward the output port 1512 is approximately equal to the number of electrons excited, if the photons are generated at $\lambda$ before the free decay of the electrons which takes place on a nanosecond time scale (for a semiconductor medium). This can occur at beam intensity high enough for at the stimulated decay rate of the excited electrons to exceed its spontaneous decay rate, such as with a beam intensity higher than the saturation intensity of the medium ($I_\lambda>I_{sat}$). As a result, the number of photons out at $\lambda$ would be nearly equal to (i.e. correlated to) the number of electrons from the injection current if the majority of the electrons ends up as excited electrons in the medium 1508. This is called electron-photon quantum-number correlation. When this happens, the device 1500 can be used as a high or near unity quantum efficiency device. If the input signal light 1518 is a continuous wave (CW) beam, then the net action of the exemplary device 1500 is to translate a beam of electrons to a beam of photons. Hence, this device can act as a quantum-number correlated electron to photon converter. In particular, if the injection current is constant, the photon flux or light power exiting port A2 1512 will be relatively constant. In this case, the device acts as a light power regulator.

It should be understood that this description covers several but not all aspects of device performance. For example, the light at $\lambda$ ($\lambda \geq \lambda_{gap}$) can be on or off, and if the light at $\lambda$ is on, the intensity $I_\lambda$ of the light at $\lambda$ can be greater than, equal to, or less than the saturation intensity of the active medium 1508. In addition, the PN or PIN junction that preferably includes the active medium 1508 can be forward (approximately V>0) or reverse (approximately V<0) biased by the applied voltage V of the variable voltage source 1506. The applied voltage V has an associated injection current C. As shown above, when V exceeds zero volts (approximately), the value of V relative to the transparency voltage at $C=C_t$ and the decoupling voltage $V_{decouple}$ has implications for the operation of the device 1500 and the state of the active medium 1508. The active medium 1508 can exhibit loss, transparency, or gain at the wavelength of operation $\lambda$ depending on the light intensity at $\lambda_2$, the wavelength $\lambda_2$, and the applied voltage V and/or injection current C. It should be understood, however, that more or fewer states of the active medium can be applied to and described instructively with respect to device 1500 in this or in other useful embodiments and/or applications.

In another useful embodiment of the device, the interaction length l is shorter than the coupling length $l_C$ (l<$l_C$). In this case not all the signal power at $\lambda$ from port A1 1510 will be coupled from Waveguide A 1502 to Waveguide B 1504 even when the medium 1508 is at a transparency state as in state H of FIG. 4H. Preferably, part of the signal power at $\lambda$ will propagate through the active medium 1508 and exit out of port A2 1512. A reverse bias applied to the active medium as in state K of FIG. 4K will turn the medium to a loss state at $\lambda$ and the signal light propagating into the active medium will be mostly absorbed and little signal power at $\lambda$ will exit port A2 1512. In this way, the electro-optic phosistor 1500 can be used as a voltage controlled switching element between the first and second exemplary states described above and can act as an optical intensity modulator.

It should be understood that these dimensions and exemplary lengths are presented for purposes of illustrating a useful embodiment of the device 1500 and are not intended to limit other exemplary embodiments of any exemplary device, or the device 1500. A variety of dimensions and sizes can be used, depending on the application desired as well as the fabrication materials, processes or technologies that are employed.

viii). MMI/Resonator Configuration Device

It should be evident to those skilled in the art that the MMI/Resonator I/Resonator II configuration for device 8 would be topologically similar to the MMI/Resonator configuration of Device 1. As in device 1, it should be understood that the MMI/Resonator I/Resonator II Configuration Devices are otherwise functionally and operationally identical to the device 1500 and descriptions and comments relating to the device 1500 are generally applicable to the MMI/Resonator Configuration Devices.

viii). PBG Implementation of the Coupler/MMI/Resonator Configuration Device

It should be evident to those skilled in the art that the PBG implementations for the Coupler/MMI/Resonator configuration of device 8 would be topologically similar to the PBG implementations for the Coupler/MMI/Resonator configuration of device 1. As in device 1, it should be understood that the PBG implementations for the Coupler/MMI/Resonator configuration of device 8 are otherwise functionally and operationally identical to the device 1500 and descriptions and comments relating to the device 1500 are generally applicable to the PBG implementations for the Coupler/MMI/Resonator configuration of device 8.

As with previously described embodiments, it should be understood that the dimensions and materials for the devices are presented for purposes of illustrating a useful embodiment of the device 1500 and its MMI/PBG/Resonator versions, and are not intended to limit other exemplary embodiments of any exemplary device, or the device 1500 its MMI/PBG/Resonator versions. A variety of dimensions and sizes can be used, depending on the application desired as well as the fabrication materials, processes or technologies that are employed. A variety of materials can be used, for example, the waveguides do not have to be semiconductor and may be optical fibers or polymer waveguides (as long as the requisite waveguiding or wave-coupling effect is achieved), the active medium does not have to be a semiconductor or quantum well but can be erbium ions doped in glass or active polymers (as long as the requisite gain/loss/ transparency properties are achived), and the resonators do not have to be semiconductors but can be glass or polymers (as long as the requisite resonance effect is achieved). Also, it should be understood that the shape of the Waveguides, MMI Structures, Photonic Bandgap Structures, or Resonators does not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

It should be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the working of these devices include those cases whereby both the gain/transparency/loss property as well as the refractive-index property of the active medium are used in bringing about the device operation.

B. Exemplary Device 9 (Electro-Optic)

Figure 14:
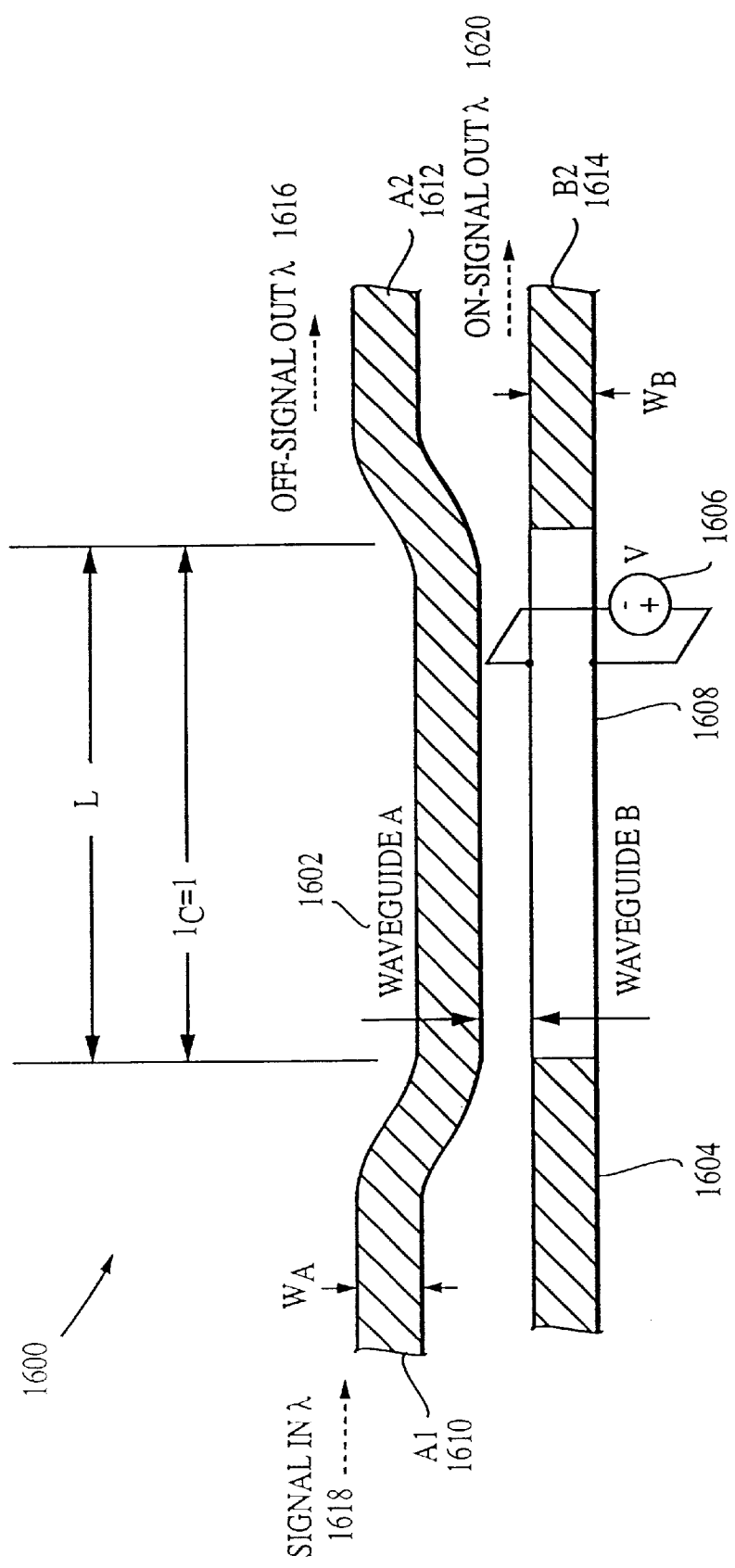
FIG. 14 illustrates an embodiment of a ninth exemplary phosistor device utilizing directionally coupled waveguides and employing electro-optics.

FIG. 14 illustrates a ninth exemplary device and a second general embodiment 1600 of an electro-optic phosistor device employing directionally coupled waveguides. For purposes of illustration and not limitation, the device is described according to one useful function as a switching element for slow or ultrafast optical pulses of sufficient energy and wavelength. The device 1600 is not limited to use as a switching element for a single light input and can be utilized as, for example, as an M×N switch, a variable coupling device (including its use in an optical loop mirror and a pulse storage ring), an electro-optic phase shifter, a resonator frequency tuning element, a light intensity modulator, a light intensity regulator, and a variable optical attenuator. It should be understood that these exemplary applications of device 1600 are intended to illustrate the wide range of uses for device 1600, and are not intended to limit the applications or other exemplary embodiments of device 1600 to these examples. The device can be referred to as an "Electro-Optic Output-Arm-Gain-Loss Gate Phosistor" (EO OGL Phosistor 1600).

EO OGL Phosistor 1600 preferably includes a first pathway of light consisting of the spatial region occupied by Waveguide A 1602 and a second pathway of light consisting of the spatial region occupied by Waveguide B 1604. The Waveguide B 1604 preferably includes an active medium 1608. A Voltage Source 1606 having a variable voltage V is applied across the active medium 1608. As described above, Waveguide B 1604 can be implemented as waveguide 450 illustrated in FIG. 5D with active medium 420 and Waveguide A 1602 can be implemented as Waveguide 400 illustrated in FIG. 5A in a useful embodiment. The Waveguide A 1602 preferably includes an input port A1 1610 and an output port A2 1612. The Waveguide B 1604 preferably includes an output port B2 1614. FIG. 14 illustrates that Waveguide A 1602 has width $W_A$ and is located at an approximately parallel distance (coupling gap or distance) $W_g$ from Waveguide B 1604, which has width $W_B$.

The input port A1 1610 on the Waveguide A 1602 is configured to receive light having wavelength λ (at λ) (SIGNAL IN λ) 1618. In a useful embodiment, this light at λ 1618 is continuous wave (CW) light. Depending on the state of the electro-optic phosistor 1600, light can be output from the output port B2 1614 as light having wavelength λ (at λ) (ON-SIGNAL OUT λ) 1620. In a useful embodiment, this light at λ 1620 is pulsed light. Light is also capable of being output from the output port A2 1612 as light having wavelength λ (at λ) (OFF-SIGNAL OUT λ) 1616. In a useful embodiment, this light at λ 1616 is pulsed light. Under certain conditions described below when the active medium on the waveguide reaches transparency and Waveguides A and B are optically transparent, most of the CW light at λ 1618 propagating along the Waveguide A 1602 will be transferred to Waveguide B 1604 after a coupling length $l_C$. It should be understood that the light signals into and out of OGL Phosistor 1600 and other useful embodiments can include pulsed light signals, continuous wave (CW) light signals, or both, depending on which of the various operating modes of the embodiments are utilized in a particular application.

The coupling length $l_C|_{X-Y}$ is defined as the length at which a wave in a first waveguide (X) maximally couples into a second waveguide (Y) that is coupled to the first waveguide (X). In this device 1600, the interaction length l, defined as the length of interaction between waves in Waveguides A 1602 and B 1604 extends to approximately the full coupling length $l_C$, so that $l=l_C$ in one useful embodiment of the device, but can be different from $l_C$ in other useful embodiments of the device. In the case of FIG. 14, the interaction length is defined geometrically by the length for which waveguides A and B run closely parallel to each other.

As shown in FIG. 14, the length L of the active medium 1608 is equal to the interaction length l (L=l). The length L of the active medium 1608 may be longer or shorter than l. Varying the length L of the active medium 1608 relative to the interaction length l will vary the input to output signal conversion efficiency but will otherwise not affect the general operating principle of the device.

It should be understood that the above dimensions, exemplary lengths, and geometry are presented for purposes of illustrating a useful embodiment of the device 1600 and are not intended to limit other exemplary embodiments of any exemplary device, or the device 1600. A variety of dimensions, sizes, and geometry can be used, depending on the application desired as well as the fabrication materials, processes or technologies that are employed. For example, while the choice of $l=l_C$ is illustrated in this exemplary device, the interaction length may vary from the coupling length $l_C$ and still achieve similar device functions.

Also, it should be understood that the shape of the waveguides does not generally have to be linear. Curved shapes and different waveguide dimensions may be utilized as long as they achieve the same functions such as waveguiding and wave-coupling. The active medium can be centered at an alternative location along waveguide B other than that illustrated in FIG. 14, and there can be more than one disconnected active medium areas along waveguide B. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel as long as the desired effect of wave-coupling is achieved.

In an exemplary embodiment of device 1600 for operation at 800 nm wavelength range, the wavelength λ can be at 820 nm and the Waveguide A 1602 can be implemented as the Waveguide 400 illustrated in FIG. 5A and Waveguide B 1604 can be implemented as the Waveguide 450 with an active medium 420 illustrated in FIG. 5D, in an $Al_xGa_{1-x}As$ embodiment for the waveguide core having alloy composition x=0.3 giving a bandgap energy of around 690 nm. Thus the core material in waveguides A and B is transparent at the wavelength λ of 820 nm. When the active medium in waveguide B is fully de-excited, the active medium absorbs light at 820 nm wavelength. The active medium is an essentially three-level medium for which the electrons supplied from current injection are free to relax from an upper-energy level to the upper-energy level corresponding to the 820 nm absorption.

In an exemplary embodiment of device 1600 for operation at 1500 nm wavelength range, the wavelength λ can be at 1500 nm and the Waveguide A 1602 can be implemented as the Waveguide 400 illustrated in FIG. 5A and Waveguide B 1604 can be implemented as the Waveguide 450. Both have an active medium 420 illustrated in FIG. 5D, in an $In_{1-x}Ga_xAs_{1-y}P_y$ embodiment for the waveguide core having alloy compositions x=0.16 and y=0.67 giving a bandgap energy of around 1100 nm. Thus the core material in waveguides A and B is transparent at the wavelength λ of 1500 nm. When the active medium is fully de-excited, the active medium in waveguide B absorbs light at 1500 nm wavelength. The active medium is an essentially three-level medium for which the electrons supplied from current injection are free to relax from the upper-energy level to the upper-energy level corresponding to the 1500 nm absorption.

In an exemplary embodiment for application to the 1500 nm (or 1.5 μm) wavelength range, the cross-sectional dimensions of the waveguide 400 or 450 are 0.4 μm wide by 0.25 μm thick. In this exemplary embodiment, the Waveguide A 1502 has width $W_A$ equal to 0.4 μm and is located at an approximately parallel distance $W_g$ from Waveguide B 1604 of 0.4 μm, while Waveguide B 1504 has width $W_B$ equal to 0.4 μm. The material refractive indices of the Waveguides A, the Waveguide G, and the Waveguide B are denoted as $n_A$, $n_B$, and $n_C$, respectively, and are taken to be $n_A=n_B=n_G=3.4$. These refractive indices give an effective planar-waveguide propagating refractive index of about 2 in a planar waveguide structure with a thickness of 0.25 μm. The material refractive index outside the waveguides is taken to be 1.5. In this exemplary embodiment for which the wavelengths of light are at around 1500 nm range, $l_C$ is 15 μm.

It should be understood that these dimensions, exemplary lengths, and geometry are presented for purposes of illustrating a useful embodiment of the devices 1600 and are not intended to limit other exemplary embodiments of any exemplary device, or the devices 1600. A variety of dimensions, sizes, and geometry can be used, depending on the application desired as well as the fabrication materials, processes or technologies that are employed.

i) General Operating Principle for the Device

The main action of the injection current or applied voltage to the active medium preferably is to bring the medium from a state of loss or transparency to a state of gain. The loss, transparency, or gain state of the medium then affect the transfer of light from various inputs to various outputs. The general operation of the device can be illustrated via computer simulation of such light transfer as a function of the medium's loss/gain coefficient (gain and loss coefficients are related as loss coefficient can be described as negative gain coefficient).

Figure 14A:
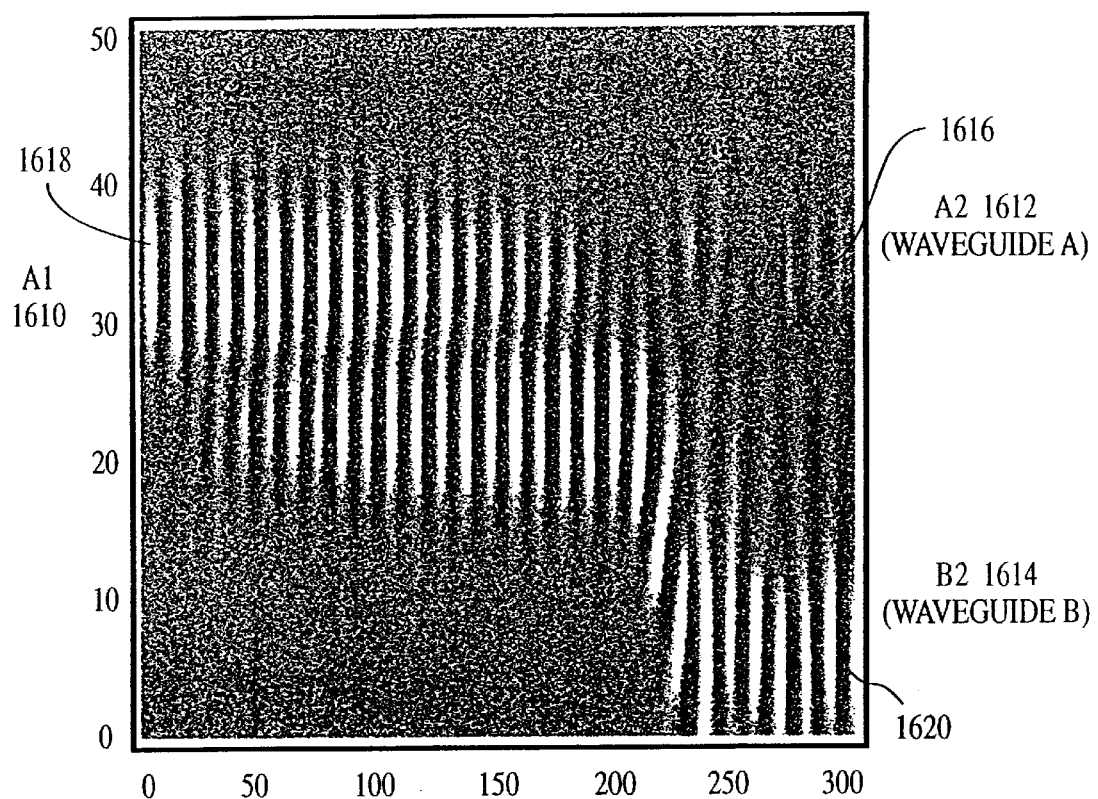
FIGS. 14A–14B are computer simulations of the spatial distribution of the electrical field strength of the device of FIG. 14.
Figure 14A:
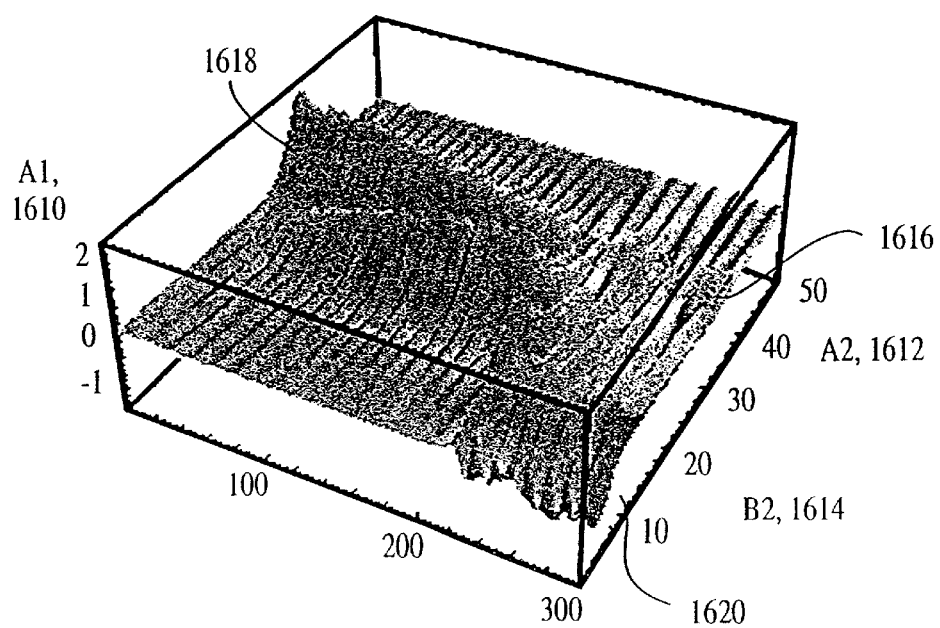
Figure 14B:
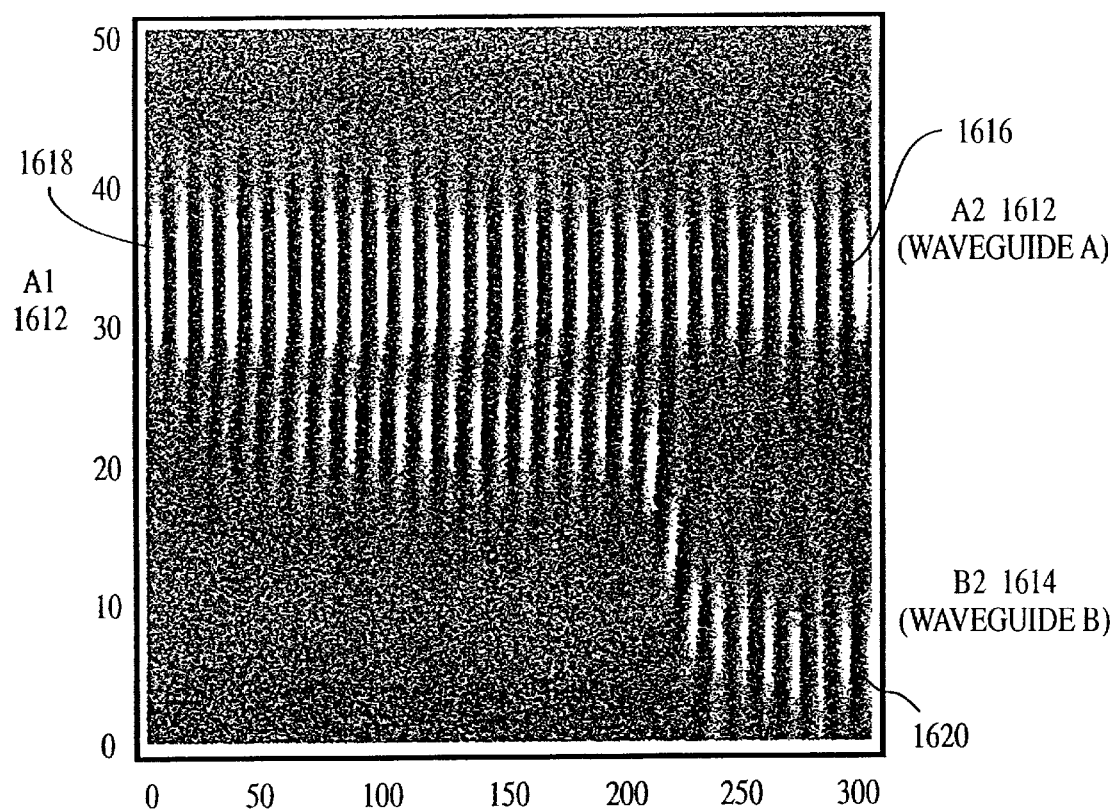
Figure 14B:
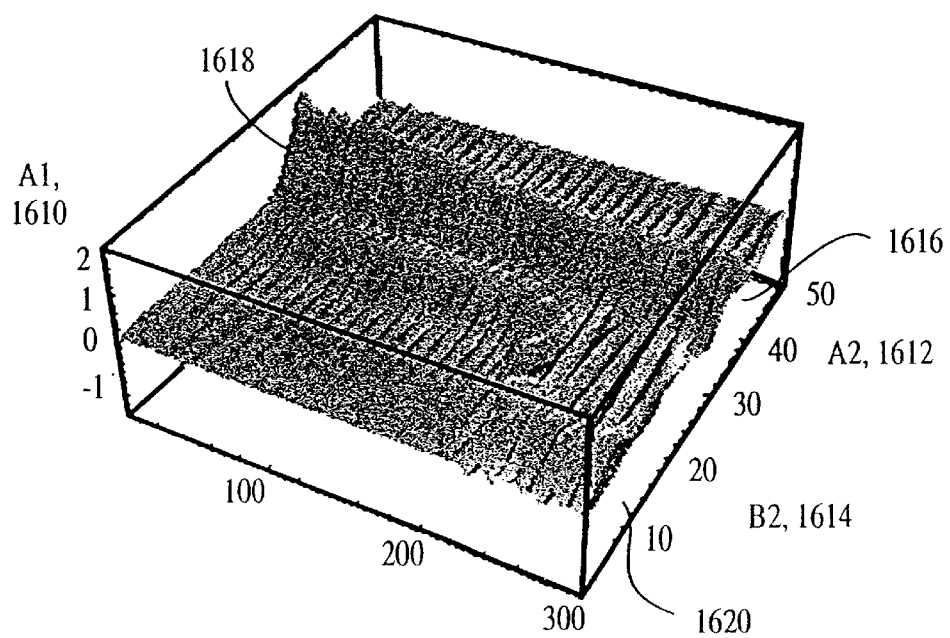
Figure 14C:
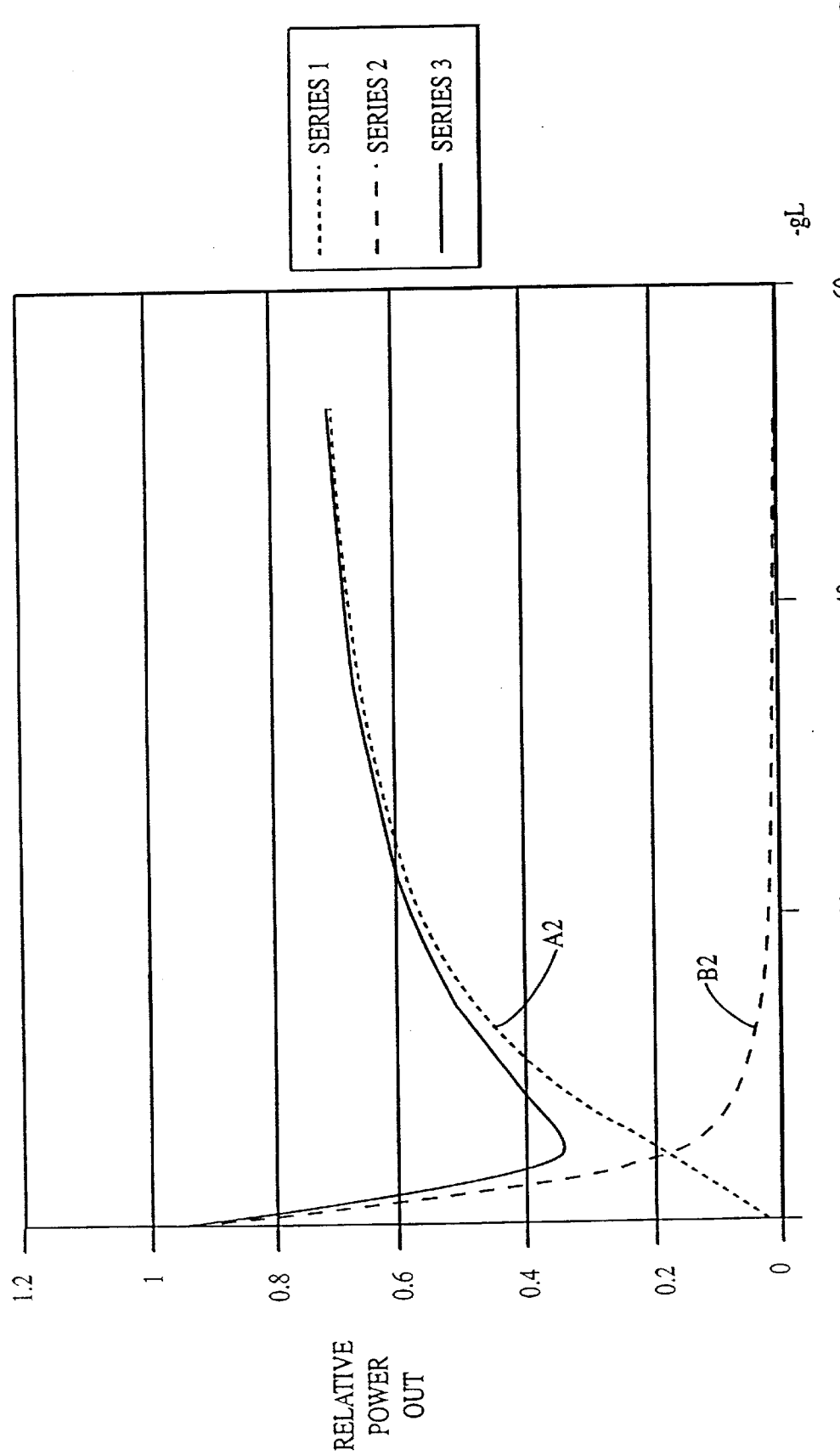
FIGS. 14C–14D are graphical portrayals of the performance of the device of FIG. 14.

An exemplary operation of the device can be illustrated via the results of computer simulation as shown in FIGS. 14A, 14B, and 14C for operation at 1500 nm wavelength range. The geometry for the device simulated is as described by the exemplary embodiment given above for application to the 1500 nm wavelength range. FIGS. 14A and 14B show the spatial distribution of the electric field strength for the light input at λ 1618 after propagating into waveguides A and B. The upper parts of FIGS. 14A and 14B are 2-D plots for which the brightness shows the relative field strength, and the lower parts of FIGS. 14A and 14B are 3-D plots for which the heights show the relative field strength. FIG. 14C shows the relative power at the output ports of waveguide A (port A2 1612) and waveguide B (port B2 1614) as a function of −gL (the product of the loss coefficient −g and the medium length L). In FIG. 14C, the output at A2 is shown as a dotted line, the output at B2 is shown as a dashed line, and the solid line is the sum of the outputs at A2 and B2 (i.e. the dashed line plus the dotted line). FIG. 14A shows the situation when the gain medium is in the state of transparency (at a loss coefficient of 0 per $\mu$m or −gL=0). From FIG. 14A, it is evident that most of the energy of λ 1618 exits from Waveguide B 1604 at the port B2 1614. FIG. 14B shows the situation when the medium is de-excited to the state of loss at λ (at a gain coefficient of about −3.3 per $\mu$m or −gL=50). From FIG. 14B, it is evident that most of the energy of λ exits from Waveguide A. FIG. 14A and FIG. 14B show the two representative interference flux patterns of light for the device, which is dependent on the state of the active medium. In particular, one can switch between these two representative interference flux patterns of light by changing the state of the active medium through the action of an applied voltage or injection current. Note that besides these two states, there are other states, for example the intermediate state at −gL=6 shown in FIG. 14C, for which there is substantial total energy absorbed by the loss medium so that both output ports at waveguide A and waveguide B have low output power.

Figure 14D:
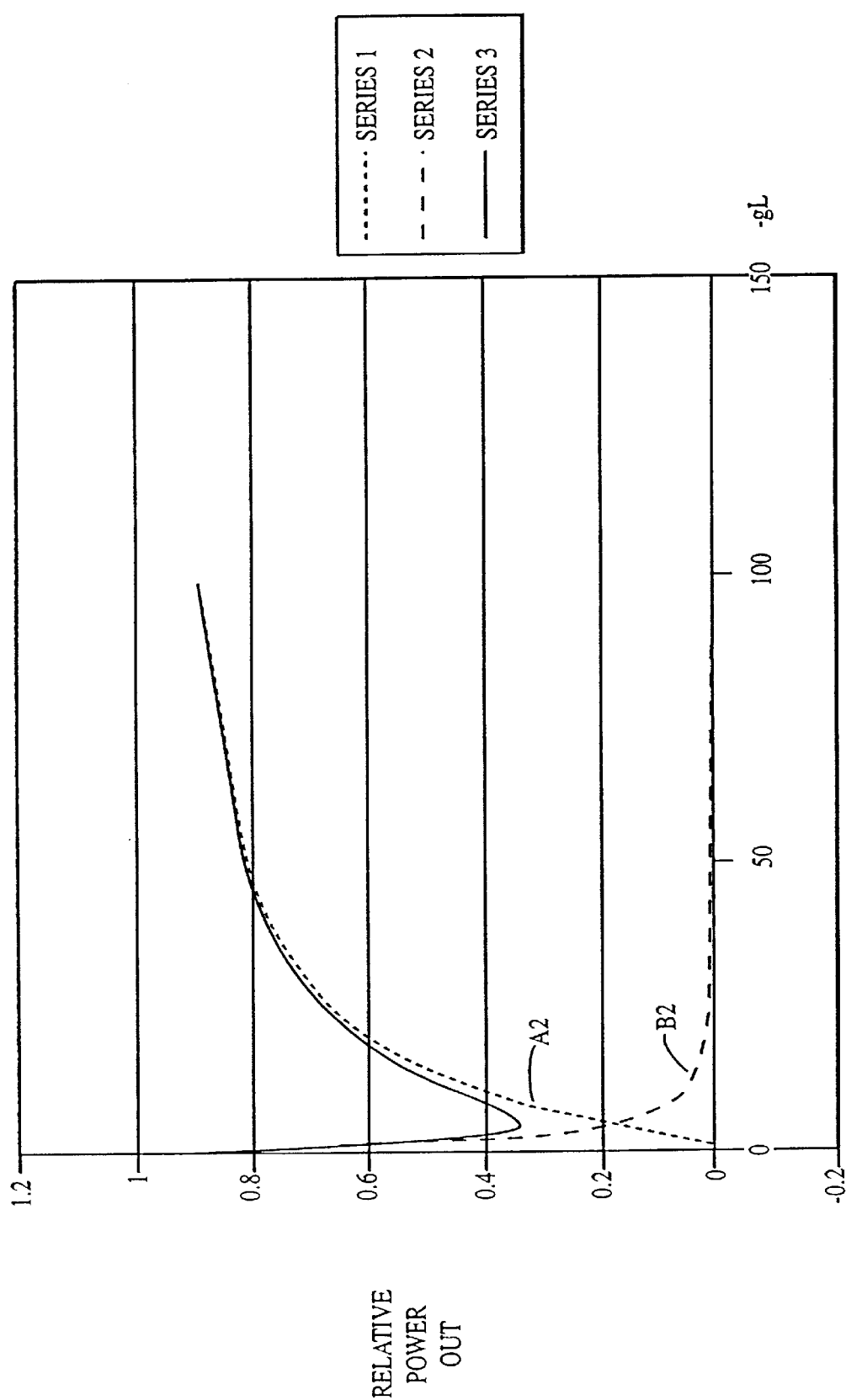

FIG. 14D, depicts the case of a longer device for which the gap $W_g$ is 1.2 $\mu$m instead of 0.4 $\mu$m, and the coupling length $l_C$ is 120 $\mu$m. Again the interaction length l is set equal to $l_C$ and the medium length L is equal to $l_C$. FIG. 14D shows the relative powers at the output ports of waveguide A (port A2) and waveguide B (port B2) as a function of gL (the product between the gain coefficient g and the medium length L). Comparing FIG. 14C and FIG. 14D, we see that the switching is more complete for the longer device case of FIG. 14D. While switching still occurs at a gL of about −50, a longer L means a short g (for gL=−50, L=120 $\mu$m, we have g=−0.4 $\mu$m), while means the switching voltage can be lower.

ii) Exemplary Device States

Various operating modes of a general active region or medium (such as active medium 420 operating as a PN or PIN junction) with an applied voltage V (or injection current C) were defined and described above and illustrated in FIGS. 4G–K. Since the electro-optic phosistors such as device 1600 and related exemplary embodiments thereto preferably include one or more active regions, the devices and embodiments thereto can be characterized according to the states illustrated in FIGS. 4G–K.

In a preferred and useful embodiment, the electro-optic phosistor 1600 operates as a switching element. The wavelength of the light at λ input to the device 1600 is preferably around the bandgap energy (associated with $\lambda_{gap}$).

It should be understood that the light signals into and out of OGL Phosistor 1600 and other useful embodiments can include pulsed light signals, continuous wave (CW) light signals, or both, depending on which of the various operating modes of the embodiments are utilized in a particular application.

It should be understood that the action of the exemplary Phosistor 1600 is defined by the paths taken by the light beams in the device 1600. The paths taken by the light beams in the device 1600 are preferably dependent on the state of the active medium in the interaction region of the Phosistor 1600 (e.g. state of loss, transparency, or gain).

The combination of the state of the active medium and the state of light beam propagation in the device define the state of the device. The various operations of the device 1600 can be more precisely described in terms of such device states. It should be understood however that more or fewer device states can be applied to and described instructively with respect to device 1600 in this or in other useful embodiments and/or applications.

In particular, the operation of the device can be described as making transitions from one class of states to another class of states under the influence of some external inputs such as the power of the input beam, the locations where the input beam is received, applied electrical energy preferably including applied voltages or currents.

iii). A First Exemplary Device State

For this first exemplary device state of the electro-optic phosistor 1600, the light beam at λ 1618 is turned "on." The wavelength λ is at the wavelength of absorption and gain of the active medium, which is slightly shorter than the bandgap wavelength $\lambda_g$ of the active medium ($\lambda < \lambda_g$). The intensity $I_\lambda$ of the light beam at λ 1618 can be greater than, equal to, or less than the saturation intensity $I_{sat}$ of the active medium 1608. The voltage V of the variable voltage source 1606 that is applied across the PN or PIN junction including the active medium 1608, is approximately less than or equal to zero volts. At this value, the PN or PIN junction, including the active medium 1608, is reverse-biased by the applied voltage V.

Light at λ 1618 enters at the port A1 1610 on the Waveguide A 1602. The light at λ 1618 propagates along the Waveguide A 1602. The energy of light at λ 1618 that reaches waveguide B will lose energy in the active medium 1608 so that the most of the light at λ 1618 does not transfer to Waveguide B 1604 and thus does not exit from the output on B2 1614. Rather, most of the light at λ 1618 propagates through Waveguide A 1602, and exits from Waveguide A 1602 at the port A2 1612 as light at λ 1616. The reverse bias from the applied voltage V drives the active medium 1608 to a state of loss at λ and maintains this state while the applied voltage V is approximately at or below zero volts. There is effectively little electron excitation. Instead there is fast electron de-excitation occurring to assist in driving the active medium to a loss state at λ. This state of the active medium 1608 is analogous to Case K, as illustrated in FIG. 4K.

iv). A Second Exemplary Device State

For this second exemplary device state of the electro-optic phosistor 1600, the light beam at λ 1618 is turned "on." The wavelength λ is at the wavelength of absorption and gain of the active medium, which is slightly shorter than the bandgap wavelength $\lambda_g$ of the active medium ($\lambda < \lambda_g$). The intensity $I_\lambda$ of the light beam at λ 1618 can be greater than, equal to, or less than the saturation intensity $I_{sat}$ of the active medium 1608. The voltage V of the variable voltage source 1606 that is applied across the PN or PIN junction including the active medium 1608, is approximately equal to the value of the voltage that is associated with a critical value of the injection current, $C_t(\lambda)$ (i.e., $V \cong V|_{C=C_t(\lambda)}$), called the transparency current. At this value, the PN or PIN junction including the active medium 1608 is forward-biased by the applied voltage V. This transparency current, $C_t(\lambda)$ is the approximate value of the current when the active medium 1608 is driven to a state of transparency at wavelength λ by the current. The corresponding voltage $V|_{C=C_t(\lambda)}$ that gives rise to this transparency current $C_t(\lambda)$, is called the transparency voltage. This state of the active medium is analogous to State H as illustrated in FIG. 4H.

Light at λ 1618 enters at the port A1 1610 on the Waveguide A 1602. The light at λ 1618 propagates along the Waveguide A 1602 and is subsequently transferred to Waveguide B 1604 after a coupling length $l_C$. The light at λ 1618 then exits from Waveguide B 1604 at the port B2 1614 as light at λ 1620. While the applied voltage V is approximately at the transparency voltage $V|_{C=C_{t(\lambda)}}$, the active medium 1608 is driven to and maintained in a state of transparency at λ. Not enough electron excitations are supplied by the applied voltage/injection current to drive the active medium to a gain state at λ. This state of the active medium 1608 is analogous to Case H, as illustrated in FIG. 4H.

v). A Third Exemplary Device State

For this third exemplary device state of the electro-optic phosistor 1600, the light beam at λ 1618 is turned "on." The wavelength λ is at the wavelength of absorption and gain of the active medium, which is slightly shorter than the bandgap wavelength $\lambda_g$ of the active medium ($\lambda < \lambda_g$). The intensity $I_\lambda$ of the light beam at λ 1618 is either greater than, equal to, or less than the saturation intensity $I_{sat}$ of the active medium 1608. The voltage V of the variable voltage source 1606 that is applied across the PN or PIN junction including the active medium 1608, is greater than the value of the voltage that is associated with the transparency value of the injection current, $C_t(\lambda)$ (i.e., $V > V|_{C=C_t(\lambda)}$.

As the applied voltage V of the variable voltage source 1606 increases beyond the transparency voltage at $V=V|_{C=C_t(\lambda)}$, the applied voltage V will excite the active medium 1608, providing gain at the operating wavelength λ to the active medium 1608 located in Waveguide B 1604. This state of the active medium 1608 is analogous to Case J, as illustrated in FIG. 4J.

This state (state J of FIG. 4J) is characterized by a relatively fast electron excitation due to the increased injection current C and applied voltage V compared with the first exemplary state of the exemplary device (state H of FIG. 4H).

Some of the light at λ 1618 from input port A1 1610 transfers to Waveguide B 1604 and gains energy in the active medium 1608 and some extra energy does not exit Waveguide B 1604 but rather propagates towards and exits port A2 1612.

vi). Transitions for the Active Medium States and Device States

Transition from one active medium state to another is brought about by changing the applied voltage. The change in the active medium state then brings about a corresponding change in the device state, resulting in a change in the behavior of the light beams propagating through the device.

As an example of such transitions, suppose we start with a forward-biased voltage at above the transparency voltage $V > V|_{C=C_t(\lambda)}$. In this case, the active medium 1608 is in the state of gain analogous to State J, as illustrated in FIG. 4J (the third exemplary device state of the exemplary device 9). The active medium 1608 when in the gain state at λ (State J in FIG. 4J) will be driven back to the transparency state at λ (State H in FIG. 4H) when the applied voltage V of the variable voltage source 1606 decreases to become approximately equivalent to the transparency voltage at $V = V|_{C=C_t(\lambda)}$. The state of the active medium 1608 is again analogous to State H, as illustrated in FIG. 4H (the second exemplary device state of the exemplary device 9). This state (State H of FIG. 4H) is characterized by a relatively low electron excitation compared with State J of FIG. 4J (the third exemplary device state of the exemplary device 8).

When the voltage V is further reduced from $V|_{C=C_t(\lambda)}$ to zero and then to a reverse bias (V<0), any excited electrons will be de-excited and the medium will be driven to and will maintain a loss state. The state of the active medium 1608 is again analogous to State K, as illustrated in FIG. 4K (the first exemplary device state of the exemplary device 9).

vii) Exemplary Device 9 as a Switching or Modulation Element

For a given light input at λ 1618, in the case of device 1600 of FIG. 14 the net effect of varying the voltage applied to the active medium 1608 is that the increasing the applied voltage V to $V|_{C=C_t(\lambda)}$ generates light at λ 1620 exiting port B2 1614 on Waveguide B 1604, while decreasing the applied voltage V below approximately zero volts results in light at λ 1616 exiting port A2 1612 on Waveguide A 1602. In this way, the electro-optic phosistor 1600 can be used as a voltage-controlled switching element between the first and the second exemplary states described above, and can act as an optical switch that switches optical energy between output A2 1612 and output B2 1614.

It should be understood that this description covers several but not all aspects of device performance. For example, the light at λ ($\lambda \leq \lambda_{gap}$) can be on or off, and if the light at λ is on, the intensity $I_\lambda$ of the light at λ can be greater than, equal to, or less than the saturation intensity of the active medium 1608. In addition, the PN or PIN junction that preferably includes the active medium 1608 can be forward (approximately V>0) or reverse (V approximately <0) biased by the applied voltage V of the variable voltage source 1606. The applied voltage V has an associated injection current C. As shown above, when V exceeds zero volts (approximately), the value of V relative to the transparency voltage at $C=C_t(\lambda)$ has implications for the operation of the device 1600 and the state of the active medium 1608. The active medium 1608 can exhibit loss, transparency, or gain at the wavelength of operation λ depending on the light intensity at λ and the applied voltage V and/or injection current C. It should be understood however that more or fewer states of the active medium can be applied to and described instructively with respect to device 1600 in this or in other useful embodiments and/or applications.

In another useful embodiment of the device 1600, the active medium 1608 does not contain a PN or PIN junction, and the quantum contained stark effect or the Franz-Keldysh effect is used to change the medium from transparency to absorption under an applied voltage across the active medium 1608. The device otherwise functions in a way identical to the exemplary device 9. In this case, the first exemplary state will correspond to state F in FIG. 4F and the second exemplary state will correspond to state E in FIG. 4E.

viii). Exemplary Device 9 as a Phase Shifter

In another useful embodiment of the device, the waveguide interaction length is approximately $2l_C$ ($l \cong l_C$) or an even number multiple of $l_C$ ($l \cong 2ml_C$, where m is a positive integer). In this case, when the active medium 1608 is in a state of transparency as in state H of FIG. 4H, the signal light input 1618 will first propagate along Waveguide A 1602 but will have most of the energy transferred from Waveguide A 1602 to Waveguide B 1604 after propagating for a length of $l_C$. This energy will be transferred from Waveguide B 1604 back to Waveguide A 1602 after the light further propagates for another length of $l_C$, resulting in signal output at $\lambda$ from port A2 1612 if $l = 2l_C$. When the active medium is in a state of loss as in state K of FIG. 4K, most of the signal light input 1618 will not transfer from Waveguide A 1602 to Waveguide B 1604 as it propagates but will propagate only along Waveguide A 1602 and exit port A2 1612. However, the signal light will experience a different phase shift due to the different pathway it takes to get to port A2 1612. Specifically, it will attain a change of phase shift by $\pi$ radians (or 180°).

Hence, the net action is that the signal light will exit the same port A2 1618 when the active medium changes from the first state to the second state but with a change in the optical phase by $\pi$ radians (or 180°). In this case, the device functions as a voltage-controlled optical phase shifter.

viiii). Exemplary Device 9 as a Wavelength Multiplexer/De-Multiplexer or Wavelength Selective Switch In another useful embodiment of the device, the waveguides A and B have unequal widths $W_A$ and $W_B$. As is well known to those skilled in the art, waveguide couplers with unequal waveguide widths will have strong wavelength sensitivity. In particular, when the active medium is in the transparency state, only certain wavelength of light will couple maximally from waveguide A to waveguide B, thus allowing the device to act not only as a switch but as a wavelength selective switch. Except for the difference in the waveguide widths providing wavelength sensitivity, this embodiment of the device is otherwise functionally and operationally identical to the device 1600 and descriptions and comments relating to the device 1600 are generally applicable to this device.

x). MMI/Resonator Configuration Device

It should be evident to those skilled in the art that the MMI/Resonator I/Resonator II configuration for device 9 would be topologically similar to the MMI/Resonator I/Resonator II configuration of Device 2. As in device 2, it should be understood that the MMI/Resonator I/Resonator II Configuration Devices are otherwise functionally and operationally identical to the device 1600 and descriptions and comments relating to the device 1600 are generally applicable to the MMI/Resonator I/Resonator II Configuration Devices. The use of resonators can help to reduce the required operating voltage of the device as well as the device size.

xi). PBG Implementation of the Coupler/MMI/Resonator Configuration Device

It should be evident to those skilled in the art that the PBG implementations for the Coupler/MMI/Resonator I/Resonator II configuration of device 9 would be topologically similar to the PBG implementations for the Coupler/MMI/Resonator I/Resonator II configuration of device 2. As in device 2, it should be understood that the PBG implementations for the Coupler/MMI/Resonator I/Resonator II configuration of device 9 are otherwise functionally and operationally identical to the device 1600 and descriptions and comments relating to the device 1600 are generally applicable to the PBG implementations.

As with the previous embodiments, it should be understood that the dimensions and materials for the devices are presented for purposes of illustrating a useful embodiment of the device 1600 and its MMI/PBG/Resonator versions, and are not intended to limit other exemplary embodiments of any exemplary device, or the device 1600 its MMI/PBG/Resonator versions. A variety of dimensions and sizes can be used, depending on the application desired as well as the fabrication materials, processes or technologies that are employed. A variety of materials can be used, for examples, the waveguides do not have to be semiconductors and may be optical fibers or polymer waveguides (as long as the requisite waveguiding or wave-coupling effect is achieved), the active medium does not have to be a semiconductor or quantum well but can be erbium ions doped in glass or active polymers (as long as the requisite gain/loss/transparency properties are achieved), and the resonators do not have to be semiconductors but can be glass or polymers (as long as the requisite resonance effect is achieved). Also, it should be understood that the shape of the Waveguides, MMI Structures, Photonic Bandgap Structures, or Resonators does not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

It should be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the working of these devices include those cases whereby both the gain/transparency/loss property as well as the refractive-index property of the active medium are used in bringing about the device operation.

C. Exemplary Device 10 (A Three Gate Electro-Optic Device)

Figure 15:
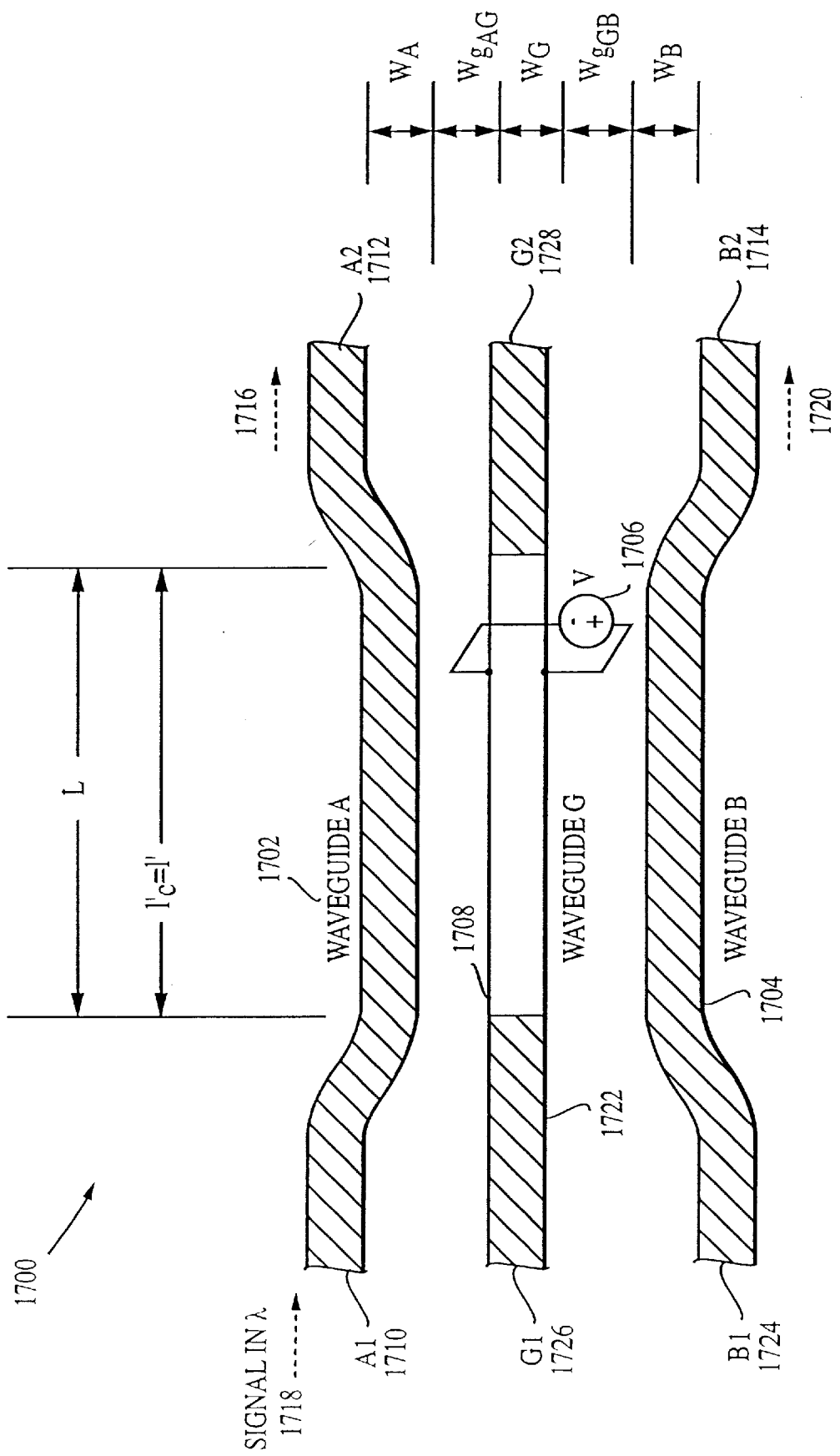
FIG. 15 illustrates an embodiment of a tenth exemplary phosistor device utilizing directionally coupled waveguides and employing electro-optics.

FIG. 15 illustrates a tenth exemplary device and a second general embodiment 1700 of an electro-optic phosistor device employing directionally coupled waveguides. For purposes of illustration and not limitation, the device is described according to one useful function as a switching element for slow or ultrafast optical pulses of sufficient energy and wavelength. The device 1700 is not limited to use as a switching element for a single light input and can be utilized as, for example, as an M×N switch, a variable coupling device (including its use in an optical loop mirror and a pulse storage ring), an electro-optic phase shifter, a resonator frequency tuning element, a light intensity modulator, a light intensity regulator, and a variable optical attenuator. It should be understood that these exemplary applications of device 1700 are intended to illustrate the wide range of uses for device 1700, and are not intended to limit the applications or other exemplary embodiments of device 1700 to these examples. The device can be referred to as an "Electro-Optic Mid-Arm-Gain-Loss Gate Phosistor" (EO MGL Phosistor 1700).

It should be understood that the phosistor device 1700 as presented in FIG. 15 can also be employed as an all-optical device by utilizing input light to modify the state of the active medium (with respect to an operating wavelength of other input light) to affect the interference and light transfer properties of the device 1700 in the way described with exemplary devices 1 through 7, rather than through the application of a voltage or the injection of current.

EO MGL Phosistor 1700 preferably includes a first pathway of light consisting of the spatial region occupied by Waveguide A 1702 and a second pathway of light consisting of the spatial region occupied by Waveguide B 1704, and a third waveguide G 1722. The Waveguide G 1722 preferably includes an active medium 1708. A Voltage Source 1706 having a variable voltage V is applied across the active medium 1708. Waveguide G 1722 can be implemented as waveguide 450 illustrated in FIG. 5D with active medium 420. Waveguide A 1702 and waveguide B 1704 can be implemented as Waveguide 400 illustrated in FIG. 5A in a useful embodiment. The Waveguide A 1702 preferably includes an input port A1 1710 and an output port A2 1712. The Waveguide B 1704 preferably includes an input port 1724 and an output port B2 1714. The Waveguide G 1722 preferably includes an input port G1 1726 and an output port G2 1728, as well as the active medium 1708. FIG. 15 illustrates that Waveguide A 1702 has width $W_A$ and is located at an approximately parallel distance (coupling gap or distance) $W_{gAG}$ from Waveguide G 1722, which has width $W_G$. Waveguide G 1722 is in turn located at an approximately parallel distance (coupling gap or distance) $W_{gGB}$ from Waveguide B 1704, which has width $W_B$.

The input port A1 1710 on the Waveguide A 1702 is configured to receive light having wavelength $\lambda$ (at $\lambda$) (SIGNAL IN $\lambda$) 1718. In a useful embodiment, this light at $\lambda$ 1718 is continuous wave (CW) light. Depending on the state of the electro-optic phosistor 1700, light can be output from the output port B2 1714 as light having wavelength $\lambda$ (at $\lambda$) (ON-SIGNAL OUT $\lambda$) 1720. In a useful embodiment, this light at $\lambda$ 1720 is pulsed light. Light is also capable of being output from the output port A2 1712 as light having wavelength $\lambda$ (at $\lambda$) (OFF-SIGNAL OUT $\lambda$) 1716. In a useful embodiment, this light at $\lambda$ 1716 is pulsed light. Under certain operating conditions described below when the active medium on the waveguide reaches transparency and Waveguides A, B, and G are optically transparent, most of the CW light at $\lambda$ 1718 propagating along the Waveguide A 1702 will be transferred to Waveguide B 1704 after a coupling length $l'_C$. It should be understood that the light signals into and out of MGL Phosistor 1700 and other useful embodiments can include pulsed light signals, continuous wave (CW) light signals, or both, depending on which of the various operating modes of the embodiments are utilized in a particular application.

The coupling length $l'_C|_{X-Z-Y}$ is defined as the length at which a wave in a first waveguide (X) maximally couples into a second waveguide (Y) that is coupled to the first waveguide (X). There may be one or more intermediate waveguides between waveguides X and Y, which can be represented by one waveguide (Z). As is known to those skilled in the art, the coupling length is a function of the gap distance between each pair of waveguides and the width of each waveguide. The gap distances can be chosen to achieve maximal coupling between waveguide X and waveguide Y through intermediate coupling between waveguide X to waveguide Z and waveguide Z to waveguide Y, where Z can represent one or more waveguides.

In this device 1700, the interaction length l', defined as the length of interaction between waves in Waveguides A 1702, G 1722, and B 1704 extends to approximately the full coupling length $l'_C$ so that $l'=l'_C$ in one useful embodiment of the device but can be different from $l'_C$ in other useful embodiments of the device. In the case of FIG. 15, the interaction length is defined geometrically by the length for which waveguides A, G, and B run closely parallel to each other.

As shown in FIG. 15, the length L of the active medium 1708 is about equal to the interaction length l' (L=l'). The length L of the active medium 1708 may be somewhat longer or shorter than l'. Varying the length L of the active medium 1708 relative to the interaction length l' will vary the input to output signal conversion efficiency but will otherwise not affect the general operating principle of the device.

It should be understood that the above dimensions, exemplary lengths, and geometry are presented for purposes of illustrating a useful embodiment of the device 1700 and are not intended to limit other exemplary embodiments of any exemplary device, or the device 1700. A variety of dimensions, sizes, and geometry can be used, depending on the application desired as well as the fabrication materials, processes or technologies that are employed. For example, while the choice of $l=l'_C$ is illustrated in this exemplary device, the interaction length may vary from the coupling length $l'_C$ and still achieve similar device functions.

Also, it should be understood that the shape of the waveguides does not generally have to be linear. Curved shapes and different waveguide dimensions may be utilized as long as they achieve the same functions such as waveguiding and wave-coupling. The active medium can be centered at an alternative location along waveguide B other than that illustrated in FIG. 15, and there can be more than one disconnected active medium areas along waveguide B. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same widths and dimensions as long as the desired effect of wave-coupling is achieved.

In an exemplary embodiment of device 1700 for operation at 800 nm wavelength range, the wavelength $\lambda$ can be at 820 nm and the Waveguides A 1702 and B 1704 can be implemented as the Waveguide 400 illustrated in FIG. 5A and Waveguide G 1722 can be implemented as the Waveguide 450 with an active medium 420 illustrated in FIG. 5D, in an $Al_xGa_{1-x}As$ embodiment for the waveguide core having alloy composition x=0.3 giving a bandgap energy of around 690 nm. Thus the core material in waveguides A, B, and G is transparent at the wavelength $\lambda$ of 820 nm. When the active medium in waveguide G is fully de-excited, the active medium absorbs light at 820 nm wavelength. The active medium is an essentially three-level medium for which the electrons supplied from current injection are free to relax from an upper-energy level to the upper-energy level corresponding to the 820 nm absorption.

In an exemplary embodiment of device 1700 for operation at 1500 nm wavelength range, the wavelength $\lambda$ can be at 1500 nm and the Waveguides A 1702 and B 1704 can be implemented as the Waveguide 400 illustrated in FIG. 5A and Waveguide G 1722 can be implemented as the Waveguide 450. Both have an active medium 420 illustrated in FIG. 5D, in an $In_{1-x}Ga_xAs_{1-y}P_y$ embodiment for the waveguide core having alloy compositions x=0.16 and y=0.67 giving a bandgap energy of around 1100 nm. Thus the core material in waveguides A, B, and G is transparent at the wavelength λ of 1500 nm. When the active medium in waveguide G is fully de-excited, the active medium absorbs light at 1500 nm wavelength. The active medium is an essentially three-level medium for which the electrons supplied from current injection are free to relax from an upper-energy level to the upper-energy level corresponding to the 1500 nm absorption.

In an exemplary embodiment for application to the 1500 nm (or 1.5 μm) wavelength range, the cross-sectional dimensions of the waveguide 400 or 450 are 0.4 μm wide by 0.25 μm thick. In an exemplary embodiment, the Waveguide A 1702 has width $W_A$ equal to 0.4 μm and is located at an approximately parallel distance $W_{gAG}$ from Waveguide G 1722 of 0.3 μm, while the Waveguide G 1722 has width $W_G$ equal to 0.4 μm. In this embodiment, the Waveguide G 1722 is in turn located at an approximately parallel distance $W_{gGB}$ from Waveguide B 1704 of 0.3 μm, while the Waveguide B 1704 has width $W_B$ equal to 0.4 μm. The material refractive indices of the Waveguides A, the Waveguide G, and the Waveguide B are denoted as $n_A$, $n_B$, and $n_C$, respectively, and are taken to be $n_A=n_B=n_G=3.4$. These refractive indices give an effective planar-waveguide propagating refractive index of about 2 in a planar waveguide structure with a thickness of 0.25 μm. The material refractive index outside the waveguides is taken to be 1.5. In this exemplary embodiment for which the wavelengths of light are at around 1500 nm range, $l'_C$ is about 15 μm.

It should be understood that these dimensions, exemplary lengths, and geometry are presented for purposes of illustrating a useful embodiment of the devices 1700 and are not intended to limit other exemplary embodiments of any exemplary device, or the devices 1700. A variety of dimensions, sizes, and geometry can be used, depending on the application desired as well as the fabrication materials, processes or technologies that are employed.

i) General Operating Principle for the Device

The main action of the injection current or applied voltage to the active medium preferably is to bring the medium from a state of loss or transparency to a state of gain. The loss, transparency, or gain state of the medium then affects the transfer of light from various inputs to various outputs. The general operation of the device can be illustrated via computer simulation of such light transfer as a function of the medium's loss/gain coefficient (gain and loss coefficients are related as gain coefficient can be described as negative loss coefficient).

Figure 15A:
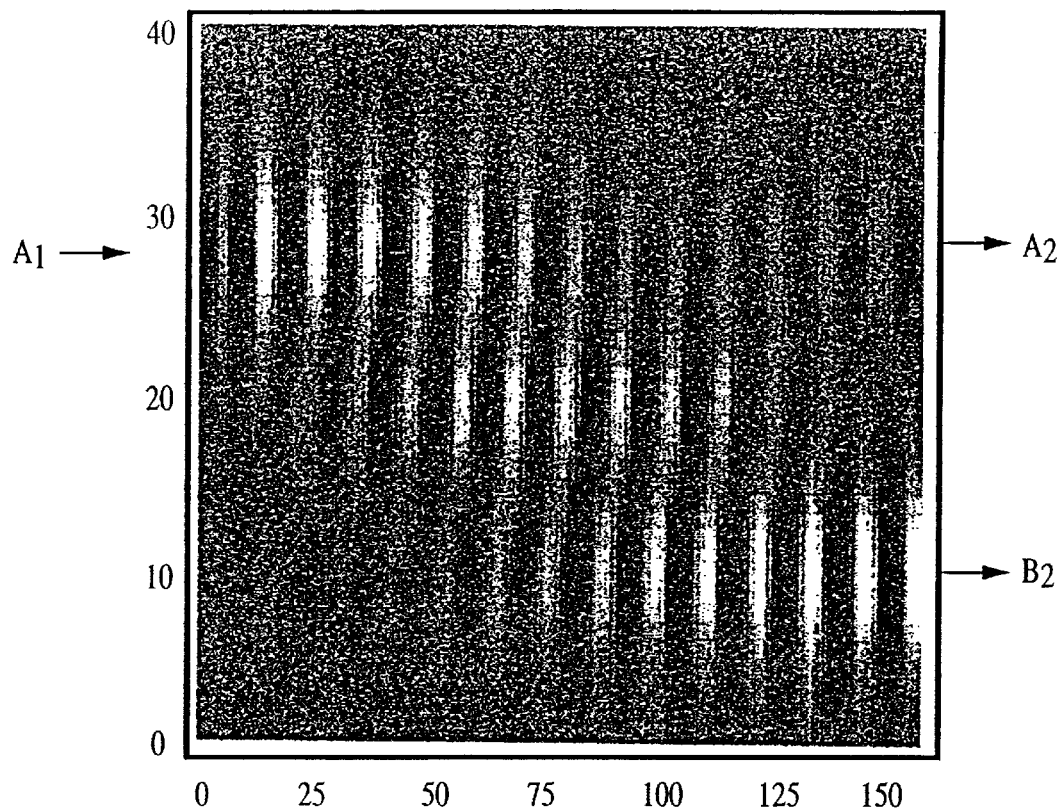
FIGS. 15A–15B are computer simulations of the spatial distribution of the electrical field strength of the device of FIG. 15.
Figure 15A:
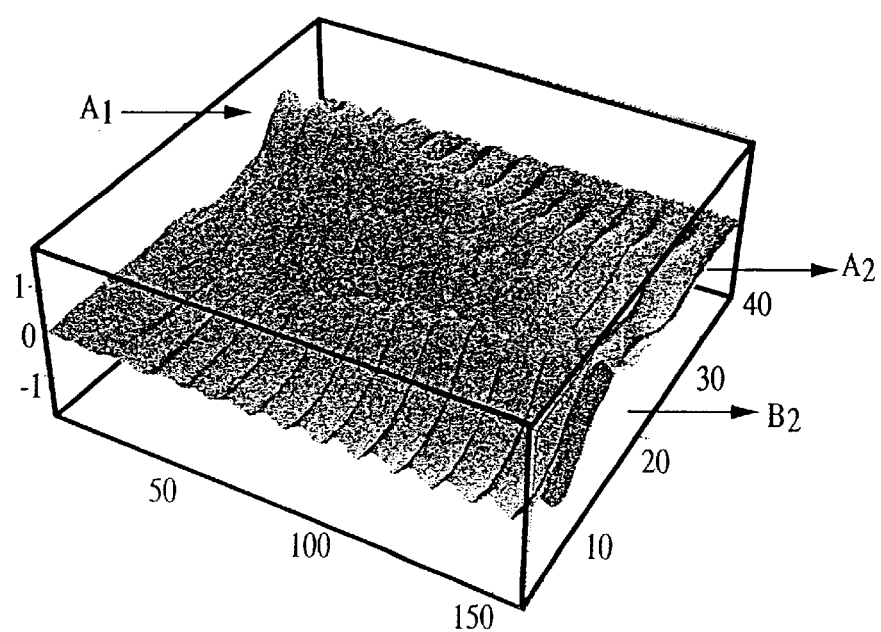
Figure 15B:
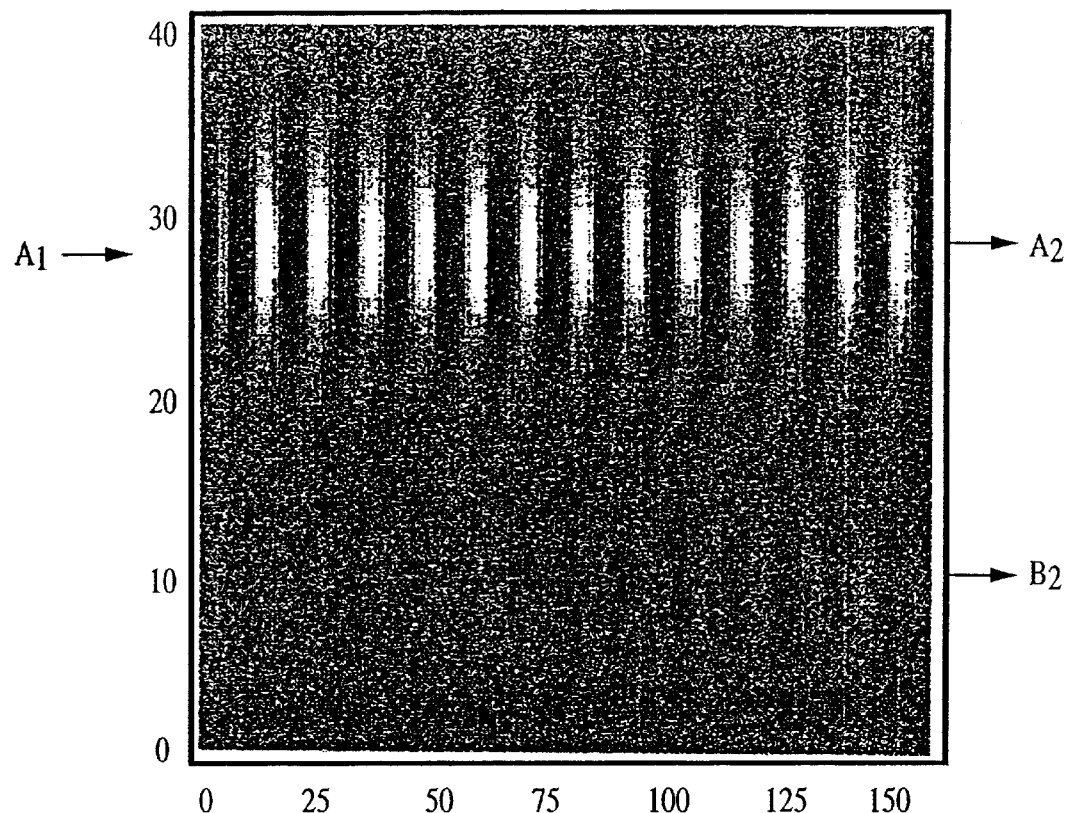
Figure 15B:
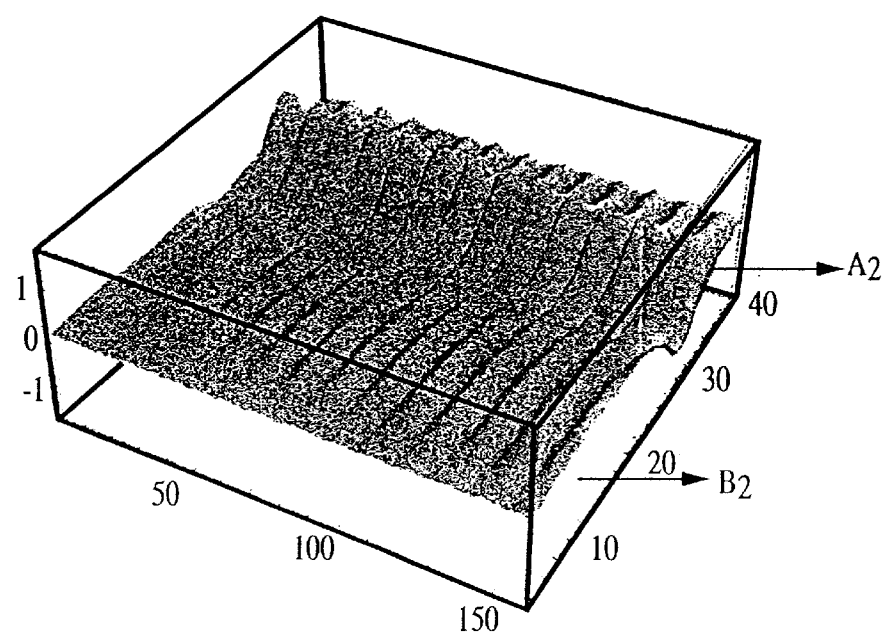
Figure 15C:
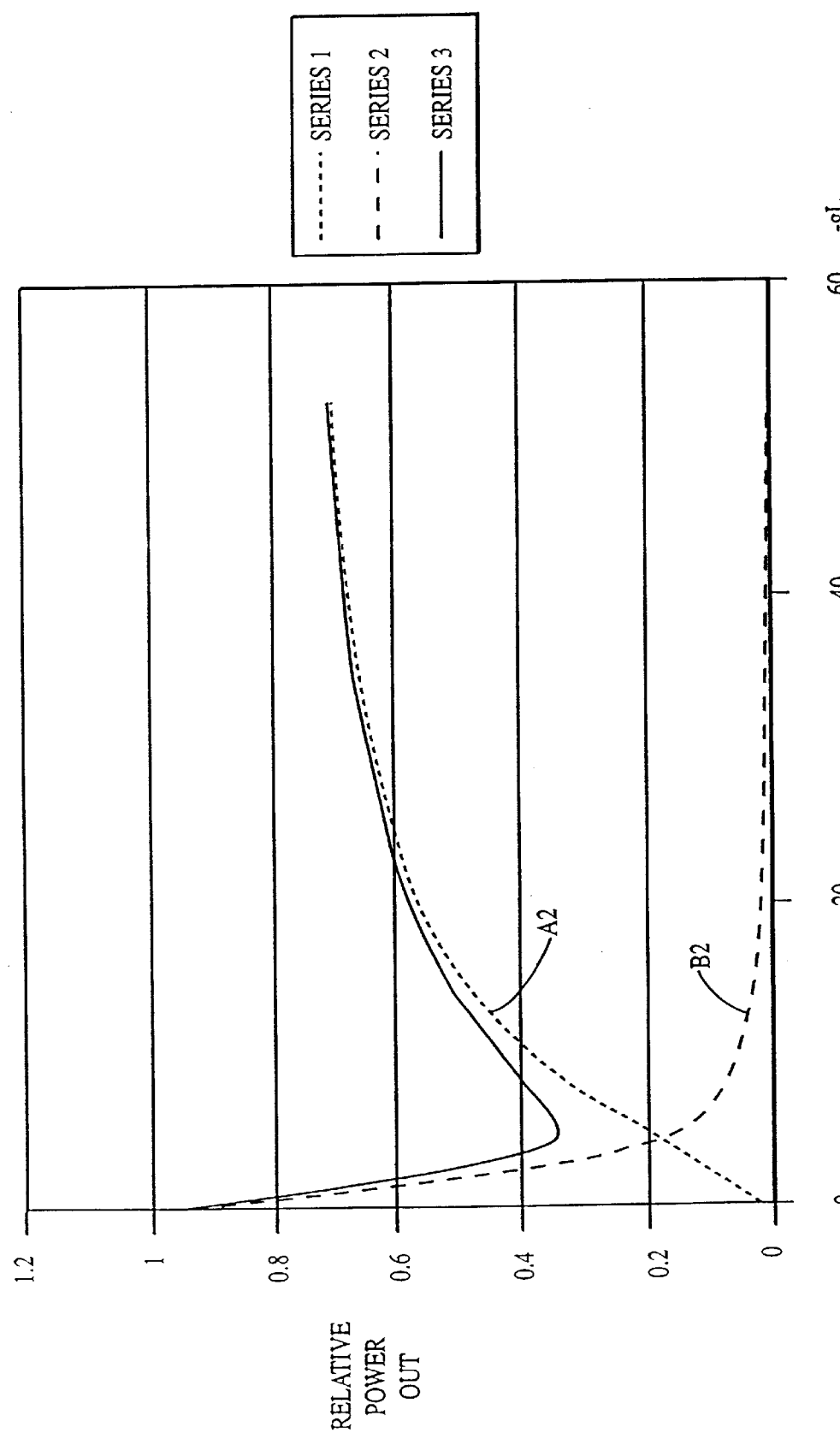
FIGS. 15C–15D are graphical portrayals of the performance of the device of FIG. 15.

An exemplary operation of the device can be illustrated via the results of computer simulation as shown in FIGS. 15A, 15B, and 15C. FIGS. 15A and 15B show the spatial distribution of the electric field strength for the light input at λ 1718 after propagating into waveguides A and B. The upper parts of FIGS. 15A and 15B are 2-D plots for which the brightness shows the relative field strength, and the lower parts of FIGS. 15A and 15B are 3-D plots for which the heights show the relative field strength. FIG. 15C shows the relative power at the output ports of waveguide A (port A2, 1712) and waveguide B (port B2, 1714) as a function of −gL (the product of the loss coefficient −g and the medium length L). In FIG. 15C, the output at A2 is shown as a dotted line, the output at B2 is shown as a dashed line, and the solid line is the sum of the outputs at A2 and B2 (i.e. the dashed line plus the dotted line). FIG. 15A shows the situation when the gain medium is in the state of transparency (at a loss coefficient of 0 per μm or −gL=0). From FIG. 15A, it is evident that most of the energy of λ 1718 exits from Waveguide B 1704 at the port B2 1714. FIG. 15B shows the situation when the medium is de-excited to the state of loss at λ by the pulsed light at λ 1722 (at a gain coefficient of about 3.3 per μm or −gL=50). From FIG. 15B, it is evident that most of the energy of λ exits from Waveguide A. FIG. 15A and FIG. 15B show the two representative interference flux patterns of light for the device, which is dependent on the state of the active medium. In particular, one can switch between these two representative interference flux patterns of light by changing the state of the active medium through the action of an applied voltage or injection current. Note that besides these two states, there are other states, for example the intermediate state at −gL=6 shown in FIG. 15C, for which there is substantial total energy absorbed by the loss medium so that both output ports at waveguide A and waveguide B have low output power.

Figure 15D:
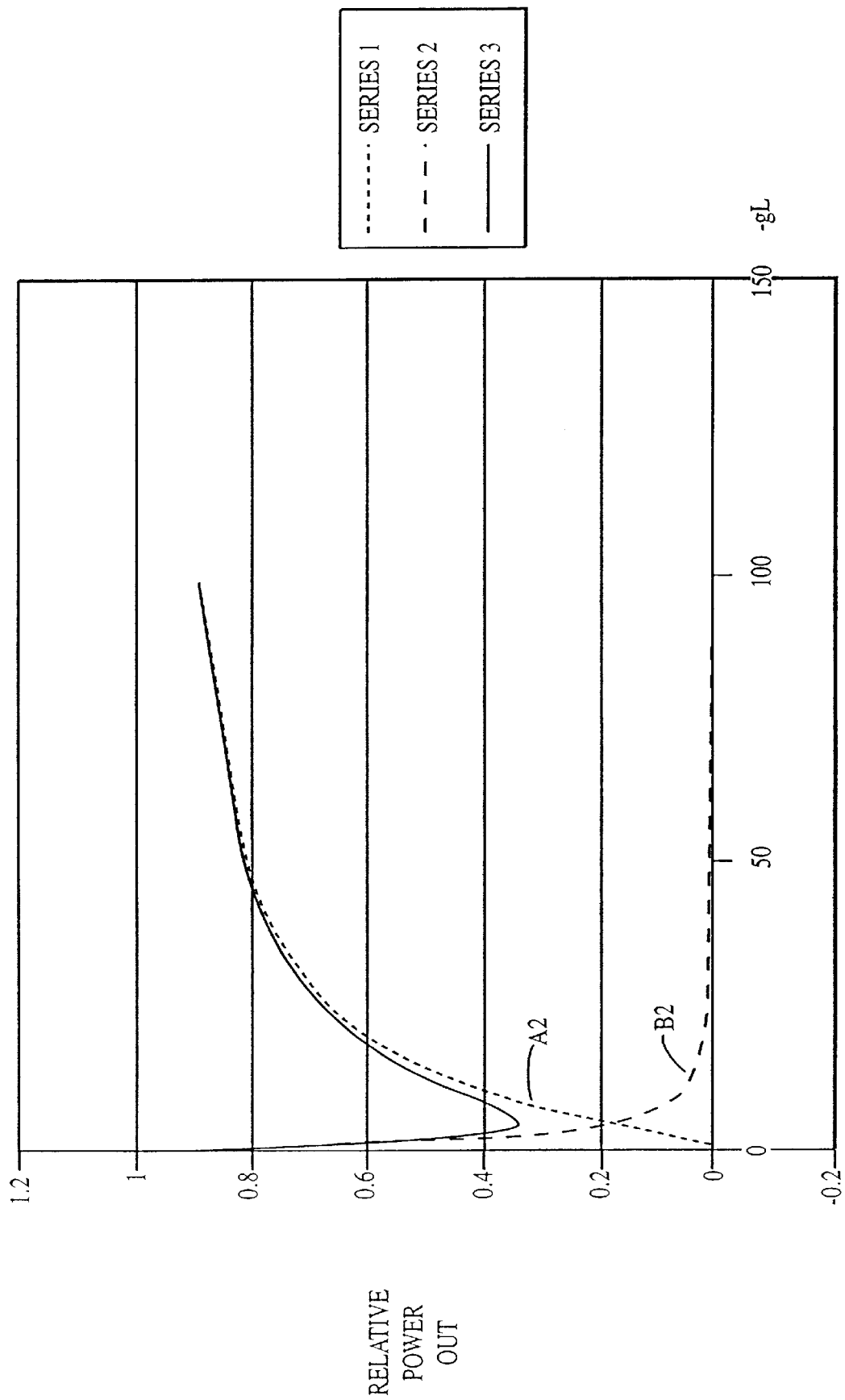

In FIG. 15D, we show the case of a longer device for which the gap $W_g$ is 1.2 μm instead of 0.4 μm, and the coupling length $l'_C$ is 120 μm. Again the interaction length l' is set equal to $l'_C$ and the medium length L is equal to $l'_C$. FIG. 15D shows the relative powers at the output ports of waveguide A (port A2) and waveguide B (port B2) as a function of gL (the product between the gain coefficient g and the medium length L). Comparing FIG. 15C and FIG. 15D, we see that the switching is more complete for the longer device case of FIG. 15D. While switching still occurs at a gL of about −50, a longer L means a short g (for gL=−50, L=120 μm, we have g=0.4/μm), which means the switching voltage can be lower.

ii) Exemplary Device States

Various operating modes of a general active region or medium (such as active medium 420 operating as a PN or PIN junction) with an applied voltage V (or injection current C) were defined and described above and illustrated in FIGS. 4G–K. Since the electro-optic phosistors such as device 1700 and related exemplary embodiments thereto preferably include one or more active regions, the devices and embodiments thereto can be characterized according to the states illustrated in FIGS. 4G–K.

In a preferred and useful embodiment, the electro-optic phosistor 1700 operates as a switching element. The wavelength of the light at λ input to the device 1700 is preferably around the bandgap energy (associated with $\lambda_{gap}$).

It should be understood that the light signals into and out of MGL Phosistor 1700 and other useful embodiments can include pulsed light signals, continuous wave (CW) light signals, or both, depending on which of the various operating modes of the embodiments are utilized in a particular application.

It should be understood that the action of the exemplary Phosistor 1700 is defined by the paths taken by the light beams in the device 1700. The paths taken by the light beams in the device 1700 are preferably dependent on the state of the active medium in the interaction region of the Phosistor 1700 (e.g. state of loss, transparency, or gain).

The combination of the state of the active medium and the state of light beam propagation in the device define the state of the device. The various operations of the device 1700 can be more precisely described in terms of such device states. It should be understood however that more or fewer device states can be applied to and described instructively with respect to device 1700 in this or in other useful embodiments and/or applications.

In particular, the operation of the device can be described as making transitions from one class of states to another class of states under the influence of some external inputs such as the power of the input beam, the locations where the input beam is received, and applied electrical energy, preferably including applied voltages or currents.

iii). A First Exemplary Device State

For this first exemplary device state of the electro-optic phosistor 1700, the light beam at λ 1718 is turned "on." The wavelength λ is at the wavelength of absorption and gain of the active medium, which is slightly shorter than the bandgap wavelength $\lambda_g$ of the active medium ($\lambda<\lambda_g$). The intensity $I_\lambda$ of the light beam at λ 1718 can be greater than, equal to, or less than the saturation intensity $I_{sat}$ of the active medium 1708. The voltage V of the variable voltage source 1706 that is applied across the PN or PIN junction including the active medium 1708, is approximately less than or equal to zero volts. At this value, the PN or PIN junction including the active medium 1708 is reverse-biased by the applied voltage V.

Light at λ 1718 enters at the port A1 1710 on the Waveguide A 1702. The light at λ 1718 propagates along the Waveguide A 1702 and loses energy in the active medium 1708 so that most of the light at λ 1718 does not transfer via Waveguide G 1722 to Waveguide B 1704 and thus does not exit from the output on B2 1714. Rather, most of the light at λ 1718 propagates through Waveguide A 1702 and exits from Waveguide A 1702 at the port A2 1712 as light at λ 1716. The reverse bias from the applied voltage V drives the active medium 1708 to a state of loss at λ and maintains this state while the applied voltage V is approximately at or below zero volts. This state of the active medium 1708 is analogous to Case K, as illustrated in FIG. 4K.

iv). A Second Exemplary Device State

For this second exemplary device state of the electro-optic phosistor 1700, the light beam at λ 1718 is turned "on." The wavelength λ is at the wavelength of absorption and gain of the active medium, which is slightly shorter than the bandgap wavelength $\lambda_g$ of the active medium ($\lambda<\lambda_g$). The intensity $I_\lambda$ of the light beam at λ 1718 can be greater than, equal to, or less than the saturation intensity $I_{sat}$ of the active medium 1708. The voltage V of the variable voltage source 1706 that is applied across the PN (or PIN) junction including the active medium 1708, is approximately equal to the value of the voltage that is associated with a critical value of the injection current, $C_t(\lambda)$, called the transparency current. At this value, the PN or PIN junction including the active medium 1708 is forward-biased by the applied voltage V. This transparency current, $C_t(\lambda)$ is the approximate value of the current when the active medium 1608 is driven to a state of transparency at wavelength λ by the current. The corresponding voltage $V|_{C=C_t(\lambda)}$ that gives rise to this transparency current $C_t(\lambda)$, is called the transparency voltage. This state of the active medium is analogous to State H as illustrated in FIG. 4H.

Light at λ 1718 enters at the port A1 1710 on the Waveguide A 1702. The light at λ 1718 propagates along the Waveguide A 1702 and is subsequently transferred from Waveguide A 1702 to Waveguide B 1704 via waveguide G 1722 after a coupling length $l'_C$. The light at λ 1718 then exits from Waveguide B 1704 at the port B2 1714 as light at λ 1720. While the applied voltage V is approximately at the transparency voltage $V|_{C=C_t(\lambda)}$, the active medium 1708 is driven to and maintained in a state of transparency at λ. Not enough electrons are supplied by the applied voltage/injection current to drive the active medium to a gain state at λ. This state of the active medium 1708 is analogous to Case H, as illustrated in FIG. 4H.

v). A Third Exemplary Device State

For this third exemplary device state of the electro-optic phosistor 1700, the light beam at λ 1718 is turned "on." The wavelength λ is at the wavelength of absorption and gain of the active medium, which is slightly shorter than the bandgap wavelength $\lambda_g$ of the active medium ($\lambda<\lambda_g$). The intensity $I_\lambda$ of the light beam at λ 1718 can be greater than, equal to, or less than the saturation intensity $I_{sat}$ of the active medium 1708. The voltage V of the variable voltage source 1706 that is applied across the PN (or PIN) junction including the active medium 1708, is greater than the value of the voltage that is associated with a critical value of the injection current, $C_t$ (i.e., $V>V|_{C=C_t(\lambda)}$).

As the applied voltage V of the variable voltage source 1706 increases beyond the voltage at $V=V|_{C=C_t(\lambda)}$, the applied voltage V will excite the active medium 1708, providing gain at the operating wavelength λ to the active medium 1708 located in Waveguide G 1722. This state of the active medium 1708 is analogous to Case J, as illustrated in FIG. 4J.

This state (state J of FIG. 4J) is characterized by a relatively fast electron excitation due to the increased injection current C and applied voltage V compared with the first exemplary state of the exemplary device (state H of FIG. 4H).

The light at λ 1718 from input port A1 1710 transfers from Waveguide A 1702 to Waveguide B 1704 via Waveguide G 1722 and gains energy in the active medium 1708 located on Waveguide G 1722, and some extra energy propagates towards and exits port A2 1712.

vi). Transitions for the Active Medium States and Device States

Transition from one active medium state to another is brought about by changing the applied voltage. The change in the active medium state then brings about a corresponding change in the device state, resulting in a change in the behavior of the light beams propagating through the device.

As an example of such transitions, suppose we start with a forward-biased voltage at above the transparency voltage $V>V|_{C=C_t(\lambda)}$. In this case, the active medium 1708 is in the state of gain analogous to State J, as illustrated in FIG. 4J (the third exemplary device state of the exemplary device 9). The active medium 1708 when in the gain state at λ (State J in FIG. 4J) will be driven back to the transparency state at λ (State H in FIG. 4H) when the applied voltage V of the variable voltage source 1706 decreases to become approximately equivalent to the transparency voltage at $V=V|_{C=C_t(\lambda)}$. The state of the active medium 1708 is again analogous to State H, as illustrated in FIG. 4H (the second exemplary device state of the exemplary device 9). This state (State H of FIG. 4H) is characterized by a relatively low electron excitation compared with State J of FIG. 4J (the third exemplary device state of the exemplary device 8).

When the voltage V is further reduced from $V|_{C=C_t(\lambda)}$ to zero and then to a reverse bias (V<0), any excited electrons will be de-excited and the medium will be driven to and will maintain a loss state. The state of the active medium 1708 is again analogous to State K, as illustrated in FIG. 4K (the first exemplary device state of the exemplary device 9).

vii). Exemplary Device 10 as a Switching Element

In the case of FIG. 15 the net effect of varying the voltage applied to the active medium 1708 is that increasing the applied voltage V to $V|_{C=C_t(\lambda)}$ generates light at λ 1720 exiting port B2 1714 on Waveguide B 1704, while decreasing the applied voltage V below approximately zero volts results in light at λ 1716 exiting port A2 1712 on Waveguide A 1702. In this way, the electro-optic phosistor 1700 can be used as a voltage-controlled switching element between the first and the second exemplary states described above.

The device has a symmetric property in that port B1 1724 can play the role of a signal input port as in port A1 1710.

In this case, port A2 1712 (or B2 1714) will play the role of output port B2 1714 (or A2 1712). Likewise, port A2 1712 can play the role of the signal input port A1 1710 and port B1 1724 (or A1 1710) will then play the role of the signal output port B2 1714 (or A2 1712). Lastly, port B2 1714 can play the role of the signal input port A1 1710 and port A1 1710 (or B1 1724) will then play the role of the signal output port B2 1714 (or A2 1712).

The above symmetric property of the device allows it to be used in particular as a 2×2 optical cross-bar switch. In this case, there will be a signal input at λ1 (signal 1) into port A1 1710 and another signal input at λ2 (signal 2—not shown in FIG. 15) into port B1 1724. The wavelengths λ1 and λ2 may be the same or may be different for the two separate signal light beams (signal 1 and signal 2).

Depending on the state of the medium, it is possible to channel signal 1 to output port A2 1712 and signal 2 to output port B2 1714 or signal 1 to output port B2 1714 and signal 2 to output port A2 1712. Specifically in the bar state output, the active medium 1708 is driven to a loss state as in state K of FIG. 4K. In this case, signal input at λ1 in port A1 1710 will propagate along Waveguide A 1702 and exit port A2 1712 and signal input at λ2 in port B1 1724 will propagate along Waveguide B 1704 and exit port B2 1714.

In the cross-state output, the active medium 1708 is driven to a transparency state as in state H of FIG. 4H. In this case, most of signal output at λ1 in port A1 1710 will couple from Waveguide A 1702 to Waveguide B 1704 and exit port B2 and most of signal input at λ2 in port B1 1724 will couple from Waveguide B 1704 to Waveguide A 1702 and exit port A2.

Hence, the net effect is that changing from the first state to the second state will bring the device from a bar-state output to a cross-state output. Operated in this fashion, the device is known to those skilled in the art as a 2×2 optical cross-bar switch. 2×2 cross-bar switches can be mutually connected in such a way as to implement a M×N cross-bar switching in which signals input into M designated input ports can be channeled in any order to N output ports.

It should be understood that this description covers several but not all aspects of device performance. For example, the light at λ ($\lambda \geq \lambda_{gap}$) can be on or off, and if the light at λ is on, the intensity $I_\lambda$ of the light at λ can be greater than, equal to, or less than the saturation intensity of the active medium 1708. In addition, the PN (or PIN) junction that preferably includes the active medium 1708 can be forward (approximately V>0) or reverse (V approximately <0) biased by the applied voltage V of the variable voltage source 1706. The applied voltage V has an associated injection current C. As shown above, when V exceeds zero volts (approximately), the value of V relative to the voltage at $C=C_r(\lambda)$ has implications for the operation of the device 1700 and the state of the active medium 1708. The active medium 1708 can exhibit loss, transparency, or gain at the wavelength of operation λ depending on the light intensity at λ and the applied voltage V and/or injection current C. It should be understood however that more or fewer states of the active medium can be applied to and described instructively with respect to device 1700 in this or in other useful embodiments and/or applications.

In another useful embodiment of the device 1700, the active medium does not contain a PN or PIN junction, and the quantum contained stark effect or the Franz-Keldysh effect is used to change the medium 1708 from transparency to absorption under an applied voltage across the active medium 1708. The embodiment otherwise functions in an identical way as the exemplary device 10 1700 as described above. In this case, the first exemplary state will correspond to state F in FIG. 4F and the second exemplary state will correspond to state E in FIG. 4E.

viii). Exemplary Device 10 as a Phase Shifter

As in the case of Device 10, by choosing coupling length $l'_C$ so that $l''=2l'_C$, light input into waveguide A will be coupled back to waveguide A, the net result of which is an additional optical phase shift, whose value will depend on how many intermediate waveguides are coupled to. Typically the phase shift will be in multiple number of π radians (or 180°). When the active medium is in the loss state, light will remain in waveguide A (i.e. there will be no coupling to other waveguides) and there will be no additional optical phase shift. In this way, Device 10 can function as an electro-optically controlled phase shifter.

viiii). Exemplary Device 10 as a Wavelength Multiplexer/De-Multiplexer or Wavelength Selective Switch In another useful embodiment of the device, the waveguides A, G, and B have unequal widths $W_A$, $W_G$, and $W_B$. As is well known to those skilled in the art, waveguide couplers with unequal waveguide widths will have strong wavelength sensitivity. In particular, when the active medium is in the transparency state, only certain wavelengths of light will couple maximally from waveguide A to waveguide B, thus allowing the device to act not only as a switch but as a wavelength selective switch. As an exemplary embodiment, the width $W_A$ and $W_B$ can be equal to 0.4 $\mu$m and $W_G$ can be equal to 0.6 $\mu$m. Except for the difference in the waveguide widths providing wavelength sensitivity, this embodiment of the device is otherwise functionally and operationally identical to the device 1700 and descriptions and comments relating to the device 1700 are generally applicable to this device.

x). MMI/Resonator Configuration Device

It should be evident to those skilled in the art that the MMI/Resonator I/Resonator II configuration for device 10 would be topologically similar to three-gate implementation of MMI/Resonator I/Resonator II configuration of Device 2. As in device 2, it should be understood that the MMI/Resonator I/Resonator II Configuration Devices are otherwise functionally and operationally identical to the device 1700 and descriptions and comments relating to the device 1700 are generally applicable to the MMI/Resonator I/Resonator II Configuration Devices.

xi). PBG Implementation of the Coupler/MMI/Resonator Configuration Device

It should be evident to those skilled in the art that the PBG implementations for the Coupler/MMI/Resonator I/Resonator II configuration of device 9 would be topologically similar to the PBG implementations for the three-gate version of the Coupler/MMI/Resonator I/Resonator II configuration of device 2. As in device 2, it should be understood that the PBG implementations for the Coupler/MMI/Resonator I/Resonator II configuration of device 9 are otherwise functionally and operationally identical to the device 1700 and descriptions and comments relating to the device 1700 are generally applicable to the PBG implementations.

As with previous embodiments, it should be understood that the dimensions and materials for the devices are presented for purposes of illustrating a useful embodiment of the device 1700 and its MMI/PBG/Resonator versions, and are not intended to limit other exemplary embodiments of any exemplary device, or the device 1700 and its MMI/PBG/Resonator versions. A variety of dimensions and sizes can be used, depending on the application desired as well as the fabrication materials, processes or technologies that are employed. A variety of materials can be used, for examples, the waveguides do not have to be semiconductor and may be optical fibers or polymer waveguides (as long as the requisite waveguiding or wave-coupling effect is achieved), the active medium does not have to be semiconductor or quantum well but can be erbium ions doped in glass or active polymers (as long as the requisite gain/loss/transparency properties are achived), and the resonators do not have to be semiconductor but can be glass or polymers (as long as the requisite resonance effect is achieved). Also, it should be understood that the shape of the Waveguides, MMI Structures, Photonic Bandgap Structures, or Resonators do not generally have to be linear, circular, parallel, or regular in form. Arbitrarily curved shapes and structural dimensions may be utilized as long as they achieve the same functions such as waveguiding, wave-coupling, optical resonant effect, and photonic bandgap effect.

It should be understood that while the active medium of these devices works primarily in the gain/transparency/loss modes, concurrent change in the refractive index of the active medium could occur when the active medium changes state. The change in the active medium's refractive index can in some cases be used to further improve the device performance. Thus, the working of these devices include those cases whereby both the gain/transparency/loss property as well as the refractive-index property of the active medium are used in bringing about the device operation.

D. Exemplary Device 11 (A Wavelength Multiplexing/Filtering Device)

Figure 16:
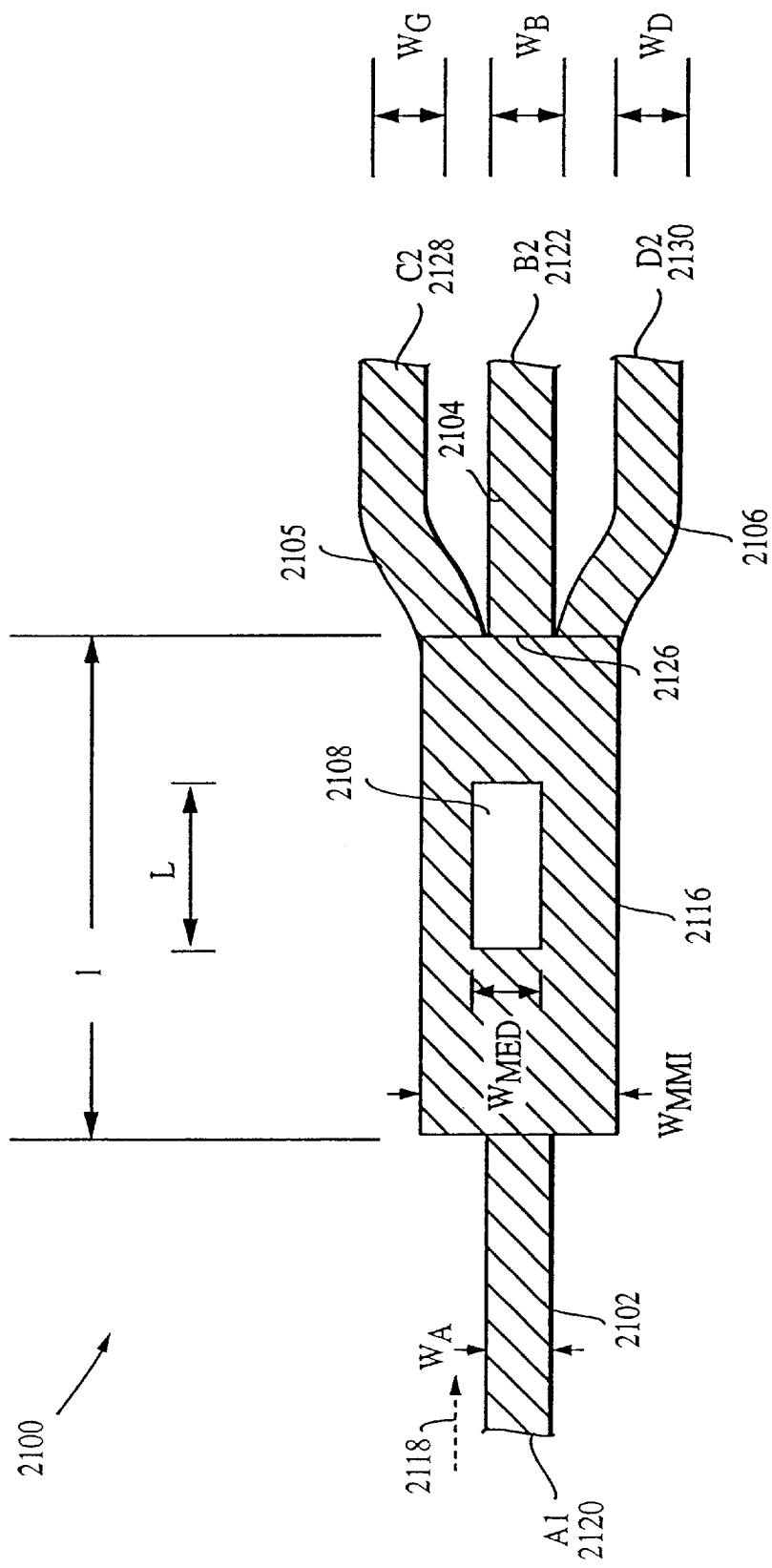
FIG. 16 illustrates an embodiment of a eleventh exemplary phosistor device utilizing directionally coupled waveguides and employing electro-optics.

FIG. 16 illustrates a general embodiment 2100 of a phosistor device employing a multimode interference filter. The device is capable of performing as an optical filter and is also capable of shifting the resonance frequency of the filter via an applied voltage or injection current. The device can be referred to as a "wavelength-multiplexing phosistor" (WM Phosistor 2100).

It should be understood that the phosistor device 2100 as presented in FIG. 16 can also be employed as an all-optical device by utilizing input light to modify the state of the active medium (with respect to an operating wavelength of other input light) to affect the interference and light transfer properties of the device 2100 in the way described with exemplary devices 1 through 7, rather than through the application of a voltage or the injection of current.

WM Phosistor 2100 preferably includes an input Waveguide A 2102, an output Waveguide B 2104, and a multimode interference (MMI) Waveguide MMI 2116 and two Bypass Waveguides C 2105 and D 2106. The multimode interference MMI Waveguide 2116 preferably includes an active medium 2108. As described above, Waveguide A 2102 can be implemented as waveguide 450 with active medium 420 in a useful embodiment. The Waveguide A 2102 preferably includes an input port A1 2120 and is preferably connected to the MMI Waveguide 2116 as illustrated in FIG. 16. Light at λ 2118 entering port Al 2120 will propagate into the MMI Waveguide 2216 region, which in an exemplary embodiment has a waveguide width approximately three times larger than the width of Waveguide A 2102.

Figure 17A:
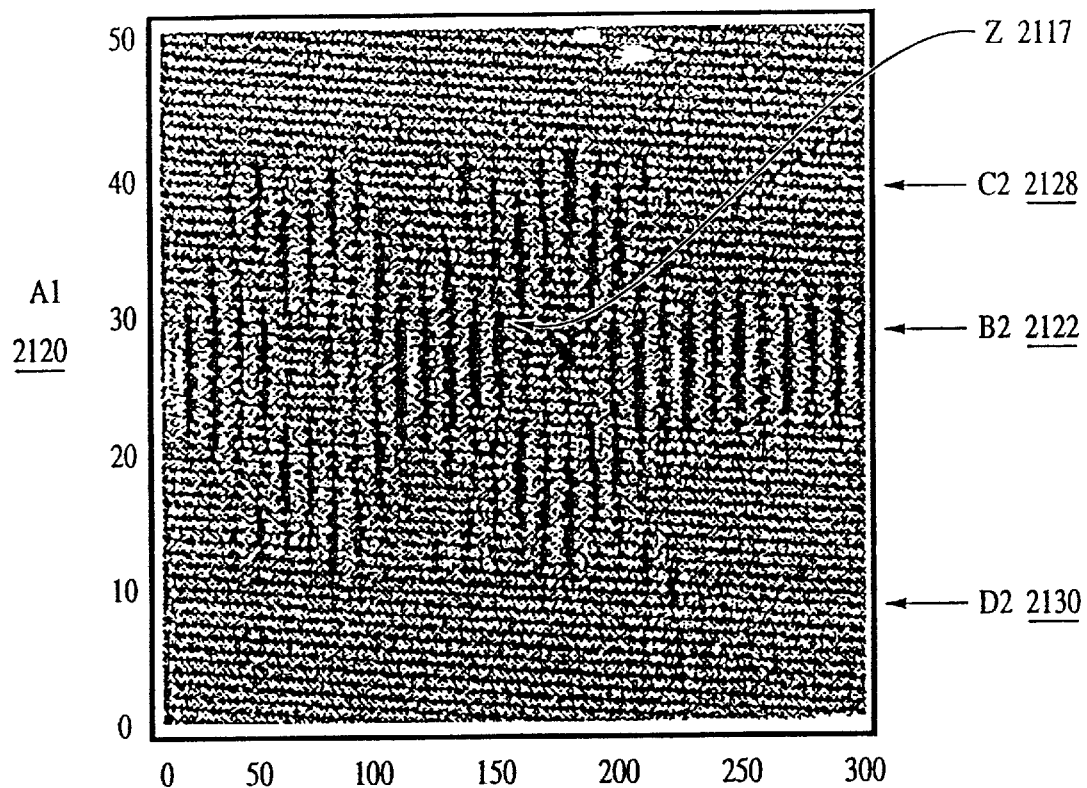
FIGS. 17A–B are simulation diagrams illustrating the spatial distribution of the electric field strength of the eleventh exemplary phosistor device illustrated in FIG. 16 under two exemplary possible states of operation out of a plurality of possible states of operation.

FIG. 17A illustrates a possible interference flux pattern of light formed by the light at λ 2118 entering the MMI Waveguide 2216 region. As shown in FIG. 17A, along the center of the MMI Waveguide 2216 region there is a point or location at which the field energy is low, as indicated at point Z 2117. There is also a point or location at which the field energy is maximal. In an exemplary embodiment, the length l of the MMI Waveguide 2116 is designed so that at a joining interface 2126 between the MMI Waveguide 2116 and the output Waveguide B 2104, the field energy is at its maximum. In this case, most of the signal light energy (from the light at λ 2118) will couple from the MMI Waveguide 2116 to the output Waveguide B 2104, resulting in a substantial transfer of signal light energy from the input port A1 2120 to the output port B2 2122.

Figure 17B:
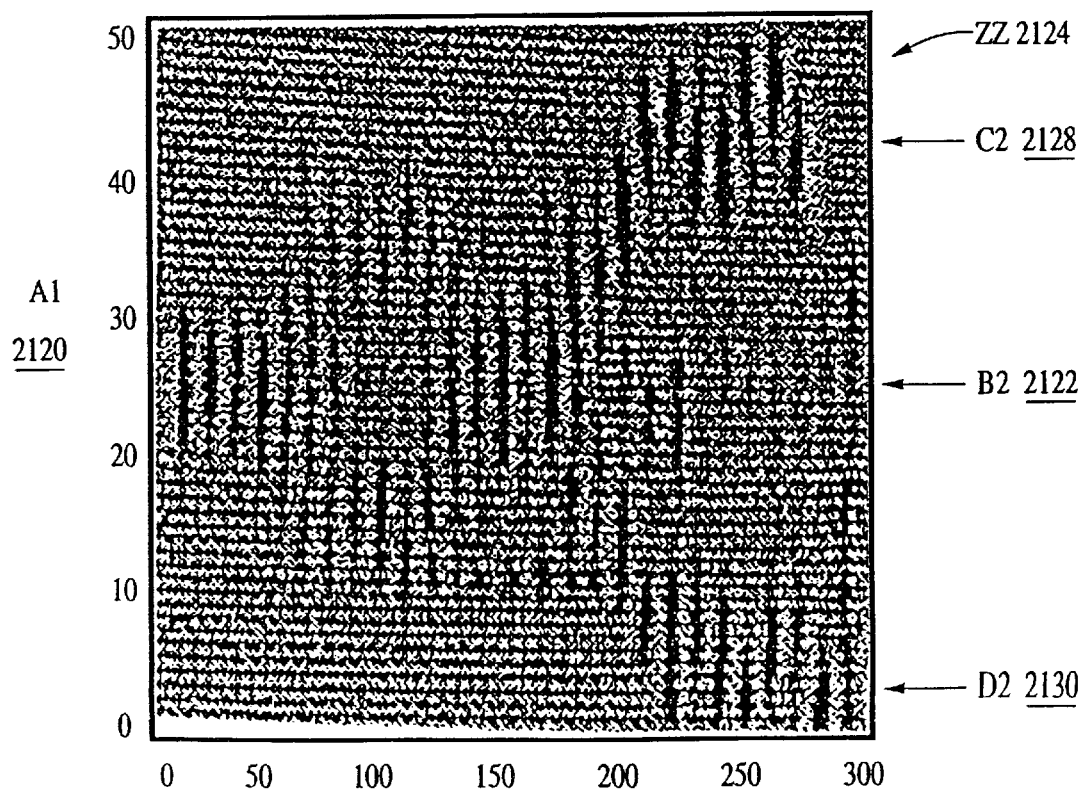

FIG. 17B illustrates another possible interference flux pattern of light, similarly formed by the light at λ 2118 entering the MMI Waveguide 2216 region. Increasing the length of the input wavelength λ of the light 2118 will in general shift the interference flux pattern of light to the right so that at some wavelength λ, the zero energy area of the pattern ZZ 2124 is at the joining interface 2126 between the MMI Waveguide 2116 and the output Waveguide B 2104. In this case, essentially most of the signal light energy will be coupled into the Bypass Waveguides C 2103 and D 2106 and out of output ports C2 2128 and D2 2130, respectively, resulting in little or no energy transferring from the input port A1 2120 to the output port B2 2122.

Hence, the energy transfer from the input port A1 2120 to the output port B2 2122 depends on the input wavelength λ and the device 2100 can be utilized as an optical wavelength filter. As is known to those skilled in the art, the wavelengths that yield a maximal transfer of signal energy are called resonant wavelengths.

The above description assumes that the active medium 2108 of device 2100 is in the transparency state at λ as in state H of FIG. 4H. Driving the active medium to a state of loss at λ as in state K of FIG. 4K or F of FIG. 4F, however, for example via an externally applied voltage (not illustrated in FIG. 16), will shift the resonance wavelength because of the change in the interference flux pattern of light in the MMI Waveguide 2116.

The distance between adjacent resonance wavelengths (called the filtering resolution) is inversely proportional to the length l of the MMI Waveguide 2116. By choosing l to be large, in the millimeter range, it is possible to achieve a very small filtering resolution on the order of a few nanometers. In an exemplary embodiment of device 2100 shown in FIG. 16, l is four (4) microns in length. In a useful embodiment, the widths $W_A$, $W_B$, $W_C$, and $W_D$ of the Waveguides A 2102, B 2104, C 2105, and D 2106, respectively are each 0.235 microns, while the width $W_{MMI}$ of the MMI Waveguide 2116 is 0.675 microns and the width $W_{MED}$ of the active medium 2108 is 0.235 microns. It should be understood, however, that l is not limited to micron or millimeter length in other embodiments of the device 2100, and in general that the dimensions relating to the exemplary embodiments of device 2100 are not limited to the dimensions illustrated in FIG. 14.

It should be understood that these dimensions and exemplary lengths are presented for purposes of illustrating a useful embodiment of the device 2100 and are not intended to limit other exemplary embodiments of any exemplary device, or the device 2100. A variety of dimensions and sizes can be used, depending on the application desired as well as the fabrication materials, processes or technologies that are employed.

It should be understood that FIG. 16 is presented not only to describe the operation of an application such as an optical wavelength filter, but also to illustrate the applicability of multimode interference (MMI) technology and devices to the all-optical and electro-optical devices described herein.

As will be evident to those skilled in the art, each of the exemplary embodiments of the directional coupled waveguides can be implemented as MMI devices in useful embodiments.

E. Exemplary Device 12 (A Three Gate Mechanical-Optical Device)

Figure 18:
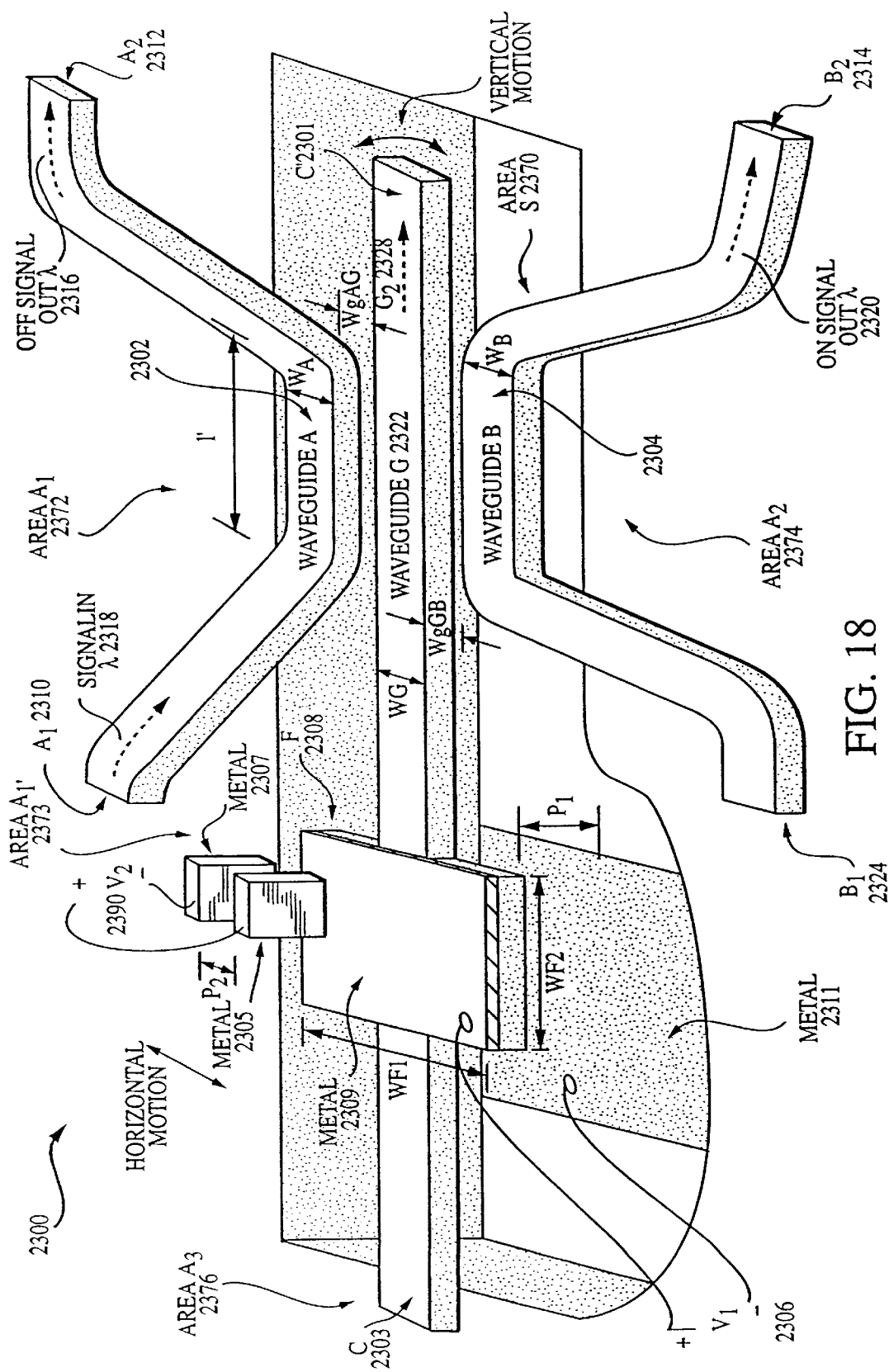
FIG. 18 is an exemplary embodiment of a mechanical-optical phosistor device.

FIG. 18 illustrates a twelfth exemplary device and a first general embodiment 2300 of a mechanical-optical phosistor device employing directionally coupled waveguides. For purposes of illustration and not limitation, the device is described according to one useful function as a switching element for slow or ultrafast optical pulses of sufficient energy and wavelength. The device 2300 is not limited to use as a switching element and can instead be used to implement other mechanical-optical device functions to perform in various applications. It can be utilized, for example, as a M×N optical cross-bar switch, a variable coupling device (including an optical loop mirror and a pulse storage ring), a mechanical-optical phase shifter, a resonator frequency tuning element, a light intensity modulator, a light intensity regulator, a micro-electro-mechanical optical switch, a micro-acousto-mechanical optical switch, a micro-hydro-mechanical optical switch, and a variable optical attenuator. The device can be referred to as an "Mechanical-Optical Mid-Arm-Gate Phosistor" (MO-MG Phosistor 2300).

MO-MG Phosistor 2300 preferably includes a first pathway of light consisting of the spatial region occupied by Waveguide A 2302, a second pathway of light consisting of the spatial region occupied by Waveguide B 2304, and a third Waveguide G 2322. Waveguide G is suspended in air and is surrounded by bottom substrate area S 2370, and areas A1 2372, A2 2374, and A3 2376, which are solid areas. Preferably, the Waveguide G 2322 includes no active medium but can be moved physically or mechanically by placing it on a cantilever pivoted at C 2303 defined by the beam between points C 2303 and C' 2301. Such mechanical motion can be induced, for example, by applying force on part F 2308 along the cantilever, where part F 2308 is shown to have a width WF1 and a length WF2. As described below, switching action can be achieved either by moving the waveguide G 2322 vertically or by moving the waveguide G 2322 horizontally.

As an exemplary embodiment of the device 2300 which allows vertical movement of waveguide G 2322, the force can be induced, for example, via applying voltage to a pair of parallel metal plate in which one of the metal plates 2309 is attached to part F 2308 of the cantilever and another of the metal plates 2311 is situated on the substrate area below part F 2308. Metal plate 2311 is preferably oriented parallel to metal plate 2309 and is spaced by a distance P1 from the bottom on part F 2308. Metal plate 2311 can have an irregular shape other than that shown as long as it is around the area or adjacent to the area below part F 2308. A voltage Source 2306 having a variable voltage V1 can be applied across the parallel pair of metal plates 2309 and 2311 to move waveguide G in a vertical direction pivoted around point C 2303. These forces on part F 2308 can also be induced via other mechanical means, for example, acoustically, hydraulically, or via acceleration. We may refer to this exemplary embodiment as the vertical-motion embodiment of device 2300.

Alternatively, as an exemplary embodiment of the device 2300 which allows horizontal movement of waveguide G 2322, the waveguide G 2322 may be moved via a metal plate 2305 attached to part F 2308 but oriented vertically and a metal plate 2307 attached to area A1' 2373. Metal plate 2307 is preferably oriented parallel to metal plate 2305 but spaced by a distance P2 away from metal plate 2305. These vertical pairs of metal plate 2305 and 2307 can be used to move the cantilever horizontally (pivoted around point C 2303) via applying a voltage V2 2390 to the parallel metal plates 2305 and 2307. These forces on part F 2308 can also be induced via other mechanical means, for example, acoustically, hydraulically, or via acceleration. We may refer to this exemplary embodiment as the horizontal-motion embodiment of device 2300.

Similar device switching functions can be achieved by using either the vertical-motion embodiment or the horizontal-motion embodiment of the device 2300.

In an exemplary embodiment, the Waveguides A 2302, B 2304, and G 2322 can each be implemented as the Waveguide 400 illustrated in FIG. 5A. Waveguides A, B, and G are support from below in areas A1, A2, and A3 in which the lower cladding region is solid material such as silicon dioxide. The Waveguide A 2302 preferably includes an input port A1 2310 and an output port A2 2312. The Waveguide B 2304 preferably includes an input port 2324 and an output port B2 2314. FIG. 18 illustrates that Waveguide A 2302 has width $W_A$ and is located at an approximately parallel distance (coupling gap or distance) $W_{gAG}$ from Waveguide G 2322, which has width $W_G$. Waveguide G 2322 is in turn located at an approximately parallel distance (coupling gap or distance) $W_{gGB}$ from Waveguide B 2304, which has width $W_B$.

The input port A1 2310 on the Waveguide A 2302 is configured to receive light having wavelength λ (at λ) (SIGNAL IN λ) 2318. In a useful embodiment, this light at λ 2318 is continuous wave (CW) light. Depending on the state of the mechanical-optical phosistor 2300, light can be output from the output port B2 2314 as light having wavelength λ (at λ) (ON-SIGNAL OUT λ) 2320. In a useful embodiment, this light at λ 2320 is pulsed light. Light is also capable of being output from the output port A2 2312 as light having wavelength λ (at λ) (OFF-SIGNAL OUT λ) 2316. In a useful embodiment, this light at λ 2316 is pulsed light. Under certain operating condition described below, most of the CW light at λ 2318 propagating along the Waveguide A 2302 will be transferred to Waveguide B 2304 through waveguide G 2322. It should be understood that the light signals into and out of MO-MG Phosistor 2300 and other useful embodiments can include pulsed light signals, continuous wave (CW) light signals, or both, depending on which of the various operating modes of the embodiments are utilized in a particular application.

The coupling length $l'_{C}|_{X-Z-Y}$ is defined as the length at which a wave in a first waveguide (X) maximally couples into a second waveguide (Y) that is coupled to the first waveguide (X). There may be one or more intermediate waveguides between waveguides λ and Y, which can be represented by one waveguide (Z). As is known to those skilled in the art, the coupling length is a function of the gap distance between each pair of waveguides and the width of each waveguide. The gap distances can be chosen to achieve maximal coupling between waveguide X and waveguide Y through intermediate coupling between waveguide X to waveguide Z and waveguide Z to waveguide Y, where Z can represent one or more waveguides.

In this device 2300, the interaction length l', defined as the length of interaction between waves in Waveguides A 2302, G 2322, and B 2304 extends to approximately the full coupling length $l'_C$ so that $l'=l'_C$ in one useful embodiment of the device but can be different from $l'_C$ in other useful embodiments of the device. In the case of FIG. 18, the interaction length is defined geometrically by the length for which waveguides A, G, and B run closely parallel to each other.

It should be understood that the above dimensions, exemplary lengths, and geometry are presented for purposes of illustrating a useful embodiment of the device 2300 and are not intended to limit other exemplary embodiments of any exemplary device, or the device 2300. A variety of dimensions, sizes, and geometry can be used, depending on the application desired as well as the fabrication materials, processes or technologies that are employed. For example, while the choice of $l'=l'_C$ is illustrated in this exemplary device, the interaction length may vary from the coupling length $l'_C$ and still achieve similar device functions. The structure forming waveguide G does not have to be of the regular shape shown. The overhanging of waveguide A and B is not necessary and waveguide A and B can be adjacent to the edge of the hole or indentation area.

Also, it should be understood that the shape of the waveguides does not generally have to be linear. Curved shapes and different waveguide dimensions may be utilized as long as they achieve the same functions such as waveguiding and wave-coupling. Furthermore, waveguides that are placed side by side to achieve wave-coupling do not have to be placed side by side in a horizontal manner but can be placed in a top-down vertical manner or any other manner with respect to the horizontal substrate. Also, coupled waveguides do not have to be exactly parallel or have the same widths as long as the desired effect of wave-coupling is achieved.

It should be understood that the force application point, part F 2308 can be at any location along the cantilever defined by points C 2303 and C' 2301, and is not restricted to the exemplary location illustrated in device 2300. It should be understood that this three-waveguide-gate device can be generalized to other multiple-waveguide gate devices by placing additional fixed or movable waveguides between waveguide A and B and oriented parallel to waveguides A and B so as to enable light to couple from waveguide A to waveguide B by coupling from waveguide A to these intermediate waveguides and then coupled back to waveguide B. As described below, this three gate device can also be implemented as a two gate device by taking away waveguide B, in which case the device functions as a phase shifter.

In an exemplary embodiment of device 2300 for operation at 800 nm wavelength range, the wavelength λ can be at 820 nm and the Waveguides A 2302, B 2304, and G 2322 can be implemented as the Waveguide 400 illustrated in FIG. 5A. In an exemplary embodiment of device 2300 for operation at 1500 nm wavelength range, the wavelength λ can be at 1500 nm and the Waveguides A 2302, B 2304, and G 2322 can be implemented as the Waveguide 400 illustrated in FIG. 5A.

In an exemplary embodiment for application to the 1500 nm (or 1.5 μm) wavelength range, the cross-sectional dimensions of the waveguide 400 are 0.4 μm wide by 0.25 μm thick. In an exemplary embodiment, the Waveguides A 2302 has width $W_A$ equal to 0.4 μm, the Waveguide B 2304 has width $W_B$ equal to 0.4 μm, and the Waveguide G 2322 has width $W_G$ equal to 0.4 μm. At the "rest state" or "zero-force state" for which the force on part F 2308 is zero, the Waveguide A 2302 is located at an approximately parallel distance $W_{gAG}$ of 0.3 μm from the Waveguide G 2322, and the Waveguide G 2322 is in turn located at an approximately parallel distance $W_{gGB}$ of 0.3 μm from Waveguide B 2304. The material refractive indices of the Waveguides A, the Waveguide G, and the Waveguide B are denoted as $n_A$, $n_B$, and $n_C$, respectively, and are taken to be $n_A=n_B=n_G=3.4$. These refractive indices give an effective planar-waveguide propagating refractive index of about 2 in a planar waveguide structure with a thickness of 0.25 μm. The material refractive index outside the waveguides is taken to be 1.5. In this exemplary embodiment for which the wavelengths of light are around a 1500 nm range, $l'_C$ is about 15 μm. In this exemplary device, the force applying part F 2308 has dimension WF1 of 2 μm and WF2 of 10 μm. The midpoint of the area defining part F 2308 is approximately 10 μm from the mid point of waveguide G defined by the midpoint of the coupling length l', and is approximately 25 μm away from the pivoted point C 2303.

It should be understood that these dimensions, exemplary lengths, and geometry are presented for purposes of illustrating a useful embodiment of the devices 2300 and are not intended to limit other exemplary embodiments of any exemplary device, or the devices 2300. A variety of dimensions, sizes, and geometry can be used, depending on the application desired as well as the fabrication materials, processes or technologies that are employed.

i) General Operating Principle for the Device

The main action of the applied voltage preferably is to move Waveguide G 2322 either closer to or away from either Waveguide A 2302 or Waveguide B 2304. The relative position of Waveguide G 2322 then affects the transfer of light from various inputs to various outputs. The general operation of the device can be illustrated via computer simulation of such light transfer as a function of the position of Waveguide G 2322.

Figure 19A:
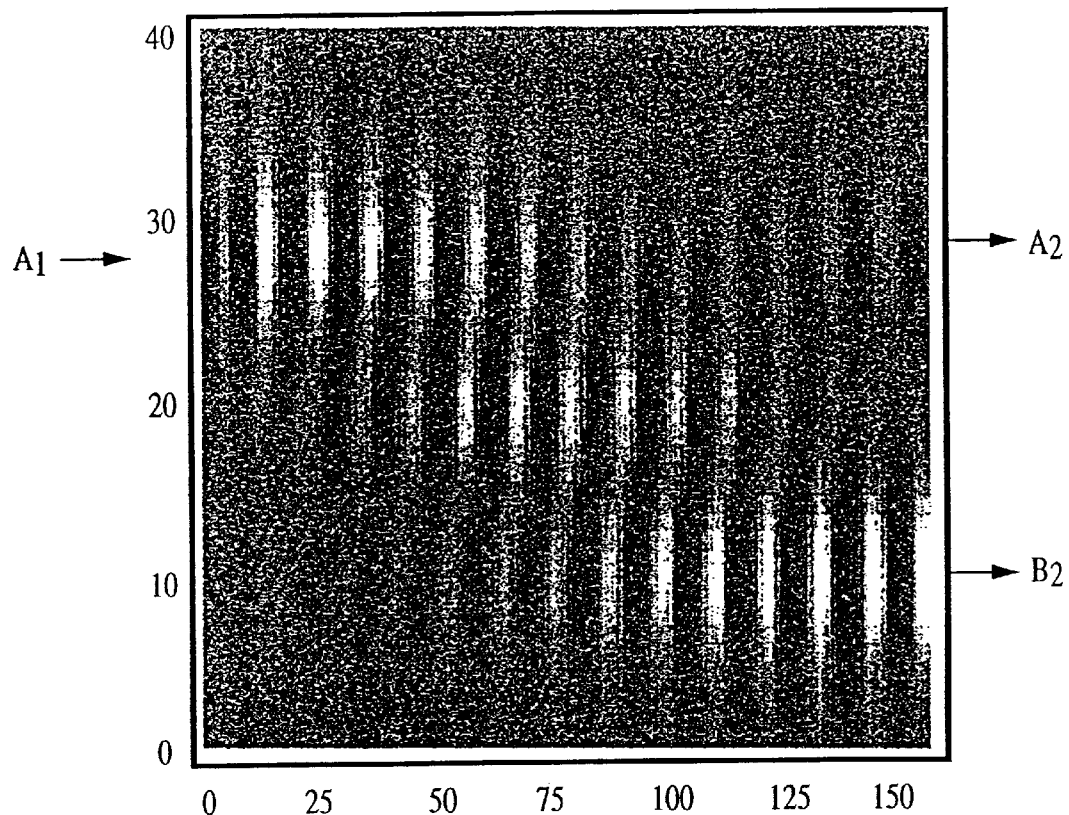
FIGS. 19A–19B are simulation diagrams of the spatial distribution of the electrical field strength of the device of FIG. 18.
Figure 19A:
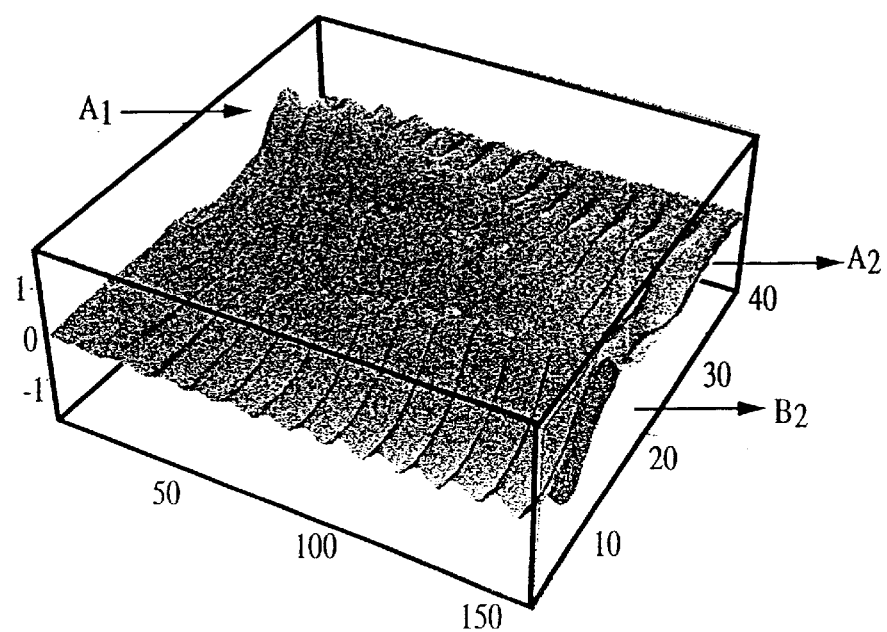
Figure 19B:
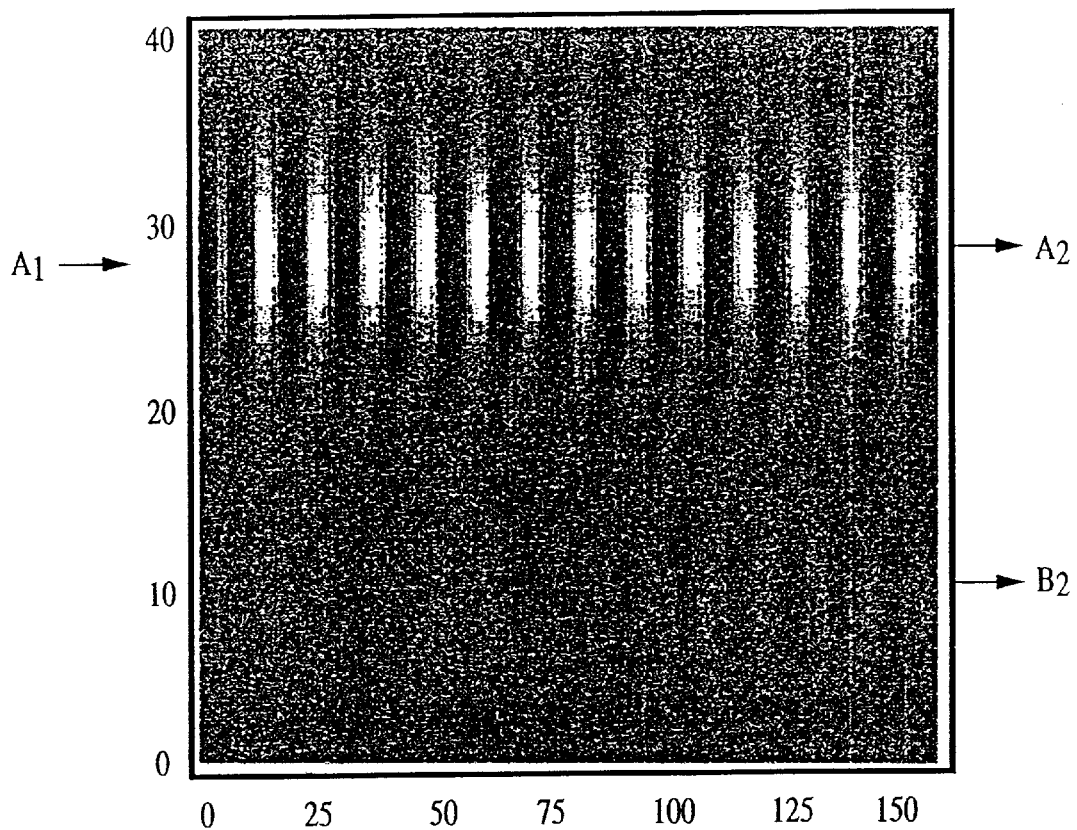
Figure 19B:
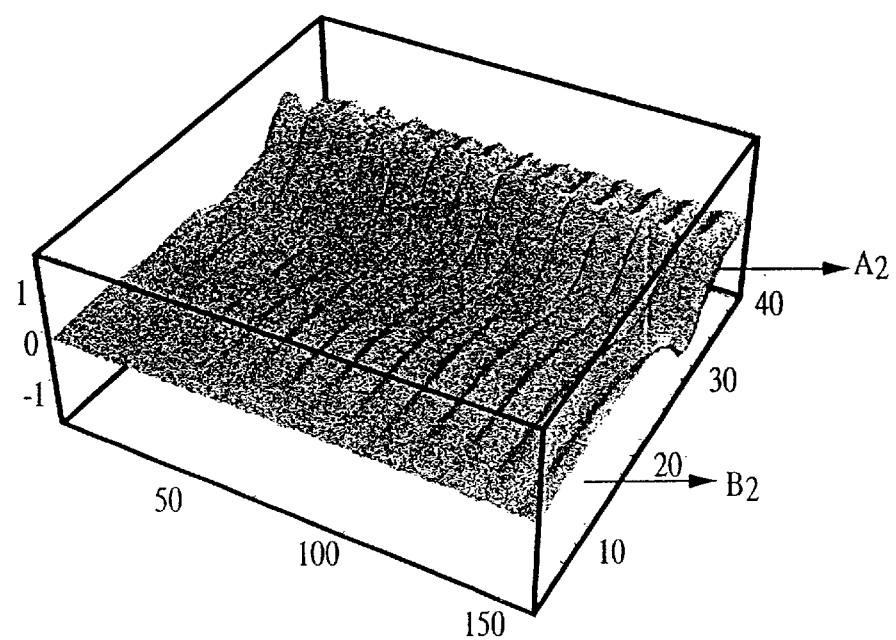

An exemplary operation of the device can be illustrated via the results of computer simulation as shown in FIGS. 19A and 19B. FIGS. 19A and 19B show the spatial distribution of the electric field strength for the light input at A 2318 after propagating into waveguides A and B. The upper parts of FIGS. 19A and 19B are 2-D plots for which the brightness shows the relative field strength, and the lower parts of FIGS. 19A and 19B are 3-D plots for which the heights show the relative field strength. FIG. 19A shows the situation when the applied voltage or force is zero. From FIG. 19A, it is evident that most of the energy of A 2318 exits from Waveguide B 2304 at the port B2 2314. FIG. 19B shows the situation when a voltage is applied to create an electrostatic force to move the center waveguide G down. From FIG. 19B, it is evident that most of the energy of λ 2318 exits from Waveguide A. FIG. 19A and FIG. 19B show the two representative interference flux patterns of light for the device, which is dependent on the state of the center waveguide G. In particular, one can switch between these two representative interference flux patterns of light by changing the state of the center waveguide G through the action of an applied voltage or applied mechanical force to move the center waveguide G away.

ii) Exemplary Device 12 as a Switching Element

In a preferred and useful embodiment, the mechanical-optical phosistor 2300 operates as a switching element. In general, the mechanical-optical phosistor 2300 has one or more light inputs with associated wavelengths. In the zero-force state, for which there is zero force on part F 2308 of device 2300, light at λ 2310 input into port A1 2310 will result in a high power of light at λ 2320 exiting port B2 2314 on Waveguide B 2304, and a low power of light at λ 2316 exiting port A2 2312 on Waveguide A 2302.

In the applied-force state, for which there is nonzero force on part F 2308 of device 2300, the gaps $W_{gAG}$ and $W_{gGB}$ will change due either to vertical or horizontal movements of waveguide G. As a result, the light power at λ 2318 exiting port B2 2314 on Waveguide B 2304 will reduce eventually towards zero, and light power at λ 2316 exiting port $\lambda_2$ 2312 on Waveguide A 2302 will increase eventually to a maximum value when the movement is of the order of the gap size $W_{gAG}$ or $W_{gGB}$.

If the applied force is induced by the voltages V1 and V2, the mechanical-optical phosistor 2300 can be used as a voltage-controlled optical switch to switch light energy between ports A2 2312 and B2 2314.

The device has a symmetric property in that port B1 2324 can play the role of a signal input port as in port A1 2310. In this case, port A2 2312 (or B2 2314) will play the role of output port B2 2314 (or A2 2312). Likewise, port A2 2312 can play the role of the signal input port A1 2310 and port B1 2324 (or A1 2310) will then play the role of the signal output port B2 2314 (or A2 2312). Lastly, port B2 2314 can play the role of the signal input port A1 2310 and port A1 2310 (or B1 2324) will then play the role of the signal output port B2 2314 (or A2 2312).

The above symmetric property of the device allows it to be used in particular as a 2×2 optical cross-bar switch. In this case, there will be a signal input at λ1 (signal 1) onto port A1 2310 and another signal input at λ2 (signal 2—not shown in FIG. 18) into port B1 2324. The wavelength λ1 and λ2 can be the same or can be different for the two separate signal light beams (signal 1 and signal 2).

Depending on the state of the switch, it is possible to channel signal 1 to output port A2 2312 and signal 2 to output port B2 2314 or signal 1 to output port B2 2314 and signal 2 to output port A2 2312. Specifically in the bar state output, corresponding to the applied-force state described above, signal input at λ1 in port A1 2310 will propagate along Waveguide A 2302 and exit port A2 2312 and signal input at λ2 in port B1 2324 will propagate along Waveguide B 2304 and exit port B2 2314.

In the cross-state output, corresponding to the zero-force state described above, most of signal output at λ1 in port A1 2310 will couple from Waveguide A 2302 to Waveguide B 2304 and exit port B2 and most of signal input at λ2 in port B1 2324 will couple from Waveguide B 2304 to Waveguide A 2302 and exit port A2.

Hence, the net effect is that changing from the zero-force state to the applied-force state will bring the device from a cross-state output to a bar-state output. Operated in this fashion, the device is known to those skilled in the art as a 2×2 optical cross-bar switch, or more specifically in this case a 2×2 micro-electro-mechanical optical cross-bar switch. 2×2 cross-bar switches can be mutually connected in such a way as to implement a M×N cross-bar switching in which signals input into M designated input ports can be channeled in any order to N output ports.

It should be understood that this description covers several but not all aspects of device performance. For example, it should be understood that the force on F 2308 can be applied to via an electrical force as described, but can also be applied to via other types of forces such as acoustic force, hydraulic force, or acceleration force. Such variations are described instructively with respect to device 2300 in this or in other useful embodiments and/or applications.

iii) Exemplary Device 12 as a Phase Shifter

As in the case of Device 10, by choosing coupling length $l'_C$ so that $l''=2l'_C$, light input into waveguide A will be coupled back to waveguide A, the net result of which is an additional optical phase shift, whose value will depend on how many intermediate waveguides are coupled to. Typically the phase shift will be in multiple number of π radians (or 180°). When the active medium is in the loss state, light will remain in waveguide A (i.e. there will be no coupling to other waveguides) and there will be no additional optical phase shift. In this way, Device 12 can function as an mechanical-optically controlled phase shifter. In this case, the presence of waveguide B is not essential and the device can function as a two-waveguide device.

iv). Exemplary Device 12 as a Wavelength Multiplexer/De-Multiplexer or Wavelength Selective Switch In another useful embodiment of the device, the waveguide A, G, and B have unequal widths $W_A$, $W_G$, and $W_B$. As is well known to those skilled in the art, waveguide couplers with unequal waveguide widths will have strong wavelength sensitivity. In particular, when the active medium is in the transparency state, only certain wavelengths of light will couple maximally from waveguide A to waveguide B, thus allowing the device to act not only as a switch but as a wavelength-selective switch. As an exemplary embodiment, the widths $W_A$ and $W_B$ can be equal to 0.4 μm and WG can be equal to 0.6 μm. Except for the difference in the waveguide widths providing wavelength sensitivity, this embodiment of the device is otherwise functionally and operationally identical to the device 2300 and descriptions and comments relating to the device 2300 are generally applicable to this device.

v). Resonator Configuration Device

It should be evident to those skilled in the art that the Resonator I/Resonator II configuration for device 12 would be topologically similar to three-gate implementation of Resonator I/Resonator II configuration of Device 2. In the resonator configuration, the resonator can be supported by a cantilever in place of waveguide G. The joint of the cantilever beam to the resonator can either be from the bottom or from the side of the resonator structure. Note that for joining to the side, the joint must be as small as possible to reduce scattering loss at the joint. The bottom-type joint will be ideal for disk shape resonators since the joint can be made to the center of the disk that will have little light energy to scatter. As in device 2, it should be understood that the Resonator I/Resonator II Configuration Devices are otherwise functionally and operationally identical to the device 2300 and descriptions and comments relating to the device 2300 are generally applicable to the Resonator I/Resonator II Configuration Devices.

vi) Comments on Fabrication Methods

Figures 20A, 20B, 20C:
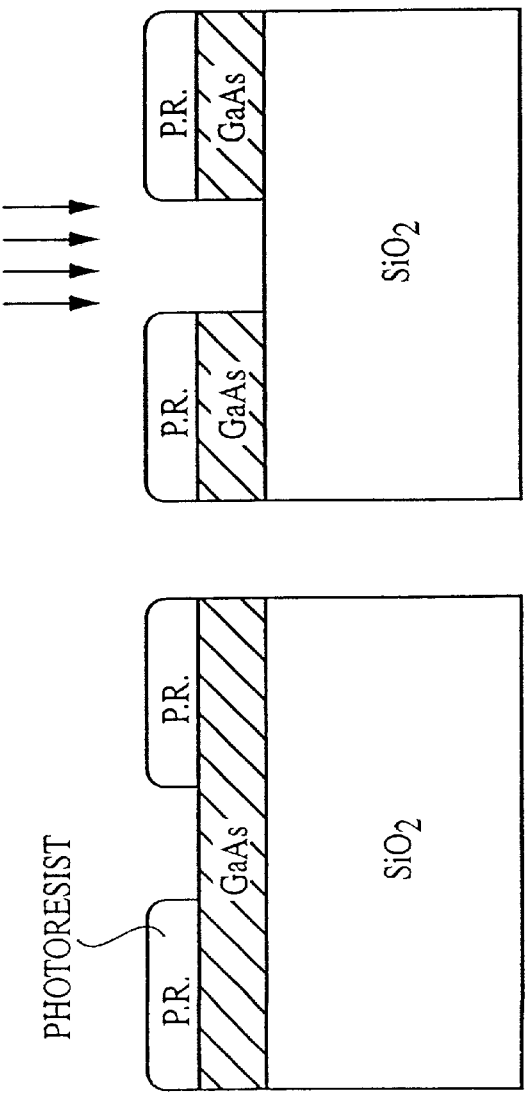
FIGS. 20A–C are depictions of stages of fabrication of the structure of FIGS. 18 and 21.

The structure shown in FIG. 18 can be fabricated using the well-known methods in fabricating MEM (Micro Electro Mechanical) devices, which typically use a thin layer of semiconductor transfer onto a silicon dioxide $SiO_2$ (glass) surface, and use selective etching technique to etch the $SiO_2$ underlayer to form an overhang for the semiconductor structure. As an example, in FIG. 20, we show that beginning with a wafer made up of a thin layer of GaAs bonded to a $SiO_2$ substrate such as quartz. The GaAs thin layer may have a thickness of 0.25 μm, for example, which will form the thickness required for the waveguides. An optical (or e-beam) lithography is used to pattern the waveguide structures. FIG. 20A shows the situation after the patterning in which photoresist covers the area that will be etched. The wafer is then subjected to reactive-ion-beam etching of GaAs using chlorine chemistry, which is a typical semiconductor etching process. This etches the GaAs layer away as shown in FIG. 20B. The wafer is the dipped into a dilute hydrofluoric (HF) acid solution. The HF solution has a selective-etching property in that it will etch only the $SiO_2$ material and not the semiconductor GaAs material. This selective etching property allow us to undercut the materials under the GaAs thin film as shown in FIG. 20C. After the removal of photoresists with acetone, we will end up with an overhanging structure for the GaAs thin film. Those skilled in the art will know how to use such undercutting property to make the desired structure shown in FIG. 18 using the typical semiconductor fabrication processes.

F. Exemplary Device 13 (A Relaying Gate Mechnical-Optical Device)

Figure 21:
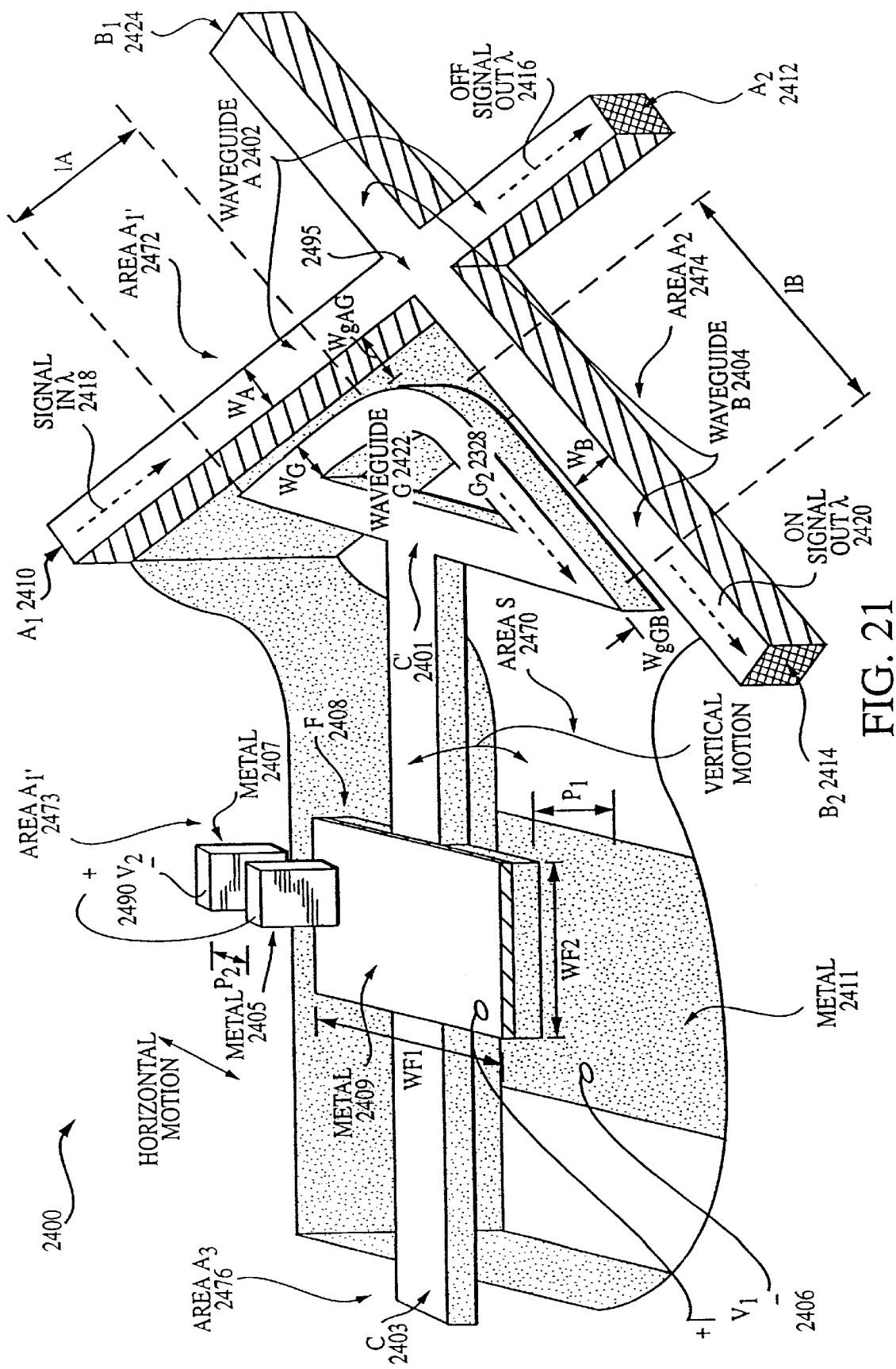
FIG. 21 is a second embodiment of a mechanical-optical phosistor.

FIG. 21 illustrates an exemplary device and a second general embodiment 2400 of a mechanical-optical phosistor device employing directionally coupled waveguides. For purposes of illustration and not limitation, the device is described according to one useful function as a switching element for slow or ultrafast optical pulses of sufficient energy and wavelength. The device 2400 is not limited to use as a switching element and can instead be used to implement other mechanical-optical device functions to perform in various applications. It can be utilized, for example, as a M×N optical cross-bar switch, a variable coupling device (including an optical loop mirror and a pulse storage ring), a mechanical-optical phase shifter, a resonator frequency tuning element, a light intensity modulator, a light intensity regulator, a micro-electro-mechanical optical switch, a micro-acousto-mechanical optical switch, a micro-hydro-mechanical optical switch, and a variable optical attenuator. The device can be referred to as an "Mechanical-Optical Relaying-Gate Phosistor" (MO-RG Phosistor 2400 ).

MO-RG Phosistor 2400 preferably includes a first pathway of light consisting of the spatial region occupied by Waveguide A 2402, a second pathway of light consisting of the spatial region occupied by Waveguide B 2404, and a third Waveguide G 2422. Waveguide G is suspended in air and is surrounded by bottom substrate area S 2470, and areas A1 2472, A2 2474, and A3 2476, which are solid areas. Preferably, the Waveguide G 2422 includes no active medium but can be moved physically or mechanically by placing it on a cantilever pivoted at C 2403 defined by the beam between points C 2403 and C' 2401. Such mechanical motion can be induced, for example, by applying force on part F 2408 along the cantilever, where part F 2408 is shown to have a width WF1 and a length WF2. As described below, switching action can be achieved either by moving the waveguide G 2422 vertically or by moving the waveguide G 2422 horizontally.

As an exemplary embodiment of the device 2400 which allows vertical movement of waveguide G 2422, the force can be induced, for example, via applying voltage to a pair of parallel metal plate in which one of the metal plates 2409 is attached to part F 2408 of the cantilever and another of the metal plates 2411 is situated on the substrate area below part F 2408. Metal plate 2411 is oriented parallel to metal plate 2409 and is spaced by a distance P1 from the bottom on part F 2408. Metal plate 2411 can have an irregular shape other than that shown as long as it is around the area or adjacent to the area below part F 2408. A voltage source 2406 having a variable voltage V1 can be applied across the parallel pair of metal plates 2409 and 2411 to move waveguide G in a vertical direction pivoted around point C 2403. These forces on part F 2408 can also be induced via other mechanical means, for example, acoustically, hydraulically, or via acceleration. We may refer to this exemplary embodiment as the vertical-motion embodiment of device 2400.

Alternatively as an exemplary embodiment of the device 2400 which allows horizontal movement of waveguide G 2422, the waveguide G 2422 may be moved via a metal plate 2405 attached to part F 2408 but oriented vertically and a metal plate 2407 attached to area A1' 2473. Metal plate 2407 is oriented parallel to metal plate 2405 but spaced by a distance P2 away from metal plate 2405. These vertical pairs of metal plate 2405 and 2407 can be used to move the cantilever horizontally (pivoted around point C 2403 ) via applying a voltage V2 2490 to the parallel metal plates 2405 and 2407. These forces on part F 2408 can also be induced via other mechanical means, for example, acoustically, hydraulically, or via acceleration. We may refer to this exemplary embodiment as the horizontal-motion embodiment of device 2400.

Similar device switching function can be achieved by using either the vertical-motion embodiment or the horizontal-motion embodiment of the device 2400.

In an exemplary embodiment, the Waveguides A 2402, B 2404, and G 2422 can each be implemented as the Waveguide 400 illustrated in FIG. 5A. Waveguides A, B, and G are support from below in areas A1, A2, and A3 by having the lower cladding region being solid materials such as silicon dioxides. The Waveguide A 2402 preferably includes an input port A1 2410 and an output port A2 2412. The Waveguide B 2404 preferably includes an input port 2424 and an output port B2 2414. Waveguides A and B cross each other at a cross junction D 2495. Waveguide G 2422 preferably includes a shaped region 2328 that traces an area of the interface between waveguides A and B. FIG. 21 illustrates that Waveguide A 2402 has width $W_A$ and is located at an approximately parallel distance (coupling gap or distance) $W_{gAG}$ from Waveguide G 2422, which has width $W_G$. The shaped region 2328 of Waveguide G 2422, after making a 90° turn, is in turn located at an approximately parallel distance (coupling gap or distance) $W_{gGB}$ from Waveguide B 2404, which has width $W_B$.

The input port A1 2410 on the Waveguide A 2402 is configured to receive light having wavelength λ (at λ) (SIGNAL IN λ) 2418. In a useful embodiment, this light at λ 2418 is continuous wave (CW) light. Depending on the state of the mechanical-optical phosistor 2400, light can be output from the output port B2 2414 as light having wavelength λ (at λ) (ON-SIGNAL OUT λ) 2420. In a useful embodiment, this light at λ 2420 is pulsed light. Light is also capable of being output from the output port A2 2412 as light having wavelength λ (at λ) (OFF-SIGNAL OUT λ) 2416. In a useful embodiment, this light at λ 2416 is pulsed light. Under certain operating conditions described below, most of the CW light at λ 2418 propagating along the Waveguide A 2402 will be transferred to Waveguide B 2404 through waveguide G 2422. It should be understood that the light signals into and out of MO-RG Phosistor 2400 and other useful embodiments can include pulsed light signals, continuous wave (CW) light signals, or both, depending on which of the various operating modes of the embodiments are utilized in a particular application.

The coupling length $l_C|_{X-Y}$ is defined as the length at which a wave in a first waveguide (X) maximally couples into a second waveguide (Y) that is coupled to the first waveguide (X). As is known to those skilled in the art, the coupling length is a function of the gap distance between each pair of waveguides and the width of each waveguide. The gap distances can be chosen to achieve maximal coupling between waveguide X and waveguide Y.

In this device 2400, the interaction length $l_A$, defined as the length of interaction between waves in Waveguides A 2402 and G 2422, and the interaction length $l_B$, defined as the length of interaction between waves in Waveguides G 2422 and B 2404 extends to approximately the full coupling length $l_C$ so that $l_A = l_C|_{A-G}$ and $l_B = l_C|_{G-B}$ in one useful embodiment of the device, but may be different from $l_A = l_C|_{A-G}$ and $l_B = l_C|_{G-B}$ in other useful embodiments of the device. In the case of FIG. 21, the interaction length is defined geometrically by the length for which waveguides A and G, or G and B run closely parallel to each other.

It should be understood that the above dimensions, exemplary lengths, and geometry are presented for purposes of illustrating a useful embodiment of the device 2400 and are not intended to limit other exemplary embodiments of any exemplary device, or the device 2400. A variety of dimensions, sizes, and geometry can be used, depending on the application desired as well as the fabrication materials, processes or technologies that are employed. For example, while the choice of $l_A = l_C|_{A-G}$ and $l_B = l_C|_{G-B}$ is illustrated in this exemplary device, the interaction length may vary from the coupling length $l_A = l_C|_{A-G}$ and $l_B = l_C|_{G-B}$ and still achieve similar device functions. Also, the structure forming waveguide G does not have to be of the regular shape shown. The overhanging of waveguide A and B is not necessary and waveguides A and B can be adjacent to the edge of the hole or indentation area.

Also, it should be understood that the shape of the waveguides do not generally have to be linear. Curved shapes and different waveguide dimensions may be utilized as long as they achieve the same functions such as waveguiding and wave-coupling. Furthermore, waveguides that are placed side by side to achieve wave-coupling do not have to be placed side by side in a horizontal manner but can be placed in a top-down vertical manner or any other manner with respect to the horizontal substrate. Also coupled waveguides do not have to be exactly parallel or have the same widths as long as the desired effect of wave-coupling is achieved. In addition, Waveguide A and Waveguide B can be two independent waveguides and do not have to cross each other. Furthermore, the turning of Waveguide G can be any degree and does not have to be a right angle, as long as the required wave-relaying effect of relaying wave from Waveguide A to Waveguide B through Waveguide G is achieved.

It should be understood that the force application point, part F 2408 can be at any location along the cantilever defined by points C 2403 and C' 2401, and is not restricted to the exemplary location illustrated in device 2400. It should be understood that this three-waveguide relaying-gate device can be generalized to other multiple-waveguide gate devices by placing additional fixed or movable waveguides between waveguide A and G (or G and B) and oriented parallel to waveguides A and G (or G and B) so as to enable light to couple from waveguide A to waveguide G (or G to B) by coupling from waveguide A (or G) to these intermediate waveguides and then coupled back to waveguide G (or B).

In an exemplary embodiment of device 2400 for operation at 800 nm wavelength range, the wavelength λ can be at 820 nm and the Waveguides A 2402, B 2404, and G 2422 can be implemented as the Waveguide 400 illustrated in FIG. 5A. In an exemplary embodiment of device 2400 for operation at 1500 nm wavelength range, the wavelength λ can be at 1500 nm and the Waveguides A 2402, B 2404, and G 2422 can be implemented as the Waveguide 400 illustrated in FIG. 5A.

In an exemplary embodiment for application to the 1500 nm (or 1.5 μm) wavelength range, the cross-sectional dimensions of the waveguide 400 are 0.4 μm wide by 0.25 μm thick. In an exemplary embodiment, the Waveguide A 2402 has width $W_A$ equals to 0.4 μm, the Waveguide B 2404 has width $W_B$ equals to 0.4 μm, and the Waveguide G 2422 has width $W_G$ equal to 0.4 μm. At the "rest state" or "zero-force state" for which the force on part F 2408 is zero, the Waveguide A 2402 is located at an approximately parallel distance $W_{gAG}$ of 0.4 μm from the Waveguide G 2422, and the Waveguide G 2422 is in turn located at an approximately parallel distance $W_{gGB}$ of 0.4 μm from Waveguide B 2404. The material refractive indices of the Waveguides A, the Waveguide G, and the Waveguide B are denoted as $n_A$, $n_B$, and $n_C$, respectively, and are taken to be $n_A = n_B = n_G = 3.4$. These refractive indices give an effective planar-waveguide propagating refractive index of about 2 in a planar waveguide structure with a thickness of 0.25 μm. The material refractive index outside the waveguides is taken to be 1.5. In this exemplary embodiment for which the wavelengths of light are at around 1500 nm range, $l_A = l_C|_{A-G}$ and $l_B = l_C|_{G-B}$ are both about 15 μm. In this exemplary device, the force applying part F 2408 has dimension WF1 of 2 μm and WF2 of 10 μm. The mid point of the area defining part F 2408 is approximately 20 μm from the mid point of waveguide G, and is approximately 25 μm away from the pivoted point C 2403.

It should be understood that these dimensions, exemplary lengths, and geometry are presented for purposes of illustrating a useful embodiment of the devices 2400 and are not intended to limit other exemplary embodiments of any exemplary device, or the devices 2400. A variety of dimensions, sizes, and geometry can be used, depending on the application desired as well as the fabrication materials, processes or technologies that are employed.

i) General Operating Principle for the Device

The main action of the applied voltage preferably is to move Waveguide G 2422 either closer to or away from either Waveguide A 2402 or Waveguide B 2404. The relative position of Waveguide G 2422 then affects the transfer of light from various inputs to various outputs. In particular, in the On state, waveguide G at its equilibrium position waveguide along Waveguide A 2402 will be transferred fully to Waveguide G 2422. Waveguide G then curves around and relays the wave to Waveguide B 2404. This causes the wave into port A1 to exit port B2, effectively turning 90° about the junction 2495. In the Off state, waveguide G is moved away (e.g. downwards vertically), and wave coupling from Waveguide A 2402 to Waveguide G 2422 is reduced or extinguished. This causes the wave entering A1 to exit port A2 by propagating through the junction 2495.

ii) Exemplary Device 13 as a Switching Element

In a preferred and useful embodiment, the mechanical-optical phosistor 2400 operates as a switching element. In general, the mechanical-optical phosistor 2400 has one or more light inputs with associated wavelengths. In the zero-force state, for which there is zero force on part F 2408 of device 2400, light at λ 2410 input into port A1 2410 will result in a high power of light at λ 2420 exiting port B2 2414 on Waveguide B 2404, and a low power of light at λ 2416 exiting port A2 2412 on Waveguide A 2402.

In the applied-force state, for which there is nonzero force on part F 2408 of device 2400, the gaps $W_{gAG}$ and $W_{gGB}$ will change due either to vertical or horizontal movements of waveguide G. As a result, the light power at λ 2418 exiting port B2 2414 on Waveguide B 2404 will reduce eventually towards zero, and light power at λ 2416 exiting port A2 2412 on Waveguide A 2402 will increase eventually to a maximum value when the movement is of the order of the gap size $W_{gAG}$ or $W_{gGB}$.

If the applied force is induced by the voltages V1 and V2, the mechanical-optical phosistor 2400 can be used as a voltage-controlled optical switch to switch light energy between ports A2 2412 and B2 2414.

As is known to those skilled in the art, these switches can be mutually connected in such a way as to implement a M×N cross-bar switching in which signals input into M designated input ports can be channeled in any order to N output ports.

It should be understood that this description covers several but not all aspects of device performance. For example, it should be understood that the force on F 2408 can be applied to via an electrical force as described, but can also be applied to via other types of forces such as acoustic force, hydraulic force, or acceleration force. Such variations are described instructively with respect to device 2400 in this or in other useful embodiments and/or applications.

iii). Exemplary Device 13 as a Wavelength Multiplexer/De-Multiplexer or Wavelength Selective Switch In another useful embodiment of the device, the waveguide A, G, and B have unequal widths $W_A$, $W_G$, and $W_B$. As is well known to those skilled in the art, waveguide couplers with unequal waveguide widths will have strong wavelength sensitivity. In particular, when the active medium is in the transparency state, only certain wavelengths of light will couple maximally from waveguide A to waveguide B, thus allowing the device to act not only as a switch but as a wavelength selective switch. As an exemplary embodiment, the width $W_B$ and WG can be equal to 0.6 μm and $W_A$ can be equal to 0.4 μm. Except for the difference in the waveguide widths providing wavelength sensitivity, this embodiment of the device is otherwise functionally and operationally identical to the device 2400 and descriptions and comments relating to the device 2400 are generally applicable to this device.

iv). Resonator Configuration Device

Figure 22:
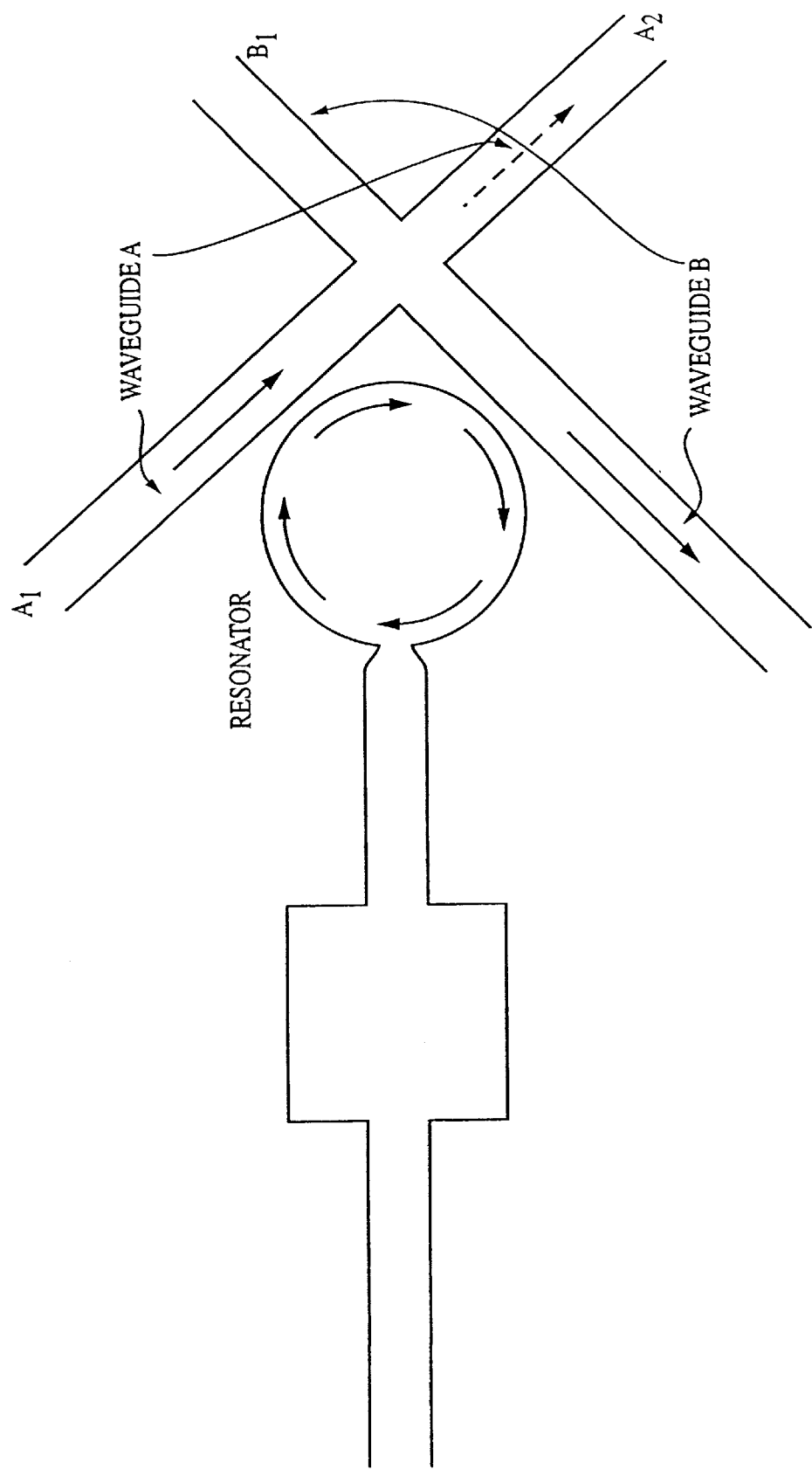
FIG. 22 is an exemplary embodiment of a resonator configuration of the device of FIG. 21.

A top view of a resonator configuration device is shown in FIG. 22. In the resonator configuration, the resonator can be supported by a cantilever in place of waveguide G. The joint of the cantilever beam to the resonator can either be from the bottom or from the side of the resonator structure. Note that for joining to the side, the joint must be as small as possible to reduce scattering loss at the joint. The bottom-type joint will be ideal for disk shape resonator as in that case the joint can be to the center of the disk that will have little light energy to scatter. As in device 2, it should be understood that the Resonator Configuration Devices are otherwise functionally and operationally identical to the device 2400 and descriptions and comments relating to the device 2400 are generally applicable to the Resonator Configuration Devices.

v) Comments on Fabrication Methods

The structure shown in FIG. 21 can be fabricated using the well-known methods in fabricating MEM (Micro Electro Mechanical) devices, which typically use a thin layer of semiconductor transfer onto a silicon dioxide $SiO_2$ (glassy) surface, and use selective etching technique to etch the $SiO_2$ underlayer to form an overhang for the semiconductor structure. As an example, in FIG. 20, we show that beginning with a wafer made up of a thin layer of GaAs bonded to a $SiO_2$ substrate such as quartz. The GaAs thin layer may have a thickness of 0.25 μm, for example, which will form the thickness required for the waveguides. An optical (or e-beam) lithography is used to pattern the waveguide structures. FIG. 20A shows the situation after the patterning for which one has photoresist covering the area that will be etched. The wafer is then subjected to reactive-ion-beam etching of GaAs using chlorine chemistry, which is a typical semiconductor etching process. This etches the GaAs layer away as shown in FIG. 20B. The wafer is the dipped into a dilute hydrofluoric (HF) acid solution. The HF solution has a selective-etching property in that it will etch only the $SiO_2$ material and not the semiconductor GaAs material. This selective etching property allow us to undercut the materials under the GaAs thin film as shown in FIG. 20C. After the removal of photoresists with acetone, we will end up with an overhanging structure for the GaAs thin film. Those skilled in the art will know how to use such undercutting property to make the desired structure shown in FIG. 21 using the typical semiconductor fabrication processes.

Figure 23A:
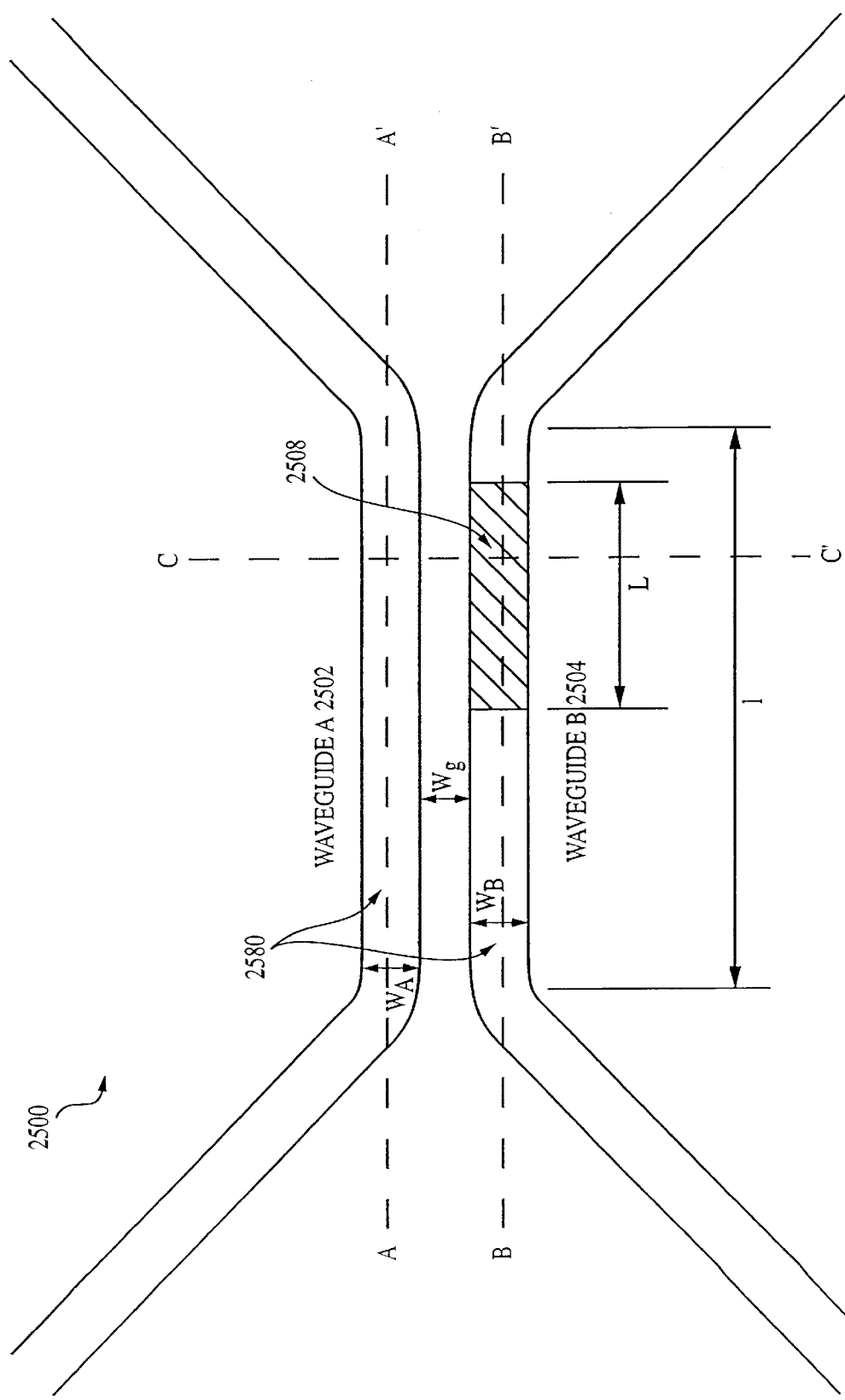
Figure 23B:
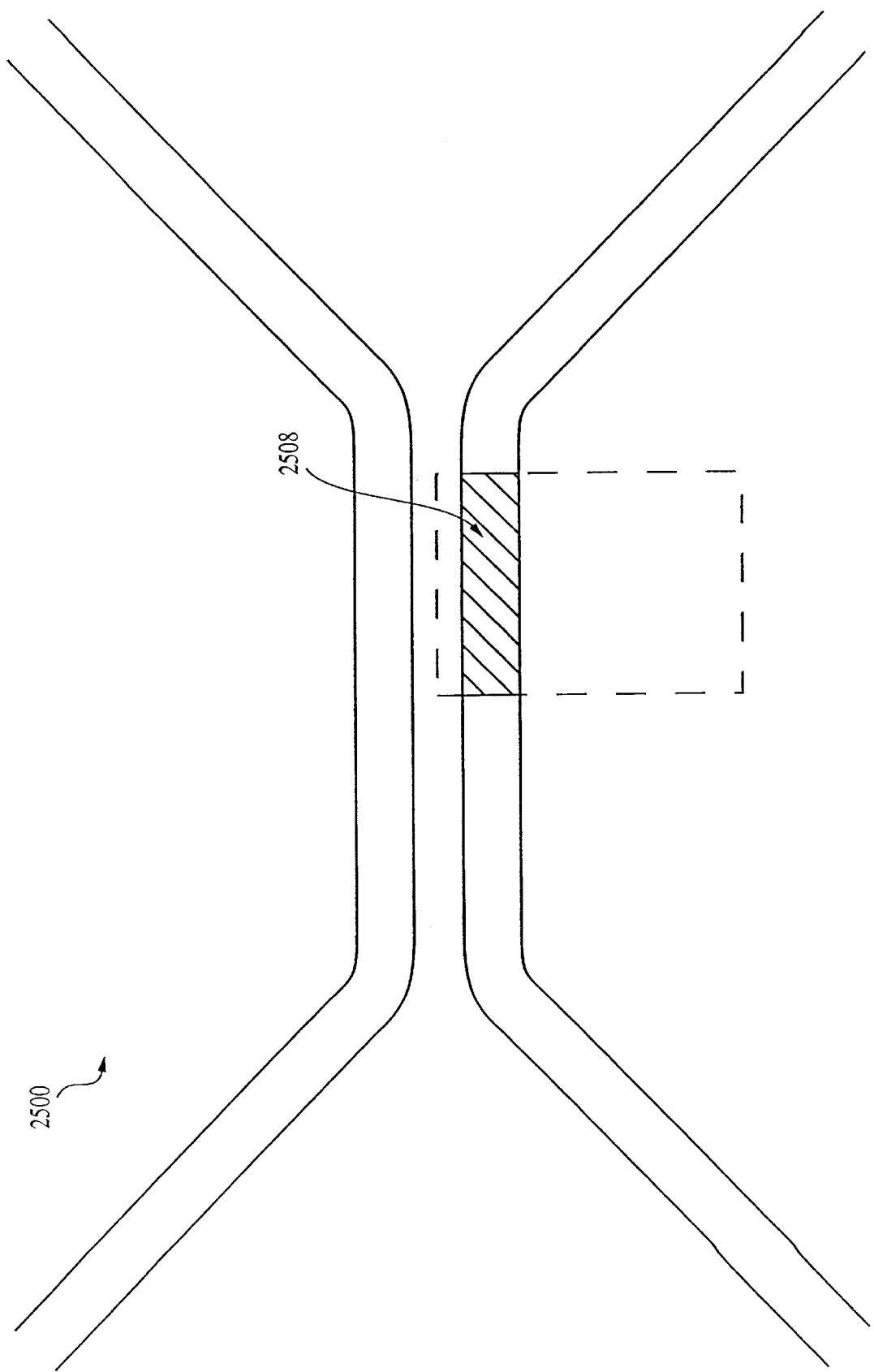

Another embodiment of a mechanical-optical device is illustrated in FIGS. 23A–C. The device 2580 comprises two waveguides, A and B, and their components. Waveguide A 2502 is spaced approximately $w_g$ apart from waveguide B 2504. Waveguide B comprises active medium portion 2504, of length L, where the overall length of the working portion of the waveguide is of length l, where L is less than 1, and preferably less than about half of 1. Operably connected to portion 2504 is movement inducing part 2508. In a manner similar to that described for FIG. 18, a voltage or other force may be applied to 2508 in FIG. 23B, causing mechanical movement of 2504, and influencing waveguide B to approach or distance itself from waveguide A. Thus, the light entering waveguide A will remain within waveguide A or be transferred to waveguide B. As depicted in FIG. 23C, it is not necessary that all portions of 2508 be located in close proximity to waveguide B. So long as the influence of the movement is manifested in portion 2504, part of 2508 may be located remotely from waveguide B.

VIII. Phosistor Exemplary Fabrication Method

Figure 26B:
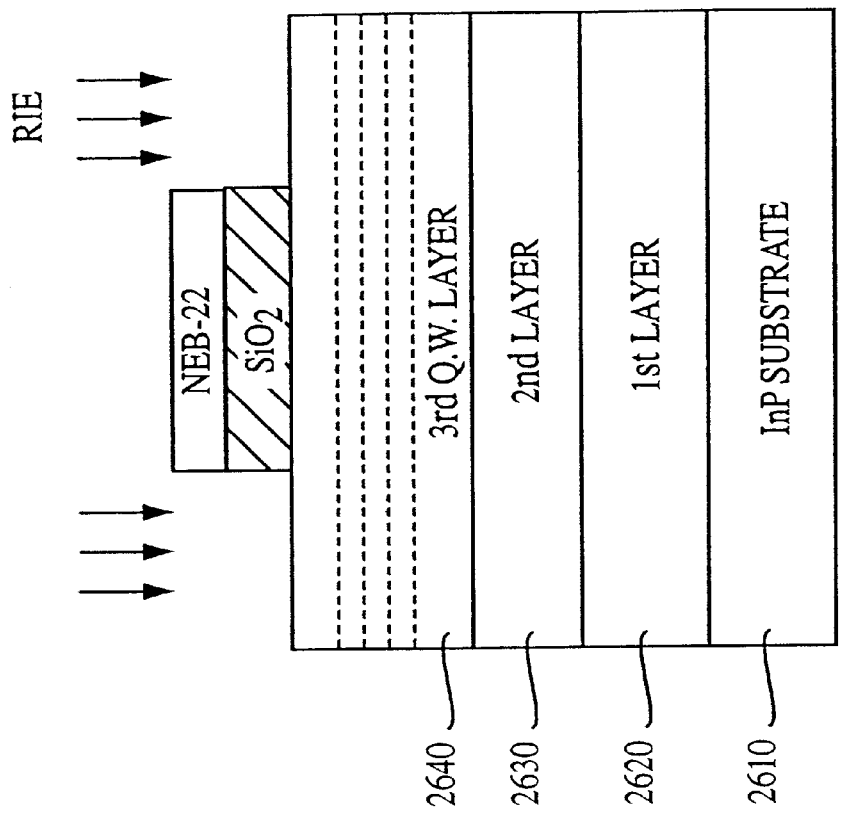
FIGS. 26A–P are exemplary embodiments for manufacturing phosistor devices such as those depicted in FIGS. 24–25.
Figure 26A:
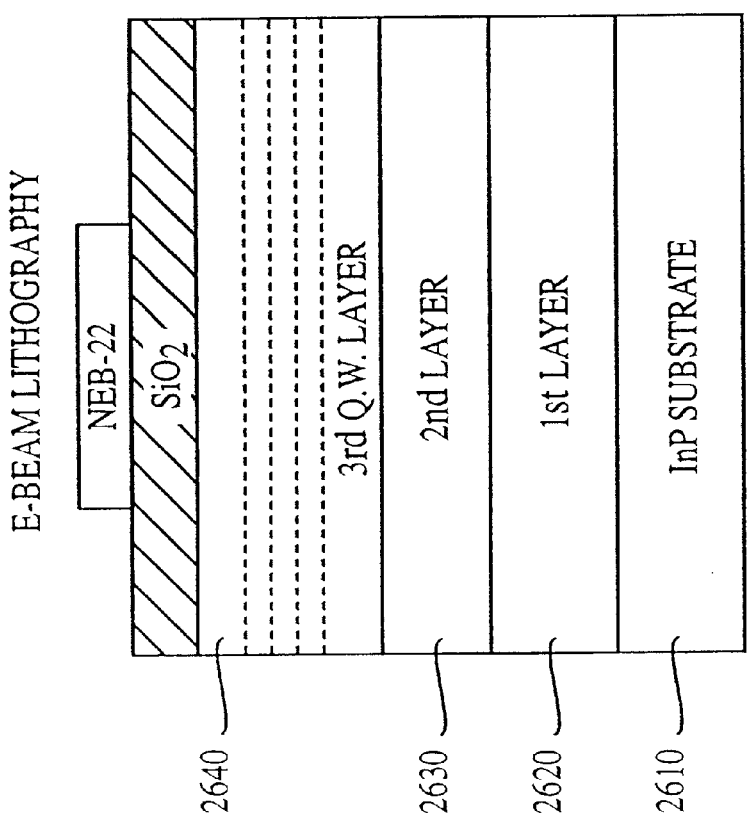
Figure 26F:
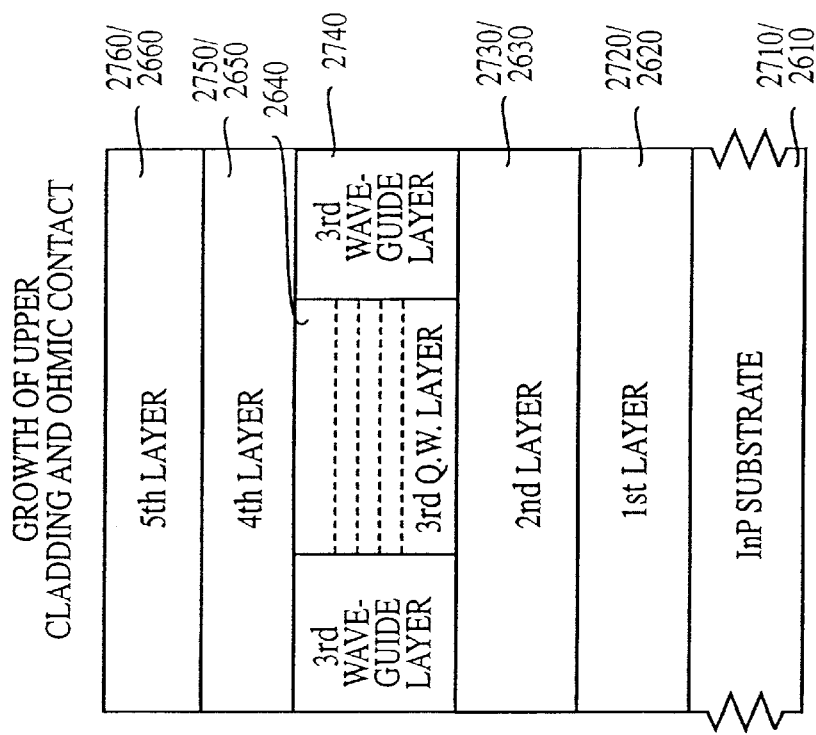
Figure 26E:
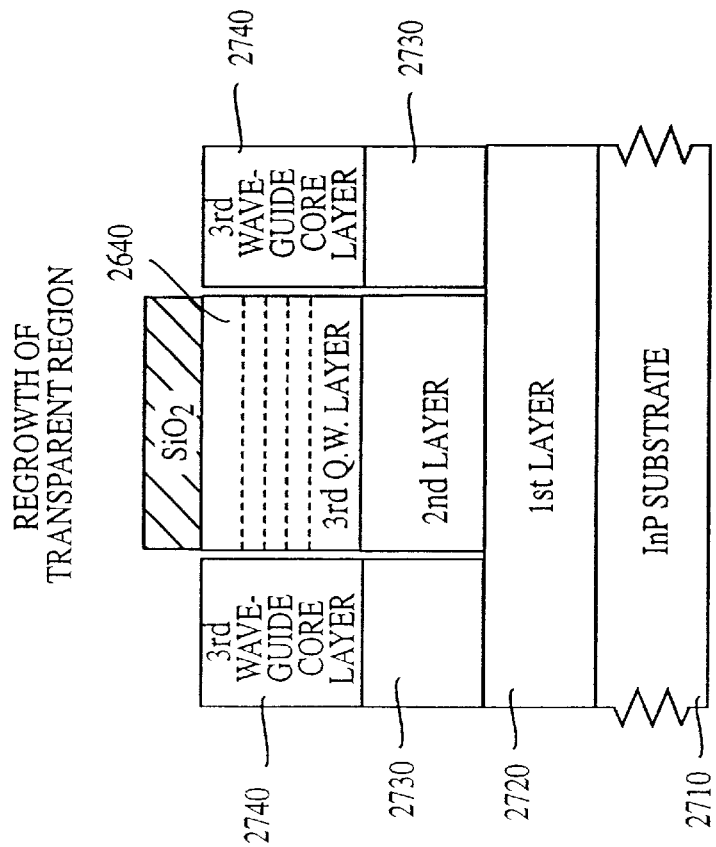
Figure 26J:
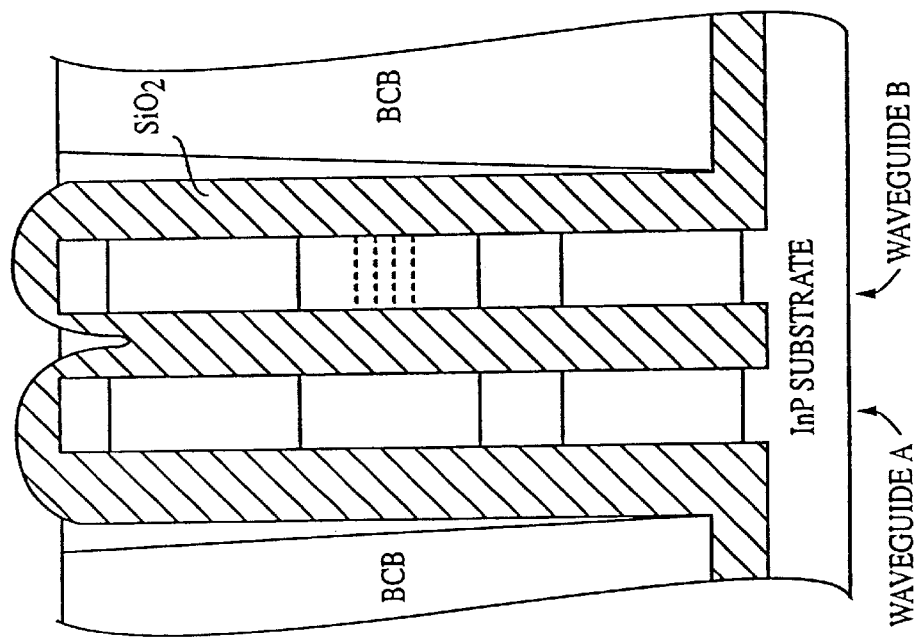
Figure 26I:
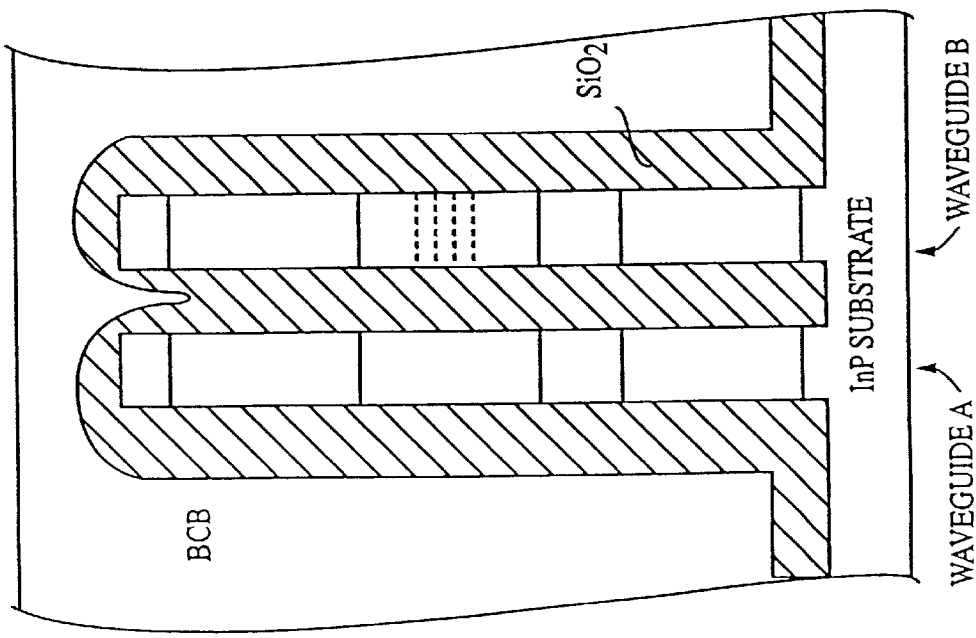
Figure 26L:
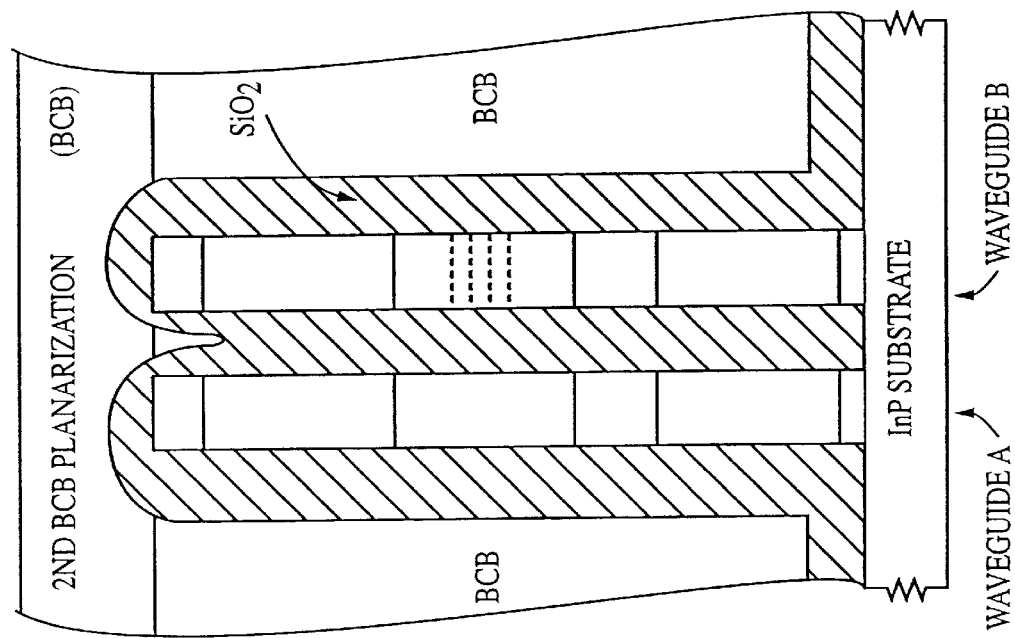
Figure 26K:
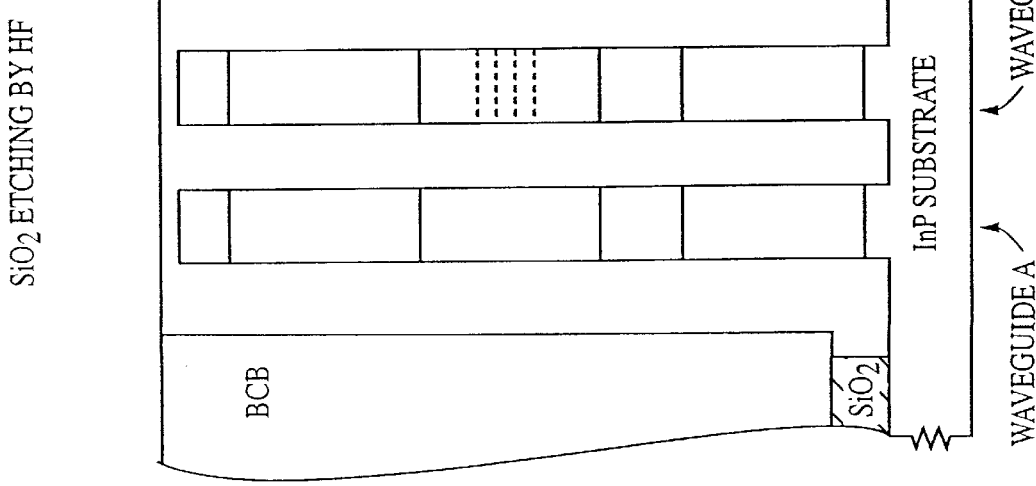
Figure 26P:
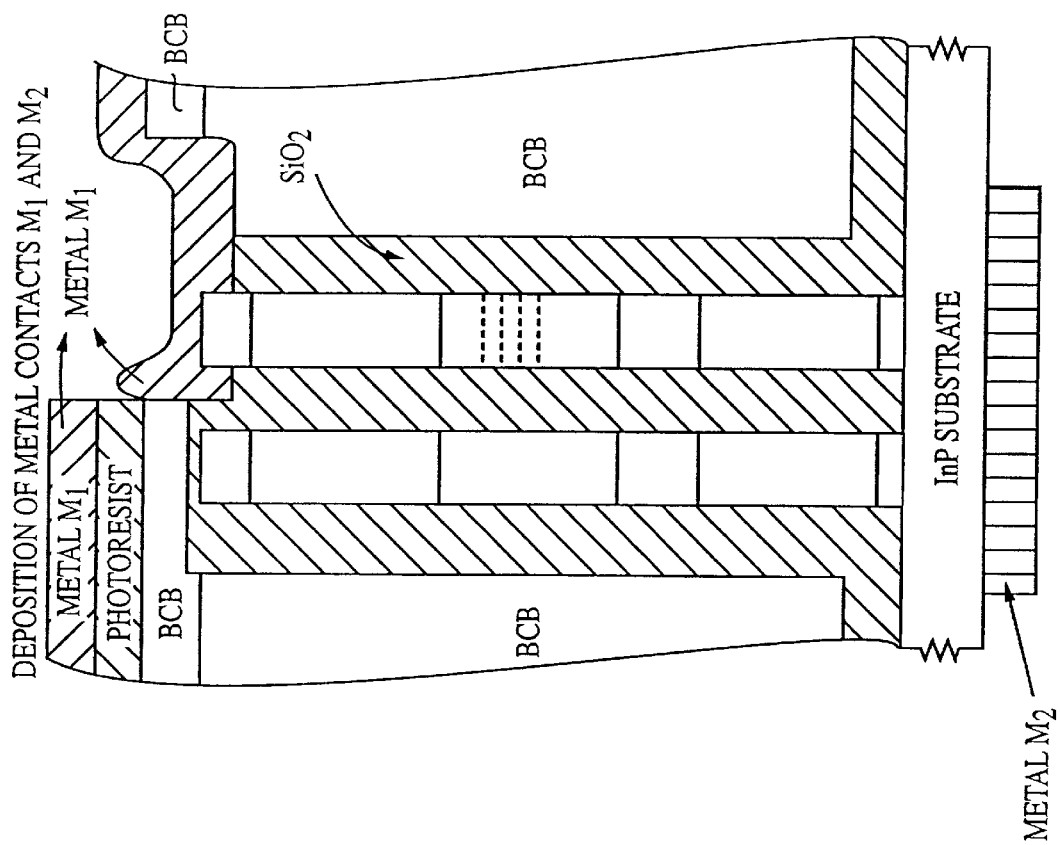

Referring now to FIGS. 26A–26P described is an exemplary procedure for fabrication of the waveguide and active structures, such as the exemplary structures illustrated in FIGS. 5A, 5B, 5C, and 5D. This procedure is given for the purpose of illustration and not limitation, as there are other procedures which can be used to achieve the same fabrication results and other materials systems or device structures that can be utilized to fabricate devices with the same functional capabilities.

The phosistor-type device structure can be fabricated by epitaxial layer growth such as MOCVD (Metal-Organic Chemical Vapor Deposition) or MBE (Molecular-Beam Epitaxy), local area etching, re-growth, E-beam lithography, and nano-fabrication techniques. We take as an example, an InGaAsP based device with multiple quantum well as the active layer. An exemplary phosistor-type device typical of those discussed above is shown in FIG. 23A for which two waveguides, waveguide A 2502 and waveguide B 2504 with waveguide widths $W_A$ and $W_B$, respectively, are placed parallel to each other spaced by a gap $W_g$ for an interation length of l. Waveguide B is occupied by an active medium section 2508 with length L. Other parts of waveguide A and B are transparent waveguides 2580. In an exemplary device $W_A=0.4$ μm, $W_B=0.4$ μm, $W_g=0.4$ μm, l=15 μm, and L=15 μm.

Figure 24:
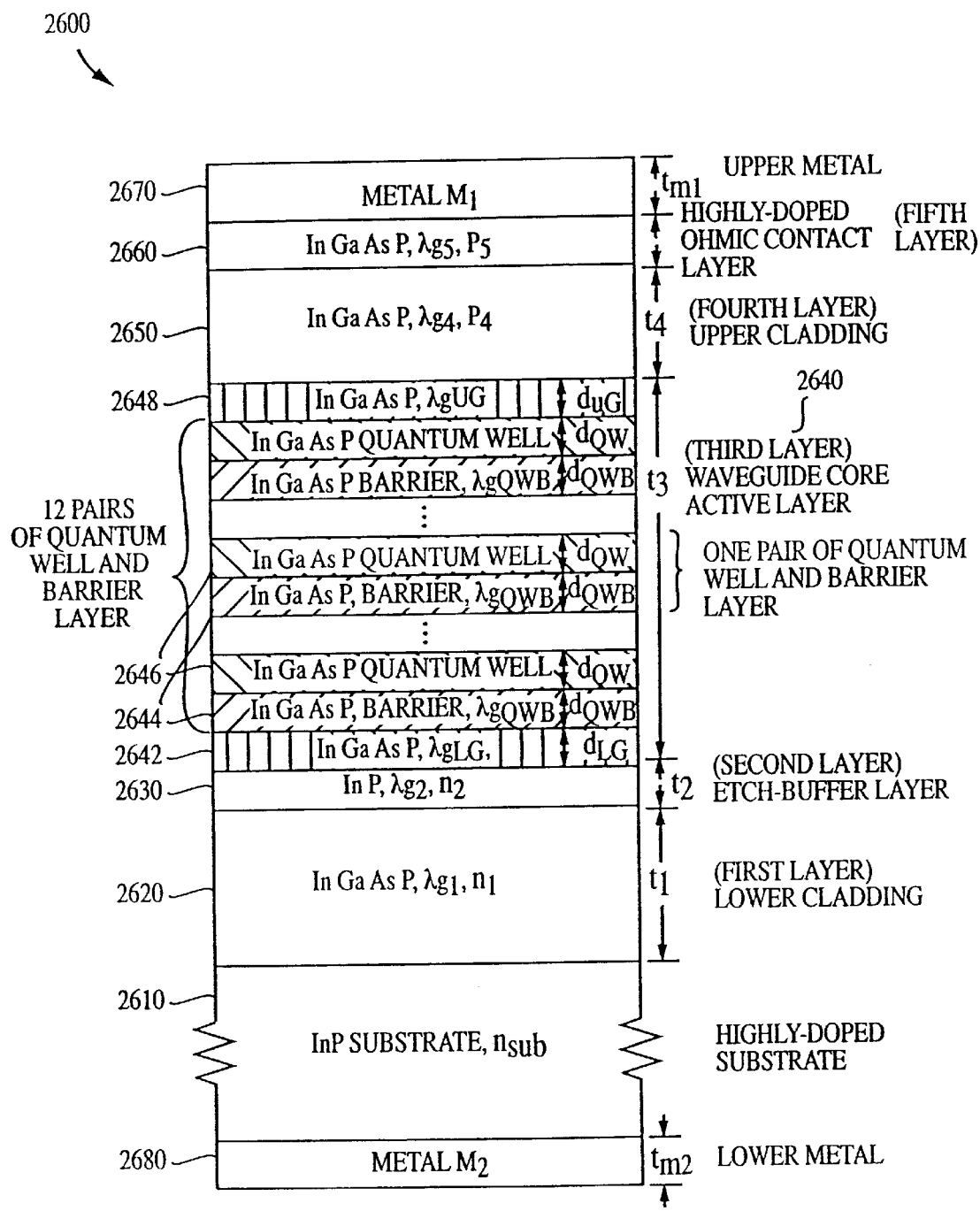
FIGS. 24–25 are embodiments of lossy and transparent devices.

The epitaxial layer structure for the active medium section 2508 is shown in FIG. 24 and it is made up of various layers of lattice matched $In_{1-x}Ga_xAs_{1-y}P_y$ (in short-formed as InGaAsP) materials with compositions x and y chosen to give different bandgap wavelengths. Note that the bandgap wavelength $\lambda_g$ specifies uniquely the compositions of x and y for lattice matching. The epitaxial layer structure shown in FIG. 24 is made up of a first layer 2620 of $t_1$ thick n-doped InGaAsP material with a bandgap wavelength of $\lambda_{g1}$ and a n-dopant density of $n_1$ grown on a n-doped InP substrate 2610 with a substrate dopant density of $n_{sub}$. In an exemplary device, $t_1=1.5$ μm, $\lambda_{g1}=1.15$ μm, $n_1=5\times10^{17}/cm^3$, and $n_{sub}>10^{18}/cm^3$. This first layer 2620 forms the lower waveguide cladding. The first layer is followed on top by a second layer 2630 of $t_2$ thick n-doped InP with a dopant density of $n_2$, which forms an etch-buffer layer useful for generating a regrowth surface to be described below. In an exemplary device, $t_2=0.05$ μm, and $n_2=5\times10^{17}/cm^3$. A third layer 2640, to be referred to as multiple-quantum-well waveguide core layer (or waveguide-core active layer), with a thickness of $t_3$ is then grown on top of the second layer 2630. In an exemplary device $t_3=0.243$ μm. This waveguide-core active layer 2640 is made up of a series of sub-layers forming the quantum-well active medium. The lowest part of layer 2640 begins with an undoped $d_{LG}$ thick InGaAsP layer 2642 with a bandgap wavelength of $\lambda_{gLG}$, which forms the lower part of the waveguide core. In an exemplary device $\lambda_{gLG}=1.25$ μm and $d_{LG}=9$ nm. Sub-layer 2642 is then followed on top by 12 quantum well/barrier pairs for which each pair is made up of an undoped $d_{QWB}$ thick InGaAsP barrier layer 2644 with a bandgap wavelength of $\lambda_{gQWB}$ and an undoped $d_{QW}$ thick InGaAs (i.e. y=0) quantum well layer 2646. In an exemplary device $\lambda_{gQWB}=1.25$ μm. The uppermost part of layer 2640 is an undoped $d_{UG}$ thick InGaAsP layer 2648 with a bandgap wavelength of $\lambda_{gUG}$, which forms the upper-most part of the waveguide core. In an exemplary device $\lambda_{gUG}=1.25$ μm and $d_{UG}=18$ nm. The waveguide core layer 2640 is followed on top by a fourth layer 2650 of $t_4$ thick p-doped InP with a dopant density of $p_4$, which forms the upper waveguide cladding. In an exemplary device $t_4=1.5$ μm and $p_4=5\times10^{17}/cm^3$. The upper waveguide cladding layer 2650 is then followed by a fifth layer 2660 of $t_5$ thick highly p-doped InGaAsP layer with a bandgap wavelength of $\lambda_{g5}$ and a dopant density of $p_5$ for the purpose of forming ohmic contact with metal. In an exemplary device, $t_5=30$ nm, $p_5=1\times10^{18}/cm^3$, and $\lambda_{g5}=1.3$ μm. Metal M1 2670 of thickness $t_{m1}$ is deposited on top of layer 2660 to form an ohmic metal contact to the top n-type semiconductor. Metal M2 2680 of thickness $t_{m2}$ is deposited on the bottom of the n-doped substrate 2610 to form an ohmic contact to the bottom p-type semiconductor. In an exemplary device M1 is Ti/Pt/Au, M2 is AuGe/NVAu, $t_{m1}=0.2$ μm, and $t_{m2}=0.2$ μm.

Figure 25:
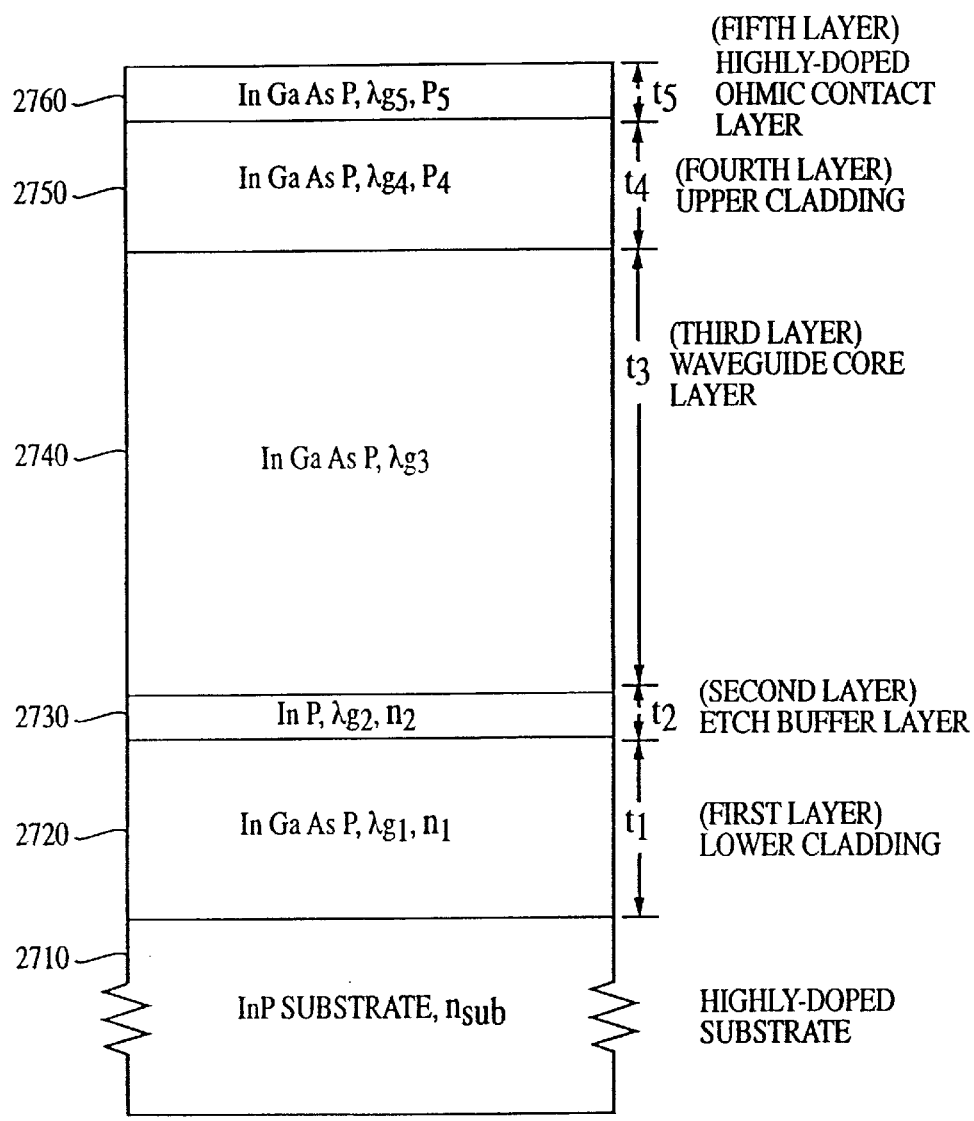

The epitaxial layer structure for the transparent waveguide section 2580 is shown in FIG. 25. It is identical to the active medium section 2508 of FIG. 24 except that the waveguide core layer has no quantum wells. Specifically, it is made up of various layers of lattice matched $In_{1-x}Ga_xAs_{1-y}P_y$ (in short-formed as InGaAsP) materials with compositions x and y chosen to give different bandgap wavelengths. Note that the bandgap wavelength $\lambda_g$ specifies uniquely the compositions of x and y for lattice matching. The epitaxial layer structure shown in FIG. 25 is made up of a first layer 2720 of $t_1$ thick n-doped InGaAsP material with a bandgap wavelength of $\lambda_{g1}$ and a n-dopant density of $n_1$ grown on a n-doped InP substrate 2710 with a substrate dopant density of $n_{sub}$. In an exemplary device, $t_1=1.5$ μm, $\lambda_{g1}=1.15$ μm, $n_1=5\times10^{17}/cm^3$, and $n_{sub}>10^{18}/cm^3$. This first layer 2720 forms the lower waveguide cladding. The first layer is followed on top by a second layer 2730 of $t_2$ thick n-doped InP with a dopant density of $n_2$, which forms an etch-buffer layer useful for generating a regrowth surface to be described below. In an exemplary device, $t_2=0.05$ μm, and $n_2=5\times10^{17}/cm^3$. A third layer 2740, to be referred to as waveguide core layer, with a thickness of $t_3$ is then grown on top of the second layer 2730. In an exemplary device $t_3=0.243$ μm. This waveguide-core active layer 2740 is made up of an undoped $t_3$ thick InGaAsP layer with a bandgap wavelength of $\lambda_{g3}$, which forms the waveguide core. In an exemplary device $\lambda_{g3}=1.25$ μm. The waveguide core layer 2740 is followed on top by a fourth layer 2750 of $t_4$ thick p-doped InP with a dopant density of $p_4$, which forms the upper waveguide cladding. In an exemplary device $t_4=1.5$ μm and $p_4=5\times10^{17}/cm^3$. The upper waveguide cladding layer 2750 is then followed by a fifth layer 2760 of $t_5$ thick highly p-doped InGaAsP layer with a bandgap wavelength of $\lambda_{g5}$ and a dopant density of $p_5$.

The fabrication process is now described by Step 1–18 below:

Step 1: Using the standard as MOCVD (Metal-Organic Chemical Vapor Deposition) or MBE (Molecular-Beam Epitaxy) III–V compound semiconductor growth technique, we first grow the $t_1$ thick $1^{st}$ layer 2620/2720 (note that 2620 is the same as 2720), the $t_2$ thick $2^{nd}$ layer 2630/2630, and the $t_3$ thick active $3^{rd}$ layer 2640 on the n-doped InP substrate 2610/2710. The above growth forms an active layer structure 2640 over the entire wafer. However, only some selected regions of the waveguide such as region 2308 are to have active material. This is achieved by patterning, masking, etching and regrowth technique, during which the wafer areas where we need the active material (called the Active-Medium Areas) are blocked via the patterning and masking and are not etched away. The other areas (called the Transparent-Medium Areas) will be etched away and regrown with the transparent waveguide core structure of 2740, which does not have the quantum wells.

Step 2: (See FIG. 26A) A 0.3 μm thick $SiO_2$ mask layer is deposited on top of step 1 structure using the standard Plasma Enhanced Chemical Vapor Deposition (PECVD) technique familiar to those skilled in the art. The wafer is then spin-coated with a 200 nm thick negative E-beam resist NEB-22. Pattern that will retain the active-medium area is then written by an electron beam on the NEB-22 using a high-resolution electro-beam lithography machine such as Leica EBPG-4 e-beam direct writer. Such a pattern is shown by the dashed line area in FIG. 23B, which overlaps the intended active-medium area 2508 of FIG. 23A shown as shaded region. Because NEB-22 is a negative E-beam resist, the area to be written by the electron beam is the same as the area to be retained, which is the active-medium area. The unwritten region is then developed and dissolved away by NEB-22 developing chemicals. The net result is shown in FIG. 26A.

Step 2: (see FIG. 26B) The pattern on NEB-22 is then transferred down to the silicon dioxide layer by etching away the $SiO_2$ region not covered by NEB-22 using the standard reactive-ion-beam etching (RIE) technique with $CHF_3$ plasma (e.g. 25 sccm $CHF_3$ at 30 mTorr pressure and 60 W RIE RF power). The NEB-22 is then stripped away using NEB-22 stripping chemicals. This step is thus left with a $SiO_2$ pattern corresponding to the dashed line region in FIG. 23B. The $SiO_2$ pattern forms a hard mask for the subsequent etching of semiconductor in step 3. The net result is shown in FIG. 26B.

Step 3: (See FIG. 26C) The $SiO_2$ mask is used as an etching mask and a standard plasma etching technique that can retain submicron pattern transfer accuracy over the required etching depth is used to etch down the $3^{rd}$ layer, which has a thickness of $t_3$. In an exemplary device, this etching depth is controlled to be slightly larger than the t3=0.243 μm etching depth required, such as between 0.243 μm and 0.25 μm. A plasma etching technique suitable for this purpose is reactive-ion-beam etching using $CH_4$, $H_2$, $Ar_2$, gas mixture with a flow-rate ratio of 10:34:10 at 45 mTorr pressure and 90 W RIE RF power. Another is using Inductively Coupled Plasma (ICP) etching technique with $Cl_2:N_2:Ar_2$ gas plasma with flow rates of 10:35:9 sccm (standard cubic foot per minute), respectively, under 140 Watts ICP power, 345 V DC bias, 2.3 mTorr pressure, and 250° C. substrate temperature. This plasma etching process typically etches InGaAsP materials much faster than the $SiO_2$ mask and has a better than 10:1 etching rate differentiation between the etching of the InGaAsP semiconductor and the $SiO_2$ mask materials. After the etching, the region not etched away is still covered with the $SiO_2$ mask with a thickness of about 0.275 microns (some $SiO_2$ mask material of about 0.025 microns will be etched away with the semiconductor etching), which will be further used as a mask for the following regrowth step. The net result after the etching is shown in FIG. 26C.

Step 6: (See FIG. 26D) The above etching etches slightly into the $2^{nd}$ layer of etch buffer layer, which is made up of InP. Using dilute 5% hydrochloric acid (HCl), it is possible to selectively etch away InP material without etching the InGaAsP materials. Thus by dipping the wafer from step 5 into dilute HCl briefly, the etch buffer layer will be etched away, forming a smooth surface that stops at the top of the $1^{st}$ layer, which is made up of InGaAsP material. The net result is shown in FIG. 26D. This smooth surface is conductive for the material regrowth to follow.

Step 7: (See FIG. 26E) The wafer is then placed into the MBE or MOCVD machine for materials regrowth. A layer of material corresponding to layer 2 2730 and layer 3 2740 for the transparent waveguide structure of 2700 is regrown on the wafer. As materials growth will only occur on the lattice matched InGaAsP surface, the surface region still covered by the left-over $SiO_2$ mask will not have materials growth on top. After the materials growth, the $SiO_2$ mask is removed using buffer (i.e. dilute) hydrofluoric acid or by using RIE with $CHF_3$ gas. The resultant structure is shown in FIG. 26E.

Step 8: (See FIG. 26F) After removing the SiO2 mask, the wafer is sent for another epitaxial regrowth by MBE or MOCVD to grow the $4^{th}$ layer 2650/2750, and the $5^{th}$ layer 2660/2760. The resultant structure is shown in FIG. 26F.

Step 9: (See FIG. 26G) After the growth, the next step will be to etch the waveguide structure of FIG. 23A to form the waveguide A and waveguide B pattern. This is done again by using E-beam writing with NEB-22 and then transferring the pattern to an $SiO_2$ mask. The net result is shown in FIG. 26G. This pattern is a cross section along the C–C' line in FIG. 23A.

Step 10: (See FIG. 26H) The patterning is followed by plasma etching of the InGaAsP semiconductor to a depth of larger than 3 micron (using the ICP process described in step 3). This depth is required to clear the entire epitaxial layer structure of FIGS. 24 and 25, so as to form a clear gap between waveguide A and waveguide B. The resultant structure is shown in FIG. 26H, where on the left is the transparent waveguide structure 2700 of Waveguide A and on the right is the active-medium structure 2600 of Waveguide B. This resultant structure corresponds to the cross sectional structure along the C–C' line in FIG. 23A.

Step 11: (See FIG. 26I) The wafer is then planarized for metal contact. The planarization is achieved by spin-coating the wafer with Benzocyclobutene (BCB). As the waveguide is submicron in width, care has to be taken to reduce stress to the waveguides due to the BCB material, which may break or distort the waveguide. To reduce stress, first a 1 micron thick SiO2 layer is deposited using PECVD before planarizing the wafer with BCB. The BCB is then baked. The stress induced by the BCB is relieved as the $SiO_2$ layer protects the waveguide from being pushed or pulled by the shrinking BCB during the baking process. The resultant structure is shown in FIG. 26I.

Step 12 (See FIG. 26J): The BCB coated is then etched down to the surface level of the waveguide. The BCB etching is done using the typical RIE process known to those skilled in the art, which involves the using of oxygen plasma to etch away polymeric materials. The resultant structure is shown in FIG. 26J.

Step 13 (See FIG. 26K): The $SiO_2$ deposited on the top as well as the side of the waveguide is then removed by dipping the wafer into a buffer HF (BHF) solution. The resultant structure is shown in FIG. 26K.

Step 14 (See FIG. 26L): The void region between the waveguide and the BCB made by the BCB shrinkage and the removal of $SiO_2$ is subsequently filled with a second deposition of $SiO_2$ and BCB planarization. The resultant structure is shown in FIG. 26L.

Step 15 (See FIG. 26M): After that, an e-beam lithography process with NEB-22 is used to pattern the require opening for metal deposition. Before the e-beam lithography, the wafer is coated with a 0.3 $\mu$m thick $SiO_2$ to be used as a mask for the subsequent etching of BCB. The pattern required is shown in FIG. 23C in which the dotted line shows the required pattern, which overlaps the active-medium area 2508. The net result after the transferring of the pattern to the $SiO_2$ mask layer is shown in FIG. 26M.

Step 16 (See FIG. 26N): After the patterning, the BCB in the exposed area is etched down using the typical RIE process known to those skilled in the art, which involves the using of oxygen plasma to etch away polymeric materials. The resultant structure is shown in FIG. 26N.

Figure 26O:
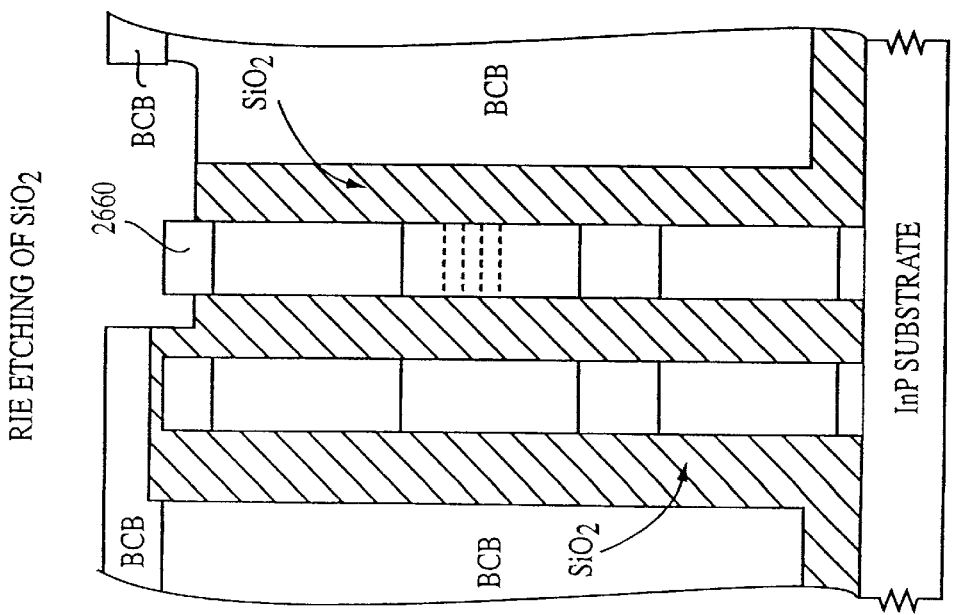

Step 17 (See FIG. 26O): After the BCB etching, the $SiO_2$ in the exposed area is etched down using the RIE process described in Step 2. The $SiO_2$ is etched down to just below the top of the $5^{th}$ InGaAsP layer 2660 for Ohmic contact. The resultant structure is shown in FIG. 26O.

Step 18 (See FIG. 26P): After the BCB opening is made, photoresist is spin-coated on the wafer and patterned with the required metal contact pattern shown by the dotted line area in FIG. 23C. A 0.2 $\mu$m thick Ti/Pt/Au metal layer is deposited and lifted off to form the p-side contact and a 0.2 $\mu$m thick AuGe/Ni/Au metal layer is deposited on the back of the substrate to form the n-side contact. The resultant structure just before the top metal lift-off is shown in FIG. 26P. After the top metal lift-off, the metal m1 above the photoresist shown is lifted away. In this resultant structure, metal m1 will only make contact with the active-medium area 2508 in Waveguide B. This step completes the entire fabrication process.

In view of the wide variety of embodiments to which the principles of the invention can be applied, it should be understood that the illustrated embodiments are exemplary only, and should not be taken as limiting the scope of the present invention.

Of course, it should be understood that a wide range of changes and modifications can be made to the preferred exemplary embodiments described above. Thus, it is intended that the foregoing detailed descriptions be regarded as illustrative rather than limiting, and that it be understood that it is the following claims, including all equivalents, which are intended to define the scope of this invention.

The claims should not be read as limited to the described order or elements unless stated to that effect. Therefore, all embodiments that come within the scope and spirit of the following claims and equivalents thereto are claimed as the invention.

What is claimed is:

1. A light transfer device comprising:
   a first light pathway having a first input and a first output;
   a second light pathway having a second output, said second light pathway coupled to said first light pathway, wherein light from said first input is transferable between said first and second light pathways; and
   an active medium positioned along at least one of said first and second light pathways, wherein said active medium is capable of receiving optical energy that modifies said active medium so that said active medium controls the transfer of light between said first and second light pathways.

2. The device of claim 1 wherein said active medium may be modified so that at least a portion of the light from said first input remains on said first light pathway and is output from said first output of said first light pathway.

3. The device of claim 2 wherein said active medium is positioned between said first input and said first output and said active medium may be modified to a gain state upon receiving an amount of optical energy so that light from said first input of said first light pathway is amplified in said active medium.

4. The device of claim 3 wherein when said active medium is modified to a gain state, the effect on the transferability of the light to said second output of said second light pathway is not substantially affected.

5. The device of claim 1 further comprising at least a third light pathway interposed between said first and second light pathways, said third light pathway configured in a circuitous shape to function as an intensity-increasing resonator between said first and second light pathways.

6. The device of claim 5 wherein said third light pathway further comprises a ring-shaped waveguide.

7. The device of claim 1 wherein said active medium further comprises a plurality of quantum wells within a waveguide.

8. The device of claim 1 wherein said active medium further comprises a layer of material within which the potential energy of an electron is less than outside the layer and the motion of an electron perpendicular to said layer is quantized.

9. The device of claim 8 wherein the thickness of said medium is between about 1 and 20 nanometers.

10. The device of claim 1 wherein the distance between said first input and said first output is less than about 150 microns.

11. The device of claim 1 wherein said pathways of said directional coupler are fabricated onto a substrate.

12. The device of claim 1 wherein said first light pathway and said second light pathway comprise a multi-mode interference structure.

13. The device of claim 1 wherein said first light pathway and said second light pathway comprise a photonic bandgap structure.

14. The device of claim 2 wherein said active medium is positioned along said second light pathway and said active medium may be modified to a loss state upon receiving an amount of optical energy so that light from said first input of said first light pathway is absorbed in said active medium.

15. The device of claim 2 wherein said active medium is positioned. along said second light pathway and said active medium may be modified to a gain state upon receiving an amount of optical energy so that light from said first input of said first light pathway is amplified in said active medium.

16. The device of claim 1 wherein said active medium is positioned between the said first input and said first output and a portion of the light from said first input remains on said first light pathway and is output from said first output when the active medium is modified to a state of transparency.

17. The device of claim 16 wherein said active medium may be modified to a loss state upon receiving an amount of optical energy so that the light energy output from said first output is decreased.

18. The device of claim 1 wherein said active medium may be modified to a loss state having absorptive properties so that the transferability of the light from said first input of said first light pathway to said second output of said second light pathway is affected by absorption by the medium.

19. The device of claim 1 wherein said active medium may be modified to a gain state having amplification properties so that the transferability of the light from said first input of said first light pathway to said second output of said second light pathway is affected by amplification by the medium.

20. The component of claim 1 wherein the refractive index of said active medium is substantially not changed upon modifying said medium.

21. A light transfer device comprising:
   a first light pathway having a first input and a first output;
   a second light pathway having a second output, said second light pathway coupled to said first light pathway, wherein light from said first input is transferable between said first and second light pathways;
   a third light pathway interposed between said first and second light pathways, said third light pathway configured in a circuitous shape to function as an intensity-increasing resonator between said first and second light pathways; and
   an active medium positioned along at least one of said first, second, and third light pathways, wherein said active medium is capable of receiving light that modifies said active medium so that said active medium controls the transfer of light between said first, second and third pathways.

22. The device of claim 21 wherein said active medium may be modified so that at least a portion of the light from said first input remains on said first light pathway and is output from said first output of said first light pathway.

23. The device of claim 21 further comprising at least a fourth light pathway coupled to one or more of said first, second and third pathways, said fourth light pathway configured in a circuitous shape to function as an intensity-increasing resonator.

24. The device of claim 21 wherein said third light pathway further comprises a ring-shaped waveguide.

25. A logic device comprising:
   a plurality of directional couplers, said directional couplers each being capable of modifying the propagation direction of a photon beam through an active medium having light transfer control properties modifiable via optical energy, said directional couplers being linked by inputs and outputs capable of transmitting said photon beam through one or more switchable propagation paths.

26. The logic device of claim 25 wherein said light transfer control properties of said active medium are modifiable without modifying substantially the refractive index of said active medium.

27. The logic device of claim 25 wherein said light transfer control properties alter the interference flux pattern of light within said logic device due to said active medium being in a loss state.

28. The logic device of claim 25 wherein said light transfer control properties alter the interference flux pattern of light within said logic device due to said active medium being in a gain state.

29. The logic device of claim 25 wherein each of said directional couplers further comprises:
   at least a first input signal port capable of receiving said photon beam;
   an active medium positioned near the first input signal port, wherein the active medium is capable of receiving electrical energy and said medium is drivable to a gain state by the electrical energy, and wherein the active medium is otherwise drivable to a transparency state; and
   a first output port capable of transmitting a photon beam from the active medium, wherein the photon beam will be amplified when the active medium is in the gain state and of negligible energy when the active medium is in the transparency state.

30. The logic device of claim 29 wherein said light transfer control properties of said active medium are modifiable without modifying substantially the refractive index of said active medium.

31. A light transfer device comprising:
   a first light pathway having a first input and a first output;
   a second light pathway having a second output, said second light pathway coupled to said first light pathway, wherein light from said first input is transferable between said first and second light pathways; and
   an active medium positioned along at least one of said first and second light pathways, wherein said active medium is capable of receiving electrical energy that modifies said active medium so that said active medium controls the transfer of light between said first and second light pathways.

32. The device of claim 31 wherein said active medium may be modified so that at least a portion of the light from said first input remains on said first light pathway and is output from said first output of said first light pathway.

33. The device of claim 32 wherein said active medium is positioned between said first input and said first output and said active medium may be modified to a gain state by electrical energy so that light from said first input of said first light pathway is amplified in said active medium.

34. The device of claim 33 wherein when said active medium is modified to a gain state, the effect on the transferability of the light to said second output of said second light pathway is not substantially affected.

35. The device of claim 31 further comprising at least a third light pathway interposed between said first and second light pathways, said third light pathway configured in a circuitous shape to function as an intensity-increasing resonator between said first and second light pathways.

36. The device of claim 35 wherein said third light pathway further comprises a ring-shaped waveguide.

37. The device of claim 31 wherein said active medium further comprises a plurality of quantum wells within a waveguide.

38. The device of claim 31 wherein said active medium further comprises a layer of material within which the potential energy of an electron is less than outside the layer and the motion of an electron perpendicular to said layer is quantized.

39. The device of claim 38 wherein the thickness of said medium is between about 1 and 20 nanometers.

40. The device of claim 31 wherein the distance between said first input and said first output is less than about 150 microns.

41. The device of claim 31 wherein said pathways of said directional coupler are fabricated onto a substrate.

42. The device of claim 31 wherein said first light pathway and said second light pathway comprise a multimode interference structure.

43. The device of claim 31 wherein said first light pathway and said second light pathway comprise a photonic bandgap structure.

44. The device of claim 31 wherein the electrical energy comprises an applied electric field.

45. The device of claim 31 wherein the electrical energy comprises an injection current.

46. The device of claim 31 wherein the gain property of the active medium is modifiable via the use of a pn junction.

47. The device of claim 31 wherein the loss property of the active medium is modifiable via the use of the quantum-confined Stark effect.

48. The device of claim 31 wherein the loss property of the active medium is modifiable via the use of the Franz-Keldysh effect.

49. The device of claim 32 wherein said active medium is positioned along said second light pathway and said active medium may be modified to a loss state by an electrical energy so that light from said first input of said first light pathway is absorbed in said active medium.

50. The device of claim 32 wherein said active medium is positioned along said second light pathway and said active medium may be modified to a gain state by an electrical energy so that light from said first input of said first light pathway is amplified in said active medium.

51. The device of claim 31 wherein said active medium is positioned between the said first input and the said first output and a portion of the light from said first input remains on said first light pathway and is output from said first output when the active medium is modified to a state of transparency.

52. The device of claim 51 wherein said active medium may be modified to a loss state by electrical energy so that the light energy output from said first output is decreased.

53. The device of claim 31 wherein said active medium may be modified to a loss state having absorptive properties so that the transferability of the light from said first input of said first light pathway to said second output of said second light pathway is affected by absorption by the medium.

54. The device of claim 31 wherein said active medium may be modified to a gain state having amplification properties so that the transferability of the light from said first input of said first light pathway to said second output of said second light pathway is affected by amplification by the medium.

55. The component of claim 51 wherein the refractive index of said active medium is substantially not changed upon modifying said medium.

56. A light transfer device comprising:
   a first light pathway having a first input and a first output;
   a second light pathway having a second output, said second light pathway coupled to said first light pathway, wherein light from said first input is transferable between said first and second light pathways;
   a third light pathway interposed between said first and second light pathways, said third light pathway configured in a circuitous shape to function as an intensity-increasing resonator between said first and second light pathways; and
   an active medium positioned along at least one of said first, second, and third light pathways, wherein said active medium is capable of receiving electrical energy that modifies said active medium so that said active medium controls the transfer of light between said first, second and third pathways.

57. The device of claim 56 wherein said active medium may be modified so that at least a portion of the light from said first input remains on said first light pathway and is output from said first output of said first light pathway.

58. The device of claim 56 further comprising at least a fourth light pathway coupled to one or more of said first, second or third pathways, said fourth light pathway configured in a circuitous shape to function as an intensity-increasing resonator.

59. The device of claim 56 wherein said third light pathway further comprises a ring-shaped waveguide.

60. A light transfer device comprising:
    a first light pathway having a first input and a first output;
    a second light pathway having a second output, said second light pathway spaced from said first light pathway;
    a third light pathway spaced from said first light pathway and said second light pathway, said third light pathway being movable between at least a first position relatively near both of said first and second light pathways and a second position relatively far from said first and second light pathways,
    wherein said first position allows said first light pathway to be optically coupled with said third light pathway, and simultaneously allows said third light pathway to be optically coupled with said second light pathway.

61. The device of claim 60 wherein said first, second and third light pathways include coupling sections that are relatively parallel to each other and said third light pathway being movable between said first and second light pathways.

62. The device of claim 60 wherein said third light pathway includes an angled portion that is shaped to complement a side portion of said intersecting first and second light pathways, said angled portion of said third light pathway being movable toward and away from said intersecting point to allow light to be transferred between said first and second light pathways and said angled portion of said third light pathway.

63. The device of claim 60 wherein said third light pathway includes two separate portions that are parallel to a portion of said first light pathway and a portion of said second light pathway, said third light pathway being movable toward and away from said first light pathway and said second light pathway to allow light to be transferred between said first and second light pathways and said third light pathway.

64. A method of manufacturing a light transfer device, said method comprising the steps of:
    etching at least two waveguide structures onto a substrate material, said waveguides each including input and output ends, at least one of said waveguides defining a gap area between its input and output end; and
    integrating an active medium onto said substrate into said gap area using epitaxial layer forming techniques to define an active medium section of said one of said waveguides, said active medium section including a plurality of quantum wells.

65. A method of manufacturing a waveguide structure, said waveguide structure having at least two waveguides, comprising:
    providing a silicon dioxide substrate;
    bonding a layer of GaAs to the substrate;
    patterning a photoresist for the waveguide structure;
    etching the GaAs not covered by the photoresist; and
    etching the silicon dioxide structure so as to form an undercut.

66. The method of manufacturing of claim 65, wherein at least one of the waveguide structures defines a gap area between an input and an out put end, said gap manufactured by a method comprising:
    providing an n-doped InP substrate;
    epitaxially growing a lower cladding layer of n-doped InGaAsP onto said substrate;
    growing a first layer of n-doped InP atop the lower cladding layer;
    growing an undoped layer of InGaAsP atop the first layer of InP; and
    providing a plurality of quantum wells, each quantum well comprising at least two layers, wherein a first barrier layer is provided by growing an undoped InGaAsP layer and a second quantum well layer is provided by growing an undoped layer of InGaAs.

67. A method of manufacturing a waveguide structure according to claim 65, further comprising:
    providing an n-doped InP substrate;
    epitaxially growing a lower cladding layer of n-doped InGaAsP onto said substrate;
    growing a first layer of n-doped InP atop the lower cladding layer;
    growing an undoped layer of InGaAsP atop the first layer of InP; and
    growing an upper cladding layer of p-doped InGaAsP and an upper layer of p-doped InGaAsP.

* * * * *

UNITED STATES PATENT AND TRADEMARK OFFICE
CERTIFICATE OF CORRECTION

PATENT NO. : 6,473,541 B1
DATED : October 29, 2002
INVENTOR(S) : Seng-Tiong Ho

It is certified that error appears in the above-identified patent and that said Letters Patent is hereby corrected as shown below:

<u>Title page,</u>
Item [56], References Cited, OTHER PUBLICATIONS, reference "Am Vol. 10", delete "No. Feb. 2," and substitute -- No. 2, February -- in its place.

<u>Column 119,</u>
Line 62, immediately after "positioned" delete "." (period).

<u>Column 124,</u>
Line 37, delete "InGaAs" and substitute -- InGaAsP -- in its place.

Signed and Sealed this

Ninth Day of September, 2003

JAMES E. ROGAN
*Director of the United States Patent and Trademark Office*